United States Patent
Oda et al.

(10) Patent No.: US 8,692,779 B2
(45) Date of Patent: *Apr. 8, 2014

(54) POINTER DETECTION APPARATUS AND POINTER DETECTION METHOD

(75) Inventors: Yasuo Oda, Kazo (JP); Yoshihisa Sugiyama, Kazo (JP); Sadao Yamamoto, Kazo (JP)

(73) Assignee: Wacom Co., Ltd., Saitama (JP)

( * ) Notice: Subject to any disclaimer, the term of this patent is extended or adjusted under 35 U.S.C. 154(b) by 310 days.

This patent is subject to a terminal disclaimer.

(21) Appl. No.: 12/732,084

(22) Filed: Mar. 25, 2010

(65) Prior Publication Data

US 2010/0321331 A1    Dec. 23, 2010

(30) Foreign Application Priority Data

Jun. 18, 2009    (JP) ................................. 2009-145880

(51) Int. Cl.
G06F 3/041    (2006.01)

(52) U.S. Cl.
USPC ......................................................... 345/173

(58) Field of Classification Search
USPC ......................................................... 345/173
See application file for complete search history.

(56) References Cited

U.S. PATENT DOCUMENTS

| | | | |
|---|---|---|---|
| 5,625,382 A | 4/1997 | Ebihara et al. | |
| 5,841,427 A | 11/1998 | Teterwak | |
| 6,522,320 B1 | 2/2003 | Chou | |
| 7,075,316 B2 | 7/2006 | Umeda et al. | 324/658 |
| 7,078,918 B2 | 7/2006 | Umeda et al. | 324/679 |
| 7,084,645 B1 | 8/2006 | Umeda et al. | 324/686 |
| 7,084,860 B1 | 8/2006 | Jaeger et al. | |
| 7,742,041 B2 | 6/2010 | Lee et al. | |
| 7,773,078 B2 | 8/2010 | Lee et al. | |

(Continued)

FOREIGN PATENT DOCUMENTS

| | | |
|---|---|---|
| CA | 2 316 067 A1 | 2/2002 |
| CN | 1749819 A | 3/2006 |

(Continued)

OTHER PUBLICATIONS

Extended European Search Report for corresponding European Application No. 10158389.6, dated Dec. 30, 2010, 2 pages.

(Continued)

Primary Examiner — Quan-Zhen Wang
Assistant Examiner — Nelson D Runkle, III
(74) Attorney, Agent, or Firm — Seed IP Law Group PLLC

(57) ABSTRACT

A pointer detection apparatus includes a conductor pattern with first conductors disposed in a first direction and second conductors disposed in a second direction that crosses the first direction, and a code string signal production circuit for producing signals based on orthogonal code strings with phases different from each other and supplying the produced signals to the first conductors. The apparatus also includes a signal detection circuit connected to the second conductors for detecting a signal corresponding to a variation of electrostatic capacitance between the conductor pattern and a pointer, an analog to digital conversion (ADC) circuit for converting the signal output from the signal detection circuit into a digital signal comprising a word string of multiple bits, and a correlation detection circuit for determining correlation values between the code strings and the word string. The apparatus also includes a memory for storing correlation values successively output from the correlation detection circuit, wherein the pointer is detected based on the correlation values.

29 Claims, 58 Drawing Sheets

(56) References Cited

U.S. PATENT DOCUMENTS

| | | | |
|---|---|---|---|
| 7,868,874 B2 | 1/2011 | Reynolds | |
| 2001/0008523 A1 | 7/2001 | Song | |
| 2004/0113895 A1 | 6/2004 | Lubarsky, Jr. et al. | |
| 2005/0001665 A1 | 1/2005 | Lin | |
| 2005/0073324 A1* | 4/2005 | Umeda et al. | 324/662 |
| 2005/0146513 A1 | 7/2005 | Hill et al. | |
| 2006/0007181 A1* | 1/2006 | Jung et al. | 345/173 |
| 2006/0017710 A1 | 1/2006 | Lee et al. | |
| 2006/0060752 A1 | 3/2006 | Lee et al. | |
| 2006/0097991 A1* | 5/2006 | Hotelling et al. | 345/173 |
| 2006/0146038 A1 | 7/2006 | Park et al. | |
| 2007/0109274 A1 | 5/2007 | Reynolds | |
| 2007/0229464 A1 | 10/2007 | Hotelling et al. | |
| 2007/0229468 A1 | 10/2007 | Peng et al. | |
| 2007/0257890 A1* | 11/2007 | Hotelling et al. | 345/173 |
| 2008/0012835 A1 | 1/2008 | Rimon et al. | |
| 2008/0062139 A1* | 3/2008 | Hotelling et al. | 345/173 |
| 2008/0122798 A1 | 5/2008 | Koshiyama et al. | |
| 2008/0158167 A1* | 7/2008 | Hotelling et al. | 345/173 |
| 2008/0158175 A1 | 7/2008 | Hotelling et al. | 345/173 |
| 2008/0158180 A1 | 7/2008 | Krah et al. | 345/173 |
| 2008/0162996 A1 | 7/2008 | Krah et al. | |
| 2008/0225015 A1 | 9/2008 | Hashida | |
| 2008/0309625 A1 | 12/2008 | Krah et al. | 345/173 |
| 2009/0002337 A1 | 1/2009 | Chang | |
| 2009/0009483 A1 | 1/2009 | Hotelling et al. | 345/173 |
| 2009/0127005 A1 | 5/2009 | Zachut et al. | |
| 2009/0167720 A1 | 7/2009 | Geaghan | |
| 2010/0059295 A1 | 3/2010 | Hotelling et al. | |
| 2010/0060591 A1 | 3/2010 | Yousefpor et al. | |
| 2010/0060593 A1 | 3/2010 | Krah | |
| 2010/0060596 A1 | 3/2010 | Whight | |
| 2010/0073301 A1 | 3/2010 | Yousefpor et al. | |
| 2010/0085324 A1 | 4/2010 | Noguchi et al. | |
| 2010/0321313 A1 | 12/2010 | Oda et al. | |
| 2010/0321314 A1 | 12/2010 | Oda et al. | |
| 2010/0321315 A1 | 12/2010 | Oda et al. | |
| 2010/0321332 A1* | 12/2010 | Oda et al. | 345/174 |
| 2010/0321333 A1 | 12/2010 | Oda et al. | |
| 2010/0321334 A1 | 12/2010 | Oda et al. | |
| 2011/0042152 A1 | 2/2011 | Wu | |
| 2011/0148785 A1 | 6/2011 | Oda et al. | 345/173 |
| 2011/0148806 A1 | 6/2011 | Oda et al. | 345/174 |
| 2011/0153263 A1 | 6/2011 | Oda et al. | 702/150 |
| 2012/0212441 A1 | 8/2012 | Christiansson et al. | |

FOREIGN PATENT DOCUMENTS

| | | | |
|---|---|---|---|
| CN | 1753447 | A | 3/2006 |
| CN | 1771430 | A | 5/2006 |
| JP | 5-224818 | | 9/1993 |
| JP | 6-4213 | | 1/1994 |
| JP | 7-141088 | | 6/1995 |
| JP | 8-87369 | | 4/1996 |
| JP | 8-179871 | | 7/1996 |
| JP | 8-190453 | | 7/1996 |
| JP | 8-241161 | | 9/1996 |
| JP | 9-45184 | | 2/1997 |
| JP | 9-222947 | | 8/1997 |
| JP | 09292950 | A | 11/1997 |
| JP | 10-161795 | | 6/1998 |
| JP | 2000-76014 | | 3/2000 |
| JP | 2000-105645 | | 4/2000 |
| JP | 2000-112642 | | 4/2000 |
| JP | 2002076984 | A | 3/2002 |
| JP | 2003-22158 | | 1/2003 |
| JP | 2005-114361 | | 4/2005 |
| JP | 2005122814 | A | 5/2005 |
| JP | 2005-152223 | | 6/2005 |
| JP | 2005-157643 | | 6/2005 |
| JP | 3144241 | U | 8/2008 |
| JP | 2008-257374 | A | 10/2008 |
| JP | 2009054141 | A | 3/2009 |
| JP | 2009516295 | A | 4/2009 |
| WO | 2007017848 | A2 | 2/2007 |
| WO | 2008007372 | A2 | 1/2008 |
| WO | 2008/085719 | | 7/2008 |

OTHER PUBLICATIONS

Japanese Office Action dated Mar. 12, 2013, for corresponding JP Application No. 2009-288273, 2 pages.

Japanese Office Action dated Apr. 16, 2013, for corresponding JP Application No. 2009-145880, 2 pages.

Office Action, dated Nov. 22, 2013, for corresponding Chinese Application No. 201010208533.0, 15 pages.

Chinese Office Action dated Jan. 6, 2014, for corresponding CN Application No. 2014010100238580, 6 pages.

Partial European Search report dated Jan. 3, 2014, for corresponding EP Application No. 10194073.2, 6 pages.

Extended European Search Report dated Jan. 7, 2014, for corresponding EP Application No. 10194074.0, 8 pages.

* cited by examiner

AMPLITUDE
OUTPUT SIGNAL OF $X_{124}$

CODE FOR CORRELATION ARITHMETIC OPERATION (SPREAD CODE)

CORRELATION VALUE
OUTPUT SIGNAL OF CORRELATOR

FIG.20A BEFORE PSK MODULATION

FIG.20B AFTER PSK MODULATION

FIG. 24A  BEFORE FSK MODULATION
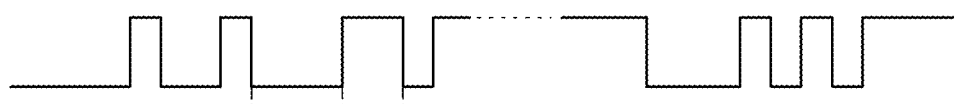
FIG. 24B  AFTER FSK MODULATION
FIG. 25
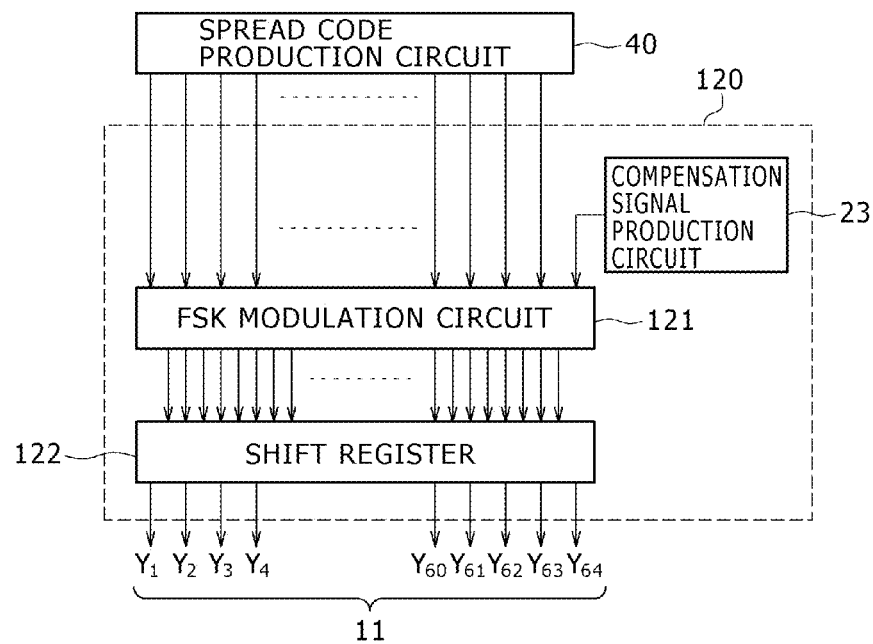

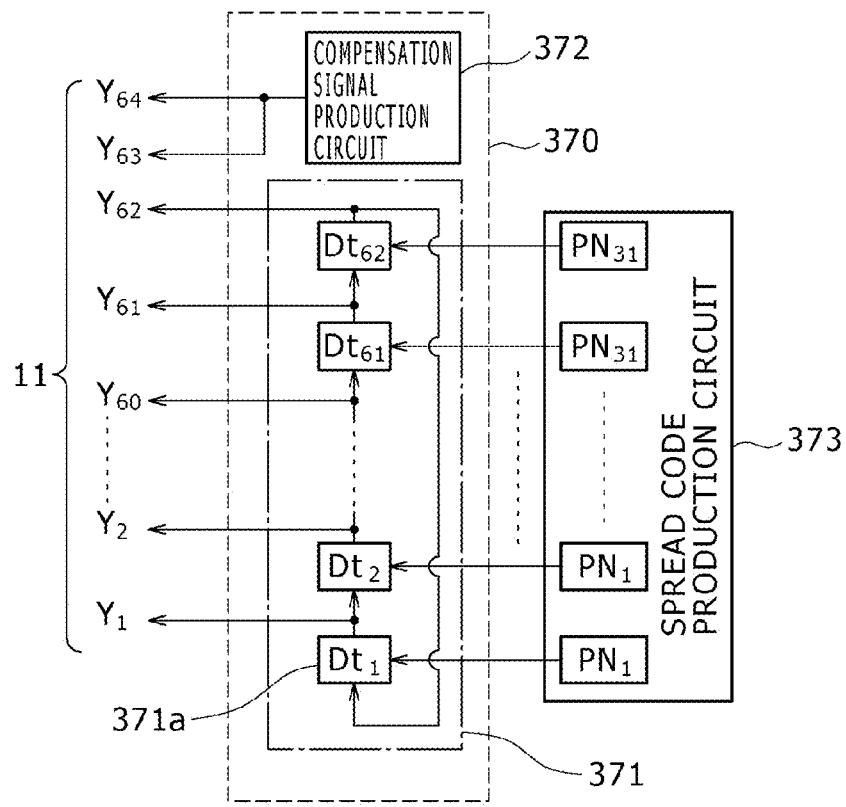

FIG.70A
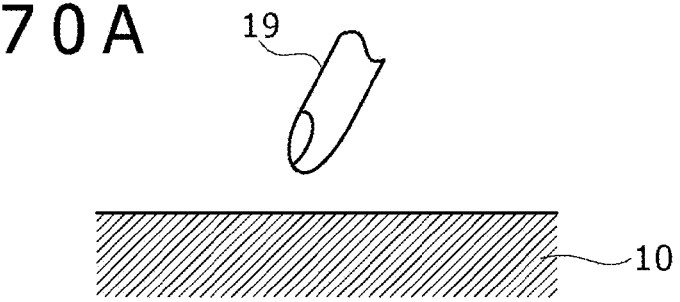
FIG.70B
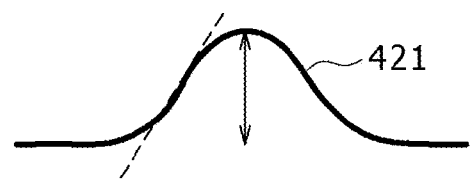
FIG.71
| 20 | 50 | 20 |
|----|-----|----|
| 50 | 100 | 50 |
| 20 | 50 | 20 |

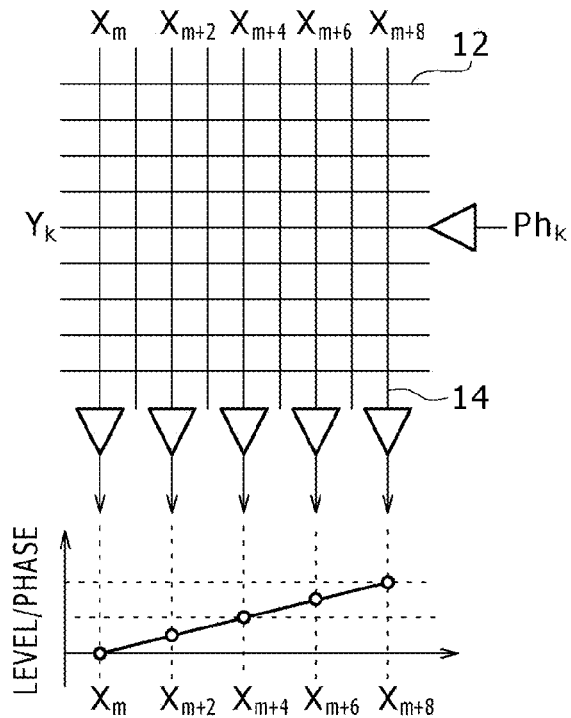
FIG.75A
FIG.75B
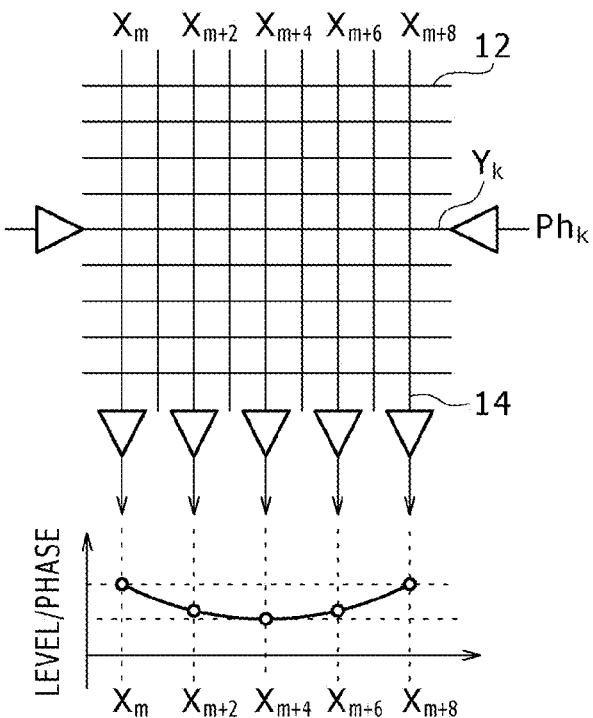
FIG.76A
FIG.76B

POINTER DETECTION APPARATUS AND POINTER DETECTION METHOD

CROSS REFERENCES TO RELATED APPLICATIONS

The present application claims priority under 35 U.S.C. §119 from Japanese Patent Application JP 2009-145880 filed in the Japanese Patent Office on Jun. 18, 2009, the entire content of which is incorporated herein by reference.

BACKGROUND OF THE INVENTION

1. Field of the Invention

This invention relates to a pointer detection apparatus and a pointer detection method, and more particularly to a pointer detection apparatus and a pointer detection method wherein a pointer is detected by an electrostatic coupling system.

2. Description of the Related Art

Conventionally, for the detection of a position of a pointer used with a touch panel or a like apparatus, various sensor systems have been proposed such as a resistive film system and an electrostatic coupling system (electrostatic capacitive system). In recent years, a pointer detection apparatus incorporating an electrostatic coupling system has been vigorously developed.

Electrostatic coupling systems are divided into two types including a surface capacitive type and a projected capacitive type. An electrostatic coupling system of the surface capacitive type is used, for example, in an ATM (Automated Teller Machine), and that of the projected capacitive type is used, for example, in a portable telephone set. In both systems, a variation of the electrostatic coupling state between a sensor electrode and a pointer, such as a finger or an electrostatic pen, is detected in order to detect a position of the pointer.

A pointer detection apparatus of the projected capacitive electrostatic coupling type includes an electrode formed in a predetermined pattern on a transparent substrate or a transparent film, and detects a variation of the electrostatic coupling state between a pointer and the electrode when the pointer approaches the electrode. Conventionally, for a pointer detection apparatus of this type, various techniques for optimizing the configuration have been proposed and are disclosed, for example, in Japanese Patent Laid-Open Nos. 2003-22158, HEI 9-222947 and HEI 10-161795. In particular, Japanese Patent Laid-Open No. 2003-22158 discloses a technique in which a code division multiplexing system using an orthogonal spread code is applied to a multi-user touch system. Japanese Patent Laid-Open No. HEI 9-222947 discloses a coordinate inputting apparatus which uses a pseudo-random signal. Japanese Patent Laid-Open No. HEI 10-161795 discloses a pen for use with an electrostatic capacitive coordinate apparatus.

Further, a pointer detection apparatus of the type called cross point electrostatic coupling system has been developed from the projected capacitive type electrostatic coupling system. An operation of a pointer detection apparatus of the cross point electrostatic coupling type will now be described briefly with reference to the accompanying drawings. FIG. 84A shows a general configuration of a sensor section and associated elements of a pointer detection apparatus of the cross point electrostatic coupling system and FIG. 84B illustrates an output signal waveform of the pointer detection apparatus.

Referring to FIGS. 84A and 84B, a sensor section 600 includes a transmission conductor array 601 formed from a plurality of transmission conductors 602, and a reception conductor array 603 formed from a plurality of reception conductors 604. An insulating film is formed between the transmission conductor array 601 and the reception conductor array 603. The transmission conductors 602 have a predetermined shape and extend in a predetermined direction, indicated by an arrow mark X in FIG. 84A, and are disposed in parallel to each other and in a spaced relationship by a predetermined distance from each other. The reception conductors 604 have a predetermined shape and extend in a direction crossing the extension direction of the transmission conductors 602, that is, in the direction indicated by an arrow mark Y in FIG. 84A. The reception conductors 604 are disposed in parallel to each other and at a predetermined distance from each other.

In the sensor section 600 having the configuration described above, a predetermined signal is supplied to a predetermined transmission conductor of the transmission conductors 602 and a variation of current flowing to a cross point between the transmission conductor 602 and a reception conductor 604 is detected at each of the cross points of the transmission conductors 602 and the reception conductors 604. When a pointer 610 such as a finger is placed to the sensor section 600, current is shunted through the pointer 610 and thus the current flowing into the reception conductors 604 changes. Therefore, the position of the pointer 610 can be detected by determining a cross point at which current exhibits a variation. Further, with a pointer detection apparatus of the cross point type electrostatic coupling system, simultaneous multipoint detection of a plurality of pointers is possible because a plurality of cross points are formed on the sensor section 600 as seen in FIGS. 84A and 84B.

A principle of position detection of the cross point type electrostatic coupling system will now be described more particularly. Assume for example that a predetermined signal is supplied to the transmission conductor $Y_6$ and a pointing position of the pointer 610, (i.e., a finger) on the transmission conductor $Y_6$ is detected as seen in FIG. 84A. When a signal is supplied to the transmission conductor $Y_6$, the difference between currents flowing to the reception conductors $X_1$ and $X_2$ is detected through a differential amplifier 605. Then, after a predetermined interval of time, the reception conductors to be used for current difference detection are changed over from the reception conductors $X_1$ and $X_2$ to the reception conductors $X_2$ and $X_3$, and the current difference between the reception conductors $X_2$ and $X_3$ is detected. This operation is repeated up to the reception conductor $X_M$.

Thereupon, a level variation of an output signal of the differential amplifier 605 at the position of each cross point on the transmission conductor $Y_6$ is determined. FIG. 84B illustrates a characteristic of the level variation. Referring to FIG. 84B, the illustrated characteristic represents detection signals output from the reception conductors $X_1$ to $X_M$ when they are consecutively selected and connected to the differential amplifier 605. A characteristic indicated by a broken line curve in FIG. 84B represents a level variation of the signal output from the differential amplifier 605 and another characteristic indicated by a solid line curve represents a variation of the integration value of the output signal of the differential amplifier 605.

In the example illustrated in FIGS. 84A and 84B, since the pointer 610 is placed in proximity to cross points of the reception conductors $X_5$ and $X_{M-5}$ on the transmission conductor $Y_6$, the current flowing in proximity to these cross points varies. Therefore, in the example illustrated in FIG. 84B, the output signal of the differential amplifier 605 varies at positions corresponding to positions in proximity to the cross points of the reception conductors $X_5$ and $X_{M-5}$ on the transmission conductor $Y_6$, and the integration value of the output signal varies. The position of the pointer 610 can be detected based on the variation of the integration value. In a conventional pointer detection apparatus, the detection described above is carried out while successively, one by one, selecting the transmission conductors to be used for the detection.

SUMMARY OF THE INVENTION

Since such a conventional pointer detection apparatus of the cross point electrostatic coupling system as described above carries out a position detection process of a pointer for each cross point, it has a problem in that a long period of time is required for detection at all cross points. For example, if the sensor section includes 64 transmission conductors and 128 reception conductors and the detection processing time at each of the cross points is, for example, 256 μsec, then a period of time of approximately 2 seconds is required for detection at all cross points, that is, total 8,192 cross points. Therefore, the pointer detection apparatus as described above is not quite suitable for practical use.

Therefore, it is an object of the present invention to provide a pointer detection apparatus and a pointer detection method of the cross point electrostatic coupling system which is capable of detecting a pointer at a higher speed To that end, a pointer detection apparatus is described that includes a conductor pattern with a plurality of first conductors disposed in a first direction and a plurality of second conductors disposed in a second direction which crosses the first direction. The pointer detection apparatus further includes a code string signal production circuit for producing a plurality of signals, based on a plurality of code strings that are orthogonal to each other and have phases different from each other, and supplying the produced plurality of signals to the first conductors. A signal detection circuit is connected to the plurality of second conductors for detecting a signal corresponding to a variation of electrostatic capacitance between the conductor pattern and a pointer. An analog to digital conversion circuit is provided for converting the signal output from the signal detection circuit into a digital signal comprising a word formed of a plurality of bits (a word string). A correlation detection circuit is provided for determining correlation values between the plurality of code strings and the word string output from the analog to digital conversion circuit, respectively. Finally, a memory circuit is provided for storing the correlation values output from the correlation detection circuit, wherein a position of the pointer on the conductor pattern is detected based on the correlation values stored in the memory circuit.

As used herein, "signals produced based on a plurality of code strings that are orthogonal to each other" may mean the plurality of code strings themselves, or the plurality of code strings that have undergone a predetermined processing, for example, modulation.

According to another aspect of the present invention, there is provided a pointer detection method including generally six steps. The first step includes supplying a plurality of signals, which are produced based on a plurality of code strings having orthogonality relative to each other and having phases different from each other, to a plurality of first conductors of a conductor pattern, wherein the plurality of first conductors are disposed in a first direction and a plurality of second conductors are disposed in a second direction which crosses the first direction. The second step includes detecting a signal corresponding to a variation of electrostatic capacitance between the conductor pattern and a pointer. The third step includes converting the detected signal into a digital signal comprising a word formed of a plurality of bits. The fourth step includes determining correlation values between the code strings and the digital signal obtained by the conversion, respectively. The fifth step includes storing the correlation values. The sixth step includes detecting a position of the pointer based on the correlation values.

In the pointer detection apparatus and the pointer detection method, a plurality of signals produced based on a plurality of code strings having orthogonality and having phases different from each other are supplied at the same time to the plurality of transmission conductors to detect the presence of a pointer on the conductor pattern and the position on the conductor pattern pointed to by the pointer. In other words, a pointer detection process may be carried out simultaneously with respect to a plurality of cross points. Therefore, the present invention makes it possible for a pointer detection apparatus of the cross point electrostatic coupling type to detect the presence of a pointer and the position pointed to by the pointer at a higher speed.

Furthermore, the present invention makes it possible for a pointer detection apparatus of the electrostatic coupling system to carry out position detection of multiple positions (i.e., multiple positions of multiple pointers, or of multiple fingers of one or more users) at the same time.

The above and other objects, features and advantages of the present invention will become apparent from the following description and the appended claims, taken in conjunction with the accompanying drawings.

BRIEF DESCRIPTION OF THE DRAWINGS

FIG. 24A is a waveform diagram of a spread code before FSK modulation in a third embodiment of the present invention, and FIG. 24B is a waveform diagram of a signal waveform after FSK modulation of the spread code of FIG. 24A;

FIG. 25 is a block diagram showing a configuration of a spread code supplying circuit according to the third embodiment;

FIGS. 58A to 58C are diagrammatic views illustrating a different manner of switching operation of transmission conductors according to modification 16;

FIG. 59 is a block diagram showing a general configuration of a spread code supplying circuit according to modification 17;

FIGS. 69A, 69B and 70A, 70B are schematic views and diagrammatic views, respectively, illustrating a principle of identification of a hovering state according to modification 24;

FIG. 71 is a diagrammatic view illustrating the principle of identification of a hovering state according to modification 24;

FIG. 75A is a diagrammatic view illustrating a manner where a spread code is supplied from one side of a transmission conductor, and FIG. 75B is a diagrammatic view illustrating a relationship between the position of reception conductors in the case illustrated in FIG. 75A and the ratio between the level of detection signals and a phase delay (i.e., level/phase);

FIG. 76A is a diagrammatic view illustrating a manner where a spread code is supplied from the opposite sides of a transmission conductor, and FIG. 76B is a diagrammatic view illustrating a relationship between the position of reception conductors in the case illustrated in FIG. 76A and the ratio between the position of detection signals and a phase delay (i.e., level/phase);

DETAILED DESCRIPTION OF THE PREFERRED EMBODIMENTS

Several embodiments of a pointer detection apparatus and a pointer detection method in accordance with the present invention will be described with reference to the accompanying drawings. One skilled in the art will appreciate that the present invention is not limited to the described embodiments; the descriptions are provided for illustrative purposes only. The embodiments will be described in the following order:

1. First Embodiment: examples of a basic configuration;
2. Second Embodiment: examples of a configuration which uses a PSK-modulated spread code;
3. Third Embodiment: examples of a configuration which uses an FSK-modulated spread code; and
4. Fourth Embodiment: examples of a configuration wherein a transmission conductor array and a reception conductor array are divided into several regions (or blocks).

1. First Embodiment

In a first embodiment of the present invention, a basic configuration of an exemplary pointer detection apparatus and a pointer detection method of the present invention are described. An electrostatic coupling method for detecting the position of a pointer based on the variation of an electrostatic coupling state between a transmission conductor and a reception conductor of a sensor section is used in the present embodiment. Further, in the present embodiment, an example of a configuration is described wherein spread codes, each in the form of a code string, are supplied at the same time to all transmission conductors such that signal detection is carried out at the same time through reception conductors.

[Configuration of the Pointer Detection Apparatus]

Figure 1:
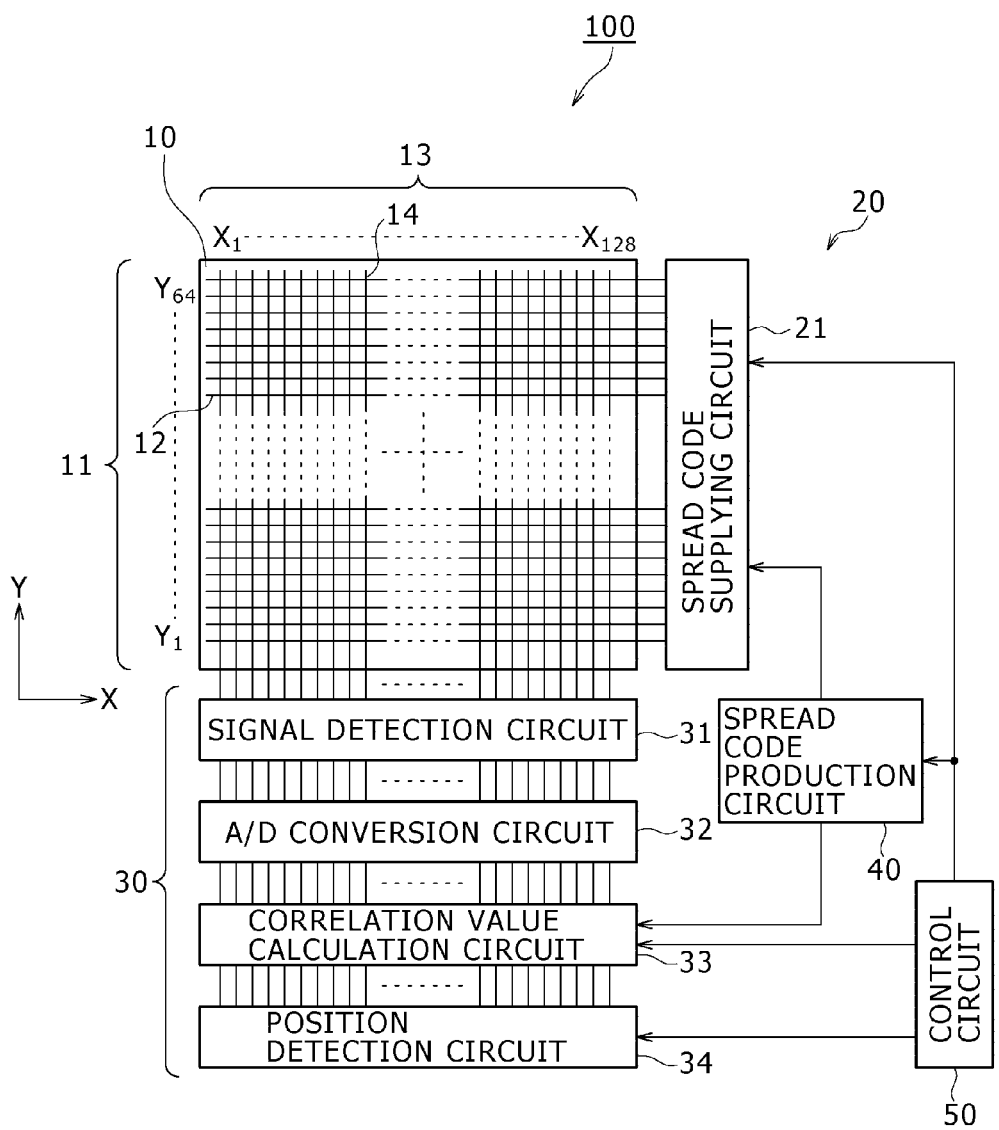
FIG. 1 is a schematic block diagram of a pointer detection apparatus according to a first embodiment of the present invention.

FIG. 1 shows a general configuration of the pointer detection apparatus according to the first embodiment. A pointer detection apparatus 100 includes a sensor section 10, which is a conductor pattern, a transmission section 20, a reception section 30, a spread code production circuit 40, and a control circuit 50. A configuration of the components is described below.

Figure 2:
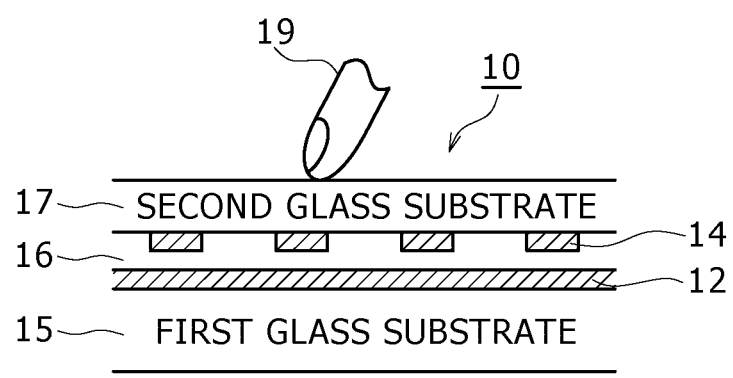
FIG. 2 is a schematic sectional view of a sensor section of the pointer detection apparatus of FIG. 1.

First, the configuration of the sensor section 10 is described with reference to FIGS. 1 and 2. FIG. 2 shows a cross section of the sensor section 10 as viewed from the side of X axis of the sensor section 10 in FIG. 1. The sensor section 10 includes a first glass substrate 15, a transmission conductor array 11 formed from a plurality of transmission conductors 12 (first conductors), a reception conductor array 13 formed from a plurality of reception conductors 14 (second conductors), a spacer 16, and a second glass substrate 17. The transmission conductor array 11 of transmission conductors 12, spacer 16, reception conductor array 13 of reception conductors 14, and second glass substrate 17 are disposed on the first glass substrate 15.

In the present embodiment, a detection surface for a pointer such as a finger or an electrostatic pen is the surface of the second glass substrate 17. Further, in the present embodiment, a sheet-like or film-like substrate formed from synthetic resin or the like may be used in place of the first glass substrate 15 and the second glass substrate 17.

The transmission conductors 12 and the reception conductors 14 are formed from a transparent electrode film in the form of an ITO (Indium Tin Oxide) film, copper foil or the like. An electrode pattern of the transmission conductors 12 may be formed, for example, as described below. First, an electrode film made of a material described above or the like material is formed on the first glass substrate 15, for example, by sputtering, vapor deposition, spread coating or by using any other technique known in the art. Then, a predetermined electrode pattern is formed by etching on the electrode film. An electrode pattern of the reception conductors 14 may be formed on the second glass substrate 17 similarly to the electrode pattern of the transmission conductors 12.

Where the transmission conductors 12 and reception conductors 14 are formed from copper foil, it is possible to blow ink, which contains copper particles, to a glass substrate or the like to form the predetermined electrode pattern.

The shape of the transmission conductor 12 and the reception conductor 14 can be formed, for example, from a linear-shaped or line-shaped conductor. Further, in regard to the shape of the transmission conductors 12, a diamond shape, a linear pattern, or the like may be applied. Preferably, the width of the transmission conductors 12 is made greater than the width of the reception conductor 14.

The spacer 16 may be formed, for example, from a synthetic resin such as PVB (polyvinyl butyral), EVA (ethylene-vinyl acetate copolymer), acrylic resin or the like. Also it is possible to form the spacer 16 from silicon resin having a high refractive index or high permittivity. In this instance, the parallax of the spacer 16 will be suppressed and an optical characteristic improved.

Where the spacer 16 is formed from synthetic resin, the spacer 16 may be formed, for example, in the following manner. First, a plastic sheet is sandwiched by the transmission conductors 12 and the reception conductors 14. Then, pressing and heating are carried out while vacuum drawing is carried out between the conductors to form the spacer 16. As another example, liquid synthetic resin may be poured into a space between the transmission conductors 12 and the reception conductors 14, and then the synthetic resin is hardened to form the spacer 16.

The transmission conductor array 11 is formed from a plurality of transmission conductors (first conductors) 12 extending in a predetermined direction, that is, in an X direction shown in FIG. 1. The plural transmission conductors 12 are disposed in parallel to each other in a spaced relationship by a predetermined distance from each other in a Y direction shown in FIG. 1. The reception conductor array 13 is formed from a plurality of reception conductors (second conductors) 14 extending in a direction which crosses the direction of the transmission conductors 12. The plural reception conductors 14 are disposed in parallel to each other and in a spaced relationship by a predetermined distance from each other in the X direction in FIG. 1.

In the present embodiment, the extending direction of the transmission conductors 12 and the extending direction of the reception conductors 14 are orthogonal to each other. However, the present invention is not limited to the above arrangement. The extending directions of the conductors 12 and 14 may not necessarily be orthogonal to each other. It is only necessary for the extending direction of the transmission conductors 12 and the extending direction of the reception conductors 14 to cross each other so as to form cross points for position detection.

In the present embodiment, the number of the transmission conductors 12 is 64 and the number of the reception conductors 14 is 128. Further, disposition intervals or pitches of the transmission conductors 12 and the reception conductors 14 are determined individually to be 3.2 mm. However, the present invention is not limited to this, and the number and the pitch of the transmission conductors 12 and the reception conductors 14 may be suitably set depending on the size of the sensor section 10, required detection accuracy and so forth.

Further, in FIG. 1, indexes n from "1" to "64" are applied consecutively to the transmission conductors 12 in the transmission conductor array 11 beginning with the transmission conductor 12 on the side to which the reception section 30 is connected. The transmission conductor 12 corresponding to the index n is hereinafter referred to as transmission conductor $Y_n$. Also, in FIG. 1, indexes m from "1" to "128" are applied consecutively to the reception conductors 14 in the reception conductor array 13 beginning with the reception conductor 14 on the side remote from the side to which the transmission section 20 is connected. The reception conductor 14 corresponding to the index m is hereinafter referred to as reception conductor $X_m$.

The transmission section 20 supplies an orthogonal code of a predetermined chip length to the transmission conductor array 11. In the present example, a spread code in the form of a code string is applied as an example of an orthogonal code, and the transmission section 20 is formed from a spread code supplying circuit 21 serving as a code string signal production circuit for supplying a spread code in the form of a code string. A spread code of 63-chip length is supplied to the transmission conductor array 11 in the present embodiment.

Figure 3:
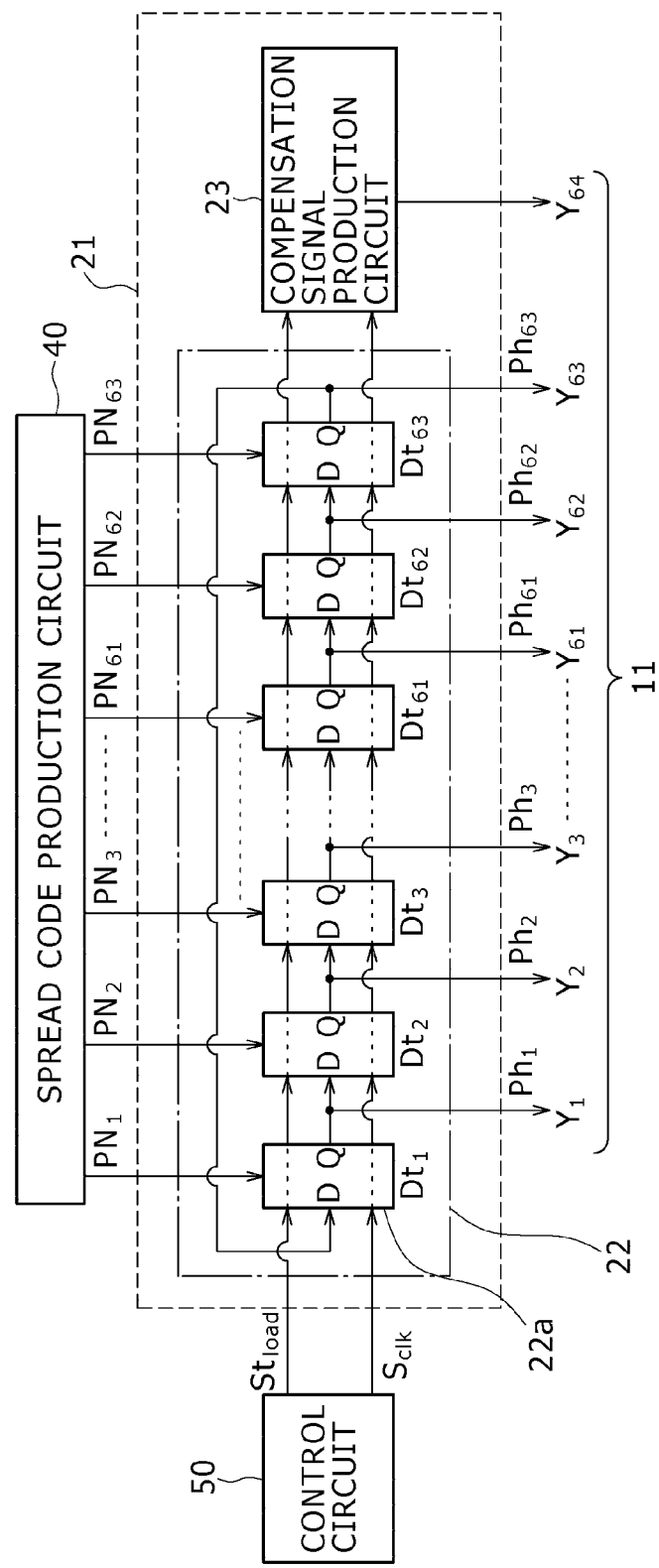
FIG. 3 is a block diagram showing a general configuration of a spread code supplying circuit of the pointer detection apparatus of FIG. 1.

FIG. 3 shows a general configuration of the spread code supplying circuit 21 and illustrates a connection relationship between the spread code supplying circuit 21 and the spread code production circuit 40, control circuit 50 and transmission conductor array 11. Referring to FIG. 3, the spread code supplying circuit 21 includes a shift register 22 and a compensation signal production circuit 23. The shift register 22 is a parallel input-output type shift register and is formed, in the present embodiment, by multistage connection of 63 flip-flops 22a as registers.

The flip-flops 22a are connected to the control circuit 50 such that the operation of the flip-flops 22a is controlled by a transmission load signal $St_{load}$ and a clock signal $S_{clk}$ supplied thereto from the control circuit 50. The transmission load signal $St_{load}$ is for controlling an inputting timing of a 63-bit (63-chip) spread code output from the spread code production circuit 40 to the shift register 22. In the present embodiment, 63-bit data, that is, 63-chip data, is input at the same time to the flip-flops 22a in response to the inputting of the transmission load signal $St_{load}$. The clock signal $S_{clk}$ is a clock signal of a one-chip period (i.e., a clock signal having one chip per unit period of time).

Each of the flip-flops 22a shifts a one-chip length signal or code therein to a next-stage flip-flop 22a for every one-chip period using the clock signal $S_{clk}$ as a trigger. Further, output terminals of the flip-flops 22a are individually connected to the corresponding transmission conductors 12 in the transmission conductor array 11 such that, when the one-chip length signal retained by each flip-flop 22a is shifted to the next flip-flop 22a, the signal is output to the corresponding transmission conductor 12. A "chip" is a pulse of a spread code generally used in the radio communication field using CDMA (Code Division Multiple Access) technology. An output signal of the flip-flop 22a denoted by $Dt_{63}$ at the final stage is supplied back to the flip-flop 22a denoted by $Dt_1$ at the first stage so that the code string formed from 63 bits is used cyclically.

In the example of FIG. 3, indexes i ranging from "1" to "63" are assigned to the flip-flops 22a, to which a first-chip code $PN_1$ to a 63rd-chip code $PN_{63}$ of the spread code output from the spread code production circuit 40 are input, and the flip-flop 22a corresponding to the index i is hereinafter referred to as flip-flop $Dt_i$.

Where no pointer exists on the sensor section 10, the compensation signal production circuit 23 produces a compensation signal, that is, an adjustment signal for establishing balance in current detected through the reception conductors 14, for example, to zero, and outputs the produced compensation signal to a predetermined transmission conductor 12. In the present embodiment, an output terminal of the compensation signal production circuit 23 is connected to a transmission conductor 12 disposed remotely from the connection of the sensor section 10 to the reception section 30. More particularly, the output terminal of the compensation signal production circuit 23 is connected to the transmission conductor $Y_{64}$. The reason why a compensation signal just described is output to one of the transmission conductors 12 is as follows.

As will be more fully described below, the value representative of a chip length of the spread code to be supplied to the transmission conductors 12 is an odd number (4N−1: N is an integer equal to or greater than 2) and has a characteristic that, summing up signal values of the level (High or Low) state of the chips of the spread code will produce a signal value of a Low-level state. Therefore, where spread codes having the same code length (i.e., the same number of chips) as the number of transmission conductors 12 are respectively applied to the transmission conductors 12, with the codes' phases displaced by one chip length from each other, if the compensation signal is not supplied, then the current output from the reception conductors 14 exhibits a value corresponding to the signal value of the Low-level state.

Therefore, in the present embodiment, a compensation signal is supplied to the transmission conductor 12 to which no spread code is supplied, that is, to the transmission conductor $Y_{64}$, so that the sum total of current values output from the reception conductors 14 becomes zero. In particular, the compensation signal corresponding to a signal value of the High level state is supplied to the transmission conductor $Y_{64}$. Consequently, an offset of a detection level which may otherwise appear upon reception can be compensated for. Accordingly, where a pointer exists on the sensor section 10, a signal corresponding to a variation amount of current at a position of the pointer can be successfully detected and the detection sensitivity of the pointer may be enhanced. A principle of position detection in the present embodiment is hereinafter described in detail.

By configuring the spread code supplying circuit 21 in a manner described above, spread codes having phases displaced by a one-chip length from each other from the flip-flop $Dt_1$ toward the flip-flop $Dt_{63}$ are supplied to the transmission conductors $Y_1$ to $Y_{63}$. In other words, the spread codes having the same phase ($Ph_1$), a one-chip phase difference ($Ph_2$), . . . , a 62-chip phase difference ($Ph_{63}$), respectively, are supplied to the transmission conductors $Y_1, Y_2, \ldots$, and $Y_{63}$, respectively.

Alternatively, where the number of the transmission conductors 12 is 63, the compensation signal is not supplied to the transmission conductor 12, but is directly input to a signal detection circuit 31 hereinafter described. Further, where the code length or chip length of the spread code is greater than the number of transmission conductors 12, any spread code and the compensation signal, which are not supplied to the transmission conductors 12, are directly input to the signal detection circuit 31.

The spread code production circuit 40 produces a spread code whose chip length is 4N−1 (N indicates an integer equal to or greater than 2). In the present embodiment, the spread code production circuit 40 produces a spread code whose chip length is 63. The number of chips of the spread code produced by the spread code production circuit 40 is set in accordance with the number of transmission conductors 12 or the number of divisional areas of the transmission conductor array 11, hereinafter described. The chip length of the spread code is normally set so as to have a value equal to or greater than the number of transmission conductors 12 to which the spread code is supplied. This setting is needed to make sure that spread codes having the same phase do not appear among the transmission conductors 12 to which the spread codes (with shifted phases) are supplied.

Output terminals of the spread code production circuit 40 are connected to the corresponding flip-flops 22a in the spread code supplying circuit 21 as shown in FIG. 3. The spread codes from the first chip code $PN_1$ to the 63rd chip code $PN_{63}$ produced by the spread code production circuit 40 are supplied at the same time to the input terminals of the flip-flops $Dt_1$ to $Dt_{63}$, respectively, at an input timing of the transmission load signal $St_{load}$.

Referring back to FIG. 1, the reception section 30 includes a signal detection circuit 31, an A/D (Analog to Digital) conversion circuit 32 and a correlation value calculation circuit 33.

Figure 4:
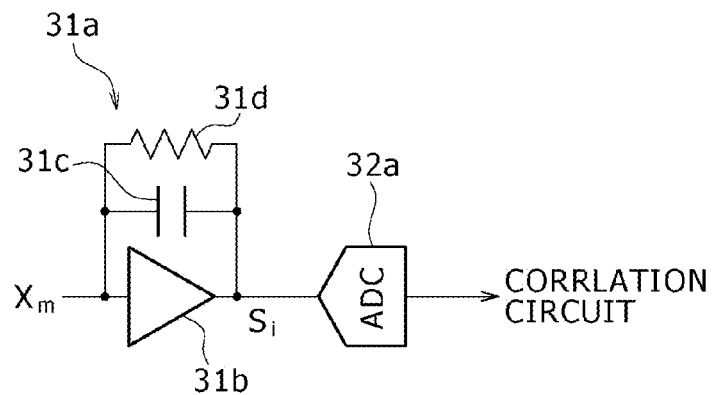
FIG. 4 is a diagrammatic view showing a general configuration of an I/V conversion circuit and an A/D converter of the pointer detection apparatus of FIG. 1.

The signal detection circuit 31 acquires current signals output from the reception conductors 14 and converts and amplifies the current signals into voltage signals. The signal detection circuit 31 includes, for example, the number of I/V (current/voltage) conversion circuits equal to the number of reception conductors 14. A circuit configuration of the I/V conversion circuit is shown in FIG. 4. Referring to FIG. 4, the I/V conversion circuit 31a shown is formed by connecting a one-input one-output amplifier 31b in the form of an operational amplifier, a capacitor 31c, and a resistor 31d in parallel to each other.

Figure 5:
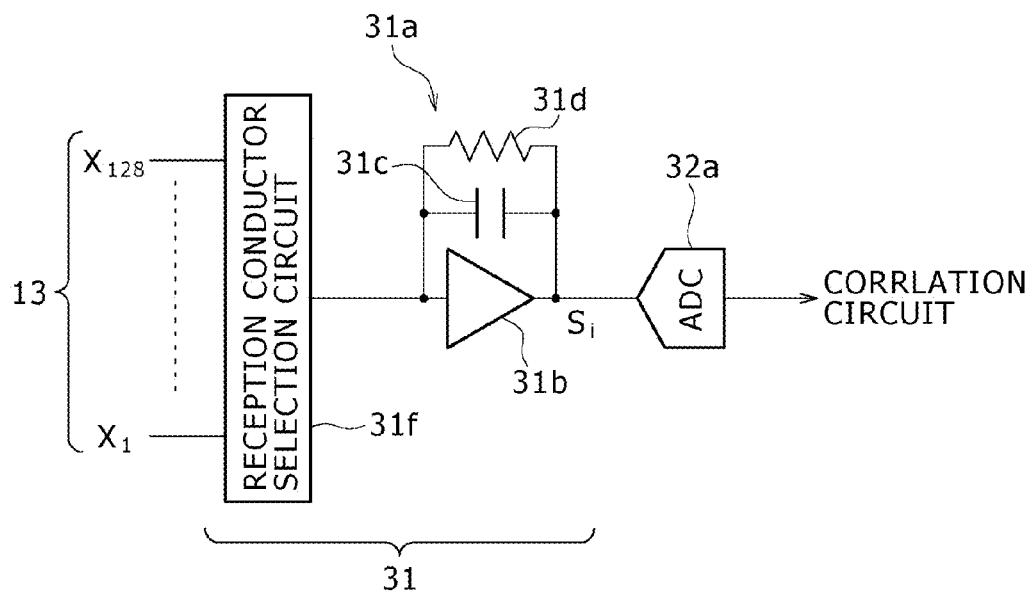
FIG. 5 is a diagrammatic view showing another configuration of a signal detection circuit of the pointer detection apparatus of FIG. 1.

In the present embodiment, an example described above has the number of I/V conversion circuits 31a equal to the number of reception conductors 14 in the signal detection circuit 31. However, the present invention is not limited to this embodiment. A different example of a configuration of the signal detection circuit 31 is shown in FIG. 5. Referring to FIG. 5, the signal detection circuit 31 includes a reception conductor selection circuit 31f for time division operation, which is formed with a switch or the like and is interposed between the I/V conversion circuit 31a and the reception conductor array 13. The signal detection circuit 31 shown in FIG. 5 successively switches among the reception conductors 14 after every predetermined interval of time, by the reception conductor selection circuit 31f selectively connecting the selected reception conductor 14 to the I/V conversion circuit 31a. If the signal detection circuit 31 is formed in this manner, then the I/V conversion circuit 31a and a circuit group hereinafter described and disposed at the succeeding stage to the circuit 31a may be shared in the reception section 30. Therefore, in this instance, the circuit configuration of the reception section 30 is simplified.

Referring back to FIG. 1, the A/D conversion circuit 32 is connected to the signal detection circuit 31 and converts an analog signal output from the signal detection circuit 31 into a digital signal. The A/D conversion circuit 32 is formed, for example, from the number of A/D converters 32a equal to the number of the reception conductors 14. As shown in FIG. 4, an input terminal of each A/D converter 32a is connected to the output terminal of a corresponding one of the I/V conversion circuits 31a in the signal detection circuit 31. It is to be noted that the input terminal of a single A/D converter 32a may be selectively connected to the output terminals of the plural I/V conversion circuits 31a through a changeover (switching) circuit such as a switch. In the above configuration, the A/D converter 32a can be shared (among the plural I/V conversion circuits 31a) to carry out time division operation.

The A/D converter 32a in the present embodiment is an analog to digital converter for converting the signal output from the I/V conversion circuit 31a into a digital signal, wherein one word is formed of a plurality of bits, for example, 10 bits (i.e., a word string). In accordance with exemplary embodiments of the present invention, a pointer detection apparatus is provided that is capable of detecting the pressure level of a pointer (e.g., finger) in high resolution. In this connection, it is advantageous that the received signals are converted into digital words, each comprising a plurality of bits (e.g., 10 bits), so as to permit fine correlation with a predetermined code string that corresponds to the code string used at the signal transmission side.

The correlation value calculation circuit 33 in FIG. 1 is connected to the A/D conversion circuit 32 and calculates a correlation value using output signals from the A/D conversion circuit 32 and a spread code, which is the same as that produced by the spread code production circuit 40. The correlation value calculation circuit 33 is formed from the number of correlation circuits (correlation detection circuits) equal to the number of reception conductors 14 and the number of correlation value storage circuits (memory circuits) also equal to the number of reception conductors 14. As shown in FIG. 4 or 5, an input terminal of each correlation circuit is connected to an output terminal of a corresponding one of the A/D converters 32a in the A/D conversion circuit 32.

Figure 6:
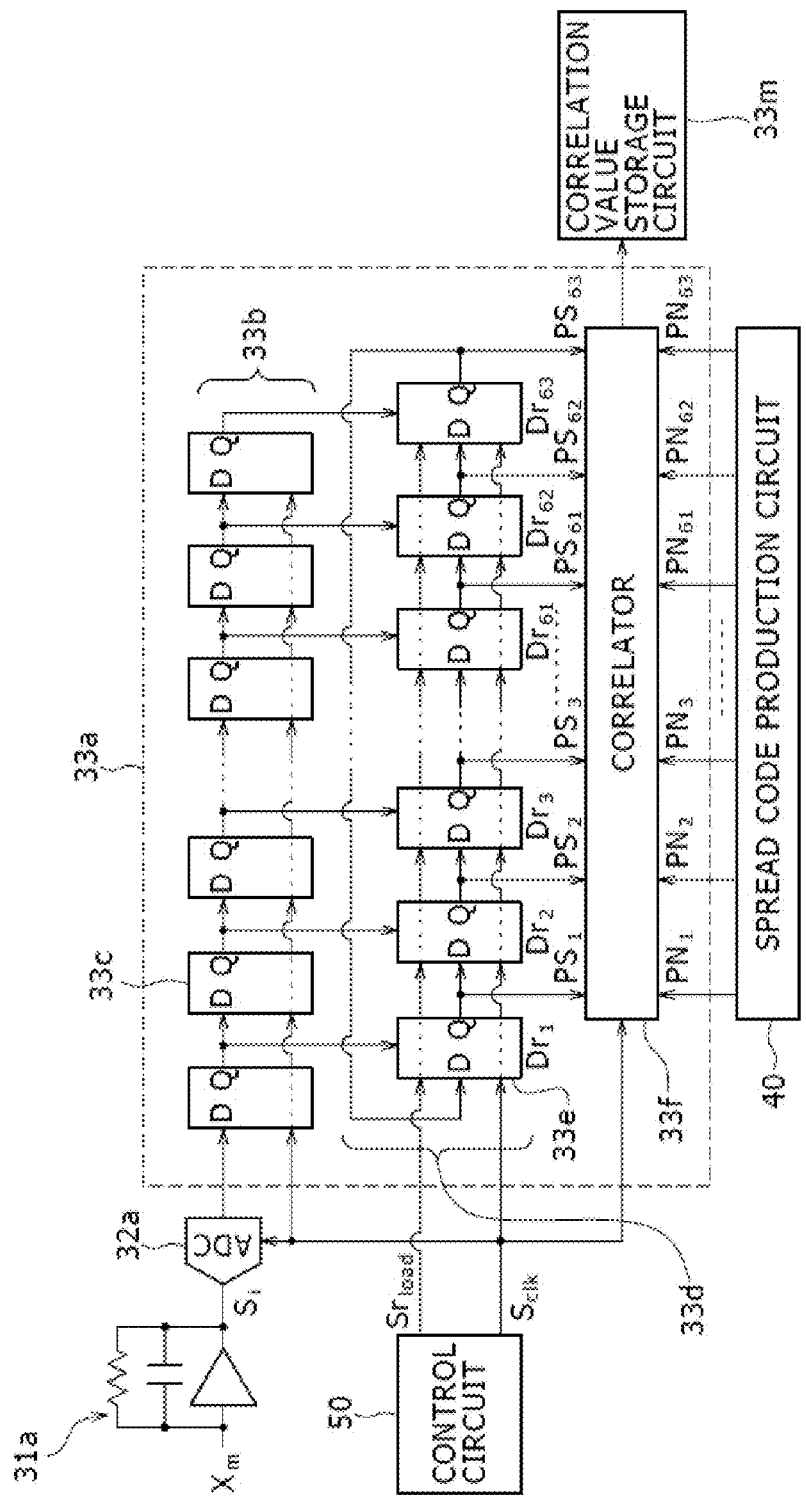
FIG. 6 is a block diagram showing a general configuration of a correlation circuit of the pointer detection apparatus of FIG. 1.

FIG. 6 shows a configuration of a correlation circuit and a correlation value storage circuit, and illustrates a connection relationship between the circuits and an I/V conversion circuit 31a, an A/D converter 32a, the spread code production circuit 40, and the control circuit 50. Referring to FIG. 6, a correlation value storage circuit 33m is connected to an output terminal of a correlation circuit 33a.

The correlation circuit 33a calculates a correlation value using a digital signal output from the A/D converter 32a and a code which is the same as the spread code output from the spread code production circuit 40, and outputs the calculated correlation value.

The correlation circuit 33a includes, as principal components thereof, a first shift register 33b, a second shift register 33d, and a correlator 33f.

In FIG. 6, indexes from "1" to "63" are applied to the flip-flops 33e in order beginning with the flip-flop 33e at the position nearest to the A/D converter 32a and ending with the flip-flop 33e at the position remotest from the A/D converter 32a in the second shift register 33d. The flip-flop 33e corresponding to the index i is hereinafter referred to as flip-flop $Dr_i$.

The first shift register 33b is a shift register of the serial input type to which a word formed of a plurality of bits and output from the A/D converter 32a is successively supplied, and is formed by multistage connection of a plurality of flip-flops 33c. The first shift register 33b in the present embodiment is formed by multistage connection of the number of flip-flops 33c equal to the code length of the spread code, that is, 63 flip-flops 33c.

Further, a flip-flop capable of retaining information wherein one word is formed from multiple bits, for example, 10 bits, is used for each of the flip-flops 33c. Operation of the flip-flops 33c is controlled in accordance with the clock signal $S_{clk}$ of a one-chip period supplied from the control circuit 50. Each flip-flop 33c outputs a signal for each one chip retained therein to a next-stage flip-flop 33c in every one-chip period.

The second shift register 33d is a parallel input type shift register and is formed by multistage connection of a plurality of flip-flops 33e. In the present embodiment, the second shift register 33d is formed by multistage connection of the number of flip-flops 33e equal to the code length of the spread code, that is, 63 flip-flops 33e.

Further, a flip-flop capable of retaining information whose one word is formed from multiple bits, for example, 10 bits, is used for each of the flip-flops 33e similarly to the flip-flops 33c. Operation of the flip-flops 33e is controlled in accordance with the reception load signal $Sr_{load}$ and the clock signal $S_{clk}$ supplied from the control circuit 50. The reception load signal $Sr_{load}$ is a signal for controlling the timing for inputting signals output from the first shift register 33b to the second shift register 33d, and the reception load signal $Sr_{load}$ is input, in the present embodiment, to the flip-flops 33e in a 64-chip period as hereinafter described. In particular, the second shift register 33d receives and retains, as parallel data, 63-word data corresponding to the code length, which correspond to 63 chips, of the output spread codes of the flip-flops 33c of the first shift register 33b in response to the reception load signal $Sr_{load}$. The clock signal $S_{clk}$ is a one-chip period clock signal.

An output terminal of each flip-flop 33e is connected to the flip-flop 33e at the succeeding stage and also to a corresponding integrator 33g (FIG. 7) of the correlator 33f hereinafter described. Each flip-flop 33e shifts the retained signal to the succeeding-stage flip-flop 33e for every one-chip period and outputs the retained signal to the corresponding integrator 33g of the correlator 33f. Further, a signal output from the final-stage flip-flop $Dr_{63}$ of the second shift register 33d is fed back to the first-stage flip-flop $Dr_1$. In particular, each word output from the A/D converter 32a is successively supplied to the first shift register 33b. If the number of words corresponding to the code length of the spread code is retained into the first shift register 33$b$, then 63 words retained in the first shift register 33$b$ are transferred at the same time to the second shift register 33$d$ in response to the reception load signal Sr$_{load}$. Then, a correlation process with the spread code output from the spread code production circuit 40 is carried out for the data retained in the second shift register 33$d$ by the correlator 33$f$. In particular, as will be more fully described below, the pattern of the data supplied from the second shift register 33$d$ and the spread code which is the same as that output from the spread code production circuit 40 are successively shifted by a unit of one chip based on the clock signal S$_{clk}$ supplied to the correlator 33$f$. Where the configuration described above is provided, words output from the A/D converter 32$a$ can be successively retained into the first shift register 33$b$, and the second shift register 33$d$ can carry out correlation calculation independently of the data retention operation into the first shift register 33$b$.

In the present embodiment, the two-stage configuration of shift registers is applied in a manner described above. Consequently, the process for calculating the correlation value using the information retained in the second shift register 33$d$ and the process for fetching the detection signals necessary for correlation value calculation into the first shift register 33$b$ can be carried out independently of each other. In particular, by applying the two-stage configuration of the shift registers as described above, position detection having an expandability may be carried out at a high speed.

Figure 7:
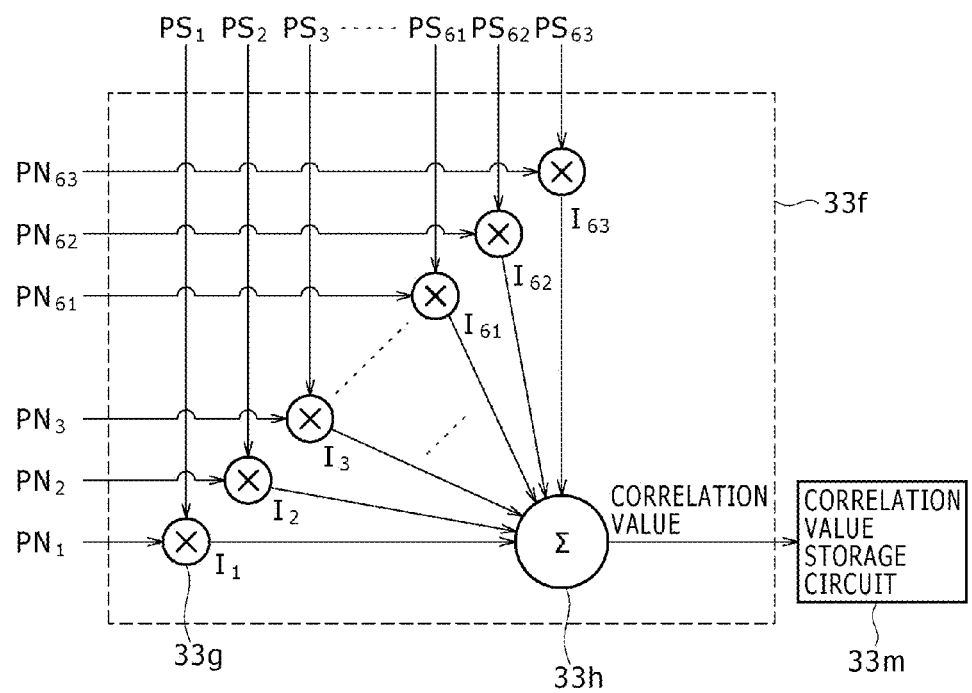
FIG. 7 is a block diagram of a correlator of the correlation circuit of FIG. 6.

A schematic configuration of the correlator 33$f$ is shown in FIG. 7. Referring to FIG. 7, the correlator 33$f$ includes, as principal components thereof, a plurality of integrators 33$g$ and an adder 33$h$. In the present embodiment, the number of integrators 33$g$ equal to the code length of the spread code are used, that is, 63 integrators 33$g$ are used. Each of the integrators 33$g$ is connected to the output terminal of the corresponding flip-flop 33$e$ in the second shift register 33$d$ shown in FIG. 6. In FIG. 7, the integrators 33$g$, to which signals PS$_1$ to PS$_{63}$ output from the flip-flops Dr$_1$ to Dr$_{63}$ are input, are referred to as integrators I$_1$ to I$_{63}$. Further, the codes of the first chip code PN$_1$ to 63rd chip code PN$_{63}$ which form the spread code (PN$_1$ to PN$_{63}$) produced by the spread code production circuit 40 are input in parallel to the integrators I$_1$ to I$_{63}$, respectively. The integrators I$_1$ to I$_{63}$ individually integrate, for example, the codes of the first chip code PN$_1$ to 63rd chip code PN$_{63}$ output from the spread code production circuit 40 with the signals PS$_1$ to the PS$_{63}$ output from the second shift register 33$d$, respectively.

Operation of the integrator 33$g$ is described below. Where the ith chip code PN$_i$ of the input spread code is a High-level code at the ith stage integrator I$_i$, the output signal PS$_i$ of the second shift register 33$d$ is multiplied by "+1." In this instance, the integrator I$_i$ outputs the output signal PS$_i$ of the second shift register 33$d$ as it is. However, where the ith chip code PN$_i$ of the input spread code is a Low-level code at the ith stage integrator I$_i$, the output signal PS$_i$ of the second shift register 33$d$ is multiplied by "−1." In this instance, the integrator I$_i$ acquires and outputs a complement of 2 (i.e., the two's complement) of the output signal PS$_i$ of the second shift register 33$d$.

The adder 33$h$ sums the output signals from the plural integrators 33$g$ and outputs the sum value as the correlation value to the correlation value storage circuit 33$m$. If a level pattern of a signal string formed from the plurality of signals PS$_1$ to PS$_{63}$ input from the second shift register 33$d$ to the correlator 33$f$ coincides with a code pattern of the spread code, then signals having the same polarity are output from the integrators I$_i$. Therefore, the correlation value output from the adder 33$h$ in this case becomes a maximum value or a minimum value.

In the present embodiment, since one word of each signal input from the second shift register 33$d$ to the correlator 33$f$ is formed of multi-bits, for example, 10 bits, the correlation value is also processed in multi-bits. Accordingly, not only the maximum value and the minimum value of the correlation value, but also an intermediate value between the maximum and minimum values can be calculated. In this instance, the correlation value at a position other than the cross points can be calculated minutely by an interpolation process hereinafter described, and position detection can be carried out with a higher degree of accuracy.

The correlation value storage circuit 33$m$ is formed from a RAM (Random Access Memory) or the like and stores the correlation value output from the correlation circuit 33$a$. Further, the correlation value storage circuit 33$m$ carries out mapping of the correlation values at the cross points to the overall surface of the sensor section 10 so as to produce spatial distribution data (that is, mapping data) of the correlation values.

Figure 8:
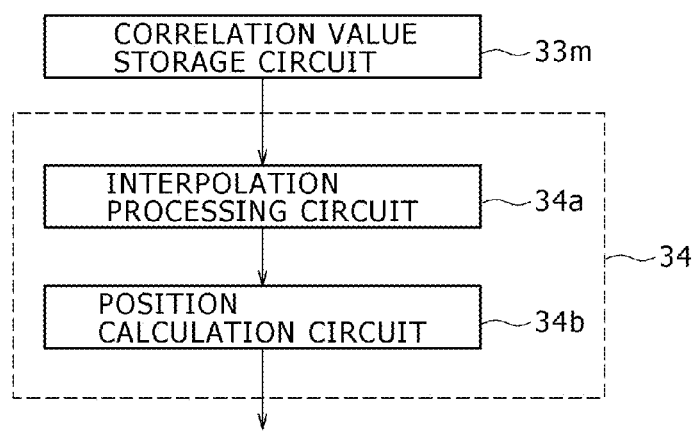
FIG. 8 is a block diagram showing a general configuration of a position detection circuit of the pointer detection apparatus of FIG. 1.

FIG. 8 shows a general configuration of the position detection circuit 34 shown in FIG. 1. Referring to FIG. 8, the position detection circuit 34 includes, as principal components thereof, an interpolation processing circuit 34$a$ and a position calculation circuit 34$b$.

The interpolation processing circuit 34$a$ calculates correlation values between the cross points based on the correlation values at the cross points stored in the correlation value storage circuit 33$m$. Consequently, mapping data of the correlation values of a high resolution are obtained. While in the example illustrating the present embodiment the interpolation processing circuit 34$a$ is provided, the present invention is not limited to this particular example. The interpolation processing circuit 34$a$ may not be provided in a case where the distance between the cross points on the sensor section 10 is sufficiently short or where a pointer detection apparatus is used for an application where high resolution is not required.

The position calculation circuit 34$b$ calculates a region of the correlation values higher than a predetermined threshold value, based on the mapping data of the correlation values calculated by the interpolation processing circuit 34$a$, and calculates, for example, a center point in the calculated region as a position of a pointer.

Further, the position calculation circuit 34$b$ may calculate multiple regions of the correlation values higher than a predetermined threshold value, also based on the mapping data of the correlation values. By calculating the multiple center points of those regions, respectively, the position calculation circuit 34$b$ may determine multiple positions (i.e., multiple positions of multiple pointers, or of multiple fingers of one or more users) at the same time.

Referring again to FIG. 1, the control circuit 50 controls operation of the components of the pointer detection apparatus 100 described above. In particular, the control circuit 50 produces and outputs the clock signal S$_{clk}$, transmission load signal St$_{load}$ and reception load signal Sr$_{load}$ to control the operation timings of the components.

[Operation of the Pointer Detection Apparatus]

Figure 9:
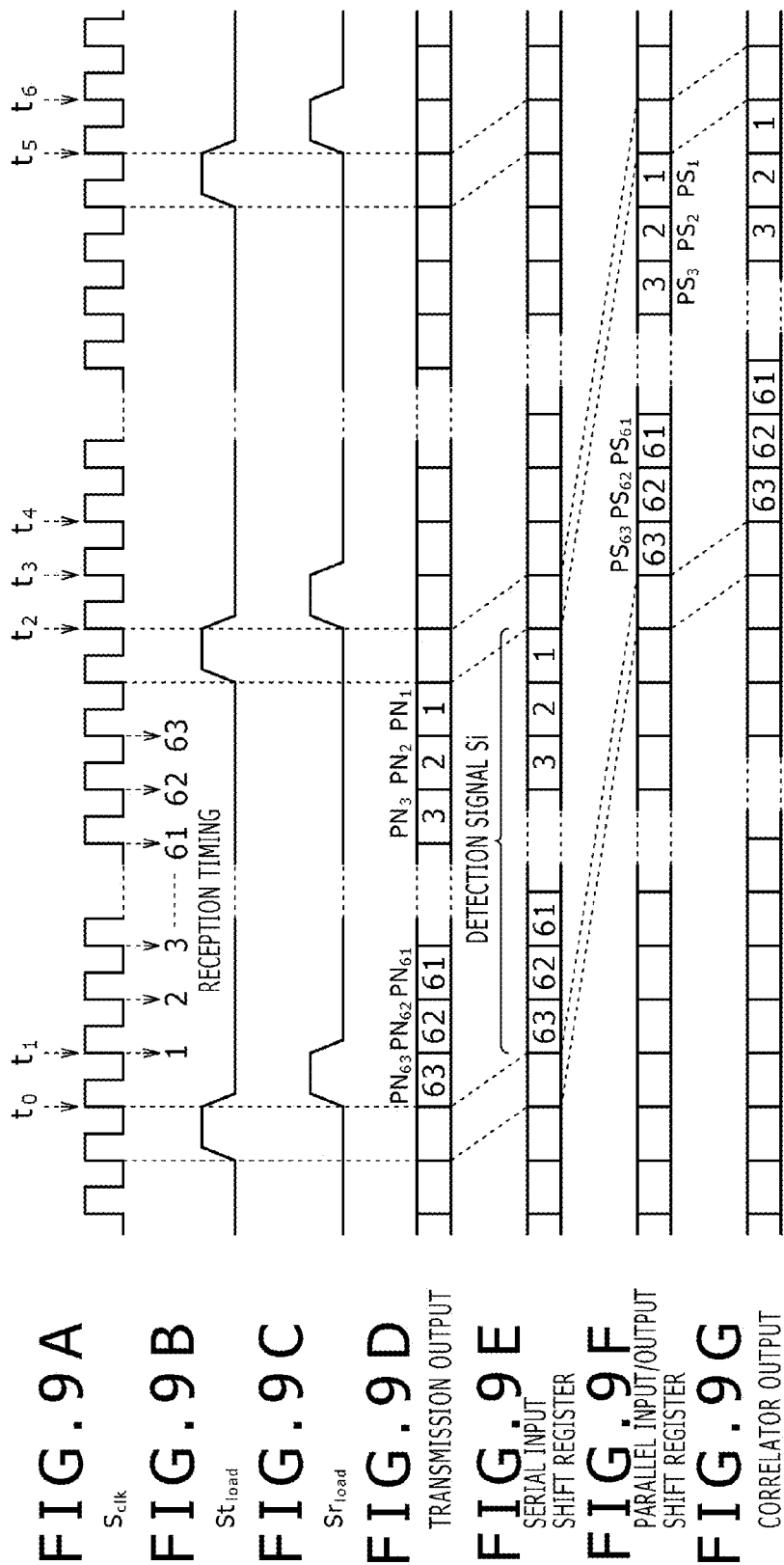
FIGS. 9A to 9G are time charts illustrating operation of several components of the pointer detection apparatus of FIG. 1.

An operational flow of the components of the pointer detection apparatus 100 described above will now be described. FIGS. 9A to 9G illustrate operation of the components of the pointer detection apparatus 100. In particular, FIGS. 9A to 9C show signal waveforms of the clock signal S$_{clk}$, transmission load signal S$_{load}$ and reception load signal Sr$_{load}$ output from the control circuit 50, respectively. The period of the clock signal $S_{clk}$ is equal to a one-chip length of the spread code. FIG. 9D illustrates operation when the spread code is transmitted from the spread code supplying circuit 21 to the transmission conductors 12. FIG. 9E illustrates operation of the first shift register 33b in the correlation value calculation circuit 33. FIG. 9F illustrates operation of the second shift register 33d. FIG. 9G illustrates operation of the correlation value calculation circuit 33 and the correlator 33f.

Operation of the components when a spread code is supplied to the transmission conductors 12 is described below. First, the transmission load signal $St_{load}$ is input from the control circuit 50 to the spread code supplying circuit 21 at predetermined rise time $t_0$ of the clock signal $S_{clk}$ (refer to FIGS. 9A and 9B). The spread code ($PN_1$ to $PN_{63}$) produced by the spread code production circuit 40 is supplied at the same time to the flip-flops 22a which form the spread code supplying circuit 21 in response to the inputting of the transmission load signal $St_{load}$ (time $t_0$). Then, supplying of the spread codes ($PN_1$ to $PN_{63}$) (from the spread code supplying circuit 21) to the transmission conductors 12 is started at time $t_0$ (refer to FIG. 9D). Then, after the supplying of the spread codes ($PN_1$ to $PN_{63}$) to the transmission conductors 12 is completed, the transmission load signal $St_{load}$ is input again to the spread code supplying circuit 21 at time $t_2$, so that the supplying of the spread codes ($PN_1$ to $PN_{63}$) to the transmission conductors 12 is repetitively executed (FIG. 9D). As shown in FIG. 3, a configuration for feeding back the output of the final-stage flip-flop $Dt_{63}$ from among the flip-flops 22a, which form the shift register 22, to the first-stage flip-flop $Dt_1$ is provided in the present invention. Further, after the spread code ($PN_1$ to $PN_{63}$) produced by the spread code production circuit 40 is supplied at the same time to the spread code supplying circuit 21 in response to the transmission load signal $St_{load}$, the spread code ($PN_1$ to $PN_{63}$) is cyclically supplied to the transmission conductors 12. In other words, where a code pattern of the spread code produced by the spread code production circuit is to be changed, a new code pattern is supplied at the same time to the shift register in response to the transmission load signal $St_{load}$.

Operation of the components when a signal is detected from the reception conductors 14 is described below. First, at time $t_1$, the control circuit 50 inputs the reception load signal $Sr_{load}$ to the correlation value calculation circuit 33 shown in FIG. 1 (refer to FIG. 9C). Then, signal detection from the reception conductors 14 is started at time $t_1$. The first shift register 33b in the correlation value calculation circuit 33 successively acquires detection signals supplied from the A/D converters 32a in every one-chip period and carries out successive shifting of the flip-flops 33c so as to retain the acquired signals (refer to FIG. 9E). Then, at time $t_2$ after a 63-chip length elapses from the signal acquisition starting time $t_1$, detection signals corresponding to the spread code of the 63-chip length is retained in the flip-flops 33c which form the first shift register 33b.

Then, the first shift register 33b outputs the retained detection signals having the 63-chip length to the second shift register 33d in response to the reception load signal $Sr_{load}$ output at the timing of time $t_3$ after a one-chip length from time $t_2$. The second shift register 33d successively retains the detection signals input from the first shift register 33b therein, with one chip within a period from time $t_3$ to time $t_5$ that is a 63-chip length after time $t_3$ (refer to FIG. 9F). Similarly to the configuration described with reference to FIG. 3, a configuration may be applied where, in response to inputting the reception load signal $Sr_{load}$, the output signals from the flip-flops 33c, which form the first shift register 33b, are supplied at the same time to the flip-flops 33e, which form the second shift register 33d.

The second shift register 33d starts outputting the detection signals to the correlator 33f at the time $t_3$ and the correlator 33f starts calculation of the correlation value. Then, within a period of time to time $t_6$ after the 63-chip length from time $t_4$, correlation calculation of the detection signals, which are successively read out from the second shift register 33d, and the spread code supplied from the spread code production circuit 40 is successively carried out by the correlator 33f and a result of the calculation is output (refer to FIG. 9G).

[Principle of the Position Detection]

Now, a detection principle implemented by the pointer detection apparatus 100 according to the present embodiment will be described. As described above, the detection method in the present embodiment is a cross point electrostatic coupling method, and a pointer is detected based on the variation of an electrostatic coupling state between the transmission conductors and the reception conductors of the sensor section.

Figure 10:
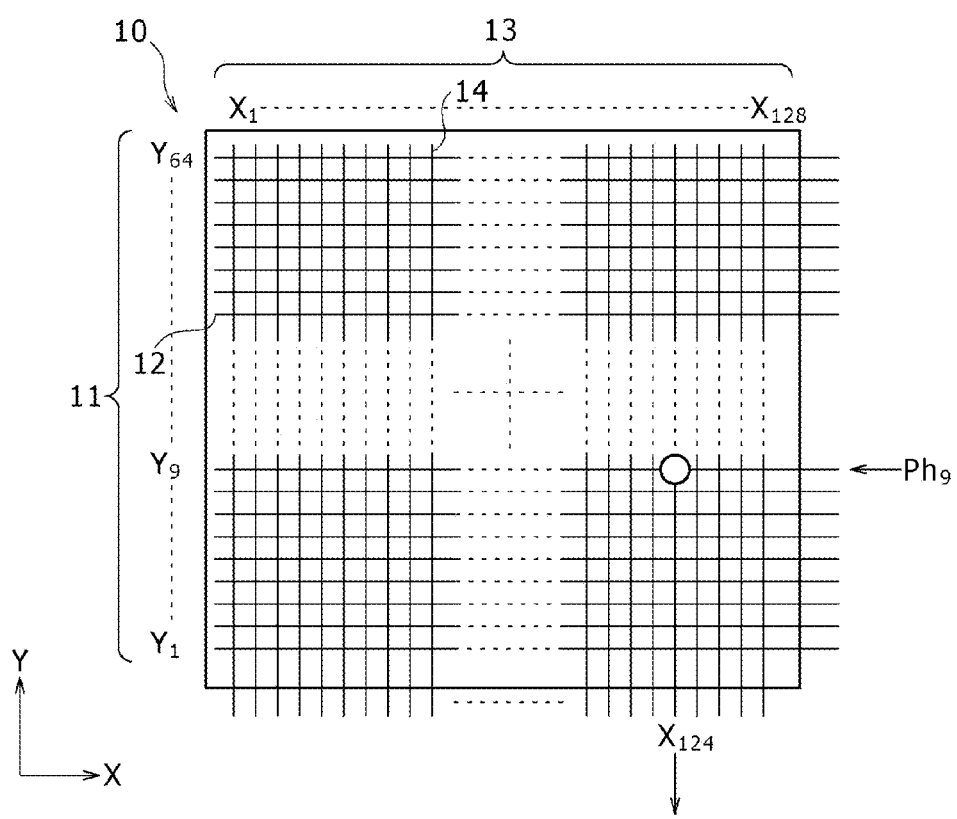
FIG. 10 is a schematic view illustrating a principle of position detection by the pointer detection apparatus of FIG. 1.

First, detection signals obtained by the reception conductors 14 where a finger (pointer) 19 is not on the sensor section 10, will be described. FIG. 10 illustrates the sensor section 10 when no finger 19 is applied to the sensor section. In the description below, the orthogonal codes (spread codes), which are produced based on the same (single) orthogonal code whose phases are shifted so as to have a predetermined phase difference from each other, are supplied to the transmission conductors $Y_1$ to $Y_{63}$. Therefore, the spread code production circuit 40 shown in FIG. 1 need not include a spread code generation circuit for directly generating a spread code itself, but instead data produced based on spread codes is retained in a ROM (Read-Only Memory) in advance and the readout address for the ROM is controlled to output signals to be supplied to the transmission conductors $Y_1$ to $Y_{63}$.

Figure 11A:
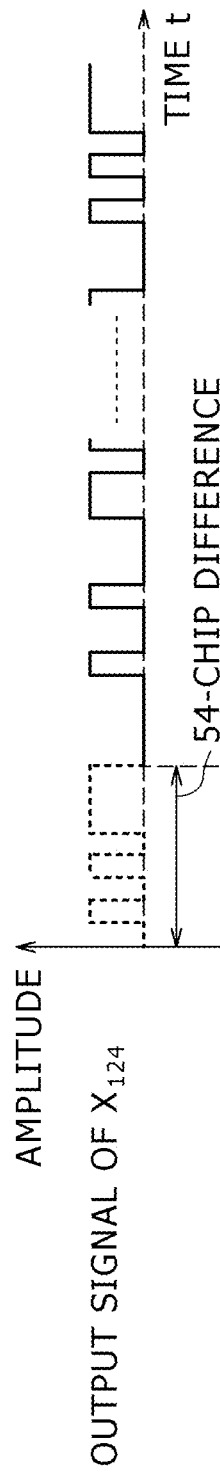
FIG. 11A is a waveform diagram illustrating a signal waveform detected through a reception conductor shown in FIG. 10.

In order to better describe the operation principle of the present invention, a case is considered here where a spread code having a phase difference $Ph_9$ of a 54-chip length from the phase difference $Ph_{63}$ is supplied only to the transmission conductor $Y_9$ and a signal is detected only through the reception conductor $X_{124}$. In particular, here a correlation value at the cross point (grid point indicated by a blank circle in FIG. 10) between the transmission conductor $Y_9$ and the reception conductor $X_{124}$ is calculated. A relationship between an output signal of the reception conductor $X_{124}$ in this state, a spread code supplied for correlation calculation, and a correlation value is shown in FIGS. 11A to 11C.

Figure 11B:
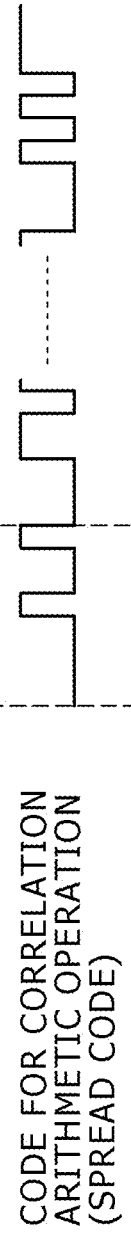
FIG. 11B is a waveform diagram illustrating a waveform of a spread code supplied for correlation calculation.

FIG. 11B shows a waveform of the spread code supplied for correlation calculation and input from the spread code production circuit 40 to the correlator 33f in the correlation circuit 33a. The waveform of the spread code supplied for correlation calculation shown in FIG. 11B has the same waveform as that of the spread code that is supplied to the transmission conductors ($Y_1$ to $Y_{63}$), although it is different in phase. FIG. 11C illustrates a time variation characteristic of the correlation value (hereinafter referred to as correlation characteristic) output from the correlator 33f based on the signal from the reception conductor $X_{124}$.

When no finger 19 exists on the sensor section 10, the spread code supplied to the transmission conductor $Y_9$ has a phase delayed by 54 chips with respect to the spread code supplied for correlation calculation. Therefore, the signal output from the reception conductor $X_{124}$ varies with a code pattern similar to that of the spread code (FIG. 11B) supplied for correlation calculation as seen in FIG. 11A. As seen in FIG. 11C, the signal is output with a phase delayed by 54 chips with respect to the spread code supplied for correlation calculation.

Figure 11C:
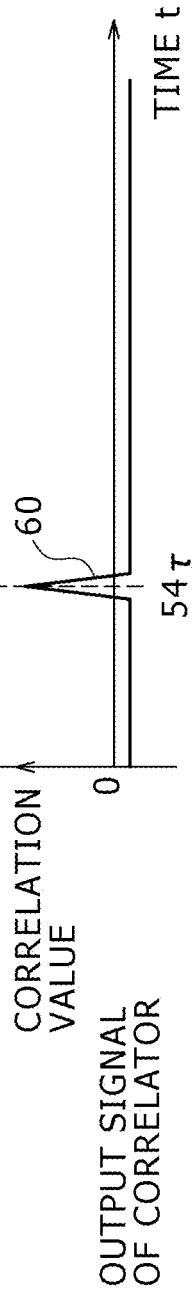
FIG. 11C is a waveform diagram illustrating a correlation characteristic when the spread code illustrated in FIG. 11B was supplied to a transmission conductor $Y_9$ shown in FIG. 10.

When a correlation between the output signal (FIG. 11A) of the reception conductor $X_{124}$ and the spread code (FIG. 11B) supplied for correlation calculation is obtained by the correlator 33f, then, as a characteristic 60 of the correlation, a peak "+63" of the correlation value at delay time 54τ (τ: delay time corresponding to a phase difference by one chip) corresponding to the phase difference by 54 chips as seen in FIG. 11C is calculated and the correlation value is calculated as "−1" at any time other than the delay time 54τ.

Figure 12:
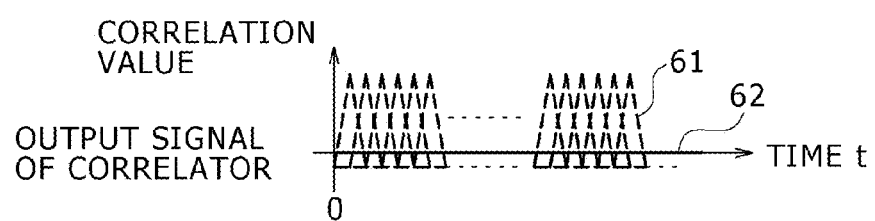
FIG. 12 is a waveform diagram illustrating an output signal waveform of the correlator shown in FIG. 7 where no pointer exists on the sensor section shown in FIG. 2.

FIG. 12 illustrates a characteristic of the correlation values output from the correlator 33f where the spread codes individually having the phase differences $Ph_1$ to $Ph_{63}$ are supplied at the same time to the transmission conductors $Y_1$ to $Y_{63}$ where no finger 19 exists on the sensor section 10. The correlation characteristic obtained from the correlator 33f connected to the reception conductor $X_{124}$ is obtained by temporally superposing correlation characteristics obtained at the cross points between the reception conductor $X_{124}$ and the transmission conductors $Y_1$ to $Y_{63}$, respectively.

Characteristics 61 indicated by broken lines in FIG. 12 represent the correlation characteristics obtained at the cross points between the reception conductor $X_{124}$ and the transmission conductors $Y_1$ to $Y_{63}$. As described above with reference to FIG. 6, the detection signals ($PS_1$ to $PS_{63}$) output from the second shift register 33d and the signals ($PN_1$ to $PN_{63}$) of the spread codes supplied from the spread code production circuit 40 are supplied to the correlator 33f, and either the detection signals or the spread code signals are successively shifted with respect to the other by 63 times. Thereafter, the integration of the signals is carried out by the integrators 33g as shown in FIG. 7. Results of the integration by the integrators 33g are summed by the adder 33h, and the sum value is supplied as the output signal of the correlator 33f to the correlator storage circuit 33m. In particular, while the correlation characteristics 61 having different peak positions are obtained corresponding to the different cross points (represented as phase differences among the spread codes), the characteristics are not correlated at other cross points at that time. Therefore, if a correlation characteristic (for example, a correlation value of −1, as described above, and a correction value of +1 for a compensation signal hereinafter described) at each of other cross points is synthesized with the correlation characteristic 61 (for example, a correlation value of +63) at a predetermined cross point, a characteristic 62 indicated by a thick solid line in FIG. 12 is obtained. Thus, the correlation value output from the correlator indicates a flat characteristic on the time axis where no finger 19 exists on the sensor section 10. If the correlation characteristics 61 obtained at the cross points between the reception conductor $X_{124}$ and the individual transmission conductors $Y_1$ to $Y_{63}$ are simply superposed on each other, a flat characteristic with the correlation value is "−1" is obtained. In the present embodiment, the transmission conductor $Y_{64}$ for supplying a compensation signal is provided separately from the 63 transmission conductors corresponding to the code length (chip length) of 63 of the spread code (an orthogonal code, for example). If the transmission conductor $Y_{64}$ for supplying a compensation signal (+1) is provided and a compensation signal is supplied to the transmission conductor $Y_{64}$, the correlation characteristic 62 of the correlation value to be actually output from the correlator 33f is adjusted to a flat characteristic of the correlation value of zero (0), as seen from FIG. 12.

Figure 13:
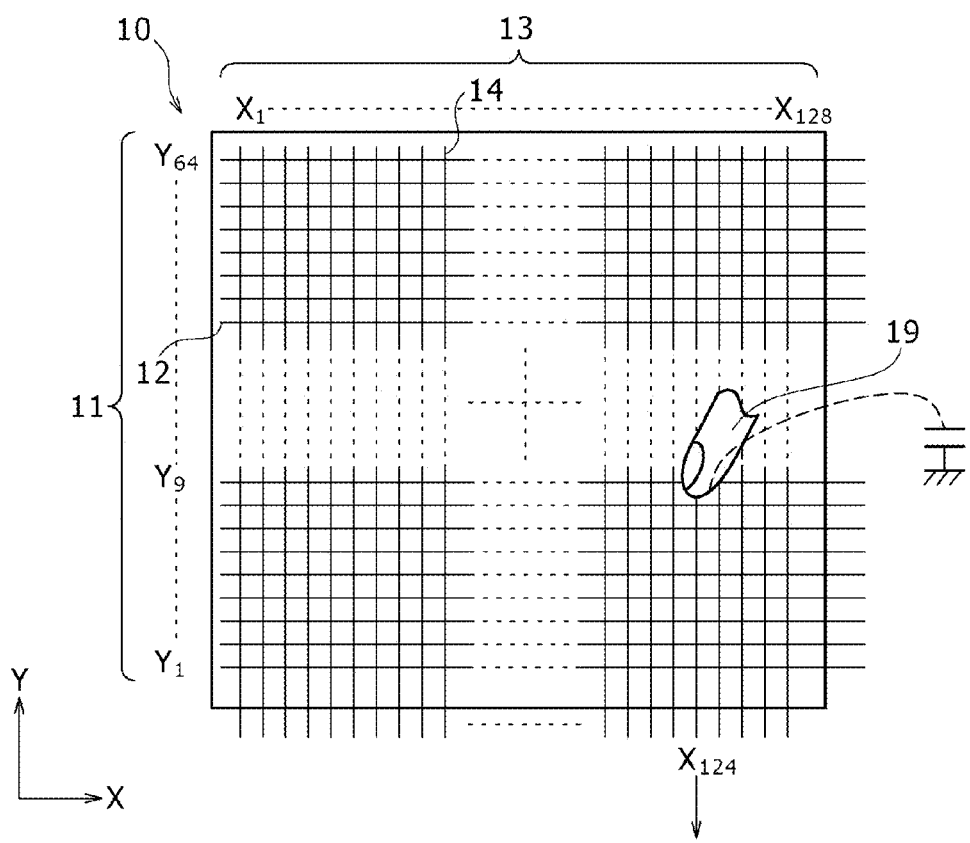
FIG. 13 is a schematic view illustrating a principle of position detection by the pointer detection apparatus of FIG. 1.
Figure 14A:
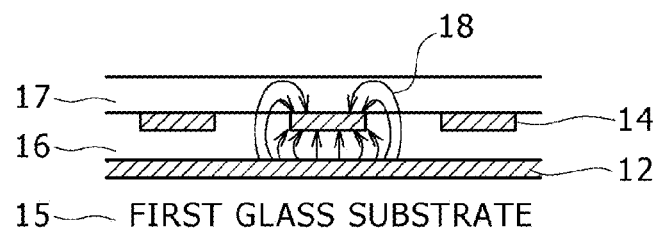
FIG. 14A is a schematic view illustrating an electrostatic coupling state between a transmission conductor and a reception conductor where no pointer exists on the sensor section shown in FIG. 2.
Figure 14B:
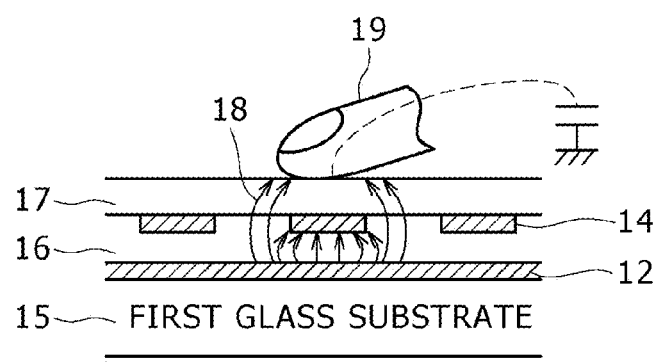
FIG. 14B is a similar view but illustrating another electrostatic coupling state between the transmission conductor and the reception conductor where a pointer exists on the sensor section shown in FIG. 2.

Now, a case will be considered where the finger 19 is placed on the cross point between the transmission conductor $Y_9$ and the reception conductor $X_{124}$ when the spread codes having the predetermined phase differences $Ph_1$ to $Ph_{63}$ are supplied at the same time to the transmission conductors $Y_1$ to $Y_{63}$. FIG. 13 illustrates a sensor section 10 in such a state as just described. In this instance, the electrostatic coupling state between the transmission conductor $Y_9$ and the reception conductor $X_{124}$ varies and current flowing to the reception conductor $X_{124}$ decreases. FIGS. 14A and 14B illustrate a phenomenon just described.

FIGS. 14A and 14B illustrate electrostatic coupling states between the transmission conductors 12 and the reception conductors 14 in a case wherein the finger 19 exists on the sensor section 10 (FIG. 14B) and an alternative case wherein no finger 19 exists on the sensor section 10 (FIG. 14A). Where no finger 19 exists on the sensor section 10, the transmission conductors 12 disposed on the first glass substrate 15 and the reception conductors 14 disposed on the second glass substrate 17 are capacitively coupled with each other through the spacer 16 and electric fields output from the transmission conductors 12 converge in the reception conductors 14, as seen in FIG. 14A. On the other hand, when the finger 19 exists on the sensor section 10, the reception conductors 14 are capacitively coupled not only with the transmission conductors 12 but also with the ground through the finger 19 as seen in FIG. 14B. Part of the electric fields output from the transmission conductors 12 converges to the finger 19 and part of the current flowing between the transmission conductors 12 and the reception conductors 14 is shunted to the ground through the finger 19. As a result, the current to be supplied to the reception conductors 14 decreases.

Figure 15:
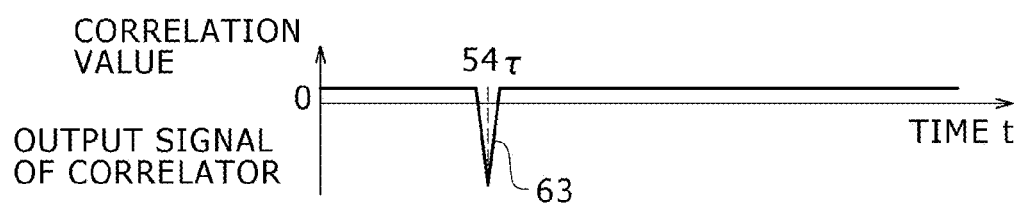
FIG. 15 is a waveform diagram illustrating an output signal waveform of the correlator shown in FIG. 7 where a pointer exists on the sensor section shown in FIG. 2.

Therefore, where the finger 19 is placed on the cross point between the transmission conductor $Y_9$ and the reception conductor $X_{124}$ as seen in FIG. 13, the current flowing to the cross point decreases. In this instance, the peak value illustrated in FIG. 11C at delay time 54τ of the correlation characteristic 60 at the cross point between the transmission conductor $Y_9$ and the reception conductor $X_{124}$ becomes low. As a result, the correlation value of the correlation characteristic obtained by the correlator 33f connected to the reception conductor $X_{124}$ decreases at delay time 54τ. A correlation characteristic 63 obtained by the correlator 33f based on the signal from the reception conductor $X_{124}$ where the finger 19 is placed at the cross point between the transmission conductor $Y_9$ and the reception conductor $X_{124}$ is illustrated in FIG. 15. For the correlation characteristic 63, a negative peak value appears at delay time 54τ, but a predetermined correlation value corresponding to the influence of the current value which exhibits the variation at the cross point between the transmission conductor $Y_9$ and the reception conductor $X_{124}$ is obtained at any time other than the delay time 54τ.

Further, in the correlation characteristic 63 illustrated in FIG. 15, correlation values at delay time zero to 62τ with reference to the spread code supplied for correlation calculation correspond to correlation values at the cross points between the reception conductor $X_{124}$ and the individual transmission conductors $Y_{63}$ to $Y_1$. Accordingly, if the correlation characteristic is determined for the reception conductors 14 in accordance with the principle described above, the correlation values at all cross points of the sensor section 10 may be obtained. In particular, mapping of the correlation values corresponding to a detection-possible region for the pointer of the sensor section 10 can be carried out and the correlation values can be calculated as a spatial distribution of the correlation value. For example, in the example shown in FIG. 13, a peak region in which the correlation value is high in the negative is produced in proximity to the cross point between the transmission conductor $Y_9$ and the reception conductor $X_{124}$. If a region having a correlation value lower than the predetermined threshold value in the spatial distribution of the correlation value is detected, then the position or coordinate of the finger 19 on the sensor section 10 can be detected. The mapping data of the correlation value is stored in the correlation value storage circuit 33m of the correlation value calculation circuit 33 as described above.

Figure 16:
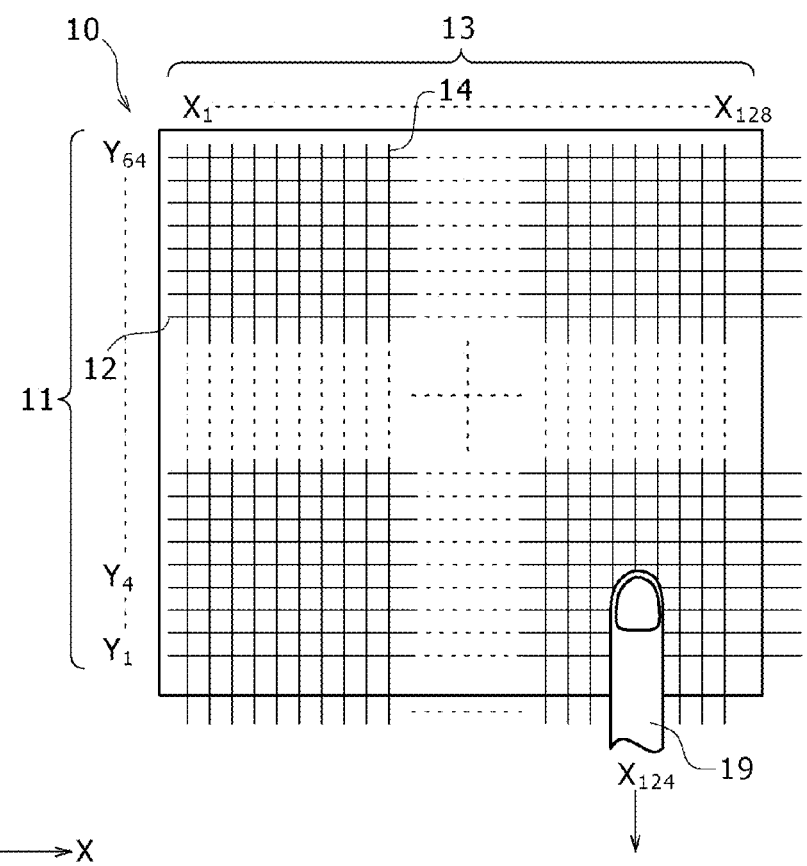
FIG. 16 is a schematic view illustrating another principle of position detection by the pointer detection apparatus of FIG. 1.
Figure 17:
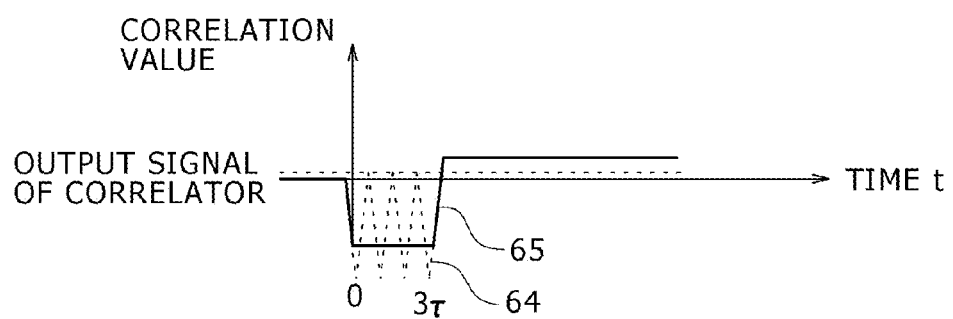
FIG. 17 is a waveform diagram illustrating an output signal waveform of the correlator shown in FIG. 7 where the pointer detection apparatus of FIG. 1 is in the state illustrated in FIG. 16.

Now, a principle of position detection where one finger 19 is placed over a plurality of cross points on the sensor section 10 is described with reference to FIGS. 16 and 17. In order to simplify the description, a case is considered where the finger 19 is placed over a plurality of cross points between the reception conductor $X_{124}$ and the transmission conductor $Y_1$ to $Y_4$ as seen in FIG. 16. Further, a correlation characteristic 65 obtained by the correlator 33f based on the signal from the reception conductor $X_{124}$ in the state of FIG. 16 is illustrated in FIG. 17. In the case illustrated in FIG. 16, spread codes having phase differences (i.e., from the phase difference $Ph_1$ of the zero-chip length (the same phase) to the phase difference $Ph_{63}$ of the 62-chip length) with respect to the spread code supplied (from the spread code production circuit 40 to the correlator 33f) for correlation calculation are supplied at the same time to the transmission conductors $Y_1$ to $Y_{63}$, respectively.

In a case illustrated in FIG. 16, the current supplied to the reception conductor $X_{124}$ decreases at the plural cross points formed between the reception conductor $X_{124}$ and the individual transmission conductors $Y_1$ to $Y_4$. In this instance, peak values of the correlation characteristics obtained at the cross points at which the finger 19 touches are comparatively low. Specifically, if the delay time by which a peak value of the correlation value appearing with the correlation characteristic obtained from the cross point between the reception conductor $X_{124}$ and the transmission conductor $Y_4$ becomes low is used as a reference (=0), the peak value of the correlation value becomes low at delay time $3\tau$ in the correlation characteristic corresponding to the cross point between the reception conductor $X_{124}$ and the transmission conductor $Y_1$. Similarly, the peak value of the correlation value appearing at delay time $2\tau$ becomes low in the correlation characteristic corresponding to the cross point between the reception conductor $X_{124}$ and the transmission conductor $Y_2$. The peak value of the correlation value appearing at delay time $\tau$ becomes low in the correlation characteristic corresponding to the cross point between the reception conductor $X_{124}$ and the transmission conductor $Y_3$. A correlation characteristic 64 indicated by a broken line in FIG. 17 is obtained from each cross point.

In the state illustrated in FIG. 16, a region is obtained where the correlation value is negative over the delay time zero to $3\tau$, as shown in the correlation characteristic 65 indicated by a thick solid line in FIG. 17. In a region after delay time $3\tau$, the correlation characteristic 65 indicates a predetermined value (a flat characteristic) reflective of the influence of the current value varied at each of the cross points at which the finger 19 is placed.

If mapping of the correlation values is carried out for a detection-possible region for the pointer on the sensor section 10 so that a spatial distribution of the correlation value is calculated, a region where the correlation value is lower than the predetermined threshold value is obtained successively over the plural cross points. As a result, the region in which the finger 19 is placed can be detected.

In this instance shown in FIG. 16, a region where the correlation value is lower than the predetermined threshold value is formed successively over the plural cross points. Therefore, not only the position of the finger 19, but also a shape of the finger 19 placed on the sensor section 10 can be estimated. For example, if the palm of the hand is placed on the sensor section 10, then the shape of the palm of the hand can be estimated.

[Processing Procedure of Position Detection]

Figure 18:
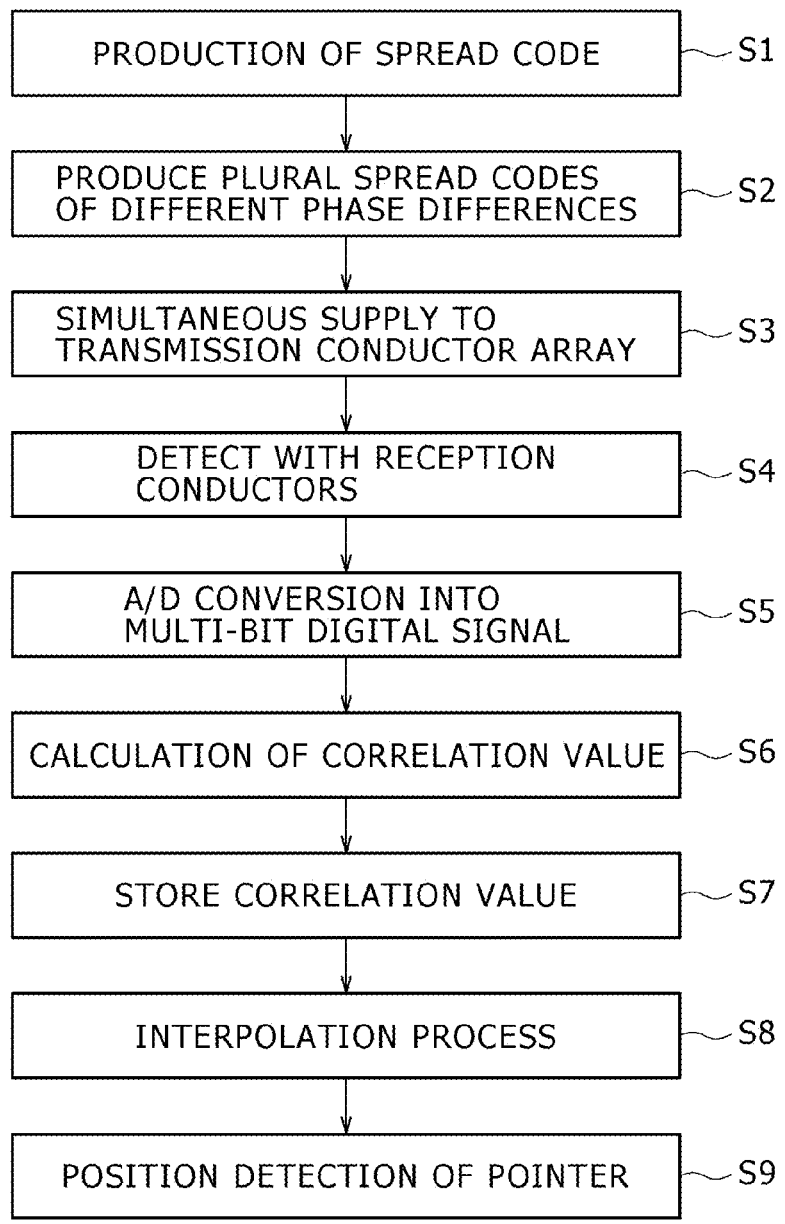
FIG. 18 is a flow chart illustrating a processing procedure for position detection by the pointer detection apparatus of FIG. 1.

Next, a procedure of a position detection process of a phase multiplexing transmission method in the pointer detection apparatus 100 according to the present embodiment will be described. FIG. 18 illustrates a procedure of position detection of a pointer in the present embodiment.

Referring to FIGS. 3 and 18, the spread code production circuit 40 produces a spread code having the predetermined code length (or chip length) at step S1. In the present embodiment, a spread code having the 63-chip length is produced. Then, the spread code production circuit 40 supplies the produced spread code to the spread code supplying circuit 21. The spread code supplying circuit 21 produces, at step S2, a plurality of spread codes having the various phase differences $Ph_1$ to $Ph_{63}$ to be supplied to the transmission conductors 12, using the shift register 22 formed from the flip-flops 22a connected in parallel to each other in the spread code supplying circuit 21. At step S3, the spread code supplying circuit 21 simultaneously supplies the spread codes having the phase differences $Ph_1$ to $Ph_{63}$ to the transmission conductors $Y_1$ to $Y_{63}$, respectively. In this instance, the compensation signal production circuit 23 in the spread code supplying circuit 21 produces a compensation signal and supplies the same to the transmission conductor $Y_{64}$ so that results obtained by adding the compensation signal to the other 63 signals, which form the spread codes ($Ph_1$ to $Ph_{63}$), are constant.

Referring also to FIG. 1, the reception section 30 subsequently detects output current from all of the reception conductors 14 at step S4. In particular, the signal detection circuit 31 first converts and amplifies current signals from the reception conductors 14 into voltage signals and then outputs the amplified signals to the A/D conversion circuit 32. In this instance, the current signals are converted and amplified into the voltage signals by means of the I/V conversion circuits 31a connected to the reception conductors 14, as seen in FIG. 4.

Then, the A/D conversion circuit 32 performs A/D conversion for the input voltage signals at step S5. In this instance, the A/D conversion is performed for the signals detected individually from the reception conductors 14 by means of the A/D converters 32a connected to the I/V conversion circuits 31a. Further, in this instance, the A/D conversion circuit 32 converts the voltage signals output from the I/V conversion circuits 31a into digital signal wherein one word (or one code) is formed of a plurality of bits, for example, 10 bits. Then, the A/D conversion circuit 32 outputs the digital signals obtained by the conversion to the correlation value calculation circuit 33.

Then at step S6, the correlation value calculation circuit 33 calculates correlation values between the input digital signals and the spread codes, which are the same as those supplied to the transmission conductors. In particular, the first shift register 33b, second shift register 33d, and correlator 33f in the correlation circuits 33a connected to the reception conductors 14 through the A/D converters 32a and operate in accordance with the timing chart described with reference to FIG. 9. Then, the correlation calculation between the signals detected from the reception conductors 14 and the spread codes for the correlation calculation is carried out and the correlation characteristic is determined.

At step S7, the correlation value calculation circuit 33 causes the correlation value storage circuit 33m to store the correlation characteristics calculated with regard to the reception conductors 14, and produces mapping data (or a spatial distribution) of the correlation values. In the present embodiment, the correlation circuit 33a can carry out retention and processing of the information in multi bits as described above. Therefore, the value of the correlation value to be stored in the correlation value storage circuit 33m is stored not as binary information but as multilevel information of the multi bits, for example, 10 bits. Consequently, the spatial distribution of the correlation value having a high resolution can be produced.

The correlation value storage circuit 33m outputs the mapping data of the correlation value stored therein to the interpolation processing circuit 34a in the position detection circuit 34, as seen in FIG. 8. The interpolation processing circuit 34a calculates the correlation value at positions other than the cross points, based on the input mapping data of the correlation values, through an interpolation calculation process at step S8. Consequently, the correlation values at positions other than the cross points can be calculated and a spatial distribution of the correlation value having a higher resolution is obtained. As a result, position detection may be carried out with high accuracy.

At step S9, the position calculation circuit 34b in the position detection circuit 34 detects a region in which the correlation value is higher than the predetermined threshold value from the mapping data of the correlation values, after the interpolation process obtained at step S8, to specify the position of a pointer.

In the present embodiment, the position detection of the pointer disposed on the sensor section 10 is carried out as described above. As described in connection with the example shown in FIG. 5, if the reception conductor selection circuit 31f is provided in the signal detection circuit 31 and the current signal is detected by successively switching between the reception conductors 14 per every predetermined time using the reception conductor selection circuit 31f, the processes at steps S4 to S7 are repetitively carried out while the reception conductors 14 are successively switched per every predetermined time by the reception conductor selection circuit 31f.

As described above, in the present embodiment, spread codes having phase differences from each other are supplied at the same time (i.e., multi-phase transmitted) to all of the transmission conductors 12 and the position of the pointer is detected through the reception conductors 14. In particular, the position detection process is carried out for all cross points formed by the transmission conductors 12 and the reception conductors 14. Therefore, the transmission section supplies the spread signals at the same time to the transmission conductors and the reception section receives the signal via each reception conductor. Consequently, variation of electrostatic coupling at each cross point can be detected in a high-speed processing.

Further, the reception section 30 according to the present embodiment can process the detected signal in multi bits. The correlation value at a position other than the cross points can be calculated by the interpolation process. Therefore, with the present embodiment, position detection can be carried out with higher accuracy.

While the foregoing description of the embodiment relates to the example where the position of the pointer is detected, the present invention is not limited to this application. The pointer detection apparatus 100 according to the present embodiment may be used as an apparatus for determining from mapping data of the correlation values whether or not a pointer exists on the sensor section. In this instance, the position detection circuit 34 need not be provided.

[Modification 1]

While the first embodiment described above illustrates an example where spread codes to be supplied to each correlator 33f and the transmission conductors 12 are produced using the spread code production circuit 40 and the shift registers in the spread code supplying circuit 21, the present invention is not limited to this particular implementation. The production of spread codes can be implemented also by providing the transmission section with a storage circuit formed from a ROM, or a random logic section wherein a predetermined logic function is formed by combining logic circuits such as an AND circuit, an OR circuit, an inverter, a flip-flop, or a like circuit, such that data to be supplied to the transmission conductors 12 is stored in and read out from the storage circuit. Further, the spread codes having the phase differences from each other may be stored in advance so that, upon position detection, signals based on the spread codes are supplied from the storage circuit to the transmission conductors or the correlators in accordance with a predetermined sequence. Modification 1 provides an example of a pointer detection apparatus as just described.

Figure 19:
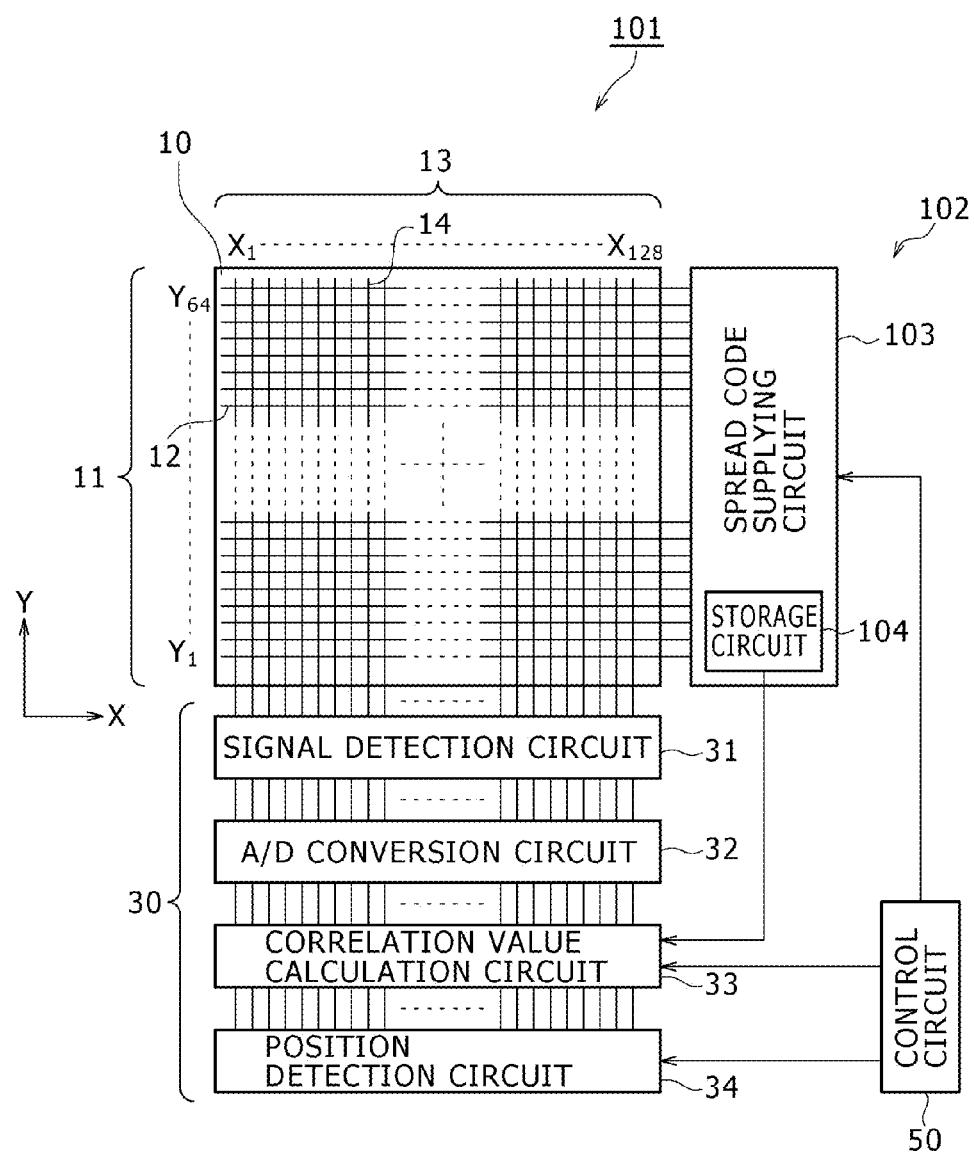
FIG. 19 is a schematic block diagram showing a general configuration of a pointer detection apparatus according to modification 1.

A general configuration of the pointer detection apparatus of modification 1 is shown in FIG. 19. In FIG. 19, the same elements as those in the pointer detection apparatus according to the first embodiment described with reference to FIG. 1 are denoted by like reference characters.

In the pointer detection apparatus 101 of modification 1, a storage circuit 104 in which a code string to be supplied to the transmission conductors 12 is stored is provided in a spread code supplying circuit 103 in a transmission section 102. The storage circuit 104 is formed from a ROM or the like and stores in advance spread codes having the phase differences $Ph_1$ to $Ph_{63}$ as well as a spread code for correlation calculation to be supplied to the correlators 33f in the correlation value calculation circuit 33. Then, upon position detection, the spread codes of the phase differences $Ph_1$ to $Ph_{63}$ are supplied from the storage circuit 104 to the transmission conductors $Y_1$ to $Y_{63}$ and the spread code for correlation calculation is supplied to the correlators 33f in accordance with a predetermined sequence. Thereafter, position detection can be carried out as in the first embodiment. In a configuration described above, the necessity for the spread code production circuit 40 and the shift register provided in the spread code supplying circuit 21 used in the pointer detection apparatus 100 according to the first embodiment is eliminated.

The pointer detection apparatus 101 according to modification 1 has a configuration similar to that of the pointer detection apparatus according to the first embodiment except that the storage circuit 104 is provided in the spread code supplying circuit 103, and the spread code production circuit 40 and the shift register 22 in the spread code supplying circuit 21 are not provided.

In modification 1, the necessity for providing the spread code production circuit 40 for producing various spread codes and the shift register 22 in the spread code supplying circuit 21 is eliminated. Therefore, the configuration of the pointer detection apparatus 101 may be further simplified.

While in the above example, the storage circuit 104 for storing various spread codes is provided inside the spread code supplying circuit 103, the present invention is not limited to this configuration, and the storage circuit 104 may otherwise be provided separately from the spread code supplying circuit 103.

2. Second Embodiment

While in the first embodiment described above spread codes are supplied directly to the transmission conductor array 11, the present invention is not limited to this implementation. A signal obtained by applying predetermined modulation to spread codes may be supplied to the transmission conductor array 11. In a second embodiment described below, the pointer detection circuit is configured such that spread codes to be supplied to the transmission conductor array 11 are PSK (Phase Shift Keying) modulated.

[PSK Modulation]

Figure 20:
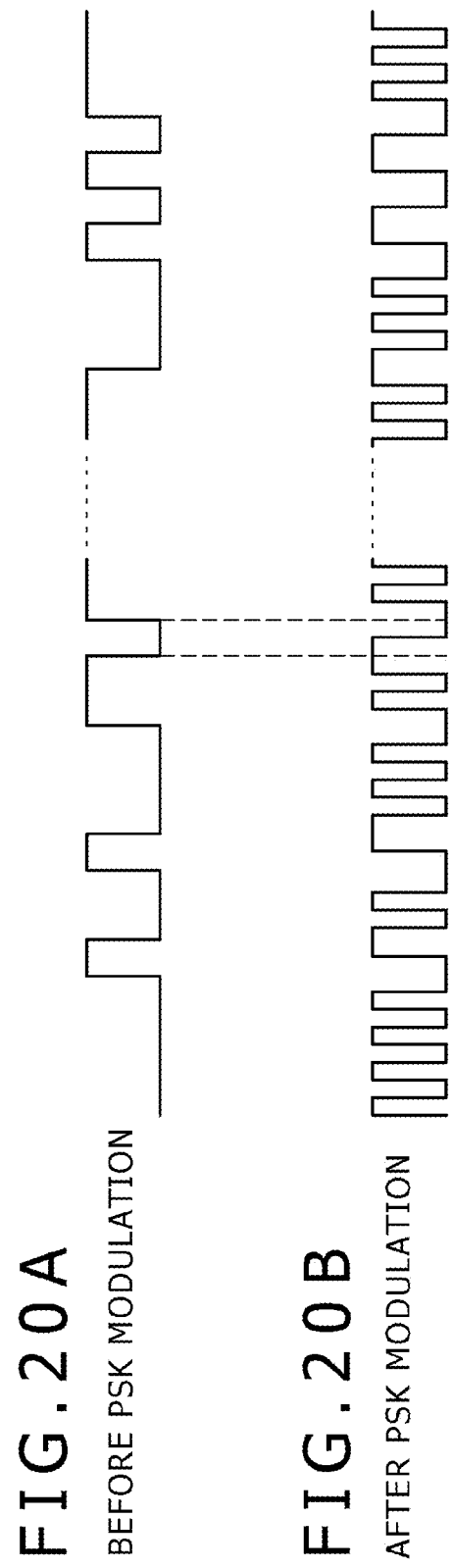
FIG. 20A is a waveform diagram of a spread code before PSK modulation in a second embodiment of the present invention.
FIG. 20B is a waveform diagram of a signal waveform after PSK modulation of the spread code of FIG. 20A.

FIGS. 20A and 20B illustrate waveforms of spread codes before and after PSK modulation. In particular, FIG. 20A illustrates a waveform of spread codes before PSK modulation and FIG. 20B illustrates a waveform of the spread codes after the PSK modulation.

In the embodiment described below, spread codes are PSK modulated with a signal of a clock frequency that is twice the clock frequency of the spread codes before the modulation (i.e., the chip rate). However, the ratio between the clock frequency upon modulation and the chip frequency may be altered suitably according to an application of the pointer detection apparatus. In the PSK modulation of the present example, when the spread codes before modulation, as illustrated in FIG. 20A, indicate the High signal level, the phase of the spread codes is inverted at a time at which the signal level begins from the Low level. When the signal level is Low, the phase is inverted at a time at which the signal level begins from the High level. As a result, the PSK modulation signal illustrated in FIG. 20B is obtained.

[Configuration of the Pointer Detection Apparatus]

The pointer detection apparatus of the present embodiment includes a processing circuit configured to carry out PSK modulation for spread codes in a spread code supplying circuit of a transmission section, and another processing circuit for demodulating the PSK-modulated spread codes in a correlation circuit of a reception section. The configuration of the other part of the pointer detection apparatus is similar to that of the first embodiment described above with reference to FIG. 1. Therefore, a description of the configuration of the pointer detection apparatus other than the spread code supplying circuit of the transmission section and the correlation circuit of the reception section is omitted herein to avoid redundancy.

Figure 21:
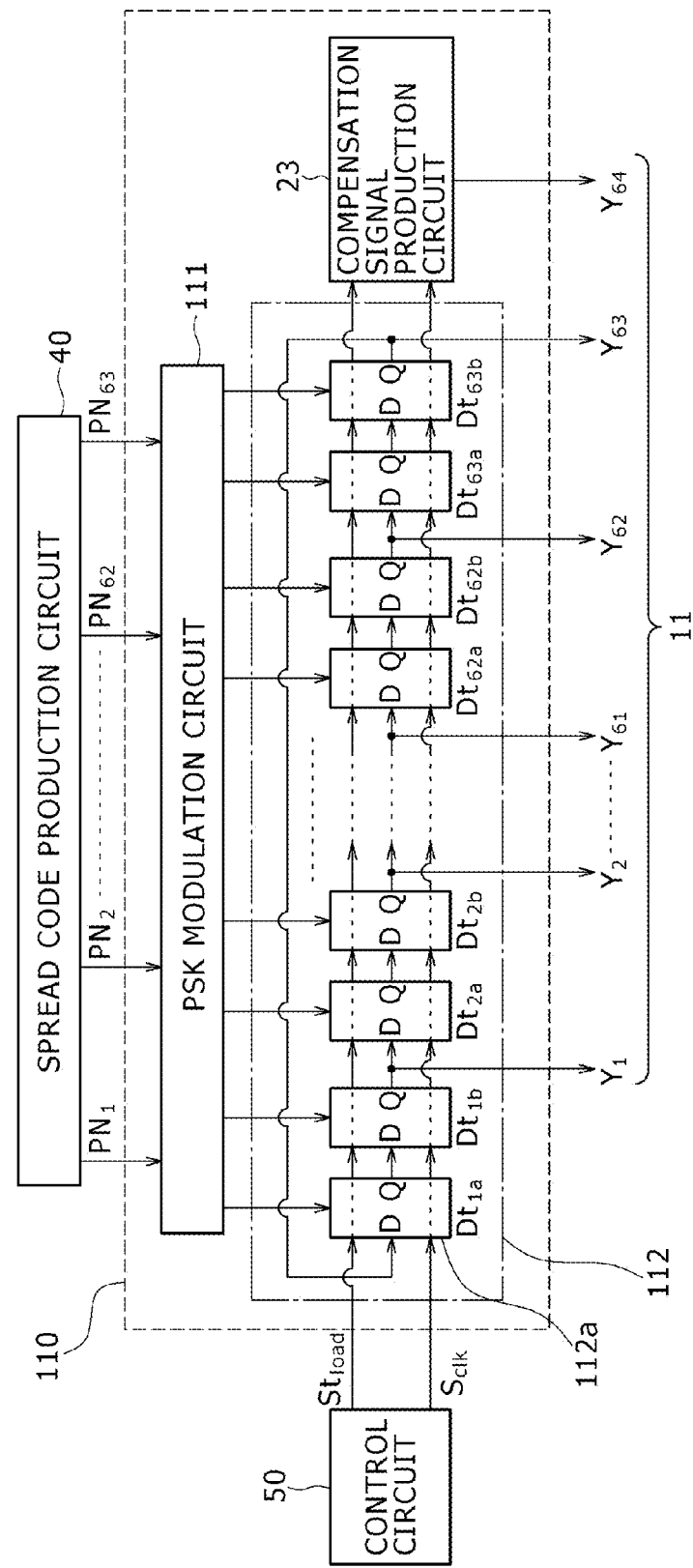
FIG. 21 is a block diagram of a spread code supplying circuit according to the second embodiment.

FIG. 21 shows a general configuration of the spread code supplying circuit of the present embodiment and illustrates a connection relationship between the spread code supplying circuit 110 and the spread code production circuit 40, control circuit 50, and transmission conductor array 11. In FIG. 21, like components as those of the spread code supplying circuit 21 of the first embodiment described above with reference to FIG. 3 are denoted by like reference characters.

Referring to FIG. 21, the spread code supplying circuit 110 includes a PSK modulation circuit 111 as a signal modulation circuit, a shift register 112, and a compensation signal production circuit 23. The compensation signal production circuit 23 has a configuration similar to that of the first embodiment described above.

The PSK modulation circuit 111 is provided between the spread code production circuit 40 and the shift register 112. The PSK modulation circuit 111 can be formed from a PSK modulation circuit, which is conventionally used in the field of communication techniques. The PSK modulation circuit 111 carries out phase modulation for spread codes of a 63-chip length produced by the spread code production circuit 40. Thereupon, in the present embodiment, since a clock signal having twice the frequency of that used in the first embodiment is used to carry out PSK modulation, the PSK modulation circuit 111 produces a modulation signal of a 126-clock length per one spread code having a 63-chip length. Then, the PSK modulation circuit 111 outputs signals of a one-clock length, which form the modulation signal after the modulation, in parallel to corresponding flip-flops in the shift register 112.

The shift register 112 is a parallel input-output type shift register and is formed from 126 flip-flops 112a connected at multi-stages. The shift register 112 has an output terminal at every interval of two flip-flops 112a. The output terminals of the shift register 112 are connected to the corresponding transmission conductors 12 of the transmission conductor array 11. In other words, the shift register 112 outputs signals for every two flip-flops 112a, which correspond to signals of a one-chip length, in parallel to the transmission conductor array 11.

The flip-flops 112a are connected to the control circuit 50 such that operation thereof is controlled by a transmission load signal $St_{load}$ and a clock signal $S_{clk}$ supplied thereto from the control circuit 50. The transmission load signal $St_{load}$ is used to control the timing at which the modulation signal output from the PSK modulation circuit 111 is to be input to the shift register 112. In the present embodiment, the transmission load signal $St_{load}$ is input simultaneously to the flip-flops 112a in a 128-clock period, that is, in a 64-chip period. Also, the clock signal $S_{clk}$ has the frequency equivalent to a ½ chip rate. Each of the flip-flops 112a individually shifts a modulation signal of a 1-clock length retained therein to the flip-flop 112a at the succeeding stage after every one-clock period.

Figure 22:
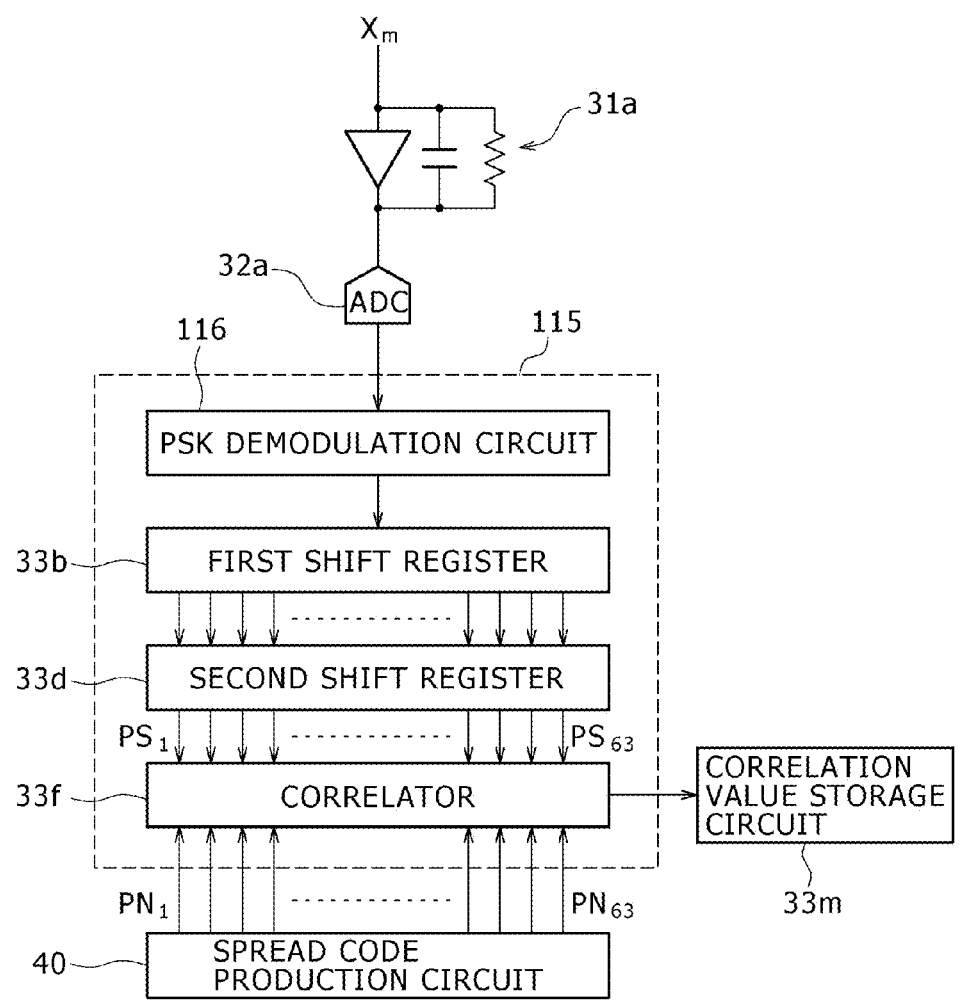
FIG. 22 is a block diagram showing a configuration of a correlation circuit according to the second embodiment.

FIG. 22 shows a configuration of a correlation circuit and a correlation value storage circuit in the present embodiment and illustrates a connection relationship between the circuits mentioned above, an I/V conversion circuit 31a, an A/D converter 32a, and the spread code production circuit 40. In FIG. 22, elements like those of the correlation circuit 33a and the correlation value storage circuit 33m of the first embodiment described above with reference to FIG. 6 are denoted by like reference characters.

The correlation circuit 115 includes, as principal components thereof, a PSK demodulation circuit 116 as a signal demodulation circuit, a first shift register 33b, a second shift register 33d, and a correlator 33f. The part of the correlation circuit 115 other than the PSK demodulation circuit 116 is similar to that in the first embodiment.

The PSK demodulation circuit 116 is provided between the A/D converter 32a and the first shift register 33b. The PSK demodulation circuit 116 can be formed from a PSK demodulation circuit conventionally used in the field of communication techniques. The PSK demodulation circuit 116 carries out PSK demodulation for a digital signal output from the A/D converter 32a. The PSK demodulation circuit 116 outputs the demodulated signal, that is, an original spread code, to the first shift register 33b. Thereafter, the correlation circuit 115 calculates a correlation value between the signals demodulated by the correlator 33f and the spread code used for correlation arithmetic operation similarly as in the first embodiment and outputs the calculated correlation value to the correlation value storage circuit 33m.

As described above, in the present embodiment, a plurality of spread codes having different phases are individually PSK-modulated. The modulation signals are supplied simultaneously to the transmission conductor array 11, that is, they are simultaneously multiple-phase transmitted to carry out position detection of a pointer using the reception conductors 14. Therefore, in the present embodiment, advantages similar to those described in the first embodiment may be achieved.

Further, in the present embodiment, when spread codes to be supplied to the transmission conductors 12 are PSK-modulated, a clock signal of a period shorter than the chip period of the spread codes is used (i.e., a clock signal of a frequency greater than the chip rate of the spread codes is used). In these cases, when the spread codes are demodulated by the reception section, the frequency of signal transitions at rising and falling edges of the demodulated spread codes can be increased. Therefore, in the present embodiment, the error in position detection of a pointer can be reduced. Further, since the spread codes are PSK-modulated, the bandwidth of signals to be supplied to the transmission conductor array 11 can be reduced, and the noise resisting property can be improved.

While in the second embodiment described above a plurality of signals obtained by PSK-modulation of spread codes having different phases are produced using the spread code production circuit 40, the PSK modulation circuit 111, and shift register 112 in the spread code supplying circuit 110, the present invention is not limited to this implementation. Further, while the reception section in the present embodiment described above PSK-demodulates, that is, digitally processes, a digital signal after A/D conversion, the present invention is not limited to this implementation. The reception section may PSK-demodulate an analog signal before A/D conversion. In this instance, a PSK demodulation circuit, which is an analog processing circuit, is provided at the preceding stage to the A/D converter 32a.

As described in the foregoing description of modification 1 shown in FIG. 19, a storage circuit, that is, a signal storage circuit, including a ROM, a random logic circuit, and the like, may be provided in the transmission section. In this instance, the pointer detection circuit may be configured such that, in the storage circuit, signals obtained by PSK-modulating a plurality of spread codes having phase differences from each other are stored in advance, and upon position detection, the modulation signals to be supplied to the transmission conductors 12 are read out in accordance with a predetermined sequence from the storage circuit and supplied to the transmission conductors 12 while the spread codes used for the PSK modulation are supplied to the correlator 33f. In other words, the configuration of modification 1 may be applied to the second embodiment. In this instance, since there is no need for the spread code production circuit 40 and the PSK modulation circuit 111 and shift register 112 in the spread code supplying circuit 110, the configuration of the pointer detection apparatus can be simplified.

[Modification 2]

While in the second embodiment described above the PSK modulation circuit 111 is provided at the stage preceding the shift register 112 in the spread code supplying circuit 110 and PSK-modulated spread codes are input to the shift register 112, the present invention is not limited to this implementation. Spread codes may be retained in the shift register such that PSK modulation is carried out for signals output from the shift register. In modification 2, an example of such configuration is described.

Figure 23:
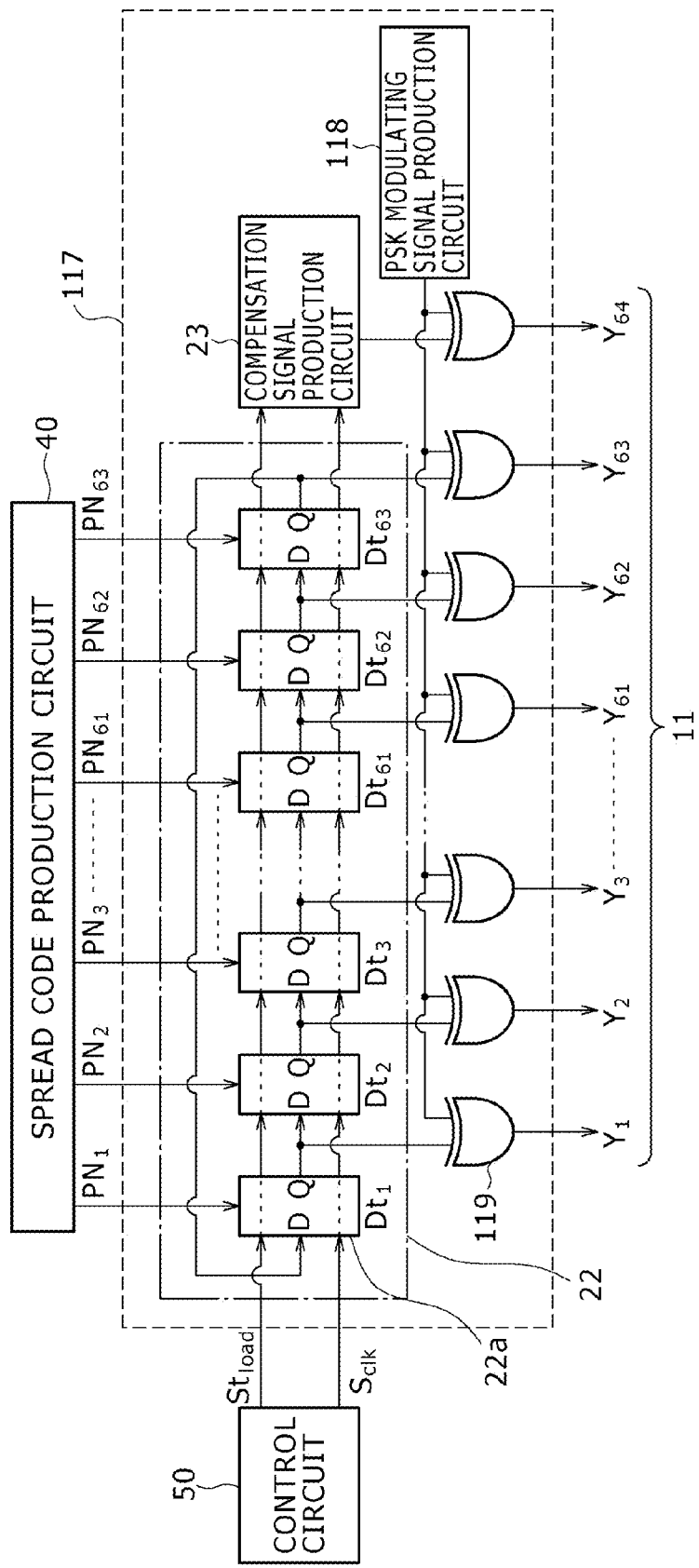
FIG. 23 is a block diagram showing a general configuration of a spread code supplying circuit according to modification 2.

FIG. 23 shows a general configuration of a spread code supplying circuit according to modification 2 and illustrates a connection relationship between the spread code supplying circuit 117, the spread code production circuit 40, the control circuit 50, and the transmission conductor array 11. In FIG. 23, components like those of the spread code supplying circuit 21 of the first embodiment described above with reference to FIG. 3 are denoted by like reference characters.

Referring to FIG. 23, the spread code supplying circuit 117 includes a shift register 22, a compensation signal production circuit 23, a PSK modulating signal production circuit 118, and a plurality of exclusive OR circuits (EXOR) 119. In the example shown, spread codes ($PN_1$ to $PN_{63}$) produced by the spread code production circuit 40 are input directly to the shift register 22, and therefore, a shift register similar to that used in the first embodiment is used in the present example.

Further, in the present example, the number of exclusive OR circuits 119 is equal to the number of flip-flops 22a in the shift register 22. Also, an exclusive OR circuit 119 for a signal output from the compensation signal production circuit 23 is provided. Each of the exclusive OR circuits 119 is connected at one of input terminals thereof to the output terminal of a corresponding one of the flip-flops 22a, and one of the exclusive OR circuits 119 is connected to the output terminal of the compensation signal production circuit 23. The other of input terminals of the exclusive OR circuits 119 are connected to the output terminal of the PSK modulating signal production circuit 118.

The PSK modulating signal production circuit 118 outputs a carrier signal for PSK modulation configured to carry out PSK modulation for 63 output signals output in parallel from the shift register 22 and a signal output from the compensation signal production circuit 23. In the example illustrated in FIG. 23, the PSK modulation is carried out with a signal of a clock frequency that is twice the clock frequency (or the chip rate) of the spread codes before the modulation, similarly as in the second embodiment described above. Therefore, in the present example, the PSK modulating signal production circuit 118 is controlled with a clock signal of a ½-chip period (i.e., twice the chip rate). The ratio between the clock frequency used in modulation and the chip frequency can be altered suitably according to an application of the pointer detection apparatus.

Each of the exclusive OR circuits 119 exclusively ORs (i.e., outputs a logical result of "true" only if one of the two inputs, and not both, is "true") an output signal from a corresponding one of the flip-flops 22a or the compensation signal production circuit 23 and the PSK modulation signal output from the PSK modulating signal production circuit 118. Using the above described configuration, PSK modulation can be carried out for a spread code output from the spread code production circuit 40 as in the second embodiment. Therefore, advantages similar to those achieved by the second embodiment can be achieved.

3. Third Embodiment

In a third embodiment described below, the pointer detection circuit is configured such that spread codes to be applied to the transmission conductor array 11 are FSK (Frequency Shift Keying) modulated.

[FSK Modulation]

FIGS. 24A and 24B illustrate waveforms of spread codes before and after FSK modulation. In particular, FIG. 24A illustrates a waveform of spread codes before FSK modulation and FIG. 24B illustrates a waveform of the spread codes after the FSK modulation.

In the embodiment described below, spread codes are FSK modulated using signals of clock frequency equal to two or four times the clock frequency (or chip frequency) of the spread codes before the modulation. However, the ratio between the clock frequency used in modulation and the chip frequency can be altered suitably according to an application of the pointer detection apparatus. In the FSK modulation of the present example, a signal in the High level state in the spread code before modulation (as seen in FIG. 24A) is modulated with the periodic signal having four times the frequency (as seen in FIG. 24B) as compared to the spread code before the modulation. Further, a signal in the Low level state in the spread code before modulation (as seen in FIG. 24A) is modulated with the periodic signal having twice the frequency (as seen in FIG. 24B) as compared to the spread code before the modulation, to thereby obtain a modulation signal illustrated in FIG. 24B.

[Configuration of the Pointer Detection Apparatus]

The pointer detection apparatus of the present embodiment includes a processing circuit configured to carry out FSK modulation of spread codes in a spread code supplying circuit of a transmission section, and another processing circuit for demodulating the FSK-modulated signals in a correlation circuit of a reception section. The configuration of the other part of the pointer detection apparatus is similar to that of the first embodiment described above with reference to FIG. 1. Therefore, description of the configuration of the pointer detection apparatus other than the spread code supplying circuit of the transmission section and the correlation circuit of the reception section is omitted herein to avoid redundancy.

FIG. 25 shows a general configuration of the spread code supplying circuit 120 of the present embodiment and illustrates a connection relationship between the spread code supplying circuit 120 and the spread code production circuit 40 and the transmission conductor array 11. In FIG. 25, components like those of the spread code supplying circuit 21 of the first embodiment described above with reference to FIG. 3 are denoted by like reference characters.

Referring to FIG. 25, the spread code supplying circuit 120 includes an FSK modulation circuit 121 as a signal modulation circuit, a shift register 122, and a compensation signal production circuit 23. The compensation signal production circuit 23 has a configuration similar to that of the first embodiment described above.

The FSK modulation circuit 121 is provided between the spread code production circuit 40 and the shift register 122. The FSK modulation circuit 121 can be formed from an FSK modulation circuit, which is conventionally used in the field of communication techniques. The FSK modulation circuit 121 carries out phase modulation of spread codes of a 63-chip length produced by the spread code production circuit 40 and a signal produced by the compensation signal production circuit 23. Thereupon, in the present embodiment, since a clock signal having a frequency equal to maximally four times that used in the first embodiment is used to carry out FSK modulation, the FSK modulation circuit 121 produces a modulation signal of a 252-clock length per one spread code having a 63-chip length. Then, the FSK modulation circuit 121 outputs signals of a one-clock length, which form the modulation signal, in parallel, to the corresponding flip-flops in the shift register 122.

The shift register 122 is a parallel input-output type 256-stage shift register. In particular, though not shown, the shift register 122 in the present embodiment is formed by multi-stage connecting four (4) flip-flops, for a compensation signal, to 252 flip-flops. Further, the shift register 122 has an output terminal at every interval of four flip-flops, and the output terminals of the shift register 122 are connected to the corresponding transmission conductors 12. In other words, the shift register 122 outputs signals for every four flip-flops, which correspond to signals of a one-chip length, in parallel to the transmission conductor array 11.

The flip-flops are connected to the control circuit unit 50 such that operation thereof is controlled by a transmission load signal St and a clock signal $S_{clk}$ supplied thereto from the control circuit 50. The transmission load signal $St_{load}$ is used to control the timing at which the modulation signals output from the FSK modulation circuit 121 are to be input to the shift register 122. In the present embodiment, the transmission load signal $St_{load}$ is input to the flip-flops in a 256-clock period, that is, in a 64-chip period. Also, the clock signal $S_{clk}$ has the frequency equivalent to a ¼-chip rate. The flip-flops individually shift a modulation signal of a 1-clock length retained therein to the flip-flops at the succeeding stage after every one-clock period.

Figure 26:
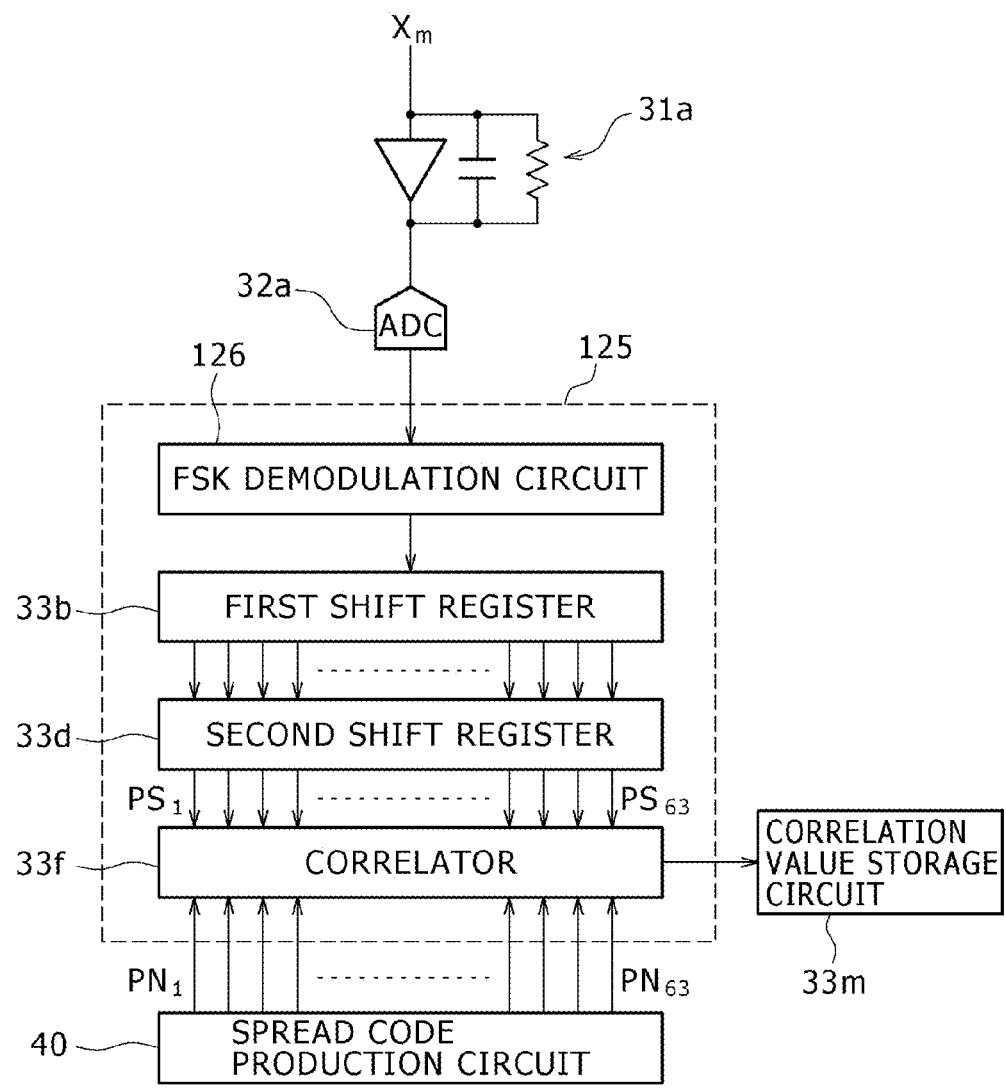
FIG. 26 is a block diagram showing a configuration of a correlation circuit according to the third embodiment.

FIG. 26 shows a configuration of the correlation circuit and the correlation value storage circuit in the present embodiment and illustrates a connection relationship between the circuits mentioned and the I/V conversion circuit 31a, A/D converter 32a, and spread code production circuit 40. In FIG. 26, like elements to those of the correlation circuit 33a and the correlation value storage circuit 33m of the first embodiment described above with reference to FIG. 6 are denoted by like reference characters.

The correlation circuit 125 includes, as principal components thereof, an FSK demodulation circuit 126 as a signal demodulation circuit, a first shift register 33b, a second shift register 33d, and a correlator 33f. The other part of the correlation circuit 125 than the FSK demodulation circuit 126 is similar to that in the first embodiment.

The FSK demodulation circuit 126 is provided between the A/D converter 32a and the first shift register 33b. The FSK demodulation circuit 126 can be formed from an FSK demodulation circuit conventionally used in the field of communication techniques. The FSK demodulation circuit 126 carries out FSK demodulation for a digital signal output from the A/D converter 32a. Then, the FSK demodulation circuit 126 outputs the demodulated signal to the first shift register 33b and then to the second shift register 33d. Thereafter, the correlation circuit 125 calculates, at the correlator 33f, a correlation value between the demodulated signals and the spread codes to be used for correlation arithmetic operation (supplied from the spread code production circuit 40), similar to as in the first embodiment, and outputs the calculated correlation value to the correlation value storage circuit 33m.

As described above, in the present embodiment, a plurality of spread codes having phase differences from each other are individually FSK-modulated, and the modulated signals are supplied simultaneously to the transmission conductors 12 of the transmission conductor array 11 to carry out position detection of a pointer based on the signals received by the reception conductors 14. Therefore, in the present embodiment, advantages similar to those achieved by the first embodiment are also achieved.

Further, in the present embodiment, when spread codes to be individually supplied to the transmission conductors 12 are FSK-modulated, a clock signal of a period shorter than the chip period of the spread codes is used (i.e., a clock signal of a frequency greater than the chip rate of the spread codes is used). Therefore, in the present embodiment, the error in position detection of a pointer can be reduced. Since spread codes are FSK-modulated, the bandwidth of signals to be supplied to the transmission conductor array 11 can be reduced, and the noise resisting property can be improved.

While in the third embodiment described above a plurality of signals obtained by FSK-modulation of spread codes having different phases from each other are produced using the spread code production circuit 40, and the FSK modulation circuit 121 and the shift register 122 in the spread code supplying circuit 120, the present invention is not limited to this implementation. Further, while the reception section in the present embodiment described above FSK-demodulates, that is, digitally processes, a digital signal after A/D conversion, the present invention is not limited to this implementation. The reception section may FSK-demodulate an analog signal before A/D conversion. In this instance, an FSK demodulation circuit, which is an analog processing circuit, is provided at the preceding stage to the A/D converter 32a.

The pointer detection apparatus may be configured otherwise. As described in the foregoing description of modification 1 with reference to FIG. 19, a storage circuit including a ROM, a random logic circuit, and so forth, may be provided in the transmission section such that in the storage circuit signals obtained as a result of FSK-modulation of a plurality of spread codes having phases different from each other are stored in advance. During position detection, the FSK modulation signals are read out in accordance with a predetermined sequence from the storage circuit and supplied to the transmission conductors 12 while the spread codes used for the FSK modulation are supplied to the correlator 33f. In other words, the configuration of modification 1 may be applied to the third embodiment. In this instance, since there is no need for the spread code production circuit 40 and the FSK modulation circuit 121 and shift register 122 in the spread code supplying circuit 120, the configuration of the pointer detection apparatus can be simplified.

[Modification 3]

While in the first to third embodiments described above, the phase difference between spread codes to be supplied to the transmission conductors 12 is fixed, the present invention is not limited to this implementation. The phase difference between spread codes to be supplied to the transmission conductors 12 may be varied, for example, after every predetermined interval of time. An example of a sequence for varying the phase difference is provided as modification 3 and illustrated in FIGS. 27A and 27B. While FIGS. 27A and 27B illustrate an example wherein a supplying form of spread codes (i.e., a form or sequence in which spread codes are supplied) of the present example is applied to the first embodiment, the supplying form of spread codes of the present example can be applied similarly also to the second and third embodiments described above.

Figure 27A:
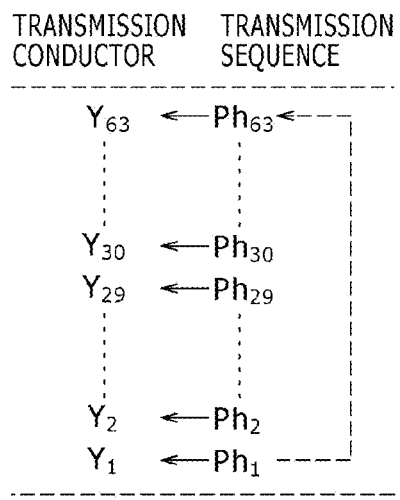
FIGS. 27A and 27B are diagrammatic views illustrating different ways of transmission sequences of spread codes to be supplied to transmission conductors in a pointer detection apparatus of modification 3.
Figure 27B:
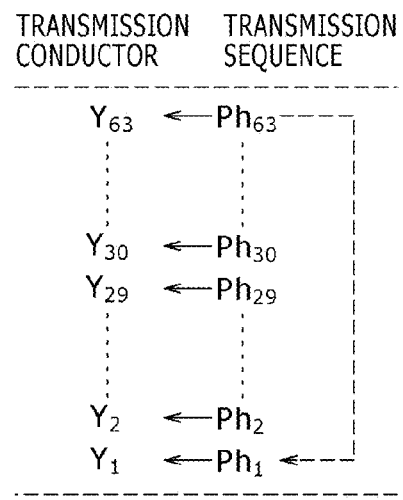

FIGS. 27A and 27B each illustrates a sequence of producing phase differences between spread codes to be individually supplied to the transmission conductors 12. In the example of FIG. 27A, spread codes having phase differences $\{Ph_1, Ph_2, \ldots, Ph_{29}, Ph_{30}, \ldots, Ph_{62}, Ph_{63}\}$ are supplied to the transmission conductors $\{Y_1, Y_2, \ldots, Y_{29}, Y_{30}, \ldots, Y_{62}, Y_{63}\}$, respectively. Then, after a predetermined interval of time, spread codes of phase differences $\{Ph_2, Ph_3, \ldots, Ph_{30}, Ph_{31}, \ldots, Ph_{63}, Ph_1\}$ are supplied to the transmission conductors $\{Y_1, Y_2, \ldots, Y_{29}, Y_{30}, \ldots, Y_{62}, Y_{63}\}$, respectively. After that, spread codes are supplied to the transmission conductor array 11 while the transmission conductors 12 to which spread codes of predetermined phase differences are to be supplied are continuously shifted such that the (conductor) index thereof decreases after every predetermined interval of time. In other words, the transmission conductors to which the transmission signals are to be individually supplied are cyclically switched (shifted) in accordance with a predetermined sequence as time passes. FIG. 27B illustrates an example wherein a sequence is executed in a direction opposite to that of the selection sequence for selecting the transmission conductors or transmission signals described above with reference to FIG. 27A.

Note that in the examples of FIGS. 27A and 27B it is necessary to switch (shift) the phase differences of signals to be individually supplied to the transmission conductors 12. Therefore, in the above examples, a processing circuit for implementing the sequence for production of the phase differences of the spread codes described above is provided in the transmission section.

Figure 28:
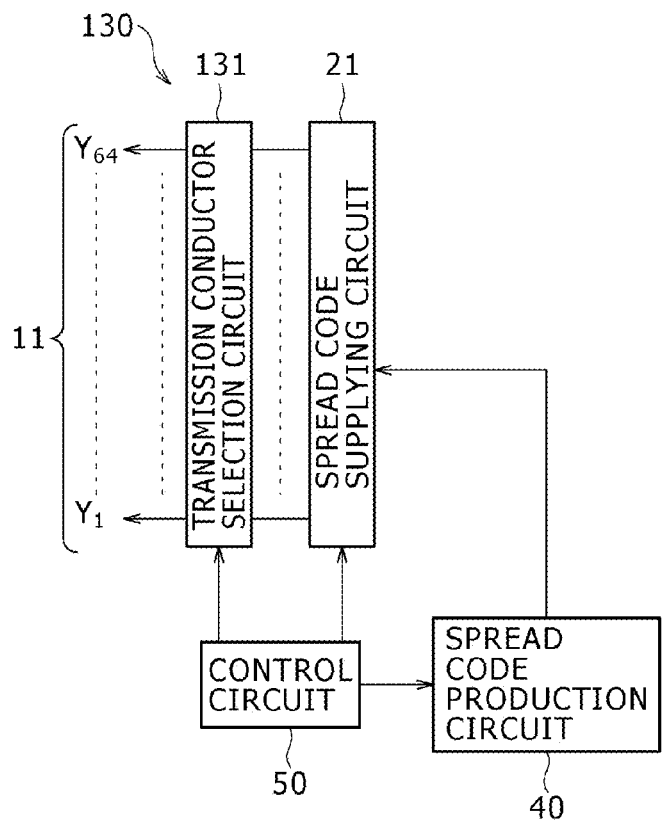
FIG. 28 is a block diagram showing a configuration of a transmission section according to modification 3.

FIG. 28 shows a general configuration of the transmission section 130 in the examples described. In FIG. 28, elements like those of the transmission section 20 of the first embodiment described above with reference to FIG. 1 are denoted by like reference characters. Referring to FIG. 28, the transmission section 130 includes a spread code supplying circuit 21 and a transmission conductor selection circuit 131. The transmission conductor selection circuit 131 is disposed between the spread code supplying circuit 21 and the transmission conductor array 11.

The transmission conductor selection circuit 131 is formed, for example, from semiconductor switches or the like. The transmission conductor selection circuit 131 switches the connection relationship between the transmission conductors 12 and the outputs of the spread code supplying circuit 21 after every predetermined interval of time in accordance with the sequence for selecting spread signals having the phase differences illustrated in FIG. 27A or 27B. The switching operation of the transmission conductor selection circuit 131 is controlled by the control circuit 50.

[Modification 4]

In the first to third embodiments described above, spread codes having predetermined phase differences are supplied individually to the transmission conductors $Y_1$ to $Y_{63}$ and a compensation signal (corresponding to the spread signals to be individually supplied to the transmission conductors $Y_1$ to $Y_{63}$) is supplied to the transmission conductor $Y_{64}$. Here, a configuration of the transmission section suitable for allowing the reception section to process signals from the reception conductors 14 using a differential amplification circuit in order to improve the noise resisting property is described. Modification 4 provides a supplying form of spread codes (i.e., a form or sequence in which spread codes are supplied), which is devised for this purpose.

Figure 29:
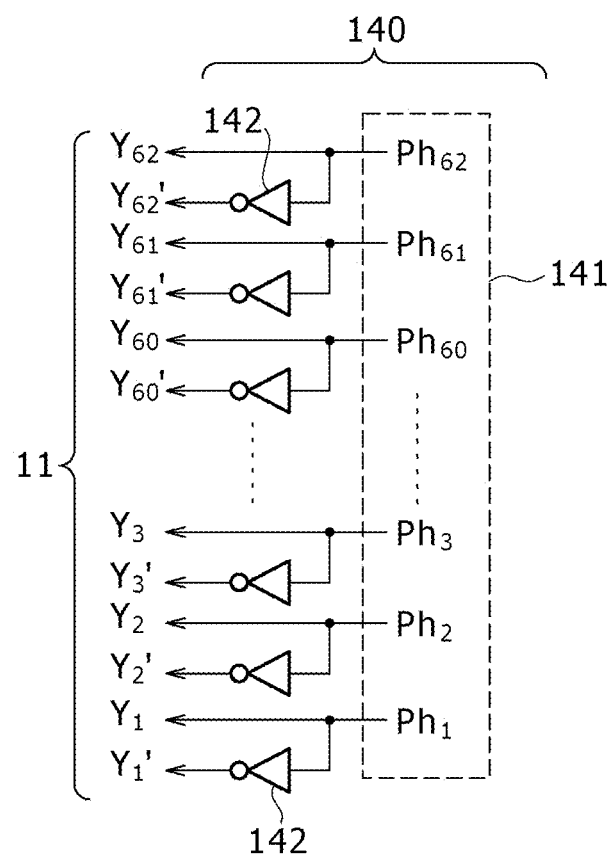
FIG. 29 is a diagrammatic view showing a general configuration of a transmission section of a pointer detection apparatus of modification 4.

FIG. 29 shows a general configuration of the transmission section in the present example and illustrates a supplying form of spread codes having phase differences. While FIG. 29 illustrates an example where the supplying form of spread codes of the present example is applied to the first embodiment, it may be applied also to the second and third embodiments described above. Further, a configuration of the reception section suitable for use in Modification 4 will be described later in connection with a still further embodiment of the present invention.

Referring to FIG. 29, the transmission section 140 includes a plurality of signal inversion circuits 142 for inverting the phase or polarity of signals of spread codes ($Ph_1$ to $Ph_{63}$) output from a spread signal supplying circuit 141. In particular, the spread signal supplying circuit 141 outputs spread codes of the phase differences $Ph_1$ to $Ph_{63}$ in parallel, and when the spread codes individually pass through the signal inversion circuits 142, the phases thereof are inverted so as to form spread codes of the inverse phase. Thus, additional transmission conductors ($Y_1'$ to $Y_{63}'$) to which the spread codes of the inverse phase are supplied are successively disposed between the transmission conductors ($Y_1$ to $Y_{63}$) of the transmission conductor array 11, to which the spread codes whose phases are not inverted are individually supplied. Accordingly, in the present example, where the code length is 63, at least 126 transmission conductors ($Y_1, Y_1', \ldots, Y_{63}, Y_{63}'$) in 63 pairs are disposed at least in the sensor section 10, to which the original spread codes and the spread codes whose phases are inverted are supplied. A transmission conductor 12 for supplying a compensation signal may be provided additionally.

Each of the signal inversion circuits 142 has the same configuration and inverts a signal input thereto. Spread codes are supplied to the signal inversion circuits 142 from the spread signal supplying circuit 141, and signals output from the signal inversion circuits 142 are supplied to the transmission conductors 12.

Specifically, spread codes of the phase differences $Ph_1$ to $Ph_{63}$ are inverted to produce inverse spread codes, and the inverse spread codes are individually supplied to the transmission conductors $(Y_1, Y_1', \ldots, Y_{63}, Y_{63}')$ which form the transmission conductor array 11. In the configuration described, current signals flowing to cross points, for example, on the transmission conductor $Y_1$ and current signals flowing to cross points on the transmission conductor $Y_1'$ have reversed phases relative to each other. Accordingly, the reception signals can be processed using a differential amplification circuit, which improves the noise resistance. Further, since the original spread codes and the phase-inverted spread codes have a complementary relationship to each other, where a pointer does not exist on the sensor section 10, the summed signals of the original spread signal and the inverted spread signal indicate a zero or very low signal level. Therefore, the sum values of the signals where a plurality of signals are received by the same reception conductors 14 can be suppressed low. Consequently, a reception amplifier with a broad dynamic range for an input signal is not required.

With regards to supplying a compensation signal, a transmission conductor 12 for supplying a compensation signal may be provided. Alternatively, as will be described later, a configuration may be adopted where a compensation signal is supplied directly to the reception section without using the transmission conductor 12.

4. Fourth Embodiment

In a fourth embodiment, each of the transmission conductor array 11 and the reception conductor array 13 is divided into a plurality of blocks or regions. Spread codes are supplied at the same time or transmitted in groups to the transmission conductors 12 which form each of the blocks. Further, signals from the reception conductors 14 which form each of the blocks are used to carry out position detection. In the present embodiment, each of the transmission conductor array 11 and the reception conductor array 13 in the pointer detection apparatus of the first embodiment described above is divided into a plurality of blocks or regions. The present embodiment may be applied also to the second and third embodiments, and also in this instance, similar advantages can be achieved. Naturally, it is possible to apply the configuration of division into blocks to the transmission conductor array 11 only or to the reception conductor array 13 only.

[Configuration of the Pointer Detection Apparatus]

Figure 30:
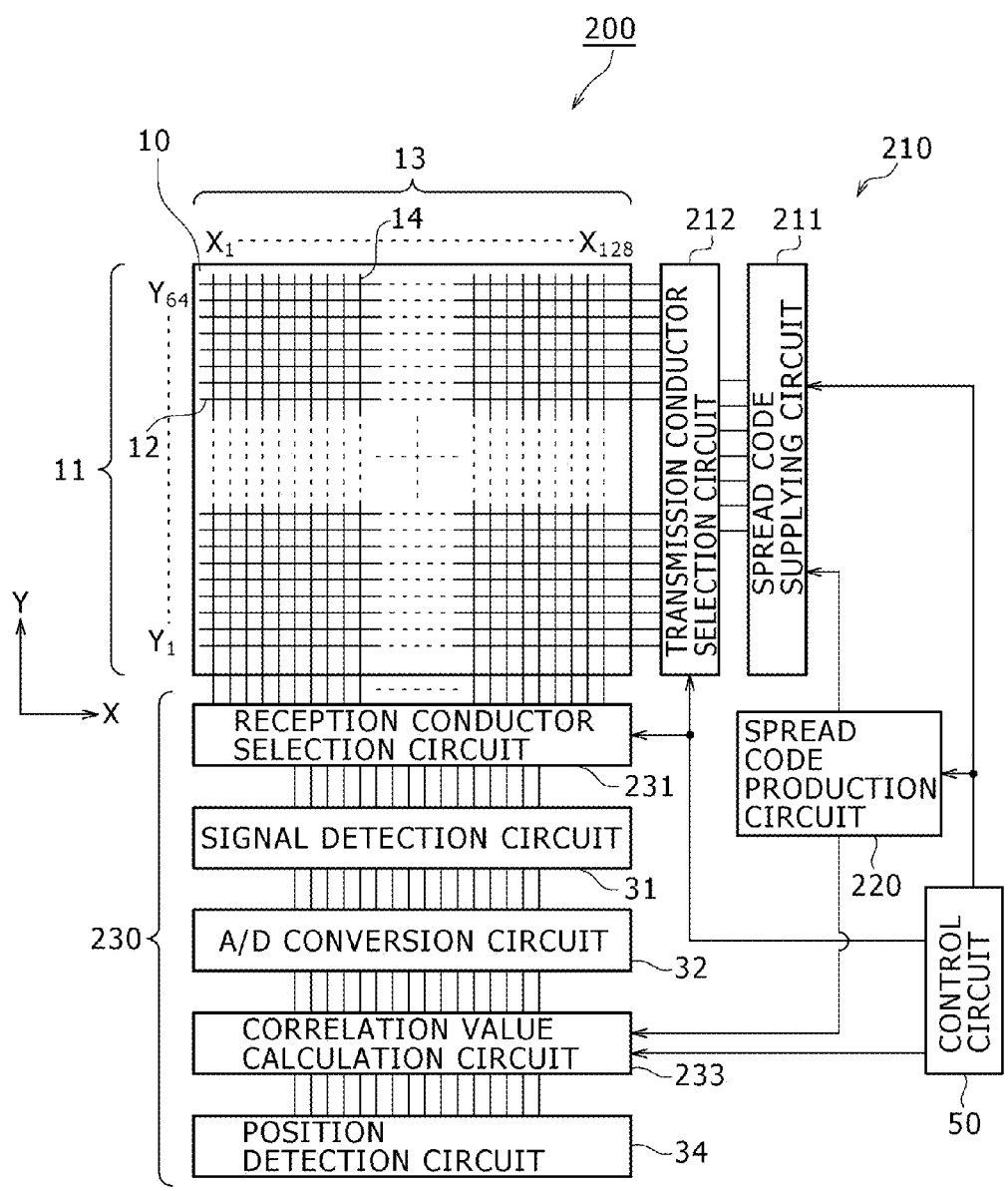
FIG. 30 is a block diagram showing a general configuration of a pointer detection apparatus according to a fourth embodiment of the present invention.

FIG. 30 shows a general configuration of the pointer detection apparatus of the present embodiment. In FIG. 30, elements like those in the first embodiment described above with reference to FIG. 1 are denoted by like reference characters. Referring to FIG. 30, the pointer detection apparatus 200 shown includes, as principal components thereof, a sensor section 10, a transmission section 210, a reception section 230, a position detection circuit 34, a spread code production circuit 220 and a control circuit 50. These components are described below. The position detection circuit 34 has a configuration similar to that in the first embodiment described above with reference to FIG. 8 and overlapping description of the position detection circuit 34 is omitted herein to avoid redundancy.

The sensor section 10 includes a transmission conductor array 11 having 64 transmission conductors 12 and a reception conductor array 13 having 128 reception conductors 14 as in the first embodiment. In the present embodiment, the transmission conductor array 11 is divided into seven blocks, each including nine transmission conductors 12, which are positioned adjacent to each other and hence have consecutive indexes. A compensation signal is supplied to the remaining transmission conductor 12 ($Y_M$) as in the first embodiment. Further, in the present embodiment, the reception conductor array 13 is divided into 16 detection blocks, each including eight reception conductors 14, which are positioned adjacent to each other and hence have consecutive indexes. The dividing numbers (i.e., how many blocks to be divided into) of the transmission conductor array 11 and the reception conductor array 13 may be altered suitably in accordance with a particular application of the pointer detection apparatus.

In the present embodiment, the transmission conductor array 11 is divided into seven transmission blocks $\{Y_1 \text{ to } Y_9\}$, $\{Y_{10} \text{ to } Y_{18}\}, \ldots, \{Y_{46} \text{ to } Y_{54}\}$ and $\{Y_{55} \text{ to } Y_{63}\}$. Then, spread codes of phase differences $Ph_1, Ph_2, \ldots, Ph_6$ and $Ph_7$ are supplied at the same time to predetermined seven transmission conductors 12 selected one by one from within the transmission blocks $\{Y_1 \text{ to } Y_9\}$, $\{Y_{10} \text{ to } Y_{18}\}, \ldots, \{Y_{46} \text{ to } Y_{54}\}$ and $\{Y_{55} \text{ to } Y_{63}\}$. (See FIG. 32.) Further, the reception conductor array 13 is divided into 16 detection blocks $\{X_1 \text{ to } X_8\}$, $\{X_9 \text{ to } X_{16}\}, \ldots, \{X_{113} \text{ to } X_{120}\}$ and $\{X_{121} \text{ to } X_{128}\}$. Then, position detection is carried out using predetermined 16 reception conductors 14 selected one by one from within the detection blocks $\{X_1 \text{ to } X_8\}$, $\{X_9 \text{ to } X_{16}\}, \ldots, \{X_{113} \text{ to } X_{120}\}$ and $\{X_{121} \text{ to } X_{128}\}$.

Figure 31:
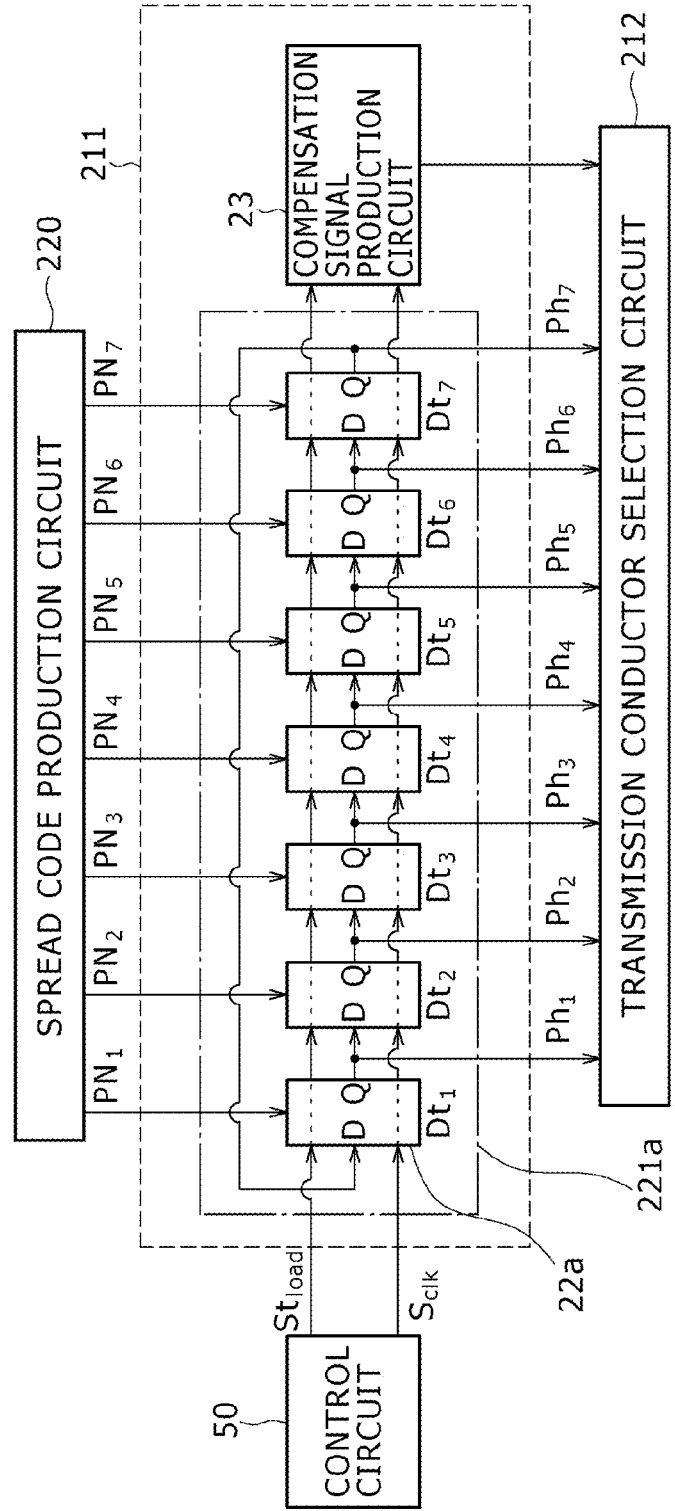
FIG. 31 is a block diagram showing a general configuration of a spread code supplying circuit shown in FIG. 30.

The transmission section 210 includes a spread code supplying circuit 211 and a transmission conductor selection circuit 212. The transmission conductor selection circuit 212 is disposed between the spread code supplying circuit 211 and the transmission conductor array 11. FIG. 31 shows a general configuration of the spread code supplying circuit 211 and illustrates a connection relationship between the spread code supplying circuit 211, the spread code production circuit 220, the control circuit 50, and the transmission conductor selection circuit 212. In FIG. 31, elements like those of the first embodiment described above with reference to FIG. 3 are denoted by like reference characters.

The spread code supplying circuit 211 includes a shift register 211a and a compensation signal production circuit 23. The shift register 211a is of the parallel input-output type and is formed from seven flip-flops 22a or registers connected at multiple stages. In the present embodiment, one transmission block of the transmission conductor array 11 includes nine transmission conductors 12. In particular, the transmission conductor array 11 is divided into seven transmission blocks, and spread codes whose code length (or chip length) is seven are supplied at the same time to seven transmission conductors 12 selected one by one from within the transmission blocks. Accordingly, the number of phase differences of spread codes to be supplied to the transmission blocks is seven. Therefore, the chip length of spread codes to be produced by the spread code production circuit 220 may be at least "7" and the number of flip-flops 22a may be seven.

Operation of the flip-flops 22a is controlled by a transmission load signal $St_{load}$ of a seven-chip period and a clock signal $S_{clk}$ of a one-chip period supplied thereto from the control circuit 50. The flip-flops 22a individually and successively shift a signal or code of a one-chip length retained therein to the flip-flops 22a at the succeeding stage after every one-chip period, and output the signals to corresponding input terminals of the transmission conductor selection circuit 212.

Where the spread code supplying circuit 211 is configured in a manner described above, the first to seventh chip codes $PN_1$ to $PN_7$ which form spread codes produced by the spread code production circuit 40 are input to the seven flip-flops $Dt_1$ to $Dt_7$, respectively. Then, spread codes of the phase differences $Ph_1$ (same phase) to $Ph_7$ (phase difference by a six-chip length) output from the flip-flops $Dt_1$ to $Dt_7$ are input to the corresponding input terminals of the transmission conductor selection circuit 212.

In the present example, the spread code production circuit 220 produces spread codes whose chip length is "7." For example, as a spread code of a seven-chip length (N=2), a code string of "0001011" can be used.

Further, the chip length representative of the code length of spread codes to be produced by the spread code production circuit 40 is set in response to the number of transmission conductors which form the transmission conductor array 11 and the dividing number of the transmission conductors. For example, where the transmission conductor array 11 is divided into 11 transmission blocks, the spread code production circuit 40 produces spread codes of an 11-chip length. As the spread codes of an 11-chip length, for example, a code string of "00010010111" can be used. On the other hand, where the transmission conductor array 11 is divided into 15 transmission blocks, the spread code production circuit 40 produces spread codes of a 15-chip length. As a spread code of a 15-chip length, for example, a code string of "000010100110111" can be used. Further, where the transmission conductor array 11 is divided into 19 transmission blocks, the spread code production circuit 40 produces spread codes of a 19-chip length. As the spread codes of a 19-chip length, for example, a code string of "0000101011110010011" can be used.

Figure 32:
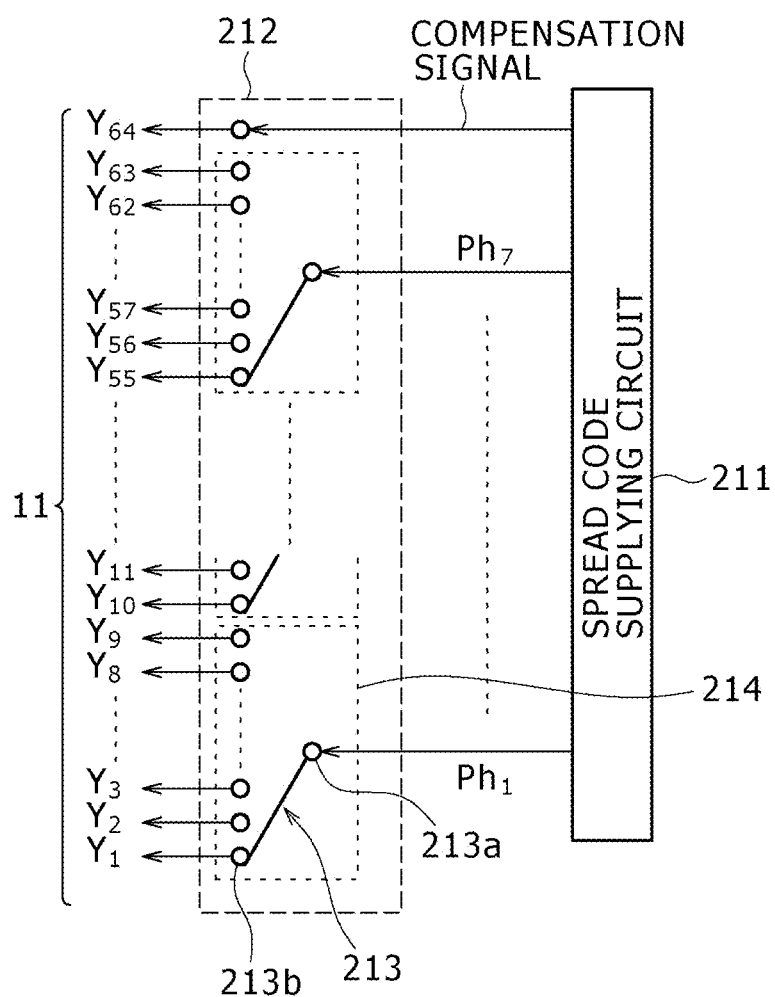
FIG. 32 is a block diagram showing a general configuration of a transmission conductor selection circuit shown in FIG. 30.

The spread code supplying circuit 212 includes the number of semiconductor switches or like member equal to the number of divisional blocks of the transmission conductor array 11 (in the present embodiment, seven semiconductor switches), so as to selectively switch between the transmission conductors within each block. FIG. 32 shows an internal configuration of the transmission conductor selection circuit 212.

Referring to FIG. 32, the transmission conductor selection circuit 212 includes a switch 213 for each of transmission blocks 214, to which spread codes are to be supplied. Each of the switches 213 has nine terminals 213b provided on the output side thereof and individually connected to corresponding ones of the transmission conductors 12. The switches 213 are connected at an input terminal 213a thereof to the output terminals of corresponding ones of the flip-flops 22a in the spread code supplying circuit 211.

Spread codes of the phase differences $Ph_1$, $Ph_2$, ..., $Ph_6$, $Ph_7$ output in parallel from the spread code supplying circuit 211 are input to the input terminals of the seven transmission blocks $\{Y_1$ to $Y_9\}$, $\{Y_{10}$ to $Y_{18}\}$, ..., $\{Y_{46}$ to $Y_{54}\}$ and $\{Y_{55}$ to $Y_{63}\}$, respectively. Meanwhile, a compensation signal output from the spread code supplying circuit 211 is supplied to the transmission conductor $Y_{64}$.

The switch 213 in each of the transmission blocks 214 successively switches the connection state between the selected transmission conductor 12 and the output terminal of the spread code supplying circuit 211 which outputs a spread code of a corresponding predetermined phase difference $Ph_k$ (k=1 to 7). The switching operation of the switch 213 is controlled by the control circuit 50.

Figure 33:
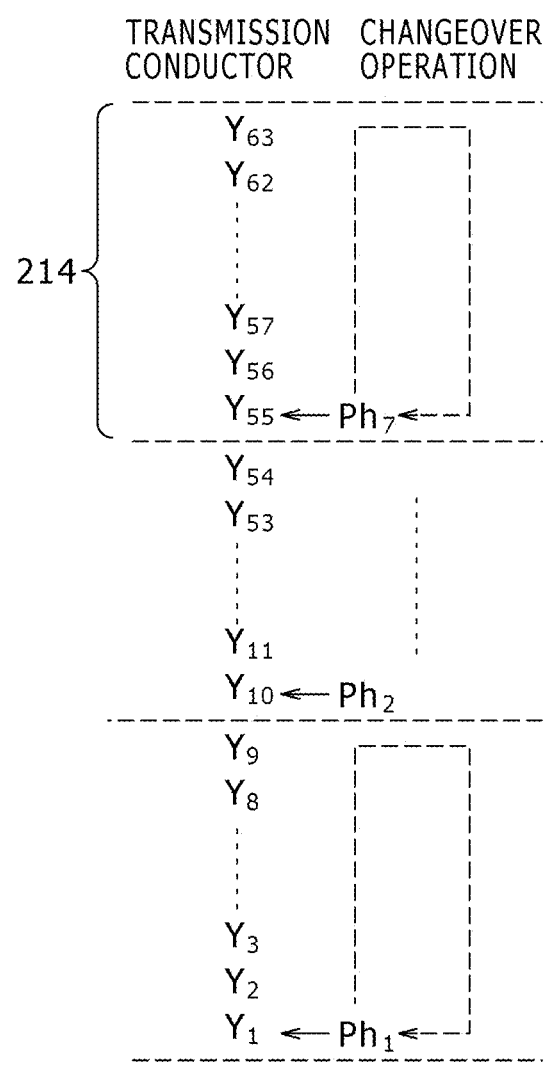
FIG. 33 is a diagrammatic view illustrating a manner of switching operation of transmission conductors by the transmission conductor selection circuit of FIG. 32.

FIG. 33 illustrates an example of the switching operation among the transmission conductors 12 in each transmission block 214 in the present embodiment. Referring to FIG. 33, in the example illustrated, in each transmission block 214, the transmission conductor 12 which has the lowest index is connected to the corresponding output terminal of the spread code supplying circuit 211 through the switch 213. In other words, spread codes of the phase differences $Ph_1$, $Ph_2$, ..., $Ph_7$ are supplied to the seven transmission conductors ($Y_1$, $Y_{10}$, ..., $Y_{55}$) through the switches 213 as seen in FIG. 33. In this state, position detection of a pointer is carried out for a predetermined period of time. Those of the transmission conductors 12 which are not selected are preferably connected to a reference potential or the ground. In this instance, when the transmission conductors 12 are not selected, they may be connected to the reference potential or the ground by the switches 213 which form the transmission conductor selection circuit 212, and when any transmission conductor is to be selected, the connection of the transmission conductor is switched from the state where it is connected to the reference potential or the ground to another state where it is connected to the corresponding output terminal of the spread code supplying circuit 211. The noise resisting property is improved by the configuration just described.

Thereafter, if a predetermined interval of time elapses, the transmission conductor selection circuit 212 switches the transmission conductors 12 to be selected to the next transmission conductors 12 positioned adjacent thereto in the direction, for example, in which the indexes increase, namely, to the transmission conductors $Y_2$, $Y_{11}$, ..., $Y_{56}$. Then, after the switching of the transmission conductors, spread codes having different phases are supplied at the same time to these seven transmission conductors 12 to carry out position detection. By cyclically selecting the transmission conductors 12 which form the transmission blocks 214, position detection of a pointer is carried out.

Figure 34:
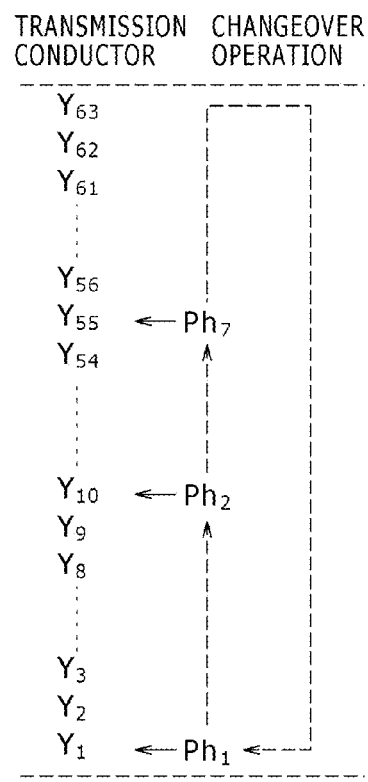
FIG. 34 is a diagrammatic view illustrating another manner of switching operation of transmission conductors by the transmission conductor selection circuit of FIG. 32.

Another example of selection operation of the transmission conductors 12 is described with reference to FIG. 34. In the example illustrated in FIG. 34, the transmission conductor selection circuit 212 first selects those seven transmission conductors 12 which are disposed at intervals of nine transmission conductors from among the transmission conductors $Y_1$ to $Y_{63}$ to which spread codes are to be supplied. For example, the transmission conductor selection circuit 212 selects the transmission conductors $Y_1$, $Y_{10}$, ..., $Y_{46}$, $Y_{55}$. The spread code supplying circuit 211 supplies spread codes of the phase differences $Ph_1$ to $Ph_7$ at the same time to the selected transmission conductors. Then, position detection is carried out for a predetermined period of time.

Thereafter, the transmission conductor selection circuit 212 selects those transmission conductors 12 whose index is displaced (shifted) by one in the direction in which, for example, the index increases. In particular, the transmission conductor selection circuit 212 now selects the transmission conductors $Y_2$, $Y_{11}$, ..., $Y_{47}$, $Y_{56}$ which are positioned adjacent to the seven transmission conductors $Y_1$, $Y_{10}$, ..., $Y_{46}$, $Y_{55}$ selected in the preceding operation cycle, respectively. The spread code supplying circuit 211 supplies spread codes of the phase differences $Ph_1$ to $Ph_7$ at the same time to the newly selected transmission conductors $Y_2$, $Y_{11}$, ..., $Y_{47}$, $Y_{56}$. Thereafter, the selection operation of the transmission conductors 12 described above is carried out cyclically to carry out position detection.

In particular, in the example illustrated in FIG. 33, the transmission conductor array 11 is divided into a plurality of transmission blocks, each including a predetermined number of transmission conductors 12, and a predetermined one of the transmission conductors 12 in each transmission block is selected cyclically such that spread codes are supplied at the same time to the transmission conductors selected in the transmission blocks, respectively. In contrast, in the example of FIG. 34, all of the transmission conductors 12 which form the transmission conductor array 11, except one of the transmission conductors 12 to which a compensation signal is supplied, are set as a single transmission block, and a predetermined number of transmission conductors 12 are selected at the same time from within the single transmission block and spread codes are supplied at the same time to the selected transmission conductors 12 with a predetermined interval therebetween (e.g., every $9^{th}$ transmission conductor). Further, the selection operation of the transmission conductors 12 is carried out cyclically through control of the switching operation of the switches 213 based on the control signal from the control circuit 50.

While in the selection operations of the transmission conductors 12 described above with reference to FIGS. 33 and 34, the transmission conductors 12 to be connected after every predetermined interval of time are switched in the direction in which the index increases, the present invention is not limited to this configuration. The transmission conductors 12 to be connected may be switched in the direction in which the index decreases after every predetermined interval of time. Alternatively, the transmission conductors 12 may be selected at random in accordance with a predetermined selection sequence.

A configuration of the reception section 230 in the present embodiment will now be described. Referring back to FIG. 30, the reception section 230 shown includes a reception conductor selection circuit 231, a signal detection circuit 31, an A/D conversion circuit 32, and a correlation value calculation circuit 233. The pointer detection apparatus according to the present embodiment is similar in configuration to that according to the first embodiment except that it includes the reception conductor selection circuit 231 and that the internal configuration of the correlation value calculation circuit 233 is different from that of the correlation value calculation circuit 33. Therefore, a description of the configuration of the reception conductor selection circuit 231 and the correlation value calculation circuit 233 only is given here.

Figure 35:
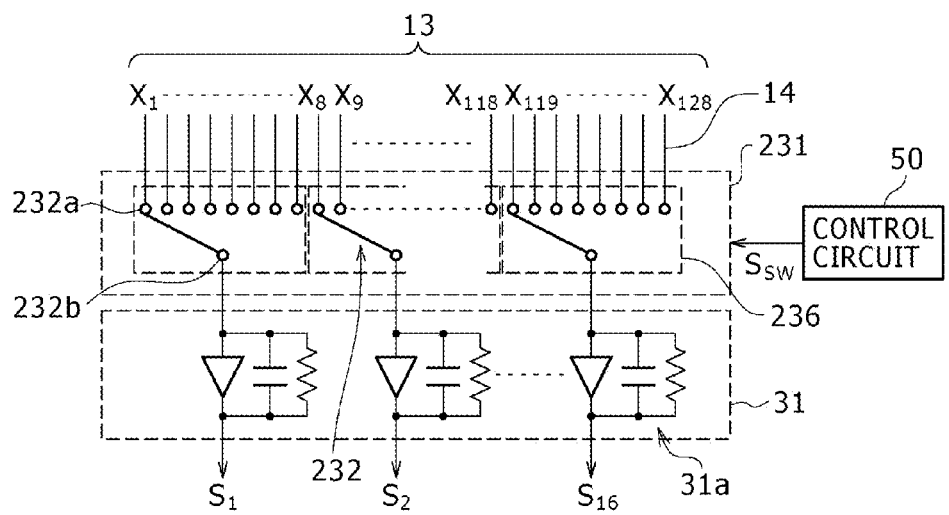
FIG. 35 is a circuit diagram showing a general configuration of a reception conductor selection circuit and a signal detection circuit shown in FIG. 30.

FIG. 35 shows a general configuration of the reception conductor selection circuit 231 and illustrates a connection relationship between the reception conductor selection circuit 231, the signal detection circuit 31, and the control circuit 50.

The reception conductor array 13 including the reception conductors $X_1$ to $X_{128}$ is divided into a plurality of detection blocks, in the present embodiment, into 16 blocks, each including a predetermined number (e.g., 8) of reception conductors 14. Each detection block includes a switch 232 for selecting one of eight reception conductors 14 which form the detection block. In particular, the reception conductor selection circuit 231 includes detection blocks 236 and supplies signals from 16 different reception conductors selected by the detection blocks 236 to the signal detection circuit 31. Each of the switches 232 has eight input terminals 232a provided on the input side thereof. Each of the input terminals 232a is connected to a corresponding one of the reception conductors 14. Further, each of the switches 232 has an output terminal 232b connected to the input terminal of a corresponding one of the I/V conversion circuits 31a in the signal detection circuit 31.

The switches 232 switches the connection state between the I/V conversion circuits 31a and the reception conductors 14 after every predetermined interval of time. The reception conductor selection operation by the switches 232 is controlled by a switching signal $S_{SW}$ input thereto from the control circuit 50. The I/V conversion circuits 31a output voltage signals ($S_1$ to $S_{16}$) converted from current signals.

Figure 36:
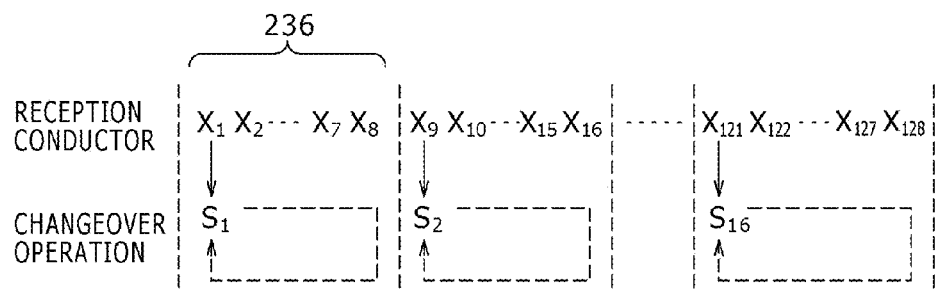
FIG. 36 is a diagrammatic view illustrating a manner of switching operation of reception conductors by the reception conductor selection circuit shown in FIG. 35.

FIG. 36 illustrates an example of the selection operation of the reception conductors 14 in the detection blocks 236. It is assumed that those reception conductors 14 whose index is lowest in the individual detection blocks 236, that is, the reception conductors $X_1, X_9, \ldots, X_{121}$, are connected to the input terminals of the corresponding I/V conversion circuits 31a in the signal detection circuit 31 through the switches 232 as seen in FIG. 36. In this state, position detection of a pointer is carried out based on the 16 currently selected reception conductors 14 for a predetermined period of time. Those reception conductors 14 which are not selected are preferably connected to a reference potential or the ground, using the conventional circuit configuration described above.

Then, after the predetermined interval of time elapses, the switches 232 switch the reception conductors 14 to be connected to the next reception conductors 14 positioned adjacent thereto in the direction in which, for example, the index increases, that is, to the transmission conductors $X_2, X_{10}, \ldots, X_{122}$. Then, position detection of a pointer is carried out based on signals from the newly selected 16 reception conductors 14. A selection operation of the reception conductors as just described is carried out cyclically for the eight reception conductors 14, which form each detection block 236, to carry out position detection of a pointer. Alternatively, the reception conductors 14 may be selected at random in accordance with a predetermined selection sequence.

Figure 37:
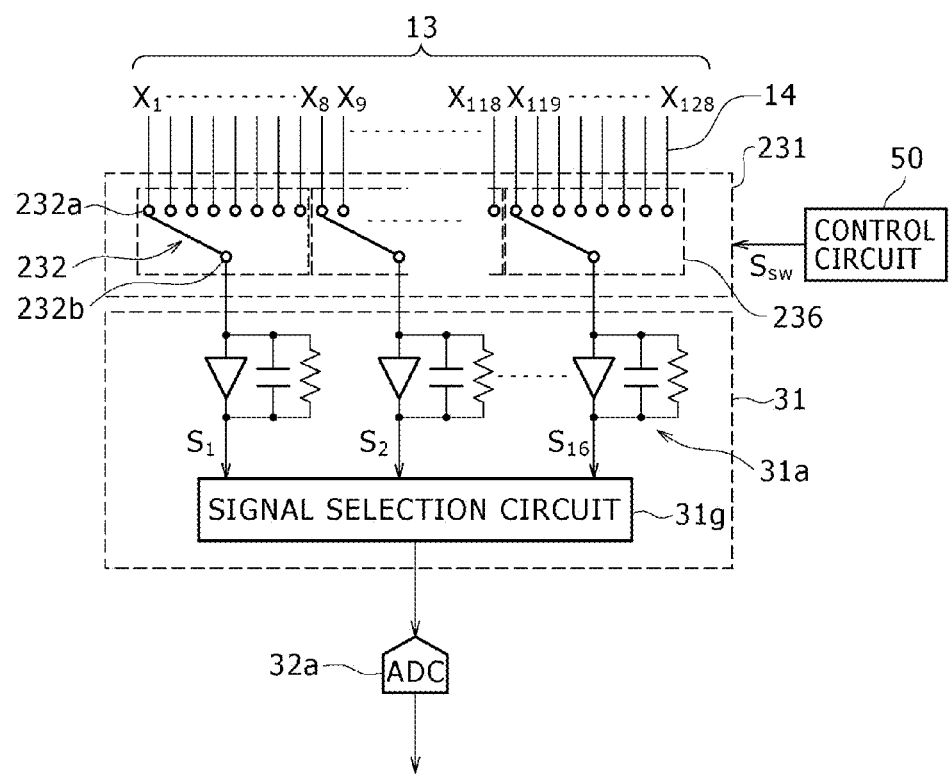
FIG. 37 is a circuit diagram showing another configuration of the signal detection circuit of the pointer detection apparatus of FIG. 30.

While in the present embodiment, the number of I/V conversion circuits 31a provided in the signal detection circuit 31 and the number of A/D converters (not shown) correspondingly provided for the I/V conversion circuits 31a are equal to the number of detection blocks 236 as described above, the present invention is not limited to this configuration. FIG. 37 shows another example of the configuration of the signal detection circuit 31. Referring to FIG. 37, in the example illustrated, a signal selection circuit 31g formed from semiconductor switches or the like is provided on the output side of the I/V conversion circuits 31a in the signal detection circuit 31. In the signal detection circuit 31 shown in FIG. 37, one of the I/V conversion circuits 31a to be connected to the corresponding A/D converter 32a is successively switched after every predetermined interval of time by the signal detection circuit 31 to output a voltage signal to the A/D converter 32a. Where the signal selection circuit 31g is provided in the signal detection circuit 31, signals output from the I/V conversion circuits 31a can be processed time-divisionally (in a dime-divided manner) and supplied to the A/D converter 32a. Accordingly, it is necessary to provide only one system of the A/D converter 32a and a circuit group hereinafter described which is disposed at a succeeding stage to the A/D converter 32a in the reception section 230. Therefore, in this instance, the circuit configuration of the reception section 230 is simplified.

Referring back to FIG. 30, the correlation value calculation circuit 233 is connected to the A/D conversion circuit 32 similar to the first embodiment and uses an output signal of the A/D conversion circuit 32, and the same spread code as supplied to the spread code supplying circuit 211 that is output from the spread code production circuit 40, to calculate a correlation value between them. The correlation value calculation circuit 233 includes the number of correlation circuits equal to the number of detection blocks 236, and a correlation value storage circuit. Each of the correlation circuits has an input terminal connected to the output terminal of a corresponding one of the A/D converters 32a in the A/D conversion circuit 32.

Figure 38:
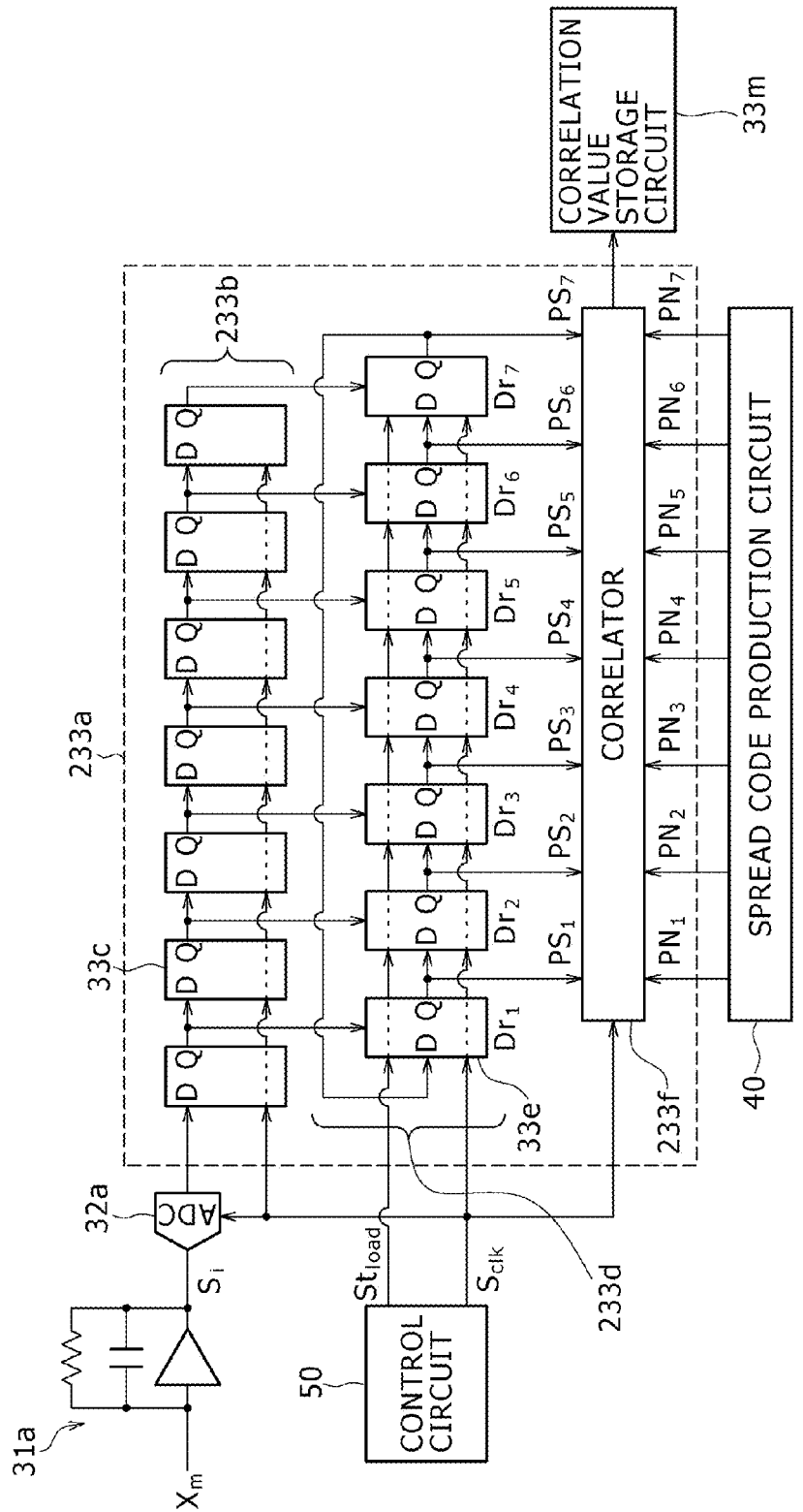
FIG. 38 is a block diagram showing a general configuration of a correlation circuit in the a schematic view illustrating a principle of position detection by the pointer detection apparatus of FIG. 30.

FIG. 38 shows a configuration of the correlation circuits and the correlation value storage circuit according to the present embodiment and illustrates a connection relationship between the circuits mentioned and the I/V conversion circuit 31a, the A/D converter 32a, the spread code production circuit 40, and the control circuit 50. In FIG. 38, elements like those in the first embodiment described above with reference to FIG. 6 are denoted by like reference characters. The correlation value storage circuit 33m in the present embodiment has a configuration similar to that in the first embodiment.

The correlation circuit 233a includes a first shift register 233b, a second shift register 233d, and a correlator 233f. In short, the correlation circuit 233a includes a two-stage configuration of shift registers similar to the first embodiment.

The first shift register 233b is of the serial input type and includes the number of flip-flops 33c equal to the code length (chip length) of spread codes, in the present embodiment, seven flip-flops 33c, which are connected at multiple stages. The flip-flops 33c have a configuration similar to that of the flip-flops 33c used in the correlation circuit 33a in the first embodiment.

The second shift register 233d is of the parallel input type and includes the number of flip-flops 33e equal to the code length (chip length) of spread codes, in the present embodiment, seven flip-flops 33e, which are connected at multiple stages. The flip-flops 33e have a configuration similar to that of the flip-flops 33e used in the correlation circuit 33a in the first embodiment. An output signal of the flip-flop 33e at the last stage of the second shift register 233d is cyclically supplied to the flip-flop 33e at the first stage similarly as in the first embodiment.

Though not shown, the correlator 233f includes, in the present embodiment, seven integrators corresponding to the chip length of spread codes and an adder. The correlator 233f has a configuration similar to that of the correlator 33f described above with reference to FIG. 7, which is used in the correlation circuit 33a in the first embodiment. The correlator 233f calculates a correlation value between signals $PS_1$ to $PS_7$ of a one-chip length output in parallel from the second shift register 233d and the first to seventh codes $PN_1$ to $PN_7$ of a one-chip length formed from spread codes produced by the spread code production circuit 40.

[Processing Procedure for Position Detection]

Figure 39:
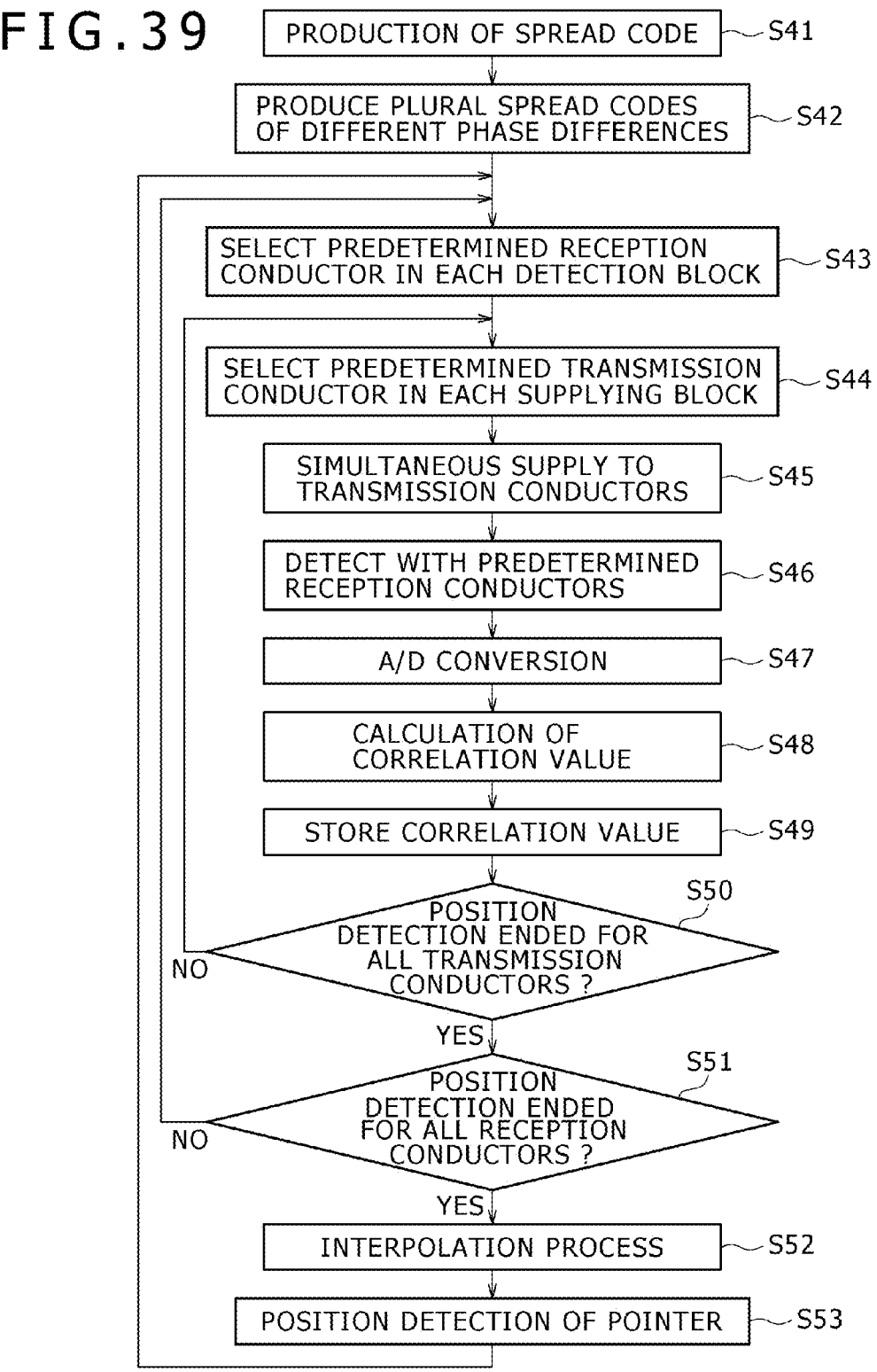
FIG. 39 is a flow chart illustrating a processing procedure for position detection by the pointer detection apparatus of FIG. 30.

A procedure for position detection by the pointer detection apparatus 200 according to the present (fourth) embodiment will now be described with reference to FIG. 39. FIG. 39 illustrates the procedure for position detection of a pointer by the pointer detection apparatus 200 of the present embodiment.

The spread code production circuit 220 first produces a spread code of a chip length "7" at step S41. Then, the spread code supplying circuit 211 produces a plurality of spread codes having various phase differences $Ph_1$ to $Ph_7$ to be supplied to the transmission blocks 214 at step S42.

Then, at step S43, the reception conductor selection circuit 231 of the reception section 230 selects a predetermined reception conductor 14 in each of the detection blocks 236 with the switch 232 and connects the selected reception conductor 14 to a corresponding one of the UV conversion circuits 31a.

At step S44, the transmission conductor selection circuit 212 selects a predetermined transmission conductor 12 in each transmission block 214 to which a spread code is to be supplied. Then, at step S45, the spread code supplying circuit 211 supplies spread codes of phase differences $Ph_k$ (k=1 to 7) corresponding to the predetermined transmission conductors 12 individually selected in the transmission blocks 214 at the same time for a predetermined period of time. The compensation signal production circuit 23 in the spread code supplying circuit 211 supplies a predetermined compensation signal corresponding to the code pattern of the spread codes to the transmission conductor $Y_{64}$ so that appropriate values may be calculated as the correlation values.

Then, at step S46, the reception section 230 detects current signals individually output from the predetermined reception conductors 14 selected from within the detection blocks 236 at step S43. The signal detection circuit 31 converts the current signals obtained from the selected reception conductors 14 into voltage signals, amplifies the voltage signals, and outputs amplified signals to the A/D conversion circuit 32. At this time, the current signals obtained from the reception conductors 14 are converted into voltage signals by the UV conversion circuits 31a.

The A/D conversion circuit 32 A/D converts the voltage signals input thereto at step S47. The voltage signals detected from the reception conductors 14 are A/D converted by the A/D converters 32a connected to the UV conversion circuits 31a. Thereupon, the A/D conversion circuit 32 converts the voltage signals output from the UV conversion circuits 31a into digital signals whose one word (or one code) is formed of a plurality of bits. The A/D conversion circuit 32 outputs the digital signals whose one word is formed of multi-bits to the correlation value calculation circuit 233.

The correlation value calculation circuit 233 calculates a correlation value between the digital signals input thereto and the spread codes at step S48. The digital signals converted from the signals from the selected reception conductors 14 by the A/D converters 32a are input to the correlation value calculation circuit 233. The first shift register 233b, second shift register 233d and correlator 233f in the correlation circuit 33a operate in accordance with the timing chart described above with reference to FIG. 9 to carry out correlation arithmetic operation between the signals from the selected reception conductors 14 and the spread codes in order to determine a correlation characteristic.

The correlation value calculation circuit 233 stores the correlation characteristic calculated with regard to the selected reception conductors 14 into the correlation value storage circuit 33m at step S49. In the present embodiment, the correlation circuit 233a can retain and process detection signals in multi-bits as described above. Therefore, the values of the correlation value to be stored into the correlation value storage circuit 33m are not necessarily binary values but may be multi-value signals of multi-bits, for example, 10 bits. Thus, a spatial distribution of correlation values of a high resolution can be produced.

Then, at step S50, the control circuit 50 determines whether or not the position detection is completed with regard to all of the transmission conductors 12. If the position detection is not completed with regard to all transmission conductors 12, that is, if a determination NO is made at step S50, the processing returns to step S44. At step S44 the switches 213 in the transmission blocks 214 in the transmission conductor selection circuit 212 are switched to select those transmission conductors 12, which are different from those in the preceding operation cycle. Thereafter, the processes at steps S44 to S50 are repeated until after the position detection is completed with regard to all transmission conductors 12.

If the position detection of the pointer 19 is completed with all transmission conductors 12 used, that is, if a determination YES is made at step S50, then the control circuit 50 determines at step S51 whether or not the position detection is completed with regard to all reception conductors 14.

If the position detection of the pointer 19 with all reception conductors 14 used is not completed, that is, if the determination NO is made at step S51, the processing returns to step S43. At this step, the switches 232 in the detection blocks 236 in the reception conductor selection circuit 231 are switched to select those reception conductors 14 which are different from those used in the preceding operation cycle. Thereafter, the processes at steps S43 to S51 are repeated until after the position detection with regard to all reception conductors 14 is completed.

If the position detection of the pointer 19 with all reception conductors 14 used is completed, that is, if the YES determination is made at step S51, then the interpolation processing circuit 34a (FIG. 8) reads out mapping data of the correlation value stored in the correlation value storage circuit 33m and calculates correlation values at positions between the cross points through a predetermined interpolation process at step S52. Consequently, correlation values at positions other than the cross points can be determined, and position detection with a higher degree of accuracy can be achieved.

Then, the position calculation circuit 34b (FIG. 8) detects, based on the spatial distribution (or mapping) data of the correlation values after the interpolation process obtained at step S52, a region of those correlation values which are higher than a predetermined threshold value, or determines a peak level in the spatial distribution and the position of the peak level, to specify the position of the pointer at step S53. In the present embodiment, position detection of the pointer disposed on the sensor section 10 is carried out in this manner.

As described above, in the present embodiment, spread codes of different phases are supplied at the same time (multiple phase transmission) to those transmission conductors 12 which are individually selected from within the transmission blocks 214, and position detection of a pointer is carried out based on signals from those reception conductors 14, which are individually selected from within the detection blocks. In other words, a position detection process is carried out at the same time with regard to a plurality of cross points between the transmission conductors 12 and the reception conductors 14. Therefore, in the present embodiment, a position detection of a pointer can be carried out at a higher speed.

More particularly, in the present embodiment, the transmission conductor array 11 is divided into seven transmission blocks 214 while the reception conductor array 13 is divided into 16 detection blocks 236, and the blocks are processed in parallel. Therefore, the detection time can be reduced to 1/(7×16) in comparison with the prior art where a detection process is carried out successively for all cross points.

Further, the reception section 230 in the present embodiment can carry out processing of detected signals by a multibit process. In the present embodiment, correlation values at positions between cross points can be determined by an interpolation process. Therefore, with the pointer detection process of the present embodiment, position detection can be carried out with a high degree of accuracy.

Furthermore, since both of the transmission conductor array 11 and the reception conductor array 13 are divided into a plurality of blocks or regions, the number of flip-flops in the spread code supplying circuit 211 and the correlation circuit 233a can be reduced. Therefore, the circuit configuration of the pointer detection apparatus 200 can be simplified in comparison with that of the first embodiment.

[Modification 5]

In the fourth embodiment described above, spread codes to be supplied to the transmission conductor selection circuit 212 and the correlator 233f are produced using the spread code production circuit 220 and the shift register 211a in the spread code supplying circuit 211. However, the pointer detection apparatus may be configured, for example, similar to modification 1 described above. A storage circuit formed from a ROM or the like is provided in the transmission section and spread codes having different phases from each other are stored in advance in the storage circuit such that, during position detection, the spread codes are read out from the storage circuit in accordance with a predetermined sequence and supplied to corresponding transmission conductors or correlators.

Figure 40:
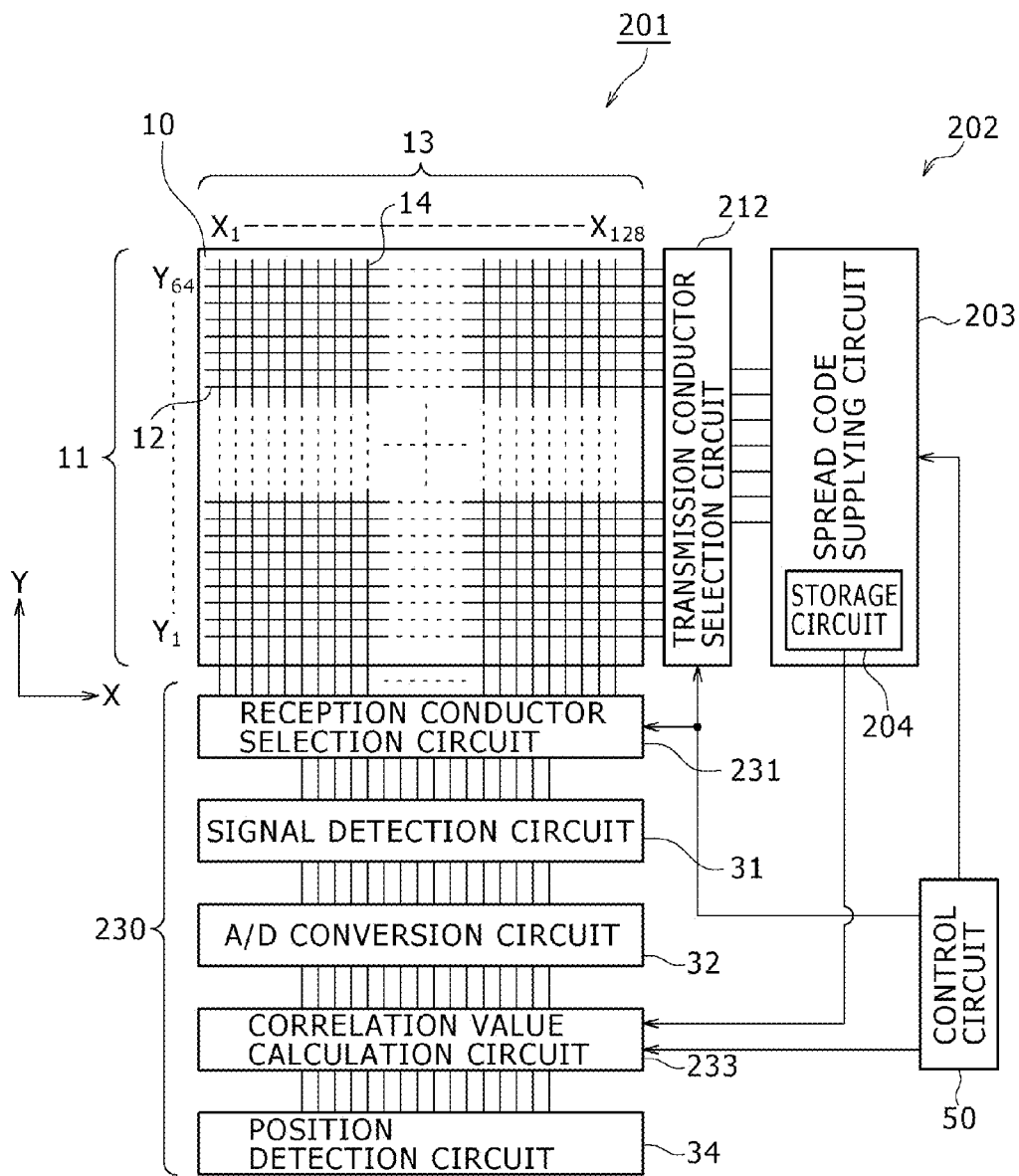
FIG. 40 is a block diagram showing a general configuration of a pointer detection apparatus of modification 5.

FIG. 40 shows a general configuration of the pointer detection apparatus according to modification 5. In FIG. 40, elements like those in the fourth embodiment described above with reference to FIG. 30 are denoted by like reference characters.

Referring to FIG. 40, the pointer detection apparatus 201 according to modification 5 includes a storage circuit 204 provided in a spread code supplying circuit 203 of a transmission section 202. The storage circuit 204 is formed from a ROM or the like, and spread codes of phase differences $Ph_1$ to $Ph_7$ and a spread code to be supplied to the correlator 233f (FIG. 38) and used for correlation arithmetic operation are stored in advance in the storage circuit 204. Then, during position detection, the spread codes of the phase differences $Ph_1$ to $Ph_7$ are read out from the storage circuit 204 in accordance with a predetermined sequence and supplied to the input terminals 213a (FIG. 32) of the corresponding switches 213 in the transmission conductor selection circuit 212. The read out spread codes are supplied to the correlator 233f. Thereafter, position detection can be carried out similarly as in the fourth embodiment. Where a configuration described above is used, the necessity for the spread code production circuit 220 and the shift register 211a (FIG. 31) in the spread code supplying circuit 211 in the pointer detection apparatus 200 of the fourth embodiment is eliminated, as in modification 1.

The pointer detection apparatus 201 of the present modification 5 is configured similarly to that of the fourth embodiment except that the storage circuit 204 is provided in the spread code supplying circuit 203 and that there is no necessity to provide the spread code production circuit 220 and the shift register 211a in the spread code supplying circuit 211.

As described above, with the pointer detection apparatus of the present modification 5, since the necessity to use the shift register 211a in the spread code supplying circuit 211 and to use the spread code production circuit 220 for producing various spread codes is eliminated, the configuration of the pointer detection apparatus 201 may be simplified.

While, in modification 5 described above the storage circuit 204 for storing various spread codes is provided in the spread code supplying circuit 203 in order to eliminate the necessity for the spread code production circuit 220, the present invention is not limited to this configuration The storage circuit 204 may otherwise be provided independently of the spread code supplying circuit 203.

[Modification 6]

While in the fourth embodiment described above the transmission conductors 12 are selected individually from within the transmission blocks 214 which form the transmission conductor array 11 after every predetermined interval of time, the present invention is not limited to this implementation. For example, a plurality of spread codes having phase differences from each other may be supplied collectively to all transmission conductors 12 which form each transmission block to carry out position detection. In this instance, the transmission block is switched after every predetermined interval of time to carry out similar position detection. In the following description of modification 6, an example of such switching operation of the transmission conductors 12 is described.

The pointer detection apparatus of modification 6 is similar in operation and configuration to the pointer detection apparatus of the fourth embodiment described above with reference to FIG. 30, except the switching operation of the transmission conductors 12 and the configuration of the transmission conductor selection circuit.

Further, in modification 6, one transmission block is formed from seven transmission conductors 12 positioned adjacent to each other. In this instance the chip length of spread codes to be supplied is "7" and the number of flip-flops of the shift registers in the spread code supplying circuit of the transmission section and the correlation circuits of the reception section is "7."

Figure 41:
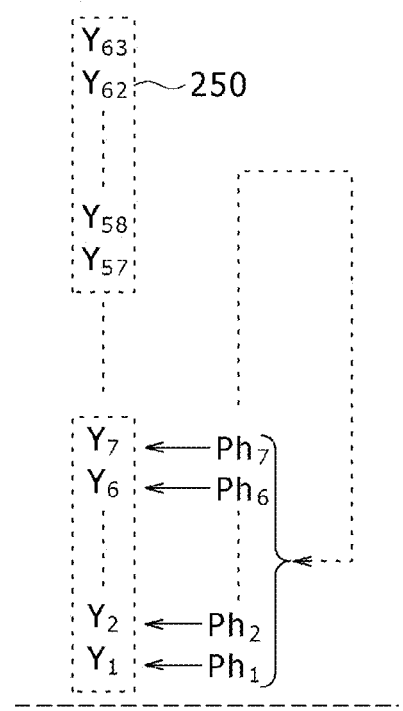
FIG. 41 is a diagrammatic view illustrating a manner of switching operation of transmission conductors by a transmission conductor selection circuit according to modification 6.

Before describing a particular configuration of the transmission conductor selection circuit of the present modification 6, an example of switching operation of the transmission conductors 12 in the pointer detection apparatus of the present modification will be described. FIG. 41 illustrates an example of the switching operation of the transmission conductors 12 in the pointer detection apparatus of modification 6.

The transmission conductor selection circuit first selects, for example, a transmission block $\{Y_1 \text{ to } Y_7\}$ from among a plurality of transmission blocks as seen in FIG. 41. Then, the transmission conductor selection circuit supplies spread codes of the phase differences $Ph_1$ to $Ph_7$ at the same time to the transmission conductors $Y_1$ to $Y_7$ which form the transmission block $\{Y_1 \text{ to } Y_7\}$. In this state, position detection of a pointer is carried out for a predetermined period of time. Thereafter, the transmission conductor selection circuit switches from the previous transmission block 250 to the next transmission block $\{Y_8 \text{ to } Y_{14}\}$. Then, the transmission conductor selection circuit supplies spread codes of the phase differences $Ph_1$ to $Ph_7$ at the same time to the selected transmission conductors $Y_8$ to $Y_{14}$ to carry out position detection of a pointer. The switching operation and the position detection operation are carried out repetitively after every predetermined interval of time. When the position detection with regard to the transmission block $\{Y_{57} \text{ to } Y_{63}\}$ is completed, the transmission conductor selection circuit selects the transmission block $\{Y_1 \text{ to } Y_7\}$ again in repeating the switching operation.

Figure 42:
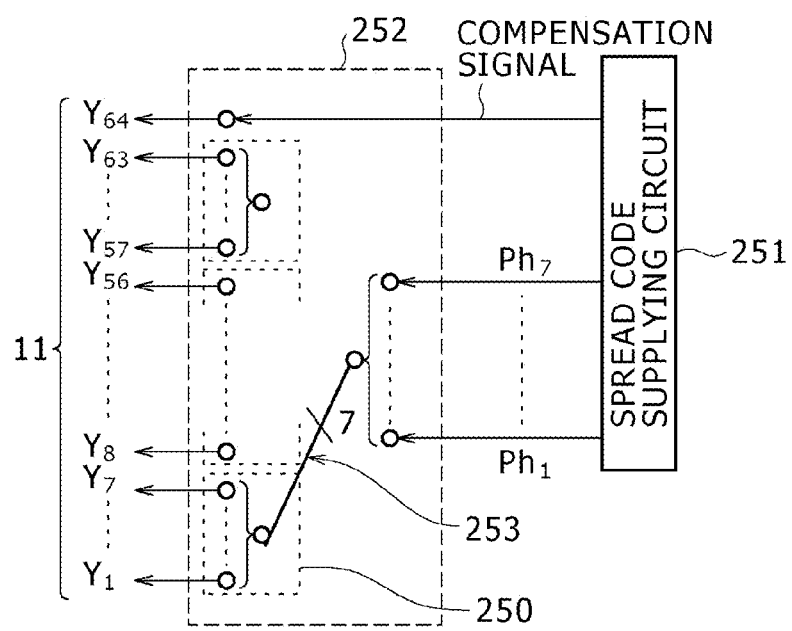
FIG. 42 is a block diagram showing a general configuration of the transmission conductor selection circuit according to modification 6.

FIG. 42 shows an example of a configuration of the transmission conductor selection circuit for implementing the switching operation described above. Referring to FIG. 42, the transmission conductor selection circuit 252 includes a switch 253 to be selectively connected to transmission blocks 250 for supplying spread codes supplied from a spread code supplying circuit 251 simultaneously to seven transmission conductors 12 within each transmission block 250. The switching operation of the switch 253, which carries out connection between the transmission conductors 12 and the output terminals of the spread code supplying circuit 251, is controlled by the control circuit 50. Further, a compensation signal is supplied to the transmission conductor $Y_{64}$ without going through the switch 253.

When the pointer detection apparatus includes the transmission conductor selection circuit 252 having a configuration described above and the selection operation of the transmission conductors 12 is carried out in accordance with the procedure illustrated in FIG. 41, the following effect is achieved. As in the fourth embodiment described above, if one transmission conductor 12 is selected after every predetermined time interval $\Delta T$ in each of the transmission blocks of the transmission conductor array 11, the difference in detection time between those transmission conductors 12 positioned on the boundary between adjacent transmission blocks is great. More particularly, assume that the transmission conductors $Y_1, Y_8, \ldots, Y_{57}$ are selected from within the transmission blocks $\{Y_1 \text{ to } Y_7\}, \{Y_8 \text{ to } Y_{14}\}, \ldots, \{Y_{57} \text{ to } Y_{63}\}$ and spread codes are supplied to the selected transmission conductors $Y_1, Y_8, \ldots, Y_{57}$ to detect the position of a pointer, and the transmission conductors 12 are successively switched in a direction in which, for example, the index increases after every predetermined time interval $\Delta T$ to detect the position of the pointer. Then, the detection time difference between the transmission conductors $Y_7$ ($7^{th}$ in the block $\{Y_1 \text{ to } Y_7\}$) and $Y_8$ ($1^{st}$ in the block $\{Y_8 \text{ to } Y_{14}\}$) is $6\Delta T$. In this instance, if the pointer moves in proximity to the boundary between the transmission blocks such as near the transmission conductors $Y_7$ and $Y_8$, a time difference appears between the starting timings of position detection of the pointer. Consequently, the position detection process may fail to appropriately follow the movement of the pointer. Accordingly, the detection accuracy of the pointer may decrease.

In contrast, in the present example of modification 6, since the transmission conductors 12 are switched (shifted) collectively for every transmission block 250, the difference in detection time between the transmission conductors 12 positioned on the boundary between different transmission blocks 250 is as short as $\Delta T$. As a result, even if the pointer is moving in proximity to the boundary between transmission blocks 250, the starting timing of position detection of the pointer is not placed into a waiting state. Consequently, the pointer can be detected with a high degree of accuracy.

Figure 43:
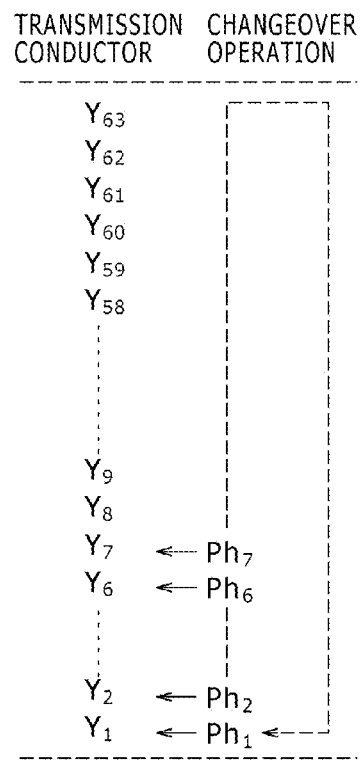
FIG. 43 is a diagrammatic view illustrating another manner of switching operation of transmission conductors by the transmission conductor selection circuit according to modification 6.

In modification 6, the switching operation of the transmission conductors 12 is not limited to the operation example described above with reference to FIG. 41. FIG. 43 illustrates another example of the switching operation of the transmission conductors 12.

Referring to FIG. 43, in the switching operation example illustrated, the transmission conductor selection circuit 252 first selects the transmission block $\{Y_1 \text{ to } Y_7\}$, as seen in FIG. 43. Then, the spread code supplying circuit 251 supplies spread codes of the phase differences $Ph_1$ to $Ph_7$ at the same time to the transmission conductors $Y_1$ to $Y_7$, which form the transmission block $\{Y_1 \text{ to } Y_7\}$.

After position detection is carried out for a predetermined period of time, the transmission conductor selection circuit 252 switches (or shifts) the transmission conductors 12 to be selected, by a one-transmission conductor distance, for example, in the direction in which the index increases. In particular, the transmission conductor selection circuit 252 switches the transmission conductors 12 from the seven transmission conductors $Y_1$ to $Y_7$, selected in the preceding operation cycle, to the transmission conductors $Y_2$ to $Y_8$. Then, the spread code supplying circuit 251 supplies spread codes of the phase differences $Ph_1$ to $Ph_7$ at the same time to the newly selected transmission conductors $Y_2$ to $Y_8$. Thereafter, the switching operation of the transmission conductors 12 described is successively repeated to carry out position detection.

While in the switching operation illustrated in FIGS. 41 and 43 the transmission conductor selection circuit 252 switches the transmission conductors 12 to be connected in the direction in which the index increases, the present invention is not limited to this implementation. The transmission conductors 12 may be switched after very predetermined interval of time in the direction in which the index decreases.

Alternatively, the transmission conductors 12 may be selected at random in accordance with a predetermined selection sequence.

[Modification 7]

Figure 44:
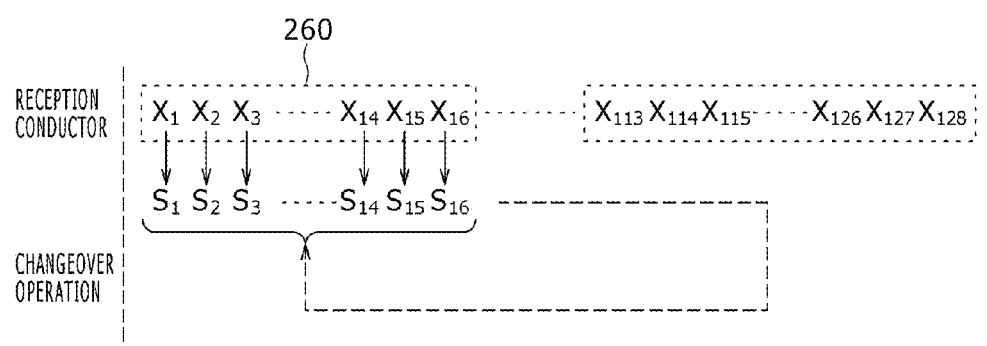
FIG. 44 is a diagrammatic view illustrating a manner of switching operation of reception conductors by a reception conductor selection circuit according to modification 7.

While in the fourth embodiment described above one reception conductor 14 is selected from each detection block of the reception conductor array 13 after every predetermined interval of time, the present invention is not limited to this implementation. For example, position detection may be carried out collectively for each detection block, and position detection may be carried out by switching from one detection block to another detection block. FIG. 44 illustrates an example of such switching operation of the reception conductor 14 according to modification 7.

The pointer detection apparatus of the present modification 7 is similar in operation and configuration to that of the fourth embodiment described above with reference to FIG. 30 except the switching operation of the reception conductors 14 and the configuration of the reception conductor selection circuit.

In the present example, one detection block 260 is formed from 16 reception conductors 14 positioned adjacent to each other. First, the reception conductor selection circuit selects a predetermined detection block 260, for example, a detection block $\{X_1$ to $X_{16}\}$, as seen in FIG. 44. Then, the signal detection circuit uses all reception conductors 14 in the selected detection block $\{X_1$ to $X_{16}\}$ to carry out position detection of a pointer simultaneously. Then, position detection is carried out for a predetermined period of time.

After a predetermined interval of time, the reception conductor selection circuit switches from the detection block 260 to the next detection block $\{X_{17}$ to $X_{32}\}$. Then, the signal detection circuit uses all reception conductors 14 in the newly selected detection block 260 $\{X_{17}$ to $X_{32}\}$ to carry out position detection of the pointer at the same time. Thereafter, the switching operation described above is carried out repetitively after every predetermined interval of time. If the position detection with regard to the detection block $\{X_{113}$ to $X_{128}\}$ is completed, the detection block 260 is returned to the detection block $\{X_1$ to $X_{16}\}$ to carry out position detection.

Figure 45:
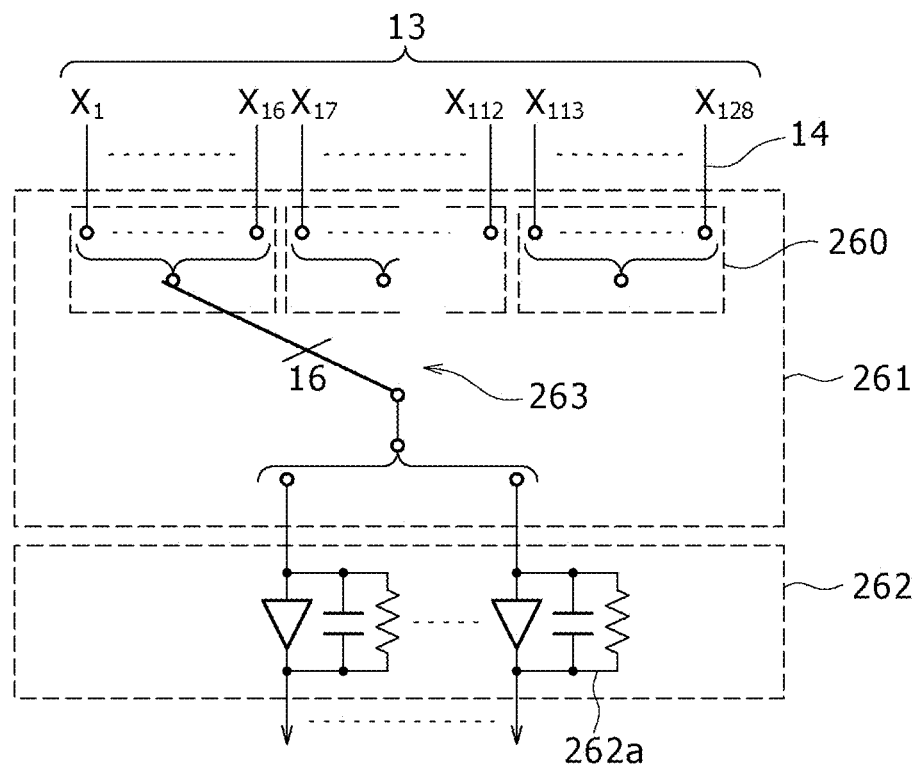
FIG. 45 is a circuit diagram showing a general configuration of a reception conductor selection circuit according to modification 7.

FIG. 45 shows an example of a configuration of the reception conductor selection circuit for implementing the switching operation of the detection block 260 described above. Referring to FIG. 45, the reception conductor selection circuit 261 includes 16 reception conductors 14 in each detection block 260 and a switch 263 for selectively connecting the reception conductors 14 to the input terminals of corresponding I/V conversion circuits 262a in a signal detection circuit 262. The switching operation of the switch 263 is controlled by the control circuit 50.

In the present example, because the reception conductors 14 are switched per every detection block 260, the number of I/V conversion circuits 262a in the signal detection circuit 262 is equal to the number of reception conductors 14 in each detection block 260. In particular, where one detection block 260 is formed from 16 reception conductors 14 as in the present example, the number of I/V conversion circuits 262a in the signal detection circuit 262 is 16. Each I/V conversion circuit 262a includes, for example, an amplifier, a capacitor, and a resistor connected in parallel similarly as in the first embodiment.

Where the reception conductor selection circuit 261 is configured as described above and the switching operation of the reception conductors 14 is carried out in a procedure described above with reference to FIG. 44, the difference in detection time between those reception conductors 14, which are positioned on the boundary between adjacent ones of the detection blocks 260, is short, similar to modification 6. As a result, in the present example, even if the pointer is moving in proximity to the boundary between detection blocks, the starting timing of position detection of the pointer is not likely to be placed into a waiting state. Consequently, the pointer can be detected with a high degree of accuracy.

[Modification 8]

While in the first embodiment described above the reception conductors 14 and the transmission conductors 12 are formed with the spacer 16 interposed therebetween on one of the surfaces of the first glass substrate 15 as described above, the present invention is not limited to this configuration. The reception conductors and the transmission conductors may be formed on the opposite surfaces of one glass substrate. An example of this configuration is shown as modification 8 in FIG. 46.

Figure 46:
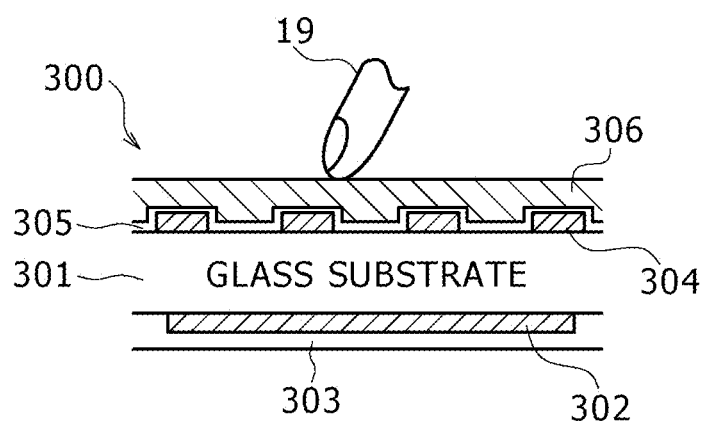
FIG. 46 is a schematic sectional view of a sensor section according to modification 8.

FIG. 46 schematically shows a cross section of the sensor section of the configuration just described. Referring to FIG. 46, the sensor section 300 includes a glass substrate 301, a plurality of reception conductors 304 formed on one of the opposite surfaces of the glass substrate 301, to which a pointer 19 points, as seen in FIG. 46, and a plurality of transmission conductors 302 formed on the other surface of the glass substrate 301, i.e., on the lower side face in FIG. 46. The transmission conductors 302 are protected by a first protective layer 303. Meanwhile, the reception conductors 304 are protected by a second protective layer 305, and a protective sheet 306 is provided on the second protective layer 305. The protective sheet 306 protects the reception conductors 304 against potential damage by the pointer 19.

In the present example, the glass substrate 301, transmission conductors 302, and reception conductors 304 are formed from materials similar to those used in the first embodiment described above. The glass substrate 301 may be replaced by a sheet-like or film-like substrate formed from a synthetic resin material as in the first embodiment. Further, the first protective layer 303 and the second protective layer 305 can be formed, for example, from a $SiO_2$ film or a synthetic resin film, and the protective sheet 306 may be formed using a sheet member made of a synthetic resin material.

Since the sensor section 300 of the present example can reduce the number of glass substrates in comparison with the sensor section 10 of the first embodiment described above with reference to FIG. 2, the thickness of the sensor section 300 can be further reduced. Further, since the number of glass substrates can be reduced in the sensor section 300, a sensor section will have a lower cost.

[Modification 9]

Figure 47A:
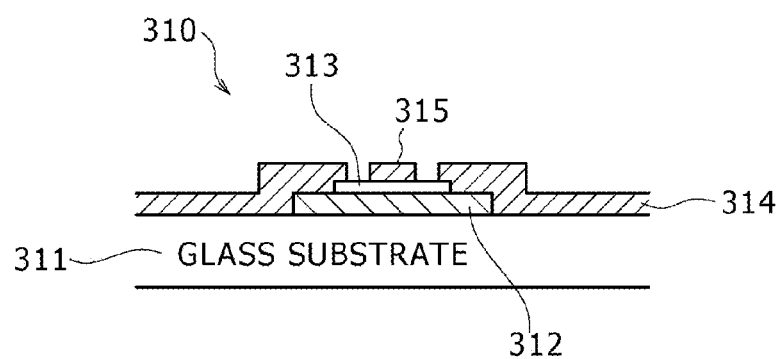
FIGS. 47A and 47B are a schematic sectional view and a perspective view, respectively, of a sensor section according to modification 9.

Modification 9 is a modification to the sensor section different from that of modification 8. In modification 9, the sensor section is configured such that the transmission conductors and the reception conductors are formed on one of the surfaces, for example, of a glass substrate. FIG. 47A shows a general cross section of the sensor section of the configuration just described.

Referring to FIG. 47A, the sensor section 310 of the present example has a structure where transmission conductors 314 and reception conductors 315 cross each other on one surface of a glass substrate 311. At locations at which transmission conductors 314 and reception conductors 315 cross each other, an insulating member for electrically isolating them from each other is interposed between them. As an example, a metal layer 312 as a jumper member is formed in a predetermined pattern on one surface of the glass substrate 311. The reception conductors 315 having a predetermined conductor pattern are formed on the metal layer 312 with an insulating layer 313 interposed therebetween. Although the transmission conductors 314 are disposed so as to cross the reception conductors 315, the transmission conductors 314 are formed in a conductor pattern having land shapes, for example, which are separated by the reception conductors 315 at locations where the two conductors 314, 315 cross each other. The transmission conductors 314, which are thus separated from each other, are electrically connected to each other by the metal layer 312.

In the example described above the insulating layer 313 is disposed between one surface of the metal layer (jumper member) 312 and the reception conductors 315. A different structure may be used, where the reception conductors 315 are formed on one surface of the glass substrate 311 and the insulating layer 313 is formed so as to cover the reception conductors 315. Then, the transmission conductors 314 separated by the reception conductors 315 may be electrically connected to each other through the metal layer 312 as a jumper member, which is arranged over the insulating layer 313. Further, the transmission conductors 314 and the reception conductors 315 can be interchangeable in terms of the relationship between transmission and reception. In the present example, the transmission conductors 314, reception conductors 315 and so forth are disposed on one surface of the glass substrate 311 toward which a pointer is to be pointed. A different configuration is possible where the transmission conductors 314, reception conductors 315 and so forth are disposed on the other face of the glass substrate 311 opposite to the face toward which the pointer is to be pointed.

In the present example, the reception conductors 315 are formed in a shape of a linear conductor similarly as in the first embodiment described above. Meanwhile, the land-shaped transmission conductors 314 are electrically connected to exposed portions of the metal layer 312 (jumper member) which are not covered with the insulating layer 313. The transmission conductors 314 having the land shape and electrically connected by the metal layer 312 are wired three-dimensionally such that they are electrically isolated from the reception conductors 315 through the insulating layer 313.

Further, in the present example, the glass substrate 311, transmission conductors 314 and reception conductors 315 are formed from materials similar to those which are used in the first embodiment described above. The glass substrate 311 may be replaced with a sheet-like or film-like substrate formed from a synthetic resin material as in the first embodiment.

The metal sections 312 can be formed from a metal material having a high conductivity, for example, Mo (molybdenum) or Al (aluminum). Since the contact area between the metal sections 312 and the transmission conductors 314 is very small, in order to reduce the resistance at the connecting portions, it is preferable to use a metal material having a high conductivity for the metal sections 312. Further, the insulating layer 313 may be formed, for example, from resist.

In the sensor section 310 of the present example, because the number of glass substrates can be reduced in comparison with the sensor section 10 of the first embodiment described above with reference to FIG. 2, the thickness of the sensor section 310 can be further reduced. Furthermore, the sensor section 310 of the present example may prove less costly because the number of glass substrates can be reduced and the transmission conductors 314 and the reception conductors 315 can be formed substantially in one layer.

Further, using the sensor section 310 of the present example, the following advantage can be achieved in comparison with the sensor section 300 of modification 8. Where the transmission conductors 314, reception conductors 315, and so forth are disposed on the surface opposite the surface of the glass substrate 311 toward which the pointer 19 is to move, since the glass substrate 311 is interposed between the pointer and the conductors, the distance between the pointer and the conductors increases in comparison with that of the sensor section 300 of modification 8. Consequently, the influence of noise from the pointer may be reduced.

[Modification 10]

While in the first to fourth embodiments the transmission conductors and the reception conductors can be formed from conductors extending in predetermined directions, modification 10 presents an example of a configuration which is more particular in regard to the shape of the transmission conductors.

Figure 48:
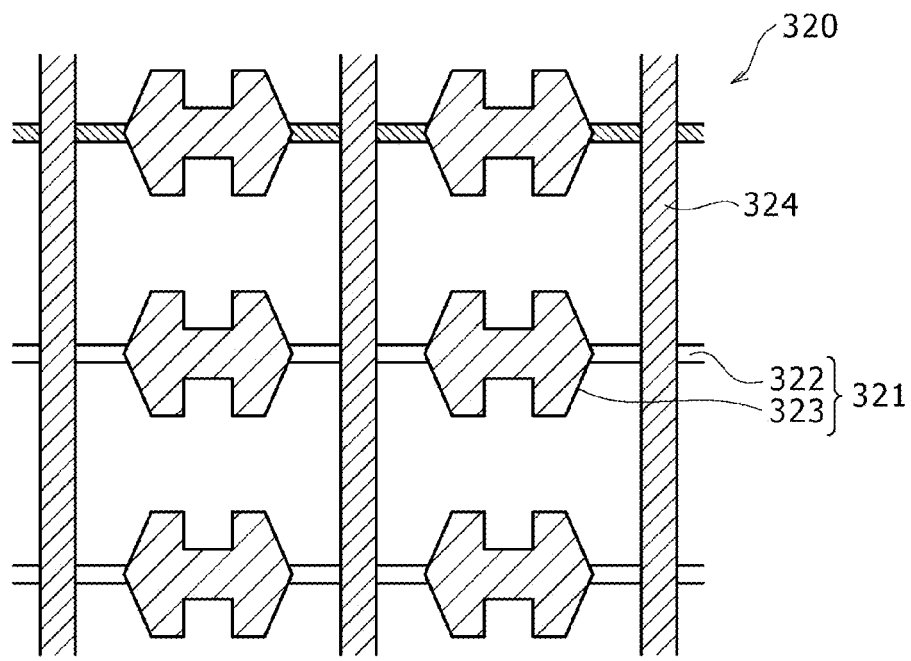
FIG. 48 is a schematic view showing a shape of transmission conductors according to modification 10.

FIG. 48 shows a general configuration of the transmission conductors and the reception conductors in the sensor section 320. Referring to FIG. 48, the reception conductors 324 are formed from a conductor of a linear shape. The transmission conductors 321 are disposed in a direction crossing the direction in which the reception conductors 324 are disposed. Each of the transmission conductors 321 is configured such that a conductor portion 322 of a linear shape, which crosses the reception conductors 324, and a land conductor portion 323 of a greater width are electrically connected to each other. An insulating layer is interposed between the reception conductors 324 and the linear conductor portions 322 in order to electrically isolate the reception conductors 324 and the conductor portions 322 from each other.

While in the example in FIG. 48 the extending direction of the reception conductors 324 and the extending direction of the transmission conductors 321 cross each other, the present invention is not limited to this configuration. The extending directions of the conductors need not necessarily cross each other perpendicularly. It is only necessary for the extending direction of the transmission conductors 321 and the extending direction of the reception conductors 324 to cross each other such that cross points for position detection are produced.

A central portion of the land conductor portion 323, which forms the transmission conductor 321, is formed in a concaved shape along the extending direction of the reception conductors 324. In other words, the land conductor portion 323 has a substantially H-like shape. Further, an end edge portion of the land conductor portion 323 adjacent to the linear conductor portion 322 has a convex shape such that the width thereof continuously decreases toward the linear conductor portion 322.

When the land conductor portion 323 of the transmission conductor 321 is formed so as to have a substantially H-like shape, the following advantage can be achieved.

In particular, while the embodiments and the modifications described above are directed to a pointer detection apparatus of the electrostatic coupling system, the present invention can be applied also to a pointer detection apparatus which employs the electrostatic coupling system and the electromagnetic induction system in combination. In this instance, in the electromagnetic induction system, electromagnetic waves are transferred between a pointer and the pointer detection apparatus to detect the position of the pointer. Therefore, if the land conductor portion on the sensor section is shaped such that the width thereof is substantially uniform and relatively large, when transfer of electromagnetic waves is carried out through the sensor section, eddy current is generated in the land conductor section, which has a negative influence on the position detection by the electromagnetic induction system. In contrast, when the land conductor portion 323 is formed in a substantially H-like shape having a concave shape near the central portion as in the present example, even when the electromagnetic induction system is additionally used for position detection, generation of eddy current in the land conductor portion 323 can be suppressed. Consequently, a problem described above will be reduced.

Application of the configuration of the present example is not limited to the sensor section of a pointer detection apparatus of the cross point electrostatic coupling system. It can be applied also to a sensor section of a pointer detection apparatus of the projected capacitive type electrostatic coupling system, which includes a conductor pattern similar to that of the cross point electrostatic coupling system. That is, a conductor pattern including a plurality of first conductors disposed in a first direction and a plurality of second conductors disposed in a direction crossing the first direction in the projected capacitive type electrostatic coupling system. In the projected capacitive type electrostatic coupling system, however, a pointed position corresponding to a cross point is not determined according to the cross point electrostatic coupling technology. Instead, those conductors disposed in different directions which correspond to a pointed position are specified based on detection signals obtained from the conductors.

Further, in the example described above, the transmission conductors have a conductor portion of a linear shape and a land conductor portion of a substantially H-like shape having a concave portion at a central portion of the land thereof. The reception conductors may also be formed in a conductor pattern having such shape.

Figure 47B:
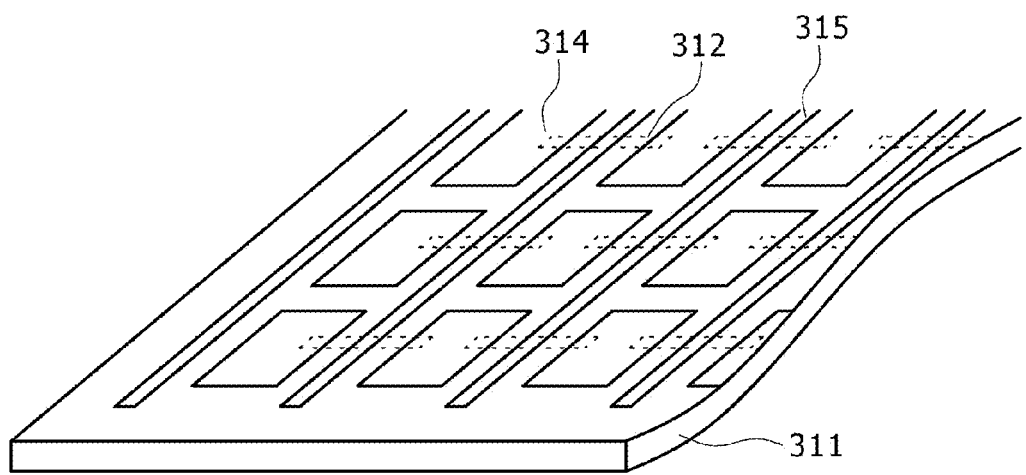

The configuration of the transmission conductors 321 and the reception conductors 324 in the present example can be applied also to the sensor section according to the first embodiment described above with reference to FIG. 2, modification 8 described above with reference to FIG. 46, and modification 9 described above with reference to FIG. 47. Further, where the pointer detection apparatus is formed integrally with a display apparatus such as a liquid crystal panel, in order to suppress the influence from the liquid crystal panel, the reception conductors 324 are preferably disposed in a direction crossing the pixel scanning direction of the liquid crystal panel so that they do not receive a signal arising from the pixel scanning of the liquid crystal panel.

[Modification 11]

Figure 49:
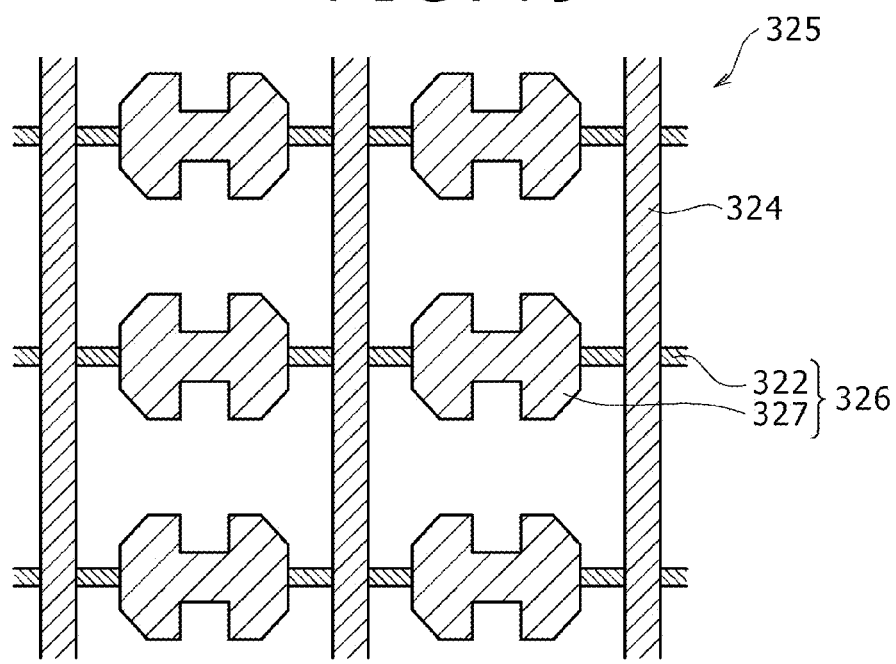
FIG. 49 is a schematic view showing a shape of transmission conductors according to modification 11.

The shape of the land conductor portion of the transmission conductors is not limited to that of the example described above with reference to FIG. 48. FIG. 49 shows another example of the shape of the land conductor portion as modification 11. In FIG. 49, elements like those in the example shown in FIG. 48 are denoted by like reference characters.

Referring to FIG. 49, as apparent from the comparison of the sensor section 325 of the present example with the sensor section 320 of modification 10, the shape of the land conductor portion 327 of a transmission conductor 326 is altered. The configuration of the other part of the sensor section 325 is similar to that of the sensor section 320 of modification 10. Therefore, in the present example, only the configuration of the land conductor portion 327 will be described.

In this example, the land conductor portion 327 of the transmission conductor 326 has a substantially H-like shape with a recessed portion at a central portion thereof as in modification 10. However, the end edge portion of the land conductor portion 323 of modification 10 adjacent to the linear-shaped conductor portion 322 has a sharp (acute) angle. In the present example, on the other hand, the end edge portion of the land conductor portion 327 adjacent to the linear conductor portion 322 is formed flat or is rather rounded so as to assure a better contact of the peripheral edge portion with the linear conductor portion 322.

Where the end edge portion of the land conductor portion 327 adjacent to the linear conductor portion 322 is flattened or rather rounded, current concentration is less likely to occur with respect to the linear conductor portion 322. With this structure, a wide flow path for current can be assured at the end edge portion of the land conductor portion 327 adjacent to the linear conductor portion 322 in comparison with modification 10, where the end edge portion of the land conductor portion 323 adjacent to the linear conductor portion 322 has a sharp angle portion. Therefore, concentration of current upon the joining portion between the land conductor portion 327 and the linear conductor portion 322 is moderated. In other words, increase of the resistance value at the joining portion between the land conductor portion 327 and the linear conductor portion 322 can be suppressed, and the electric conductivity characteristic can be improved in comparison with modification 10.

The configuration of the present example is not limited to the sensor section of a pointer detection apparatus of the cross point electrostatic coupling system, but can be applied also to the sensor section of a pointer detection apparatus of the projected capacitive type electrostatic coupling system or the like. Further, while the transmission conductors are formed from a linear conductor portion and a substantially H-shaped land conductor portion with a concave portion at a central portion thereof, the reception conductors may have a configuration similar to that of the transmission conductors.

Furthermore, the configuration of the transmission conductors 326 and the reception conductors 324 in the present example can be applied also to the sensor section according to the first embodiment described above with reference to FIG. 2, modification 8 described above with reference to FIG. 46 and modification 9 described above with reference to FIG. 47. Where the pointer detection apparatus is formed integrally with a display apparatus such as a liquid crystal panel, in order to suppress the influence from the liquid crystal panel, the reception conductors 324 are preferably disposed in a direction crossing the scanning direction of the liquid crystal panel as described above.

[Modification 12]

A pointer detection apparatus using the cross point electrostatic coupling system has a plurality of reception conductors crossing a plurality of transmission conductors, to thereby include a region where a conductor pattern exists, and another region wherein no conductor pattern exists, if the sensor section is viewed from the operating surface of the pointer detection apparatus (that is, from above the surface of the pointer detection apparatus). Although the conductors are formed from a transparent electrode film such as an ITO film, the transmission factor in the region in which the conductor pattern exists is lower than that in the region in which no conductor pattern exists. As a result, the transmission through the sensor section appears uneven. The user may feel uneasy with the unevenness of the transmission factor. Therefore, modification 12 is configured so as to eliminate unevenness of the transmission factor of the sensor section.

Figure 50:
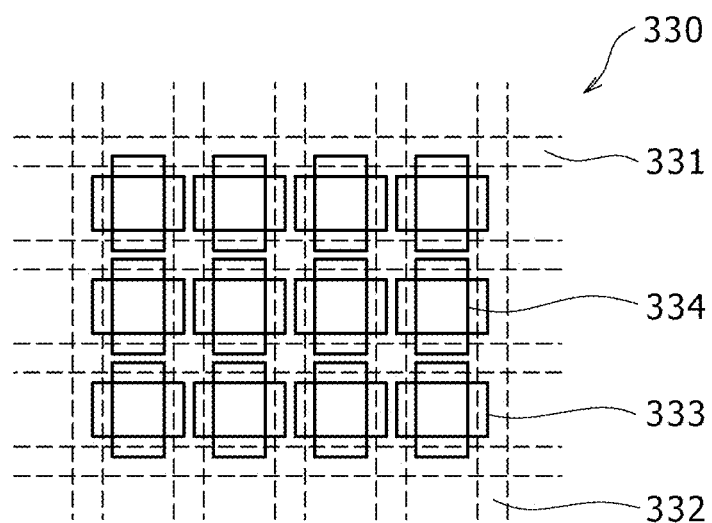
FIG. 50 is a schematic view of a sensor section according to modification 12.

FIG. 50 shows a general configuration of the sensor section of modification 12. The configuration of the present modification 12 is applied to the sensor section 300 of modification 8 described above with reference to FIG. 46. Referring to FIG. 50, in the sensor section 330 of modification 12, in a region in which none of transmission conductors 331 and reception conductors 332 exists, first transparent electrode films 333 and second transparent electrode films 334 made of the same material as that of the conductors are provided. The other part of the sensor section 330 has the same configuration as that of the sensor section 300 of modification 8 described above with reference to FIG. 46.

Figure 51A:
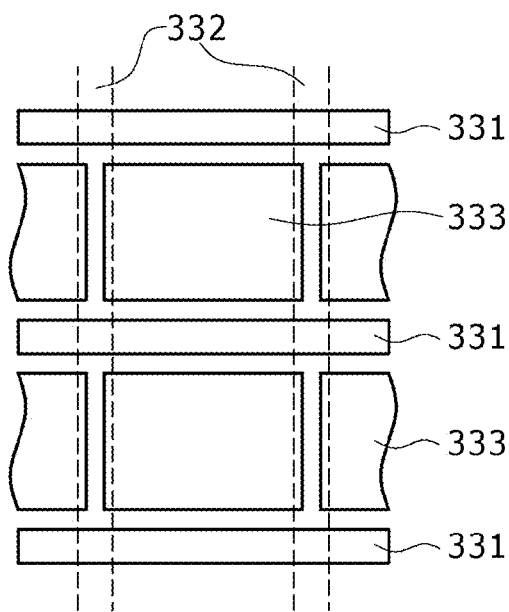
FIG. 51A is a schematic view showing disposition of a transparent electrode film on the transmission conductor side in the sensor section shown in FIG. 50.

FIG. 51A shows a configuration of a transmission conductor 331 and a first transparent electrode film 333 formed on one surface, that is, on the lower surface, of a glass substrate of the sensor section 330. In the present example, the first transparent electrode film 333 of a rectangular shape is disposed on the surface of a glass substrate, on which the transmission conductor 331 is provided, between two transmission conductors 331 disposed in proximity to each other. The first transparent electrode film 333 has a dimension slightly smaller than the distance between the transmission conductors such that it does not contact either of the transmission conductors 331. Meanwhile, the dimension of the first transparent electrode film 333 in the lengthwise dimension of the transmission conductors 331 is slightly smaller than the sum of the distance between the reception conductors 332 disposed in proximity to each other and the conductor width of one reception conductor 332. The first transparent electrode film 333 is disposed between the two reception conductors 332 positioned in proximity to each other in a positional relationship such that lateral edges of the film 333 cover approximately ½ the conductor width of the reception conductors 332, respectively.

Figure 51B:
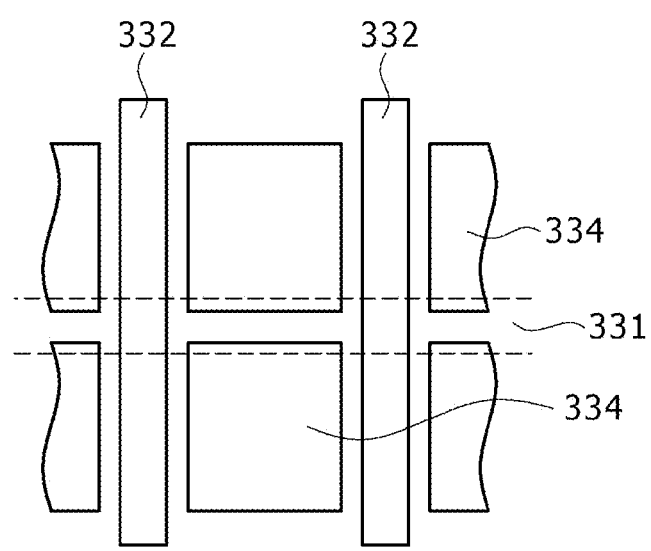
FIG. 51B is a schematic view showing disposition of a transparent electrode film on the reception conductor side in the sensor section shown in FIG. 50.

FIG. 51B shows a configuration of a reception conductor 332 and a second transparent electrode film 334 formed on the other surface, that is, on the upper surface, of the glass substrate of the sensor section 330. In the present example, the second transparent electrode film 334 is disposed on the surface of the glass substrate on which the reception conductor 332 is disposed. Regarding the dimension of the second transparent electrode film 334, an approach similar to that used where the dimension of the first transparent electrode film 333 is defined can be applied. In particular, the second transparent electrode film 334 has a slightly smaller dimension than the dimension between the reception conductors 332 so that it does not contact the reception conductors 332, and is spaced away from the reception conductors 332 with some air gap left therebetween. Meanwhile, the dimension of the second transparent electrode film 334 in the lengthwise dimension of the reception conductor 332 is set such that the second transparent electrode film 334 partly covers a portion of the transmission conductor 331 disposed in proximity to each other. The first transparent electrode film 333 and the second transparent electrode film 334 should be disposed such that, when the sensor section 330 is viewed from the surface side of the sensor section 330 on which a pointer is to be operated, that is, from the upper surface side, the overlapping relationship of the transmission conductor 331, reception conductor 332, first transparent electrode film 333 and second transparent electrode film 334 is made as uniform as possible while the electric isolation from each other is maintained. Thus, unevenness of the transmission factor can be suppressed over the entire sensor section 330 and a uniform optical characteristic can be maintained.

When the conductors and the transparent electrode films formed on the surfaces of the glass substrate of the sensor section 330 are disposed as seen in FIGS. 51A and 51B, and when the sensor section 330 is viewed from above, the first transparent electrode films 333 and the second transparent electrode films 334 made of a material same as that of the conductors are formed in a region in which the conductor pattern does not exist, as seen in FIG. 50. As a result, unevenness of the transmission factor on the sensor section 330 is suppressed.

The shape of the first transparent electrode film 333 and the second transparent electrode film 334 for suppressing unevenness of the transmission factor is not limited to a rectangle. It is only necessary for the overlapping relationship between the conductor pattern formed from the transparent electrodes and the first transparent electrode films 333 and second transparent electrode films 334 (when the sensor section 330 is viewed from above) to be optically uniform. The shape of the first transparent electrode films 333 and the second transparent electrode films 334 is suitably set in relation to the shape of the conductor pattern formed from the transparent electrode films. While in the present example a plurality of transparent electrode films of a rectangular shape are disposed in a spaced relationship from each other by a predetermined distance and extend along the transmission conductors or the reception conductors, the plural transparent electrode films may otherwise be formed as a single electrode film.

The configuration of the present example can be applied to the sensor sections of the first embodiment described above with reference to FIG. 2 and modifications 9 to 11 described above with reference to FIGS. 47 to 49. Further, a glass substrate on which a transparent electrode film for prevention of transmission factor unevenness is formed in a predetermined region may be prepared separately, and added to the sensor section. The configuration of the present example can be applied also where a film-like substrate is used in place of the glass substrate.

[Modification 13]

While in the first to fourth embodiments both of the transmission conductors and the reception conductors are formed from a linear conductor, the present invention is not limited to this configuration. For example, at least the transmission conductors or the reception conductors may be formed from curved or concentric conductors. An example is shown as modification 13 in FIG. 52.

Figure 52:
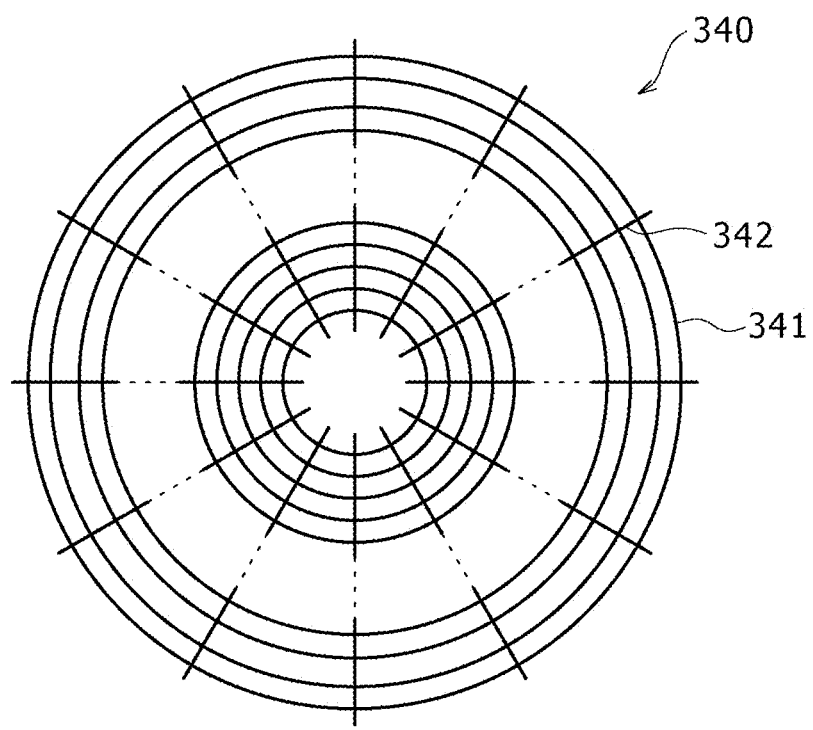
FIG. 52 is a schematic view of a sensor section according to modification 13.

FIG. 52 shows an arrangement pattern of transmission conductors 341 and reception conductors 342 of a sensor section 340 according to modification 13. In the present modification 13, the transmission conductor array includes a plurality of concentric transmission conductors 341 having different diameters. The concentric transmission conductors 341 are disposed such that the distances between adjacent ones of the transmission conductors 341 in a radius direction are equal. However, the present invention is not limited to this configuration, and the distances between the transmission conductors 341 need not be equal.

The reception conductor array includes a plurality of linear reception conductors 342 formed so as to extend radially from the center of the transmission conductor array. The reception conductors 342 are disposed in an equidistantly spaced relationship from each other in a circumferential direction. The present invention is not limited to this configuration and the distances between the reception conductors 342 need not be equal. In the configuration described, the extending directions of the transmission conductors 341 and the reception conductors 342 cross each other to form cross points for position detection.

The sensor section 340 described above with reference to FIG. 52 is suitable, for example, where the position detection region of the sensor section 340 has a circular shape.

Further, in the present invention, at least the transmission conductors or the reception conductors may be formed with a zigzag-shaped conductor which serpentines with respect to the extending direction.

[Modification 14]

While in the first to fourth embodiments described above, a one-input one-output amplifier may be used for the amplifier 31*b* in the signal detection circuit 31 as described, for example, with reference to FIG. 4, the present invention is not limited to this configuration. For example, a differential amplifier may be used for the amplifier. An example is illustrated as modification 14 in FIG. 53.

Figure 53:
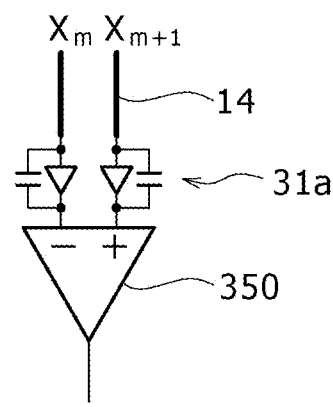
FIG. 53 is a circuit diagram illustrating a detection state of a signal by a reception section according to modification 14.

FIG. 53 shows a general configuration of the amplifier of the example mentioned. Referring to FIG. 53, the amplifier 350 of the present example is a two-input one-output differential amplifier. One reception conductor 14 is connected to each of the input terminals of the amplifier 350, and a pair of reception conductors 14 disposed adjacent to each other in the sensor section are successively selected. In FIG. 53, signals from selected reception conductors ($X_m$ and $X_{m+1}$) are input to the input terminals of the amplifier 350 after each of them is converted from a current signal into a voltage signal by an UV conversion circuit 31a. However, a description of all embodiments and modifications which use a differential amplifier is given without mentioning the presence of the UV conversion circuit 31a in order to avoid unnecessary complexity in the drawings.

Where the differential amplifier 350 is used on the reception side, noise superposed on the reception conductors 14 can be eliminated through the differential amplification by the differential amplifier 350, and consequently, the noise resisting property will be improved.

[Modification 15]

While in modification 14 the number of reception conductors 14 to be connected to a differential amplifier is two, the number of reception conductors 14 to be connected to a differential amplifier may be further increased. An example is shown as modification 15 in FIG. 54.

Figure 54:
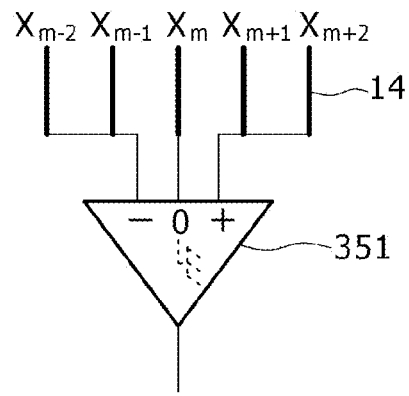
FIG. 54 is a circuit diagram illustrating a detection state of a signal by a reception section according to modification 15.

FIG. 54 illustrates a general configuration of the differential amplifier according to the present example. In the differential amplifier 351 in the present modification 15, the number of reception conductors 14 substantially connected to the differential amplifier 351 is five. Five reception conductors 14 positioned adjacent to each other are used as the reception conductors 14 to be connected to the differential amplifier 351. In FIG. 54, those five reception conductors 14 which are connected to the differential amplifier 351 are represented as reception conductors $X_{m-2}$ to $X_{m+2}$.

The reception conductors $X_{m-2}$ and $X_{m-1}$ are connected to input terminals of the differential amplifier 351 which have the polarity of "−," that is, to negated input terminals, of the differential amplifier 351, and the reception conductors $X_{m+2}$ and $X_{m+1}$ are connected to input terminals of the differential amplifier 351 which have the polarity of "+," that is, to non-negated input terminals, of the differential amplifier 351. Meanwhile, the centrally disposed reception conductor $X_m$ is connected to the input terminal of the differential amplifier 351 set to a predetermined reference voltage level, such as the ground level or a supply voltage level (Vcc), in the inside of the differential amplifier 351. Where the differential amplifier 351 is of the single power supply type, the voltage level of the reception conductor $X_m$ is set to the predetermined reference voltage level, but where the differential amplifier 351 is of the double power supply type including a positive voltage and a negative voltage, the voltage level of the reception conductor $X_m$ is usually set to zero, that is, to the ground level. Where a differential amplifier having a plurality of input terminals is used, one of which is set to the ground level or a predetermined reference voltage as described above, selection of the input terminals of the differential amplifier achieves the function of connecting those reception conductors that are not selected for reception to the ground or to a predetermined reference voltage, which would be otherwise implemented by the reception conductor selection circuit.

Where a plurality of reception conductors are used simultaneously in this manner, since the differential signal output from the differential amplifier 351 increases, the detection sensitivity can be improved. Further, the detection region of a pointer can be expanded. Since the differential amplifier 351 is used, the noise resisting property can be improved similarly to modification 14.

The reason why the centrally disposed central reception conductor $X_m$ to be connected to the differential amplifier 351 in the present modification 15 is set to the predetermined reference voltage level is as follows. As described above in connection with the first embodiment, in the cross point electrostatic coupling system, current at a cross point at which a pointer is positioned is shunted to the ground, for example, through the pointer, and the variation of the current at the cross point, such as decrease of current to flow into the cross point, is detected. If the pointer is not grounded sufficiently, the shunting of current at the cross point becomes insufficient. In this instance, the current variation at the cross point becomes small, and the sensitivity in position detection drops.

However, if the reception conductor $X_m$ disposed centrally among a plurality of reception conductors 14 connected to the differential amplifier 351 is set to a reference voltage level (for example, a predetermined reference voltage or the ground voltage as in the present modification 15), even if the pointer is not grounded sufficiently and placed on the reception conductor $X_m$, a part of current can be shunted through the pointer and the reception conductor $X_m$. As a result, the drop of the sensitivity described above can be prevented.

[Modification 16]

While in the first to third embodiments described above the chip length of spread codes to be supplied to the transmission conductor array 11 is "63" and spread codes having phases displaced by one chip from each other are individually supplied to the transmission conductors 12, the present invention is not limited to this implementation. For example, spread codes having the same phase difference may be supplied to a plurality of transmission conductors 12.

In modification 16 described below, spread codes having the same phase difference are supplied to two transmission conductors 12 positioned adjacent to each other. In the example described, the number of transmission conductors 12 is 64 including two transmission conductors for supplying a compensation signal, as in the first embodiment.

In the present example, since spread codes of the same phase difference are supplied to two transmission conductors 12 paired with each other, the number of phase differences of spread codes to be supplied to the transmission conductor array 11 may be 31 including the original (same) phase. Therefore, in the present example, spread codes whose chip length is at least "31" can be used. Since 64 transmission conductors 12 include 62 transmission conductors 12 for supplying spread codes, a compensation signal is supplied to the remaining two transmission conductors 12.

Figure 55:
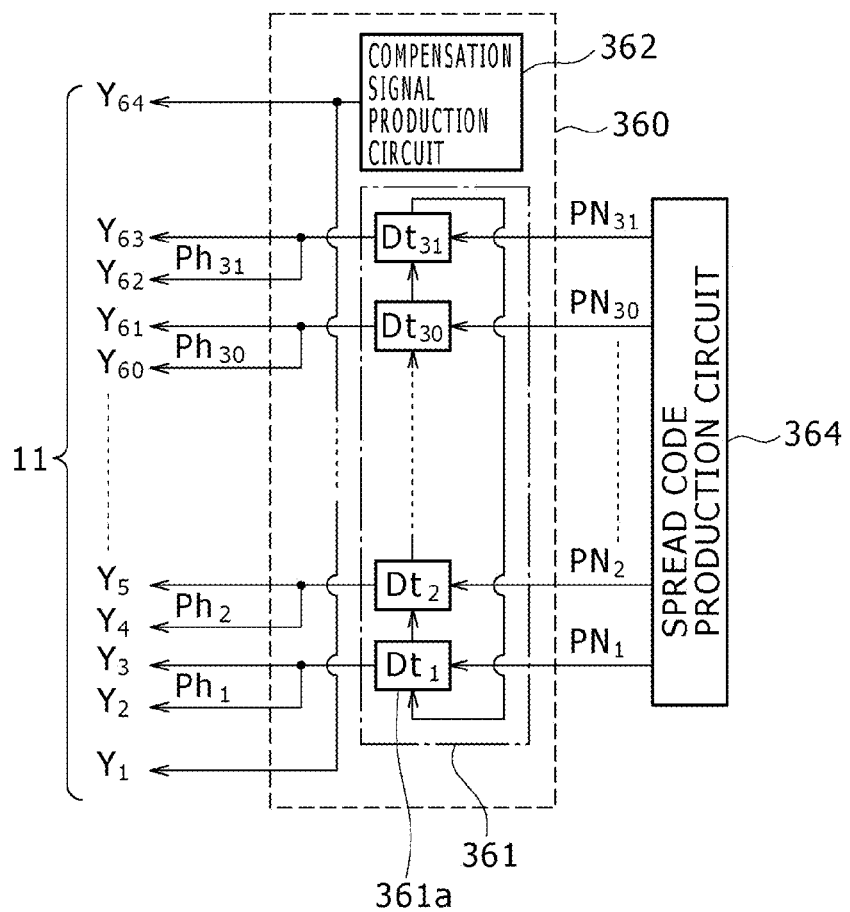
FIG. 55 is a block diagram showing a general configuration of a spread code supplying circuit according to modification 16.

FIG. 55 shows a general configuration of a spread code supplying circuit of a pointer detection apparatus for implementing the supplying form of spread codes described above. In the example of FIG. 55, a compensation signal is supplied to the transmission conductors $Y_1$ and $Y_{63}$ positioned at the opposite ends of the transmission conductor array 11 while spread codes having different phases from each other are supplied to the remaining transmission conductors $Y_2$ to $Y_{63}$. A combination of two transmission conductors 12 paired with each other is represented as transmission conductors [$Y_k$, $Y_{k+1}$] (k=2 to 62).

Referring to FIG. 55, the spread code supplying circuit 360 in the present example includes a shift register 361 and a compensation signal production circuit 362. The spread code production circuit 364 produces a spread code of a chip length of "31" and outputs codes of a one-chip length, which form the spread code, in parallel to the shift register 361.

The shift register 361 is of the parallel input/output type and includes the number of flip-flops 361a equal to the chip length of the spread code produced by the spread code production circuit 364, that is, 31 flip-flops 361a, which are connected at multi stages. The flip-flops $Dt_1$ to $Dt_{31}$ are connected at an input terminal thereof to output terminals of the spread code production circuit 364 from which the codes forming the spread code, that is, the first chip code $PN_1$ to 31st chip code $PN_{31}$ are output, respectively. Meanwhile, the flip-flop $Dt_L$ (L: integers of 1 to 31) is connected at an output terminal thereof to a set of transmission conductors $[Y_{2L}, Y_{2L+1}]$.

The flip-flops 361a simultaneously retain codes of a one-chip length output in parallel from the spread code production circuit 364 and individually shift the retained one-chip length signals or codes to the flip-flops 361a at the succeeding stage after every one-chip period. Thereupon, each of the flip-flops 361a outputs the retained signal to a corresponding set of transmission conductors $[Y_k, Y_{k+1}]$. Further, an output signal of the flip-flop $Dt_{31}$ at the last stage which forms the shift register 361 is cyclically supplied to the flip-flop $Dt_1$.

Where the spread code supplying circuit 360 is configured in such a manner as described above, spread codes of the phase differences $Ph_1$ (the same/original phase), . . . , $Ph_L$, . . . , $Ph_{31}$ (phase difference of a 30-chip length) are output from the flip-flops $Dt_1$, . . . , $Dt_L$, . . . , $Dt_{31}$, respectively. Then, the spread codes of the phase differences $Ph_1$ (the same phase), . . . , $Ph_L$, . . . , $Ph_{31}$ are output to the transmission conductors $[Y_2, Y_3]$, . . . , $[Y_{2L}, Y_{2L+1}]$, . . . $[Y_{62}, Y_{63}]$, respectively.

Figures 56, 57A, 57B:
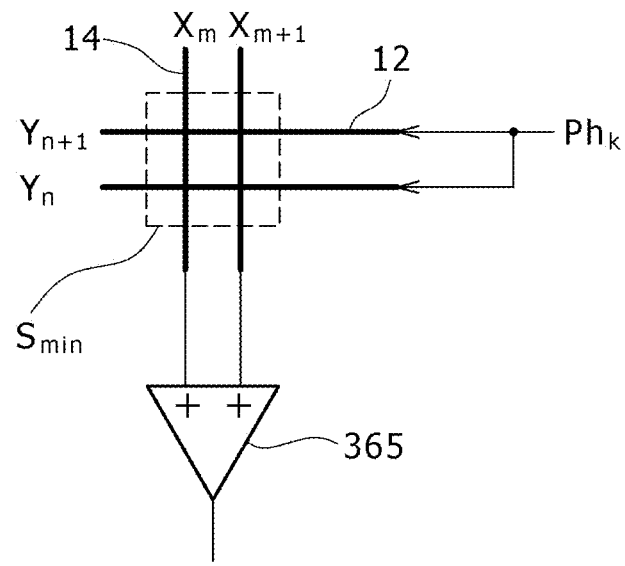
FIG. 56 is a diagrammatic view illustrating a relationship between a supplying form of a spread code (i.e., a form or sequence in which spread codes are supplied) by a transmission section and a detection form of a signal (i.e., a form or sequence in which detection signals are received) by a reception section according to modification 16.
FIGS. 57A and 57B are diagrammatic views illustrating a manner of switching operation of transmission conductors according to modification 16.

The correlation value calculation circuit of the reception section of the pointer detection apparatus of the present example should be configured such that it can calculate the correlation value between the detection signal of a 31-chip length and the spread code of a 31-chip length output from the spread code production circuit 364. In particular, the number of flip-flops which form each shift register in the correlation circuit should be 31 and also the number of integrators in the correlator should be 31 (refer to FIGS. 6 and 7).

Where spread codes of the same phase difference are supplied in a set to a plurality of transmission conductors 12 as in the present example, the output signal detected has an increased level, and therefore, the detection accuracy can be improved. Further, where spread codes of the same phase difference are supplied to a plurality of transmission conductors 12 as in the present example, since the chip-length of the spread codes can be reduced, the detection time can be further reduced. Furthermore, since the chip length of spread codes in the present example can be reduced, the number of flip-flops which form each shift register in the correlation circuit and the number of integrators in the correlator can be reduced as described above. Consequently, the configuration of the reception section can be further simplified.

Where spread codes of the same phase difference are supplied to every pair of two transmission conductors 12 as in the present example, the amplifier used in the signal detection circuit of the reception section is preferably configured so as to detect output current from both of the two transmission conductors 12 in a pair. An example of this configuration is shown in FIG. 56.

A concept of a relationship between a supplying form of spread signals (i.e., a form or sequence in which spread codes are supplied) and a detection form of detection signals (i.e., a form or sequence in which detection signals are received) in the present example is described with reference to FIG. 56. Where spread codes of the same phase difference are supplied to each pair of two transmission conductors 12 as in the present example, it is preferable to use the two-input one-output amplifier 365 whose two input-terminals have the same polarity, for example, the positive (+) polarity. Further, where spread codes of the same phase difference are supplied to two transmission conductors 12 ($Y_n, Y_{n+1}$) which are positioned adjacent to each other as in the example illustrated in FIG. 56, the two input terminals of the amplifier 365 of the reception section are preferably connected to two reception conductors ($X_m, X_{m+1}$), which are positioned adjacent to each other.

In the example described above, spread codes of the same phase difference are supplied to a unit of two transmission conductors 12 and output signals of two reception conductors 14 are added on the reception side. However, the present invention is not limited to this configuration. The unit of transmission conductors 12 to which spread codes of the same phase are to be supplied may be set to three or more, while the number of reception conductors 14 whose output signals are to be added by an amplifier on the reception side may be set to three or more accordingly. The number of transmission conductors 12, which form a set or a combination, and the number of reception conductors, which form a set or a combination, need not be equal to each other.

Where spread codes of the same phase difference are supplied to a plurality of transmission conductors 12 in a combination and output signals from a plurality of reception conductors 14 are added as described above, not only the level of the signal to be detected can be increased, but also the detection range of a pointer can be expanded. Therefore, the configuration described is suitable where the position detection region on the sensor section 10 is large.

Where the configuration in which the supplying form of spread codes in the transmission section and the detection form in the reception section as described above is applied to a pointer detection apparatus, which includes the sensor section 310 of modification 9 described above with reference to FIG. 47 for example, the following advantage can be achieved.

In particular, where the number of transmission conductors to which spread codes of the same phase difference are to be transmitted is different from the number of reception conductors 14 whose outputs are to be added by an amplifier, the minimum detection region on the sensor section has a rectangular shape, resulting in anisotropy in sensitivity distribution. In this instance, if the sensor section detects a pointer whose face opposing the sensor section has a circular shape (hereinafter referred to simply as "opposing face"), the opposing face of the pointer is sometimes detected not as a circular shape but as a deformed shape, like an elliptic shape. On the other hand, where the number of transmission conductors 12 to which spread codes of the same phase difference are to be transmitted is equal to the number of reception conductors 14 whose outputs are to be added by an amplifier as in the present example, the minimum detection range $S_{min}$ on the sensor section has a square shape, as seen in FIG. 56, and an isotropic sensitivity distribution is obtained. In this instance, even if a pointer with a circular opposing face is disposed on the sensor section, the opposing face of the pointer can be detected as a circular shape.

In the example described above with reference to FIG. 55, the phase differences of spread codes to be supplied to the transmission conductors 12 are fixed. However, the phase differences of spread codes to be supplied to the transmission conductors 12 may be varied, for example, after every predetermined interval of time. Different examples are illustrated in FIGS. 57A and 57B and 58A to 58C.

In the example of the transmission conductor selection sequence illustrated in FIGS. 57A and 57B, spread codes of the phase difference $Ph_1$ (the same phase) are supplied to the transmission conductors $Y_2$ and $Y_3$ at a certain point of time, as seen in FIG. 57A. Then, after a predetermined period of time, spread codes of the phase difference $Ph_1$ are supplied to the transmission conductors $Y_4$ and $Y_5$, as seen in FIG. 57B. In particular, the transmission conductors 12, to which spread codes of the same phase difference are to be supplied, are selected in a unit of two transmission conductors 12 after a predetermined interval of time.

In the example of the transmission conductor selection sequence illustrated in FIGS. 58A to 58C, spread codes of the phase difference $Ph_1$ are supplied to the transmission conductors $Y_2$ and $Y_3$ first at a certain point of time, as seen in FIG. 58A. Then, after a predetermined interval of time, spread codes of the phase difference $Ph_1$ are supplied to the transmission conductors $Y_3$ and $Y_4$ as seen in FIG. 58B. Then, after another predetermined interval of time elapses, spread codes of the phase difference $Ph_1$ are supplied to the transmission conductors $Y_4$ and $Y_5$, as seen in FIG. 58C. In particular, the transmission conductors 12, to which spread codes of the same phase difference are to be supplied, are selected in a unit of a predetermined number of transmission conductors 12, in the present example, in a unit of two transmission conductors 12. Some of the transmission conductors 12, which form the transmission conductors 12 selected in the preceding selection operation, are included in the plural transmission conductors 12 selected in the succeeding selection operation.

In a switching operation of the transmission conductors 12 as described above with reference to FIGS. 57A and 57B or 58A to 58C, a transmission conductor selection circuit is provided in the transmission section to carry out the switching operation as in the pointer detection apparatus described above in connection with modification 3 or the fourth embodiment.

[Modification 17]

In modification 16 described above with reference to FIG. 55, spread codes of the same phase are supplied to each pair of two transmission conductors, and therefore the resolution in position detection decreases. Modification 17 provides an example of a configuration which can solve this problem.

In the present example, the number of transmission conductors 12 is 64, as in the first embodiment, and the code length of spread codes to be transmitted is "62." However, in the present example, the code length "62" of spread codes to be supplied is obtained by expanding the code length "31." In particular, the spread code "$PN_1$, $PN_2$, $PN_{30}$, $PN_{31}$," of the code length "31" is expanded into a code string of the spread code "$PN_1$, $PN_1$, $PN_2$, $PN_2$, $PN_{30}$, $PN_{30}$, $PN_{31}$, $PN_{31}$," and the spread codes of this code string are supplied to the transmission conductors 12. In other words, the same code $PN_i$ (i=1 to 31) of a one-code length is successively (repetitively) supplied in two chips.

FIG. 59 shows a general configuration of the spread code supplying circuit 370 in the present example. Referring to FIG. 59, the spread code supplying circuit 370 includes a shift register 371 formed from the number of flip-flops 371a ($Dt_1$ to $Dt_{62}$ in FIG. 59) equal to the chip length of spread codes. The flip-flops $Dt_1$ to $Dt_{62}$ are connected to the transmission conductors $Y_1$ to $Y_{62}$, respectively. The spread code supplying circuit 370 further includes a compensation signal production circuit 372 having an output terminal connected to the transmission conductors $Y_{63}$ and $Y_{64}$ disposed in proximity to each other.

In the present example, codes $PN_1$, $PN_2$, ..., $PN_i$, ..., $PN_{31}$, which form spread codes produced by the spread code production circuit 373, are supplied to pairs [$Dt_1$, $Dt_2$], [$Dt_3$, $Dt_4$], ..., [$Dt_{2i-1}$, $Dt_{2i}$], ..., [$Dt_{61}$, $Dt_{62}$] of the flip-flops 371a, which are positioned adjacent to each other, respectively. Then, the flip-flops 371a successively shift a signal retained therein to the flip-flops 371a at the succeeding stage in a period of a one-code length.

In the supplying form of spread codes in the present example, since spread codes to be supplied to the transmission conductors 12 have a phase difference of a one-code length therebetween, a pointer position detection can be carried out without deteriorating the resolution.

Further, in this example, although those transmission conductors 12, which are to make a pair or a combination to which the same code is supplied, differ depending upon the supplying timing of a code, the same code is supplied to the transmission conductors 12 that are positioned adjacent to each other. This is described with reference to a spread code string supplied, for example, to the transmission conductors $Y_{60}$ to $Y_{62}$. Code strings of spread codes are supplied to the transmission conductors $Y_{62}$ to $Y_{60}$ for each one-code length in the following manner in a time sequence:

$Y_{62}$: "$PN_{31}$, $PN_{31}$, $PN_{30}$, $PN_{30}$, ..."
$Y_{61}$: "$PN_{31}$, $PN_{30}$, $PN_{30}$, $PN_{29}$, ..."
$Y_{60}$: "$PN_{30}$, $PN_{30}$, $PN_{29}$, $PN_{29}$, ..."

Here, attention is drawn to the code string of the spread code supplied to the transmission conductor $Y_{61}$. When the code $PN_{31}$ is supplied in the first chip to the transmission conductor $Y_{61}$, the (same) code $PN_{31}$ is supplied to the transmission conductor $Y_{62}$ at the same time. When the code $PN_{30}$ is supplied in the second chip to the transmission conductor $Y_{61}$, the (same) code $PN_{30}$ is supplied to the transmission conductor $Y_{60}$ at the same time. Further, when the code $PN_{30}$ is supplied in the third chip to the transmission conductor $Y_{61}$, the (same) code $PN_{30}$ is supplied to the transmission conductor $Y_{62}$ at the same time. When the code $PN_{29}$ is supplied in the fourth chip to the transmission conductor $Y_{61}$, the (same) code $PN_{29}$ is supplied to the transmission conductor $Y_{60}$ at the same time. Also, in the fifth and succeeding chips, although the transmission conductors 12, which are to make a pair or a combination to which the same code is supplied, differ similarly depending upon the supplying timing of the code, the same code is supplied to the transmission conductors 12 which are positioned adjacent to each other. With a supplying form described above, the transmission level increases and the detection sensitivity can be improved.

In modification 16 described above with reference to FIG. 55, a signal output from the compensation signal production circuit 362 is supplied to the transmission conductors $Y_1$ and $Y_{64}$ disposed on the opposite sides of the transmission conductor array 11 from among the transmission conductors 12 of the transmission conductor array 11. In other words, the signal output from the compensation signal production circuit 362 is supplied to those transmission conductors 12, which are spaced away from each other with a predetermined number of other transmission conductors 12 interposed therebetween. In contrast, in the present example shown in FIG. 59, a signal output from the compensation signal production circuit 372 is supplied to the transmission conductors $Y_{63}$ and $Y_{64}$, which are disposed in proximity to each other.

In the example described above with reference to FIG. 55, a signal output from the compensation signal production circuit 362 is supplied to those transmission conductors 12, which are spaced away from each other with a predetermined number of other transmission conductors 12 interposed therebetween. Therefore, this example of modification 16 has an advantage that, even if one of the two transmission conductors 12 is influenced by external noise or the like, a compensation signal supplied to the other transmission conductor can be utilized. In contrast, in the example shown in FIG. 59, a signal output from the compensation signal production circuit 372 is supplied to the transmission conductors $Y_{63}$ and $Y_{64}$ disposed in proximity to each other. Therefore, the example of FIG. 59 has an advantage that a wiring scheme for selecting one of the transmission conductors is simple in comparison with that of FIG. 55.

Also, the phase difference of spread codes to be supplied to the transmission conductors 12 may be altered, for example, after every predetermined interval of time as described above in connection with modification 16 shown in FIGS. 57A and 57B and 58A to 58C.

[Modification 18]

In modification 17 described above, the same code $PN_i$ (i=1 to 31) of a one-code length is supplied successively in two chips to transmission conductors 12. In modification 18, when the code $PN_i$ of a one-code length is supplied successively in two chips, the code in one of the two chips is supplied in a reversed state.

In the present example, the number of transmission conductors 12 is 62 and the code length of spread codes to be transmitted is "62." However, when spread codes of a code length of "62" expanded from spread codes of the code length of "31" are used, one of the two codes $PN_i$ arrayed successively in two chips is inverted. In particular, in the present modification 18, spread codes of a code string of "$-PN_1$, $PN_1$, $-PN_2$, $PN_2$, . . . , $-PN_{30}$, $PN_{30}$, $-PN_{31}$, $PN_{31}$" are used.

Figure 60:
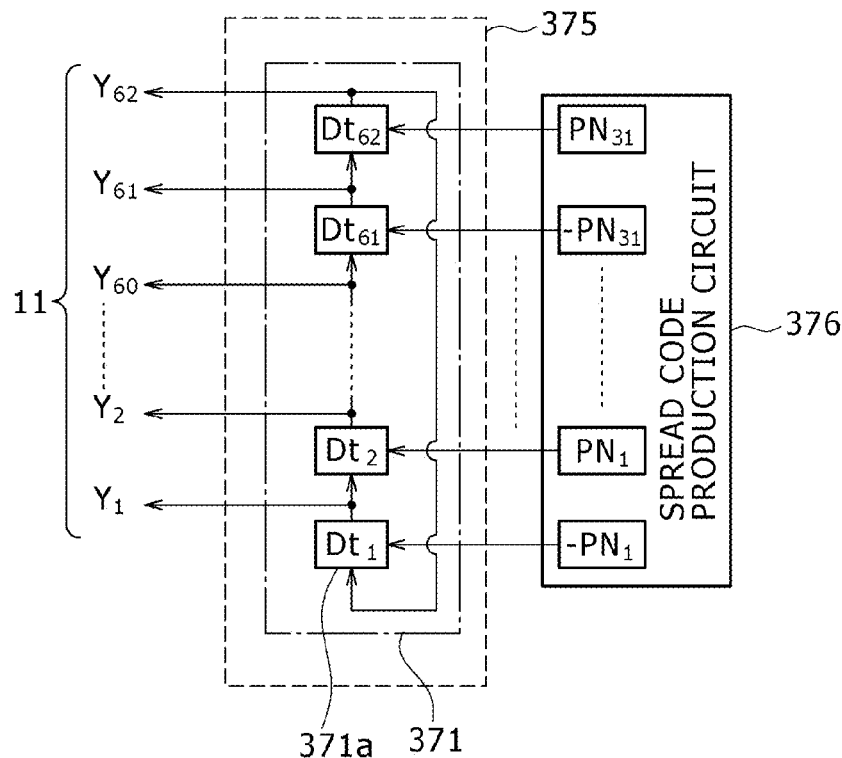
FIG. 60 is a block diagram showing a general configuration of a spread code supplying circuit according to modification 18.

FIG. 60 shows a general configuration of the spread code supplying circuit 375 of the present example. Referring to FIG. 60, the spread code supplying circuit 375 includes a shift register 371 formed from the number of flip-flops 371a ($Dt_1$ to $Dt_{62}$ in FIG. 60) equal to the chip length of spread codes, that is, from 62 flip-flops 371a. The flip-flops $Dt_1$ to $Dt_{62}$ are connected to the transmission conductors $Y_1$ to $Y_{62}$, respectively.

In the present example, a spread code production circuit 376 produces non-inverted codes "$PN_1$, $PN_2$, . . . , $PN_i$, . . . , $PN_{31}$" and inverted codes "$-PN_1$, $-PN_2$, . . . , $PN_i$, . . . , $-PN_{31}$" which form spread codes. Then, the non-inverted codes "$PN_1$, $PN_2$, . . . , $PN_i$, . . . , $PN_{31}$" are supplied to the flip-flops $Dt_2$, $Dt_4$, . . . , $Dt_{2i}$, . . . , $Dt_{62}$ and the inverted codes "$-PN_1$, $-PN_2$, . . . , $-PN_i$, . . . , $-PN_{31}$" are supplied to the flip-flops $Dt_1$, $Dt_3$, . . . , $Dt_{2i-1}$, . . . , $Dt_{61}$, respectively. Then, the flip-flops 371a successively shift a signal retained therein to the flip-flops 371a at the succeeding stage in a period of a one-code length.

In the example illustrated in FIG. 60, the non-inverted codes are supplied to the flip-flops 371a of the even-numbered indexes and the inverted codes are supplied to the flip-flops 371a of the odd-numbered indexes. However, the non-inverted codes may alternatively be supplied to the flip-flops 371a of the odd-numbered indexes, while the inverted codes are supplied to the flip-flops 371a of the even-numbered indexes.

In the present example, since spread codes to be supplied to the transmission conductors 12 have a phase difference of a one-code length therebetween similarly as in modification 17 described above, position detection of a pointer can be carried out without decreasing the resolution.

Further, in the present example of supplying spread codes, although those transmission conductors 12 which are to make a pair or a combination to which the same code is supplied differ depending upon the supplying timing of a code, the same codes having the opposite phases to each other are supplied to the transmission conductors 12 which are positioned adjacent to each other. This will be described particularly with reference to a spread code string supplied, for example, to the transmission conductors $Y_{60}$ to $Y_{62}$. Code strings of spread codes are supplied to the transmission conductors $Y_{62}$ to $Y_{60}$ in the following manner, for each one-code length in a time sequence:

Transmission conductor $Y_{62}$: "$PN_{31}$, $-PN_{31}$, $PN_{30}$, $-PN_{30}$, . . . "

Transmission conductor $Y_{61}$: "$-PN_{31}$, $PN_{30}$, $-PN_{30}$, $PN_{29}$, . . . "

Transmission conductor $Y_{60}$: "$PN_{30}$, $-PN_{30}$, $PN_{29}$, $-PN_{29}$, . . . "

Here, attention is drawn to the code string of the spread code supplied to the transmission conductor $Y_{61}$. When the inverted code $-PN_{31}$ is supplied in the first chip to the transmission conductor $Y_{61}$, the non-inverted code $PN_{31}$ is supplied to the transmission conductor $Y_{62}$ at the same time. When the non-inverted code $PN_{30}$ is supplied in the second chip to the transmission conductor $Y_{61}$, the inverted code $-PN_{30}$ is supplied to the transmission conductor $Y_{60}$ at the same time. Further, when the inverted code $-PN_{30}$ is supplied in the third chip to the transmission conductor $Y_{61}$, the non-inverted code $PN_{30}$ is supplied to the transmission conductor $Y_{62}$ at the same time. When the non-inverted code $PN_{29}$ is supplied in the fourth chip to the transmission conductor $Y_{61}$, the inverted code $-PN_{29}$ is supplied to the transmission conductor $Y_{60}$ at the same time. Also, in the fifth and succeeding chips, although the transmission conductors 12, which are to make a pair or a combination to which the same code is to be supplied, differ similarly depending upon the supplying timing of the code, the same codes of the opposite phases are supplied to the transmission conductors 12 which are positioned adjacent to each other. In this instance, because the currents flowing to cross points cancel each other between the transmission conductors 12 positioned adjacent to each other, the current signals output from the reception conductors 14 cancel each other. Thus, the reception or detection sensitivity can be improved.

Further, in the signal supplying form of the present example, when a pointer does not exist on the sensor section, since current signals detected by the reception conductors 14 become zero, there is no necessity to provide a compensation signal production circuit for supplying a compensation signal.

Also, the phase difference of spread codes to be supplied to the transmission conductors 12 may be altered, for example, after every predetermined interval of time as described above in connection with modification 16 shown in FIGS. 57A and 57B and 58A to 58C.

[Modification 19]

In modification 16 described above, spread codes of the same phase difference are supplied to a plurality of transmission conductors 12 positioned adjacent to each other and detection signals of a plurality of reception conductors 14 positioned adjacent to each other are added by an amplifier. However, the pointer detection apparatus may be configured differently. Namely, in the transmission section, spread codes of the same phase difference may be supplied to a plurality of transmission conductors 12 positioned at intervals, and also in the reception section, signals may be detected through a plurality of reception conductors 14 disposed at intervals and added by an amplifier. An example is shown as modification 19 in FIG. 61.

Figure 61:
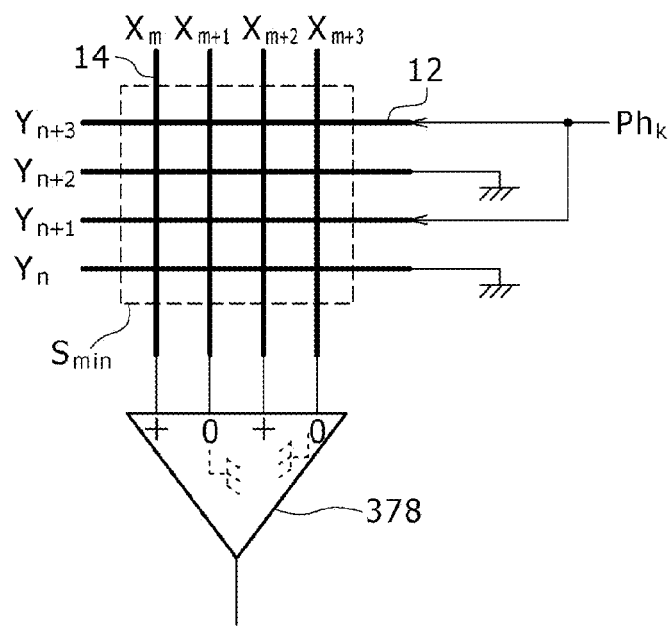
FIG. 61 is a diagrammatic view illustrating a relationship between a supplying form of a spread code by a transmission section and a detection form of a signal by a reception section according to modification 19.

FIG. 61 schematically shows a configuration wherein a pair of transmission conductors 12, to which spread codes of the same phase difference are supplied, are separated by a predetermined number of other transmission conductors 12 (i.e., at intervals). Referring to FIG. 61, one transmission conductor 12 is interposed between the two selected transmission conductors 12, and spread codes of the same phase are supplied to the two selected transmission conductors 12. No spread code is supplied to the transmission conductor 12 disposed between the selected transmission conductors 12, to which the spread codes are supplied. Specifically, in the illustrated example, spread codes of the phase difference $Ph_k$ are supplied to the transmission conductors $Y_{n+1}$ and $Y_{n+3}$, and the transmission conductor $Y_{n+2}$ disposed between the transmission conductors $Y_{n+1}$ and $Y_{n+3}$, as well as the transmission conductor $Y_n$ disposed between the transmission conductors $Y_{n+1}$ and $Y_{n-1}$ (not shown) are connected to the ground. For example, 128 transmission conductors 12 are disposed and 64 ones of the transmission conductors 12 are used to supply spread codes and a compensation signal, while the remaining 64 transmission conductors 12 are connected to the ground. Alternatively, the remaining 64 transmission conductors 12 may be connected otherwise to a predetermined reference voltage.

Where spread codes of the same phase difference are supplied to every pair of two transmission conductors 12 positioned adjacent to each other with one transmission conductor 12 interposed therebetween, as in the example shown in FIG. 61, amplifiers in the signal detection circuit of the reception section are preferably used to add output currents obtained from every pair of two reception conductors 14, which are positioned adjacent to each other with one reception conductor 14 interposed therebetween. FIG. 61 shows an example of such an amplifier as just described.

Referring to FIG. 61, a four-input one-output amplifier is used as the amplifier 378 in the reception section. The four input terminals of the amplifier 378 include two terminals of the same polarity, for example, "+" (non-negated) terminals and two terminals which are grounded or connected to a reference voltage, for example, a driving voltage. The former two input terminals and the latter two input terminals are disposed alternately. Each of the latter two input terminals is hereinafter referred to as "0" terminal. Although the "0" terminals in the present example are grounded internally, they may otherwise be supplied internally with a reference voltage. Further, in the example shown in FIG. 61, the reception conductors $X_m$ and $X_{m+2}$ are connected to the "+" terminals, and the reception conductor $X_{m+1}$ disposed between the reception conductors $X_m$ and $X_{m+2}$ and the reception conductor $X_{m+3}$ disposed between the reception conductors $X_{m+2}$ and $X_{m+4}$ (not shown) are connected to the "0" terminals. However, an alternative configuration wherein the reception conductors $X_m$ and $X_{m+2}$ are connected to the "0" terminal and the reception conductors $X_{m+1}$ and $X_{m+3}$ are connected to the "+" terminals may be used.

In the present example, spread codes of the same phase difference are supplied to a plurality of transmission conductors 12 and output signals from a plurality of reception conductors 14 are added as in modification 16. Therefore, since the detection range can be expanded and the signal level to be detected can be increased, the detection sensitivity can be improved. The configuration of the present example is also applicable where the position detection region on the sensor section is great because the minimum detection range $S_{min}$ can be expanded.

Further, in the present example, the supplying form of spread codes of the transmission section and the detection form of signals to be added by one amplifier in the reception section are formed in the same pattern similarly as in modification 16 described above. As a result, in the configuration of the present example, the minimum detection range $S_{min}$ on the sensor section has a square shape. Therefore, where the configuration of the present example is applied to a pointer detection apparatus which includes the sensor section 310, for example, of modification 9 described above with reference to FIG. 47, in the minimum detection area on the sensor section, an isotropic sensitivity distribution can be obtained. In this instance, if a pointer with a circular opposing face is placed on the sensor section, the circular shape of the opposing face of the pointer can be detected.

[Modification 20]

Modification 20 provides a configuration which is suitably applied, for example, in the operation described above with reference to FIG. 33 or 34, wherein a plurality of reception conductors 14 (four conductors in the present example), which are positioned adjacent to each other, are used collectively to carry out signal detection using a differential amplifier.

Figure 62A:
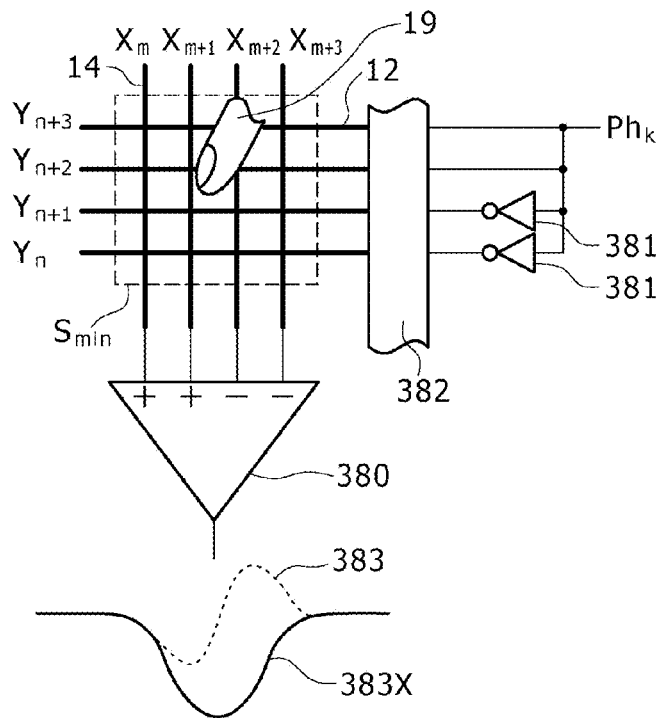
FIGS. 62A and 62B are diagrammatic views illustrating a relationship between a supplying form of a spread code by a transmission section and a detection form of a signal by a reception section according to modification 20.

FIG. 62A shows a configuration of a differential amplifier according to this example. Referring to FIG. 62A, it is assumed that a pointer 19 indicated by a solid line is positioned in proximity to transmission conductors 12 disposed at the positions $Y_{n+2}$ and $Y_{n+3}$ and reception conductors 14 disposed at the positions $X_{m+1}$ and $X_{m+2}$. The differential amplifier 380 has four terminals wherein the polarities of the two input terminals on the left side and the polarity of the two input terminals on the right side are different from each other. In the present example, the four input terminals of the differential amplifier 380 are disposed such that the polarities thereof are "++−−" in the ascending order of the index of the reception conductors 14. Then, the reception conductors $X_m$ and $X_{m+1}$ from the four reception conductors $X_m$ to $X_{m+3}$ positioned adjacent to each other are connected to the terminals of the differential amplifier 380 having the polarity of "+" while the reception conductors $X_{m+2}$ and $X_{m+3}$ are connected to the terminals of the differential amplifier 380 having the polarity of "−." The detection form or detection pattern of signals of the differential amplifier 380 illustrated in FIG. 62A is represented by "++−−."

Where the signal detection form of the reception section is "++−−" as in the present example, the signal supplying form of the transmission section is preferably set so as to correspond to the signal detection form of the reception section. In particular, spread codes of the same phase difference $Ph_k$ are supplied collectively, for example, to four transmission conductors $Y_n$ to $Y_{n+3}$ which are positioned adjacent to each other. The phases of the spread codes are preferably set to "opposite, opposite, same, same" phases in the ascending order of the index of the transmission conductors 12. In order to implement this, the spread codes of the phase difference $Ph_k$ are supplied to the transmission conductors $Y_{n+2}$ and $Y_{n+3}$ without changing the phase thereof, as seen in FIG. 62A. On the other hand, the spread codes of the phase difference $Ph_k$ are supplied to the transmission conductors $Y_n$ and $Y_{n+1}$ individually through a phase inverter 381. In the following description, the supplying form or supplying pattern of spread codes illustrated in FIG. 62A are represented by "++−−."

Where both of the signal supplying form and the signal detection form are set to "++−−" as in the above example, the signal output from the differential amplifier 380 exhibits an S-shaped level variation like a curve 383 indicated by a broken line in FIG. 62A in accordance with the presence of the pointer 19 near the transmission conductors $Y_{n+2}$ and $Y_{n+3}$. If the signal is integrated, the integration value indicates a variation represented by a curve 383X indicated by a solid line. In the present example, the center of a recessed portion of the curve 383X is calculated to carry out a position detection of the pointer. If the pointer 19 indicated by a broken line in FIG. 62A is positioned in proximity to the transmission conductors 12 disposed at the positions $Y_n$ and $Y_{n+1}$ and reception conductors 14 disposed at the positions $X_{m+1}$ and $X_{m+2}$, the level variation of the signal output from the differential amplifier 380 exhibits a waveform whose phase is inverted from that of the curve 383, due to the phase inverters 381. The integration value of the waveform also exhibits a waveform whose phase is inverted.

Figure 62B:
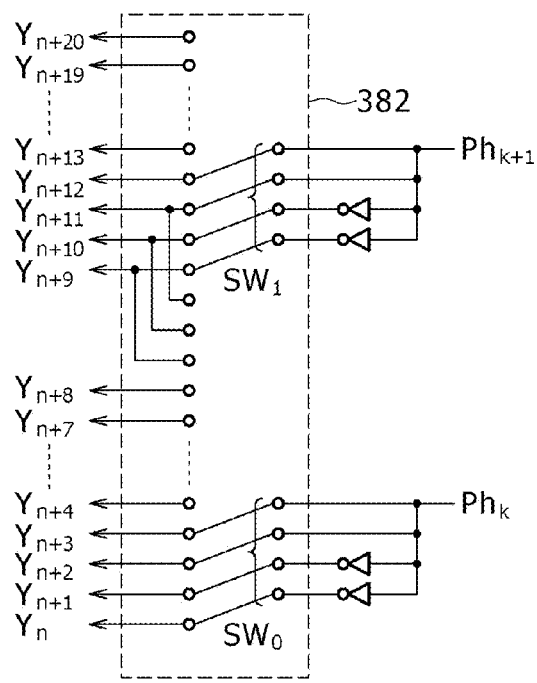

FIG. 62B shows an example of a configuration of a transmission conductor selection circuit 382 for selecting a transmission conductor shown in FIG. 62A. Referring to FIG. 62B, there is shown an example wherein signals of a phase difference $Ph_k$ and another phase difference $Ph_{k+1}$ and there respective inverted phase signals are selectively supplied to predetermined transmission conductors 12 denoted by $Y_n$ to $Y_{n+20}$. To the transmission conductor selection circuit 382, regarding each of the phase difference $Ph_k$ and the phase difference $Ph_{k+1}$, four signals in total including signals having their phases inverted are supplied. The transmission conductor selection circuit 382 includes switches $SW_0$ and $SW_1$, each formed from a semiconductor switch and having four input terminals. Each of the switches $SW_0$ and $SW_1$ has 12 output terminals, from which four output terminals are successively selected, so that signals input to the four input terminals are successively supplied to the selected transmission conductors 12. The switches $SW_0$ and $SW_1$ operate in synchronism with each other. In particular, if the transmission conductors $Y_n$ to $Y_{n+3}$ and $Y_{n+9}$ to $Y_{n+12}$ are selected from the transmission conductors 12 by the switches $SW_0$ and $SW_1$, respectively, the transmission conductors $Y_{n+1}$ to $Y_{n+4}$ and $Y_{n+10}$ to $Y_{n+13}$ are selected in the next operation cycle. This transmission conductor selection sequence is executed repetitively. Further, some of the output terminals selectable by the switch $SW_0$ (in the example illustrated, three output terminals between $Y_{n+8}$ and $Y_{n+9}$), are connected to some of the output terminals of the switch $SW_1$ ($Y_{n+9}$ to $Y_{n+11}$) without being connected to the transmission conductors 12 as seen in FIG. 62B. Accordingly, where the total number of transmission conductors 12 is 66, seven switches ($SW_0$ to $SW_6$) may be provided in the transmission conductor selection circuit 382. The number of switches used in the transmission conductor selection circuit 382 depends upon the number of input signals Ph supplied to the transmission conductor selection circuit 382 and the number of transmission conductors 12.

In the above configuration, because a plurality of transmission conductors 12 and/or a plurality of reception conductors 14 are used to process the spread code signal having the same (though inverted) phase difference, the difference signal output from the differential amplifier 380 increases and the range for simultaneous detection is expanded. Therefore, the detection sensitivity can be improved. Further, because a predetermined signal and its reversed phase signal are supplied in a paired relationship to transmission conductors 12, when no pointer 19 exists, these signals cancel each other, and therefore the dynamic range of the input signal to the differential amplifier 380 can be suppressed. Further, since noise is also canceled, the noise resisting property can be improved.

Further, the supplying form of spread codes in the transmission section and the detection form of a signal in the reception section are set to the same pattern similarly as in modification 16 described above. As a result, in the configuration of the present example, the minimum detection range $S_{min}$ in the sensor section becomes a square shape. Therefore, where the configuration of the present example is applied, for example, to a pointer detection apparatus, which includes the sensor section 310 of modification 9 described above with reference to FIG. 47, in the minimum detection area on the sensor section, an isotropic sensitivity distribution can be obtained. In this instance, for example, if a pointer with a circular opposing face is placed on the sensor section, the opposing face of the pointer can be detected as a circular shape.

The number of conductors to be used in a unit as a detection object is not limited to four or an even number, and may be an odd number such as three or five. In this instance, though not shown, a centrally disposed transmission conductor among the transmission conductors of the detection object is preferably connected to the ground or a reference voltage as described above.

Further, in the present example described above, phase inversion or polarity inversion is carried out in both of the signal supplying form in the transmission section and the signal detection form in the reception section. However, such phase inversion may be carried out in only one of the reception section and the transmission section. Further, although the signal supplying form and the signal detection form in the example described are "++−−," they may alternatively be "−−++."

[Modification 21]

Modification 21 provides an example of a configuration where signal detection is carried out collectively with regard to four reception conductors 14 positioned adjacent to each other.

Figure 63:
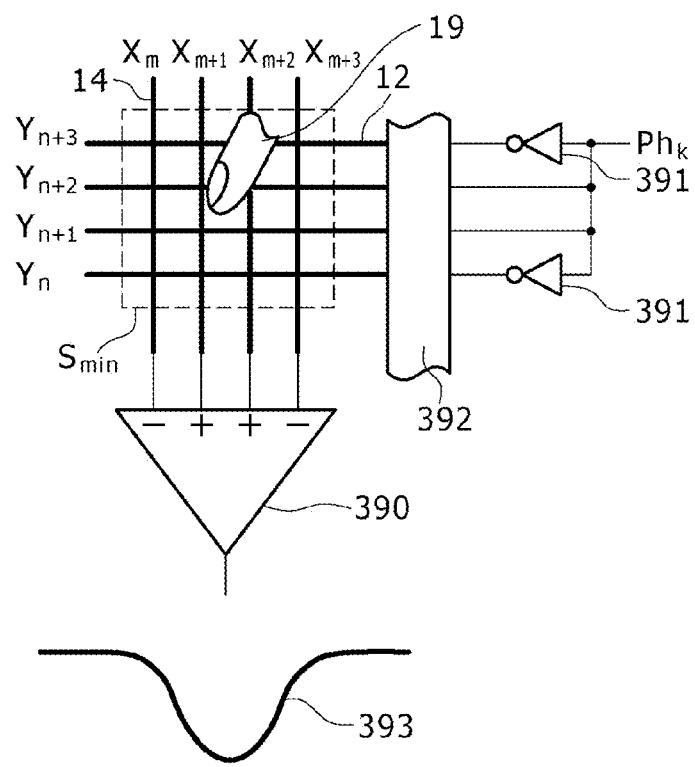
FIG. 63 is a diagrammatic view illustrating a relationship between a supplying form of a spread code by a transmission section and a detection form of a signal by a reception section according to modification 21.

FIG. 63 shows an example of a configuration of a differential amplifier of the present example. Referring to FIG. 63, the configuration shown is applied to the operation described above with reference to FIG. 33 or 34. The configuration of the reception section of the present example includes the function of integrating an output signal of the differential amplifier, unlike the configuration in FIG. 62. In particular, a four-input one-output differential amplifier 390 is used, and the four input terminals of the differential amplifier 390 have polarities of "−++−" disposed in the ascending order of the index of the reception conductors 14. In other words, in the present example, the four-input one-output differential amplifier 390 is configured such that the polarities of the two input terminals on the left side and the polarities of the two input terminals on the right side are symmetrical. Further, of four reception conductors $X_m$ to $X_{m+3}$, which are positioned adjacent to each other, the reception conductors $X_{m+1}$ and $X_{m+2}$ are connected to the "+" terminals of the differential amplifier 390 and the reception conductors $X_m$ and $X_{m+3}$ are connected to the "−" terminals of the differential amplifier 390.

Furthermore, where the signal detection form of the reception section is "−++−" as in the present example, the signal supplying form of the transmission section is preferably set to correspond to the signal detection form of the reception section. In particular, spread codes of the same phase difference $Ph_k$ are supplied collectively, for example, to four transmission conductors $Y_n$ to $Y_{n+3}$ which are positioned adjacent to each other. The phases of the spread codes are set to "opposite, same, same, opposite" phases in the ascending order of the index of the transmission conductors 12. In order to implement this, the spread codes of the phase difference $Ph_k$ are supplied to the transmission conductors $Y_{n+1}$ and $Y_{n+2}$, as seen in FIG. 63. On the other hand, the spread codes of the phase difference $Ph_k$ are supplied to the transmission conductors $Y_n$ and $Y_{n+3}$ after the phase thereof is inverted by a phase inverter 391.

Similarly to the curve 383X in FIG. 62A, which illustrates modification 20, a curve 393 illustrated in FIG. 63 indicates the level variation of a signal output from four transmission conductors 12 through the differential amplifier 390. As seen from the curve 393, the output signal has a characteristic similar to that of the value obtained by integrating the output signal of the differential amplifier 380 in modification 20 illustrated in FIG. 62A. In other words, where the signal detection form is set to "−++−," that is, to a symmetrical relationship as in the present example, an output similar to that obtained by an integration process is obtained. Therefore, where the detection form of the present example is adopted, an output similar to that obtained by an integration process is obtained. Thus, accumulation of noise, which is likely to occur where an integration process is carried out, is eliminated. Further, since a differential amplification process is applied, the noise resisting property can be additionally improved. A detailed description of operation of a transmission conductor selection circuit 392 in the present example, which executes a transmission conductor selection sequence for successively selecting the transmission conductors 12, is omitted herein because the transmission conductor selection circuit 382 described above with reference to FIG. 62A can be applied as the transmission conductor selection circuit 392.

Further, in the present example, the supplying form of spread codes in the transmission section and the detection form of a signal in the reception section are set to the same pattern, similarly as in modification 16 described above. As a result, in the present configuration, the minimum detection range $S_{min}$ in the sensor section becomes a square shape. Therefore, where the configuration of the present example is applied to a pointer detection apparatus, which includes the sensor section 310 of modification 9 described above with reference to FIG. 47 for example, in the minimum detection area on the sensor section, an isotropic sensitivity distribution can be obtained. In this instance, if a pointer having a circular opposing face is placed on the sensor section, the circular shape of the opposing face of the pointer can be detected.

The number of conductors to be selected as a unit (as a detection object) is not limited to four or an even number, but may be an odd number such as three or five. In this instance, a centrally disposed transmission conductor among the transmission conductors of the detection object is preferably connected to the ground or a reference voltage.

In the example described above, phase inversion is carried out in both of the signal supplying form in the transmission section and the signal detection form in the reception section. However, such phase inversion may be carried out in only one of the reception section and the transmission section.

Figure 64:
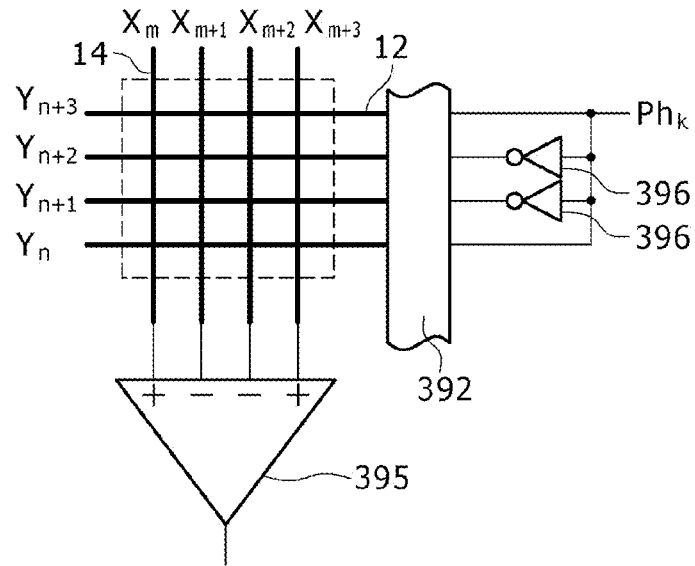
FIG. 64 is a diagrammatic view illustrating another relationship between a supplying form of a spread code by the transmission section and a detection form of a signal by the reception section according to modification 21.

Further, although the signal supplying form and the signal detection form in the example illustrated in FIG. 64 are "−++−," they may alternatively be "+−−+." An example of a configuration in this instance is illustrated in FIG. 64.

In FIG. 64, a four-input one-output differential amplifier 395 is configured such that the polarities of the four input terminals are "+−−+" in the ascending order of the index of the reception conductors 14. Further, of four reception conductors $X_m$ to $X_{m+3}$ which are positioned adjacent to each other, the reception conductors $X_{m+1}$ and $X_{m+2}$ are connected to the "−" terminals of the differential amplifier 395 and the reception conductors $X_m$ and $X_{m+3}$ are connected to the "+" terminals of the differential amplifier 395.

Still further, where the signal detection form of the reception section is "+−−+" as in the present example, the signal supplying form of the transmission section is preferably set so as to correspond to the signal detection form of the reception section. In particular, spread codes of the same phase difference $Ph_k$ are supplied collectively, for example, to four transmission conductors $Y_n$ to $Y_{n+3}$ which are positioned adjacent to each other. The phases of the spread codes are set to "same, opposite, opposite, same" phases in the ascending order of the index of the transmission conductors 12. In order to implement this, the spread codes of the phase difference $Ph_k$ are supplied to the transmission conductors $Y_n$ and $Y_{n+3}$ without changing the phase thereof as seen in FIG. 64. On the other hand, the spread codes of the phase difference $Ph_k$ are supplied to the transmission conductors $Y_{n+1}$ and $Y_{n+2}$ individually through a phase inverter 396.

Also in the example shown in FIG. 64, the four-input one-output differential amplifier 395 is configured such that the polarities of the two input terminals on the left side and the polarities of the two input terminals on the right side are symmetrical. Therefore, advantages similar to those achieved by the example shown in FIG. 63 are achieved.

[Modification 22]

Modification 22 provides an example of a configuration where signal detection is carried out collectively for three reception conductors 14, which are positioned adjacent to each other.

Figure 65A:
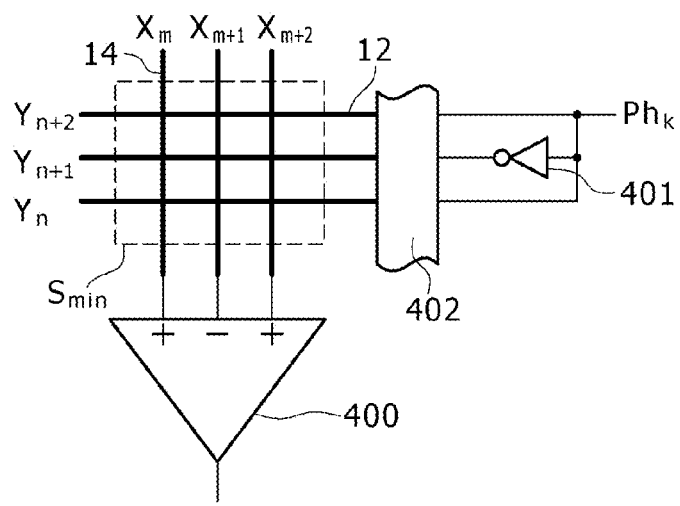
FIGS. 65A and 65B are diagrammatic views illustrating a relationship between a supplying form of a spread code by a transmission section and a detection form of a signal by a reception section according to modification 22.

FIG. 65A shows a configuration of the example described. Also, this example is suitably applied particularly to the operation described above with reference to FIG. 33 or 34. Referring to FIG. 65A, the reception section in the present example uses a three-input one-output differential amplifier 400, and the three input terminals of the differential amplifier 400 are disposed such that the polarities thereof are "+−+" in the ascending order of the index of the reception conductors 14. In particular, the differential amplifier 400 in the present example is configured such that the polarities of the input terminals on the opposite side of the centrally located input terminal are symmetrical with each other with respect to that of the centrally located input terminal. Further, of three reception conductors $X_m$ to $X_{m+2}$ which are positioned adjacent to each other, the reception conductors $X_m$ and $X_{m+2}$ are connected to the "+" terminals of the differential amplifier 400 and the reception conductor $X_{m+1}$ is connected to the "−" terminal of the differential amplifier 400.

Further, since the differential amplifier 400 of the present example includes one "−" terminal and two "+" terminals, in order to establish a balanced state between the signal levels to be input to the input terminals of the differential amplifier 400, a signal to be input to the "−" of the differential amplifier 400 is doubly amplified, for example within the differential amplifier 400, so as to correct the signal level of the signal. The magnification of the level of the signal to be input to an input terminal or thermals of the minority polarity (in FIG. 65, the "−" terminal) is determined by considering the number of input terminals of the minority polarity and the number of input terminals of the majority polarity (in FIG. 65, the "+" terminals).

Figure 65B:
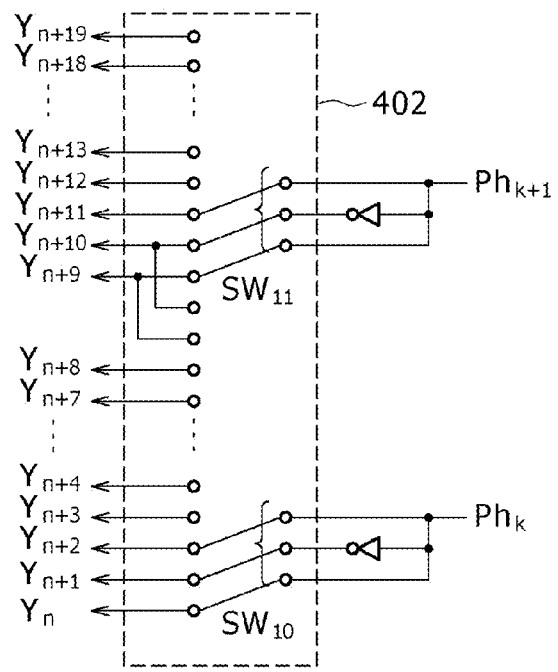

Further, where the signal detection form of the reception section is "+−+" as in the present example, the signal supplying form of the transmission section is preferably set to correspond to the signal detection form of the reception section. In particular, spread codes of the same phase difference $Ph_k$ are supplied collectively, for example, to three transmission conductors $Y_n$ to $Y_{n+2}$ which are positioned adjacent to each other. The phases of the spread codes are set to "same, opposite, same" phases in the ascending order of the index of the transmission conductors 12. In order to implement this, the spread codes of the phase difference $Ph_k$ are supplied to the transmission conductors $Y_n$ and $Y_{n+2}$ without changing the phase thereof as seen in FIG. 65A. On the other hand, the spread code of the phase difference $Ph_k$ is supplied to the transmission conductor $Y_{n+1}$ through a phase inverter 401. FIG. 65B shows an example of a configuration of a transmission conductor selection circuit 402 for selecting a transmission conductor shown in FIG. 65A. Referring to FIG. 65B, there is shown an example wherein signals of a phase difference $Ph_k$ and another phase difference $Ph_{k+1}$, and their respective inverted phase signals, are selectively supplied to predetermined transmission conductors 12 denoted by $Y_n$ to $Y_{n+19}$. To the transmission conductor selection circuit 402, three signals including two non-inverted signals and one inverted phase signal generated based on the signals with phase difference $Ph_k$ and $Ph_{k+1}$, respectively, are supplied.

The transmission conductor selection circuit 402 includes switches $SW_{10}$ and $SW_{11}$, each formed from a semiconductor switch and having three input terminals. Each of the switches $SW_{10}$ and $SW_{11}$ has 11 output terminals, from among which three output terminals are successively selected to select three transmission conductors 12 so that signals input to the corresponding three input terminals are successively supplied to the selected three transmission conductors 12. The switches $SW_{10}$ and $SW_{11}$ operate in synchronism with each other. In particular, if the transmission conductors $Y_n$ to $Y_{n+2}$ and $Y_{n+9}$ to $Y_{n+11}$ are selected from the transmission conductors 12 by the switches $SW_{10}$ and $SW_{11}$, respectively, the transmission conductors $Y_{n+1}$ to $Y_{n+3}$ and $Y_{n+10}$ to $Y_{n+12}$ are selected in the next operation cycle. Such a transmission conductor selection sequence is executed repetitively. Further, some of the output terminals selectable by the switch $SW_{10}$, in this example two output terminals (between $Y_{n+8}$ and $Y_{n+9}$), are connected to some of the output terminals of the switch $SW_{11}$ without being connected to the transmission conductors 12 as seen in FIG. 65B. Accordingly, where the total number of transmission conductors 12 is 65, seven switches ($SW_{10}$ to $SW_{16}$) are provided in the transmission conductor selection circuit 402. The number of switches which form the transmission conductor selection circuit 402 depends upon the number of input signals Ph supplied to the transmission conductor selection circuit 402 and the number of transmission conductors 12.

Where the signal detection form is "+−+" as in the present example, the polarity arrangement of the three input terminals of the differential amplifier 400 is symmetric with respect to the polarity of the centrally located input terminal. Therefore, in the present example, a result similar to that obtained by an integration process can be obtained. Further, accumulation of noise which is likely to occur where an integration process is carried out is eliminated. Since a differential amplification process is applied, the noise resisting property can be further improved.

Further, in the present example, the supplying form of spread codes in the transmission section and the detection form of a signal in the reception section are set to the same pattern as in modification 16 described above. As a result, in the configuration of the present example, the minimum detection range $S_{min}$ in the sensor section becomes a square shape. Therefore, where the configuration of the present example is applied, to a pointer detection apparatus, which includes the sensor section 310 of modification 9 described above with reference to FIG. 47 for example, in the minimum detection area on the sensor section, an isotropic sensitivity distribution can be obtained. In this instance, if a pointer with a circular opposing face is placed on the sensor section, the circular shape can be detected.

Further, in the present example, phase inversion is carried out in both of the signal supplying form in the transmission section and the signal detection form in the reception section However, such phase inversion may be carried out in only one of the reception section and the transmission section.

Figure 66:
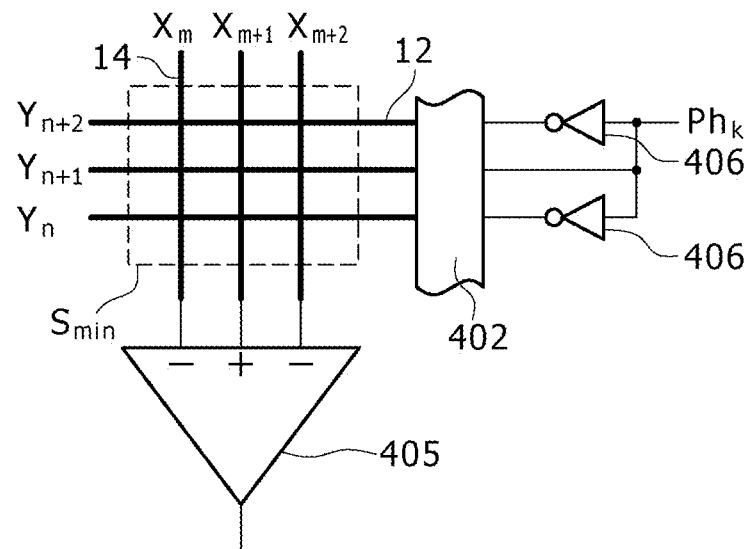
FIG. 66 is a diagrammatic view illustrating another relationship between a supplying form of a spread code by the transmission section and a detection form of a signal by the reception section according to modification 22.

Although the signal supplying form and the signal detection form in the example illustrated in FIG. 65 are "+−+," they may alternatively be "−+−." An example of a configuration in this instance is illustrated in FIG. 66.

In FIG. 66, the three input terminals of a differential amplifier 405 are disposed such that the polarities thereof are "−+−" in the ascending order of the index of the reception conductors 14. Further, of three reception conductors $X_m$ to $X_{m+2}$ which are positioned adjacent to each other, the reception conductors $X_m$ and $X_{m+2}$ are connected to the "−" terminals of the differential amplifier 405 and the reception conductor $X_{m+1}$ is connected to the "+" terminal of the differential amplifier 405. In the differential amplifier 405 shown in FIG. 66, the level of the signal to be input to the centrally located "+" terminal may be doubled in order to establish a well-balanced state of the signal levels to be input to the input terminals.

Further, where the signal detection form of the reception section is "−+−" as in the present example, the signal supplying form of the transmission section is preferably set so as to correspond to the signal detection form of the reception section. In particular, spread codes of the same phase difference $Ph_k$ are supplied collectively, for example, to three transmission conductors $Y_n$ to $Y_{n+2}$, which are positioned adjacent to each other. The phases of the spread codes are set to "opposite, same, opposite" phases in the ascending order of the index of the transmission conductors 12. In order to implement this, the spread code of the phase difference $Ph_k$ is supplied to the transmission conductor $Y_{n+1}$ without changing the phase thereof as seen in FIG. 66. On the other hand, the spread codes of the phase difference $Ph_k$ are supplied to the transmission conductors $Y_n$ and $Y_{n+2}$ through a phase inverter 406.

Also, in the example shown in FIG. 66, the differential amplifier 405 is configured such that the polarities of the three input terminals thereof are symmetrical with respect to the polarity of the centrally located input terminal. Therefore, similar advantages to those achieved by the example shown in FIG. 65A are achieved. A detailed description of operation of the transmission conductor selection circuit 402 for executing the transmission conductor selection sequence for successively selecting the transmission conductors 12 is omitted herein because the transmission conductor selection circuit 402 described above with reference to FIG. 65A can be applied to the transmission conductor selection circuit 402.

[Modification 23]

In the first to fourth embodiments and the modifications described above, the number of the transmission conductors and the reception conductors of the sensor section and so forth are selected statically. In other words, if the number of transmission conductors and the reception conductors to be used in the minimum detection area is selected once, then the numbers of the conductors are not changed thereafter. However, with the configuration just described, where a pointer is in a hovering state, that is, where a pointer is displaced above the sensor section 10, the position detection sensitivity is low and the influence of noise increases. Therefore, it is difficult to carry out position detection in a hovering state of a pointer with a high degree of accuracy.

Modification 23 provides an example of a configuration wherein position detection of a pointer can be carried out with certainty even when the pointer is in a hovering state.

In modification 23, in order to carry out position detection of a pointer with certainty also where the pointer is in a hovering state, that is, where the pointer is spaced by a predetermined distance from the sensor section 10, the number of transmission conductors and reception conductors to be used in a minimum detection area upon position detection is selected dynamically. Operation of such dynamic selection of the number of conductors to be used is described with reference to FIGS. 67 and 78.

Figure 67:
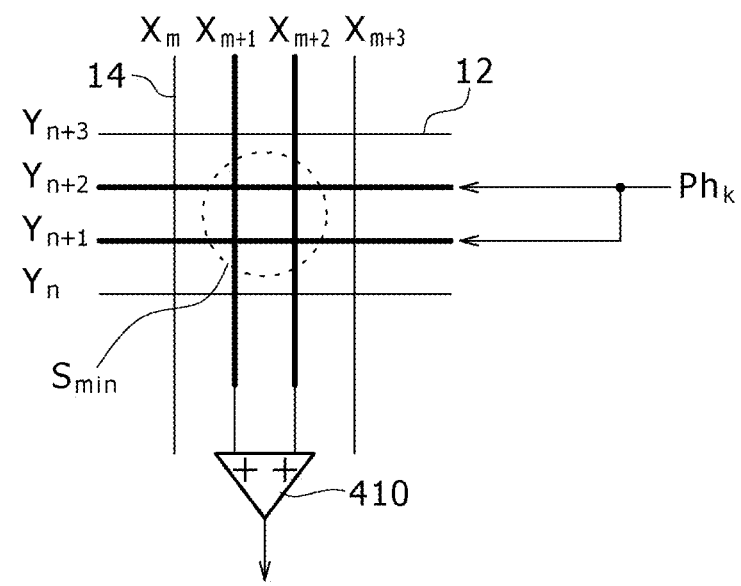
FIG. 67 is a diagrammatic view illustrating a relationship between a supplying form of a spread code by a transmission section and a detection form of a signal by a reception section according to modification 23 where a pointer is not in a hovering state.

FIG. 67 illustrates a relationship between a supplying form of spread codes and a detection form of an output signal in the minimum detection range $S_{min}$ where a pointer is positioned in proximity to the sensor section 10. Meanwhile, FIG. 68 illustrates a relationship of a supplying form of spread codes and a detection form of an output signal in the minimum detection range $S_{min}$ where a pointer is positioned relatively remotely from the sensor section 10 (i.e., in a hovering state).

Where a pointer is positioned in proximity to the sensor section 10, in the transmission section, spread codes of the same phase difference $Ph_k$ are supplied to every pair of two transmission conductors 12 while, in the reception section, output signals from two reception conductors 14 are detected collectively as seen in FIG. 67. The supplying form of spread codes in the transmission section and the detection form of a signal in the reception section may be, for example, "++" or "+−."

Figure 68:
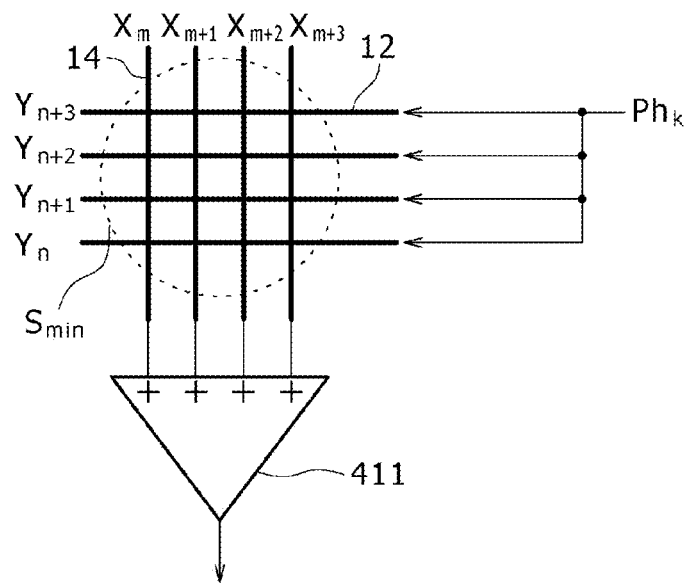
FIG. 68 is a similar view but illustrating a relationship between a supplying form of a spread code by the transmission section and a detection form of a signal by the reception section according to modification 23 where a pointer is in a hovering state.

In contrast, where a pointer is positioned relatively remotely from the sensor section, in the transmission section, the number of transmission conductors 12 to which spread codes of the same phase difference $Ph_k$ are to be supplied is increased, for example, to four, as seen in FIG. 68. In the reception section, the number of reception conductors 14, which are to make an object of detection, is also increased, for example, to four such that output signals from the four reception conductors 14 are detected collectively. The supplying form of spread codes in the transmission section and the detection form of a signal in the reception section may be, for example, "++++" or "++−−."

The switching of the number of the transmission conductors 12 and the reception conductors 14 to be selected in the operation described above (e.g., from 2 to 4) is carried out, for example, in the following manner. First, information about the distance between the sensor section and a pointer is determined by the control circuit based on the level of a signal output from the signal detection circuit. Then, the control circuit issues an instruction, based on a result of the determination above, regarding the number and position of conductors to be selected, to each of the transmission conductor selection circuit and the reception conductor selection circuit.

As described above, in the present example, where it is determined that the pointer is in a hovering state, the number of transmission conductors 12 and reception conductors 14 to be selected is increased so as to maintain or increase the detection sensitivity. Consequently, position detection of the pointer in the hovering state can be carried out with certainty.

In the example described above, the number of conductors to be selected is increased from two or four, but the number of conductors to be selected is not limited to this example, and can be changed differently. For example, the number of conductors to be selected may be gradually increased as the distance between the sensor section and the pointer increases. Also, it is possible to selectively increase the number of the transmission conductors alone or selectively increase the number of the reception conductors alone.

[Modification 24]

Modification 24 provides a technique for identifying with a higher degree of accuracy whether or not a pointer is in a hovering state. Modification 24 is described below with reference to FIGS. 69A to 71.

Figure 69A:
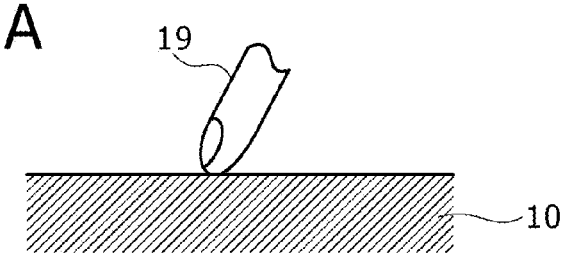
Figure 69B:

FIG. 69A illustrates a state wherein a finger 19 touches the sensor section 10, and FIG. 69B illustrates a level curve of a detection signal or correlation values obtained by the reception section in the state of FIG. 69A. When the finger 19 touches the sensor section 10, a level curve 420 indicates a steep peek in the region within which the finger 19 touches the sensor section 10.

FIG. 70A illustrates a hovering state wherein the finger 19 is spaced from and above the sensor section 10, and FIG. 70B illustrates a level curve of a detection signal obtained by the reception section in the state of FIG. 70A. When the finger 19 is in a hovering state, a level curve 421 indicates a peak within a region within which the finger 19 is above the sensor section 10. However, the shape of the peak is flattened (broadened) and the peak value decreases in comparison with that as seen in FIG. 69B where the finger 19 touches the sensor section 10.

It is possible to detect the gradient of a peak portion of the level curve at a rising edge in the variation of the level curve illustrated in FIG. 69B or 70B to determine whether or not the pointer is in a hovering state. In the present technique, when the gradient of a peak portion has a value higher than a predetermined value, it is determined that a pointer 19 is touching the sensor section, but if the gradient of the peak portion has a value lower than the predetermined value, it is determined that the pointer is spaced away from the sensor section. However, the technique just described has the following problems.

For example, if the intensity of the output signal obtained varies as a result of movement of the pointer or the like, then it is difficult to accurately identify a hovering state. Further, by a variation of the gain of the amplifier or the like, it becomes difficult to accurately identify a hovering state. Furthermore, if the detection state of a signal in the reception section changes as in the configuration described above, the level curve of the output signal is broadened (or flattened). In this instance, the gradient of an edge of a peak portion varies even if the touching state of the pointer with the sensor section is the same. Conversely, the level of the output signal becomes different depending upon the distance between or the touching state between the sensor section and the pointer even if the gradient of an edge of the peak portion is the same. In this instance, it is difficult to accurately identify the touching situation of the pointer.

Therefore, in order to solve the problems described above, the gradient of a detection signal is normalized with a maximum amplitude value of the detection signal. Specifically, a ratio between the gradient (broken line in FIG. 70B) of an edge of a peak curve portion of the level curve 421 of the detection signal or correlation values detected by the reception section, and the peak value (solid arrow in FIG. 70B) of the save level curve 421, that is (gradient of the edge/peak value) is used to identify whether the pointer is in a hovering state or whether it is touching the sensor section 10.

In order to implement the identification method, the reception section includes a ratio calculation section for calculating a ratio between a gradient of an edge and a peak value of a peak portion from a detected level curve, and a hovering identification circuit for comparing the ratio calculated by the ratio calculation section with a predetermined threshold value to determine whether or not the pointer is in a hovering state.

The ratio calculation section and the hovering identification circuit can be provided, for example, in the position detection circuit.

If the ratio determined by the ratio calculation circuit is higher than the predetermined threshold value, the hovering identification circuit identifies that the pointer is in a non-hovering state, that is, in a state wherein the pointer is touching the sensor section. On the other hand, if the determined ratio is lower than the predetermined threshold value, then the hovering identification circuit identifies that the pointer is in a hovering state. Further, it is possible for the hovering identification circuit to set a second threshold value lower than the predetermined threshold value used for identification of presence or absence of a hovering state, and to compare the ratio determined by the ratio calculation circuit with the second threshold value to more particularly identify the degree of the hovering state, that is, the distance between the sensor section and the pointer.

A particular example of a determination method of an edge gradient and a peak value of a peak portion of the level curve of a signal or correlation values detected by the reception section and the ratio between the gradient of the edge and the peak value is described with reference to FIG. 71.

FIG. 71 illustrates mapped level values of a detection signal or correlation values obtained at a certain point of time in a region in proximity to a cross point at which a finger 19 as the pointer exists. More particularly, FIG. 71 illustrates level values obtained at 3×3 cross points, which are represented as normalized values.

In such a spatial distribution of level values as illustrated in FIG. 71, a maximum value "100" of the level is obtained at the central cross point, and another level value "50" is obtained at cross points positioned upward, downward, leftward and rightward of the central cross point. In this instance, the peak value of the level curve is "100" at the central grid and the gradient of the edge is 100−50=50. Therefore, in the example illustrated in FIG. 71, the ratio between the gradient of the edge and the peak value of the level curve is (the gradient of edge/maximum value=50/100=0.5).

In the present example, the hovering state can be identified using a gradient of an edge and a maximum value of a peak portion of a level curve. Therefore, the problem described above can be eliminated and a stable identification of a hovering state becomes possible.

In the example described above, identification of a hovering state is carried out directly based on the level curve of the detection signal, that is, based on the mapping data of the level values. A hovering state may also be identified based on a characteristic obtained by a nonlinear process of the level curve of the detection signal. An example wherein logarithmic transformation is carried out as a nonlinear process for the level curve of a detection signal or correlation values is described below.

Where no nonlinear process is carried out, the level of the detection signal obtained when the pointer is touching the sensor section is extremely high at the touched location on the sensor section 10, but is extremely low at another location at which the pointer is spaced away from (i.e., hovering above) the sensor section 10. Therefore, even if it is intended to identify a situation wherein the pointer is placed only slightly above the sensor section 10, accurate identification of such is difficult because the level of the detection signal is extremely different between the two situations described above.

In contrast, if a predetermined nonlinear signal conversion process, for example, logarithmic transformation, is carried out for the level curve of a detection signal or correlation values, a signal portion of the detection signal, which has a comparatively low level, can be made to stand out while the signal level of another signal portion which has a comparatively high level can be suppressed. In other words, in the level curve after the logarithmic transformation, the peak portion has a broadened (flattened) shape and its maximum value is suppressed. In this instance, a variation of the level value becomes continuous near the boundary between the touched location and the non-touched location by the pointer. Thus, even if the pointer is in a state wherein it is spaced only slightly above the sensor section 10, the hovering state can be readily recognized.

Further, since the variation of the level value of the detection signal becomes continuous also at the boundary between the region within which the pointer touches the sensor section 10 and another region within which the pointer does not touch the sensor section 10, recognition of the boundary of the pointer (i.e., the boundary of the area on the sensor section 10 that is touched by the pointer) is facilitated. Such extraction of a touched area, which is defined by the boundary of the pointer, is significant in recognizing the coordinate of the pointer as well as the depressing pressure applied to the sensor section 10 by the pointer. Particularly, a coordinate determination error, which appears when the pointer moves on the sensor section to move between different reception conductors (i.e., a selection error of a reception conductor before and after such movement), or a like error can be reduced.

Further, with the nonlinear technique of logarithmically transforming the level curve of the detection signal or correlation values by means of a logarithmic transformation circuit not shown, the ratio between the gradient of an edge and the peak value of a peak portion of the level curve described above (i.e., the gradient of the edge/peak value) can be calculated not by division but simply by subtraction. Therefore, the calculation of the ratio, that is, the gradient of the edge/peak value, is simplified.

[Modification 25]

Modification 25 provides a configuration adopted to carry out all scanning at a high speed with increased sensitivity. In particular, operation of detecting a pointer either roughly or finely depending on a signal level of a detection signal detected by the sensor section is described.

"All scanning" means carrying out a detection process for a current variation at all of the cross points on the sensor section in order to detect a pointer. Preferably, all scanning is carried out at a high speed with increased sensitivity. However, if all scanning of the transmission conductors and the reception conductors is carried out with respect to every conductor or every small number of conductors, the number of cross points to be scanned is great and much time is required before all scanning is completed.

Therefore, in the present example, if an output signal is not detected from the sensor section, the number of transmission conductors and reception conductors to be used for a one-time detection process (i.e., in a minimum detection region) is increased to make scanning of scanning points rougher (hereinafter referred to as "skip scanning"). In the skip scanning, the minimum detection region is made greater, and a detection process for a current variation is carried out using the (enlarged) minimum detection region as a minimum unit of displacement or shifting.

The skip scanning is executed in order to confirm whether or not a pointer exists on the sensor section. This process is carried out by the position detection section. Further, the number of conductors to be selected in the skip scanning can be set arbitrarily in response to the size of the sensor section, the required sensitivity and so forth.

Either or both of the number of the transmission conductors and the number of the reception conductors may be increased or decreased. Further, where the number of both of the transmission conductors and the reception conductors is to be increased or decreased, the numbers may be different between the transmission conductors and the reception conductors. Various methods can be applied as long as the effective area (or the minimum detection area) for actual detection of a signal is increased or decreased.

The number of transmission conductors and reception conductors to be used may be changed depending not only upon presence or absence of a detection signal but also upon the level of the detection signal. For example, when the level of the detection signal is higher than a predetermined threshold value set in advance, the number of conductors may be decreased. On the other hand, when the level of the detection signal is lower than the predetermined threshold value, the number of conductors may be increased. Further, not one threshold value, but two or more threshold values may be set. To detect a level of the detection signal, the method of modification 24 described above with reference to FIGS. 70 and 71 may be used.

In the present example, when a detection signal is not obtained from the sensor section, the number of the transmission conductors and the reception conductors to be used in a minimum detection area is increased to raise the detection sensitivity and roughen the scanning point distribution ("skip scanning"). Thus, all scanning can be only selectively implemented.

[Modification 26]

In modifications 16 (FIG. 56), 19 (FIG. 61), 20 (FIG. 62), 21 (FIGS. 63 and 64) and 22 (FIGS. 65 and 66) described above, the supplying form of the transmission conductors 12 for supplying spread codes of the same phase difference and the detection form of the reception conductors 14 to be added in one amplifier have the same pattern. The present invention, however, is not limited to these configurations.

As described above in connection with the modifications mentioned above, where the supplying form of spread codes in the transmission section and the detection form of a signal in the reception section are set to the same pattern, the minimum detection region in the sensor section becomes a square shape. Therefore, if the configuration of these examples is applied, for example, to a pointer detection apparatus which includes the sensor section 310 of modification 9 described above with reference to FIG. 47, an isotropic sensitivity distribution can be obtained in a minimum detection region in the sensor section. In this instance, even if a pointer having, for example, a circular opposing face is disposed on the sensor section, the circular shape of the opposing face of the pointer can be reliably detected.

However, if the supplying form of spread codes in the transmission section and the detection form of a signal in the reception section are set to the same pattern, for example, in the sensor section 10 of the first embodiment described above with reference to FIG. 2, and where the spacer 16 provided between the transmission conductor array 11 and the reception conductor array 13 has a great thickness, the following problem may occur.

In particular, in the sensor section 10 of the first embodiment, the reception conductor array 13 is disposed on the transmission conductor array 11 with the spacer 16 interposed therebetween. In this instance, since the transmission conductor array 11 is disposed at a position farther from the detection surface for a pointer than the reception conductor array 13, the intensity of an electric field acting between the detection surface and the transmission conductors 12 and the intensity of an electric field acting between the detection surface and the reception conductors 14 are different. The level curve of the output signal from the transmission conductors 12 disposed at the farther position from the detection surface is broader (wider) than the level curve of the output signal from the reception conductors 14 disposed nearer to the detection surface. In other words, the gradient of an edge of the level curve of output signals of the transmission conductors 12 disposed at the farther position from the detection surface is comparatively low, while the gradient of an edge of the level curve of output signals from the reception conductors 14 positioned near the detection surface is comparatively high.

Figure 72:
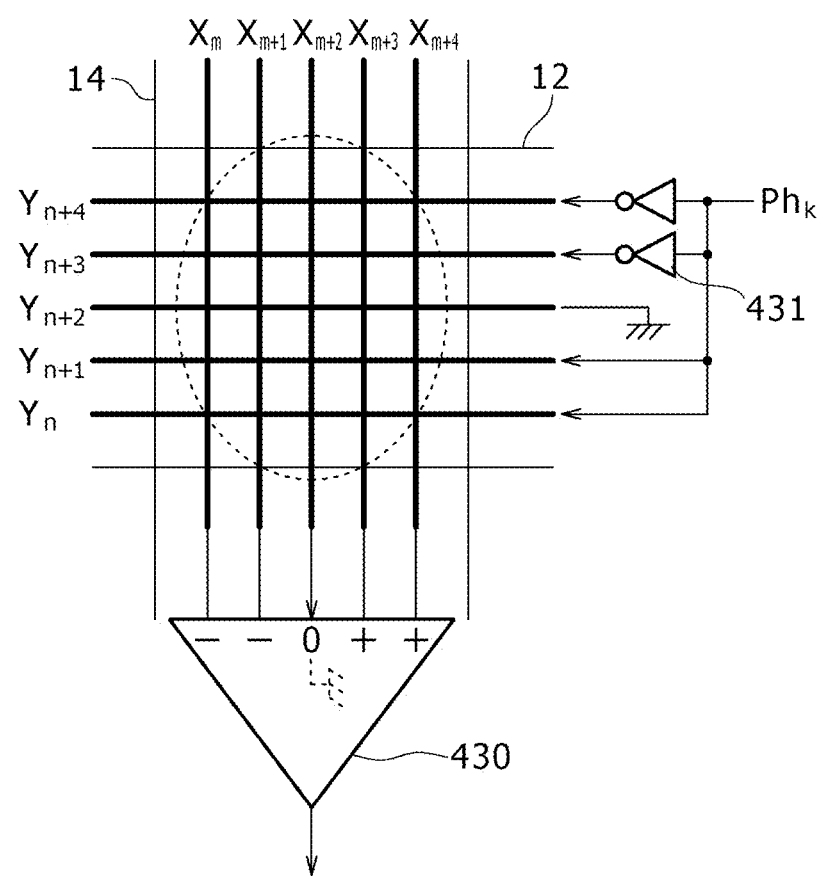
FIGS. 72 and 73 are diagrammatic views illustrating an adjustment method of the aperture ratio (or aspect ratio) of a detection level distribution on a detection surface upon position detection according to modification 26.

FIG. 72 describes the configuration where the supplying form of spread codes in the transmission section and the detection form of a signal in the reception section are set to the same pattern is applied, for example, to the sensor section 10 of the first embodiment of FIG. 2.

In FIG. 72, a five-input one-output differential amplifier 430 is used as the differential amplifier in the reception section, and the five input terminals of the differential amplifier 430 are disposed such that the polarities thereof are "−−0++" in the ascending order of the index of the reception conductors $X_m$ to $X_{m+4}$. A "0" in the detection form "−−0++" signifies that the terminal is connected to the ground or a reference voltage. In particular, a centrally located terminal of the input terminals of the differential amplifier 430 is connected to the ground or a reference potential in the inside of the differential amplifier 430. FIG. 72 shows a configuration where the transmission conductor $Y_{n+2}$ and the reception conductor $X_{m+2}$ are connected to the ground. It is also possible to use the transmission conductor selection circuit and the reception conductor selection circuit described above to control connection of the conductors to the ground.

In the example illustrated in FIG. 72, spread codes of the same phase difference $Ph_k$ are supplied collectively to the five transmission conductors $Y_n$ to $Y_{n+4}$, which are positioned substantially adjacent to each other. The phases of the spread codes are set to "same phase, same phase, ground, opposite phase, opposite phase" in the ascending order of the index of the transmission conductors 12. In order to implement this arrangement, the spread codes of the phase difference $Ph_k$ are supplied without changing the phase thereof to the transmission conductors $Y_n$ and $Y_{n+1}$ as seen in FIG. 72. The centrally located transmission conductor $Y_{n+2}$ is connected to the ground. Meanwhile, the spread codes of the phase difference $Ph_k$ are supplied to the transmission conductors $Y_{n+3}$ and $Y_{n+4}$ each through a phase inverter 431.

In the configuration shown in FIG. 72, the spread (or width) of the level curve of output signals from the transmission conductors 12 is greater than that of the level curve of output signals from the reception conductors 14 as described above. As a result, where a pointer with a circular opposing face is disposed on the sensor section 10, there is the possibility that it may be detected as an elliptic shape as indicated by a broken line in FIG. 72.

Therefore, in the present example, in order to eliminate the problem just described, the pointer detection apparatus is configured such that the detection width of the transmission conductor array 11, which is disposed remotely from the detection surface of the sensor section 10, is narrow, while the detection width on the reception conductor array 13, which is disposed nearer to the detection surface of the sensor section 10, is wide so that no difference may appear between the detection widths of the level curves of the output signals on the reception side and the transmission side. An example of a configuration implementing this is shown in FIG. 73.

Figure 73:
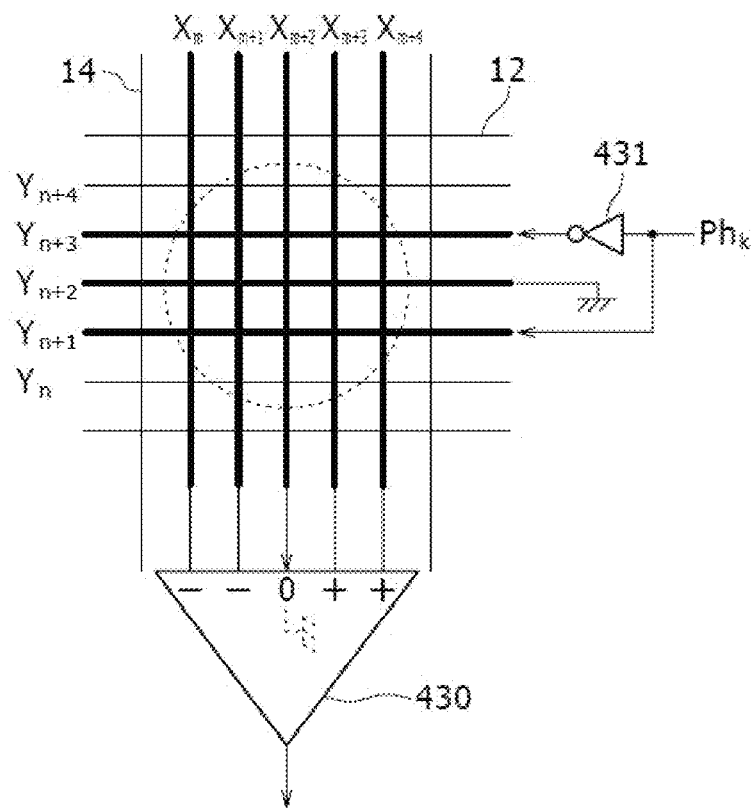

FIG. 73 illustrates a relationship between a supplying form of periodic signals by the transmission section and a detection form of a signal by the reception section according to the present example.

In the example shown in FIG. 73, the reception section has a configuration similar to that of the example shown in FIG. 72. Meanwhile, in the transmission section, spread codes of the same phase difference $Ph_k$ are supplied collectively to three transmission conductors $Y_{n+1}$ to $Y_{n+3}$ which are positioned substantially adjacent to each other. The phases of the spread codes are set to the "same phase, ground, opposite phase" in the ascending order of the index of the transmission conductors 12. In order to implement this, the spread code of the phase difference $Ph_k$ is supplied to the transmission conductor $Y_{n+1}$ without changing the phase thereof, and the centrally located transmission conductor $Y_{n+2}$ is connected to the ground, as seen in FIG. 73. Further, the spread code of the phase difference $Ph_k$ is supplied to the transmission conductor $Y_{n+3}$ through a phase inverter 431.

In the present example, the number of transmission conductors 12, to which spread codes of the same phase difference $Ph_k$ are to be supplied in the transmission conductor array 11 disposed at a comparatively remote position from the detection surface, is set smaller than the number of reception conductors 14 to be collectively used for detection in the reception section in this manner. Thus, the spread (width) of the level curve of an output signal by the transmission section on the detection surface becomes substantially equal to the spread (width) of the level curve of an output signal by the reception section. In other words, the aperture ratio or aspect ratio of the spreads of the level curves on the reception side and the transmission side can be made close to one. As a result, where a pointer with a circular opposing face is disposed on the sensor section 10, the pointer can be detected not as an elliptic shape but as a circular shape, as indicated by a broken line in FIG. 73.

In the example described above, the number of transmission conductors and/or reception conductors to be selected in a minimum detection region is varied. However, the shape (e.g., the width) of transmission conductors and reception conductors, the arrangement pattern of these conductors (e.g., a circular pattern or a tortoise-shaped pattern), or the pitch of conductors may be varied to adjust the aperture ratio or aspect ratio of the spreads of the level curves on the reception side and the transmission side.

In the example described above with reference to FIG. 73, a differential amplifier is used as the amplifier in the reception section. However, an amplifier having a single input end may be used instead. Further, in the example described above, the centrally located transmission conductor 12 among a plurality of transmission conductors 12 to which spread codes are to be supplied collectively, and the centrally located reception conductor 14 among a plurality of reception conductors 14 to be connected collectively to one differential amplifier are both grounded. However, the centrally located transmission conductor 12 and/or the centrally located reception conductor 14 need not be grounded. For example, the centrally located transmission conductor 12 and/or the centrally located reception conductor 14 may be connected to a predetermined reference voltage terminal.

[Modification 27]

In modifications 14 to 26 described above, various supplying forms of spread codes and various detection forms of a detection signal are individually carried out separately from each other. However, a plurality of the configurations described above in connection with modifications 14 to 26 may also be applied in any suitable combination, in an interchangeable manner, in a single pointer detection apparatus according to a particular application of the pointer detection apparatus, required sensitivity, and so forth.

Figure 74:
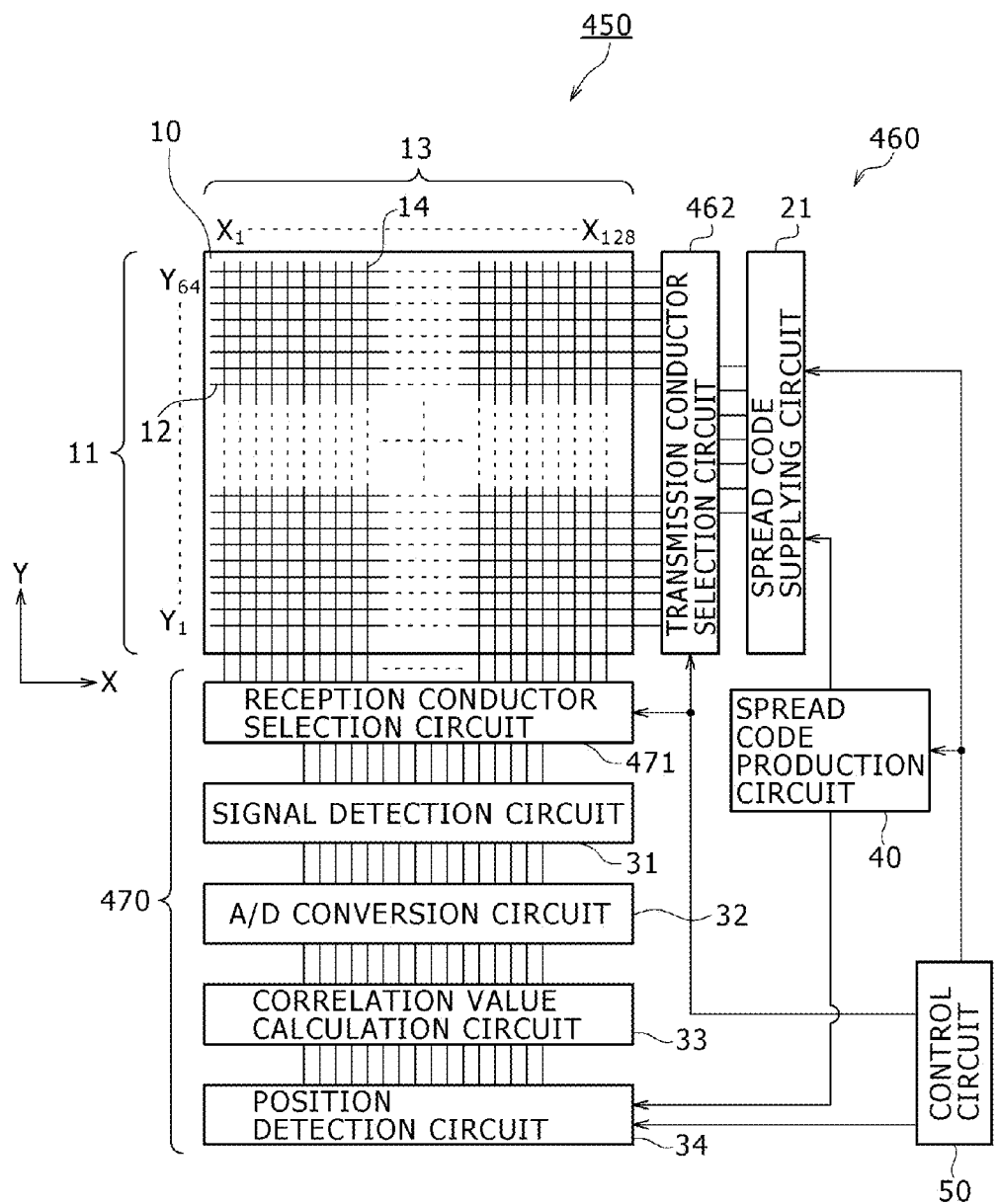
FIG. 74 is a block diagram showing a general configuration of a pointer detection apparatus according to modification 27.

FIG. 74 shows an example of a configuration of a pointer detection apparatus having a combination/interchanging function described above, as modification 27. In FIG. 74, elements like those in the first embodiment described above with reference to FIG. 1 are denoted by like reference characters.

Referring to FIG. 74, the pointer detection apparatus 450 shown includes a sensor section 10, a transmission section 460, a reception section 470, a spread code production circuit 40, and a control circuit 50 for controlling operation of the components mentions. The sensor section 10, the position detection circuit 34, the spread code production circuit 40, and the control circuit 50 have a configuration similar to that of the first embodiment.

The transmission section 460 includes a spread code supplying circuit 21 and a transmission conductor selection circuit 462. The transmission conductor selection circuit 462 is disposed on the output side of the spread code supplying circuit 21. The spread code supplying circuit 21 has a configuration similar to that of the first embodiment.

The transmission conductor selection circuit 462 is provided in order to supply spread codes supplied from the spread code supplying circuit 21 to predetermined transmission conductors 12. In particular, the transmission conductor selection circuit 462 selects the number and the position(s) of those transmission conductors 12, to which spread codes of the same phase difference are to be supplied, the phase relationship of the spread codes to be supplied, the number of chips in which the code $PN_i$ of a one-code length is to be supplied successively, and so forth in response to an application of the pointer detection apparatus. For example, the transmission conductor selection circuit 462 selects predetermined transmission conductors 12 in response to one of the supplying forms of spread codes described above in connection with modifications 14 to 26. The selection and switching operation of a supplying form by the transmission conductor selection circuit 462 is controlled by the control circuit 50.

The reception section 470 includes a reception conductor selection circuit 471, a signal detection circuit 31, an A/D conversion circuit 32, a correlation value calculation circuit 33, and a position detection circuit 34. Signals from the reception conductors 14 selected by the reception conductor selection circuit 471 are supplied to the signal detection circuit 31. Signals output from the signal detection circuit 31 are converted from analog signals into digital signals by the A/D conversion circuit 32 and then supplied to the correlation value calculation circuit 33. The signal detection circuit 31, A/D conversion circuit 32, and correlation value calculation circuit 33 have a configuration similar to that of the first embodiment.

The reception conductor selection circuit 471 selects a detection form of an output signal from the reception conductor array 13, for example, in response to the supplying form of spread codes to the transmission conductors 12, and switches to the selected detection form. In particular, the reception conductor selection circuit 471 selects the number and the positional relationship of reception conductors 14 to be connected to the input terminals of the I/V conversion circuits provided in the signal detection circuit 31, the process of addition or subtraction to be executed by the differential amplifier and so forth, in response to the supplying form of spread codes, an application of the pointer detection apparatus, and so forth. For example, the reception conductor selection circuit 471 selects one of the detection forms of an output signal described above in connection with modifications 14 to 26. The selection and switching operation of a detection form by the reception conductor selection circuit 471 is controlled by the control circuit 50.

In the configuration described above, the single pointer detection apparatus 450 can selectively set the supplying form of spread codes to the transmission conductor array 11 and the detection form of an output signal from the reception conductor array 13 in response to an application of the pointer detection apparatus, required sensitivity, and so forth. Therefore, the pointer detection apparatus 450 of the present example can be used in various applications.

The present configuration is described as applied to the first embodiment. However, the present configuration can be applied also to the second, third, and fourth embodiments, and similar effects can be achieved.

[Modification 28]

In the embodiments and the modifications described above, spread codes are supplied from one end side of the transmission conductors 12. However, the configuration just described gives rise to a problem of a drop of the level or a delay of the phase of a detection signal due to floating capacitance of transmission lines of spread codes. This problem is described more particularly with reference to FIGS. 75A and 75B.

FIG. 75A illustrates a manner in which a spread code of the phase difference $Ph_k$ is supplied to a predetermined transmission conductor $Y_k$. FIG. 75B illustrates a variation of the ratio between the level of a detection signal obtained by the reception conductors 14 and a phase delay when a spread code of the phase difference $Ph_k$ is supplied to the transmission conductor $Y_k$. In FIG. 75B, the axis of abscissa indicates the position of the reception conductors 14 and the axis of ordinate indicates the ratio between the level of the detection signal and the phase delay, that is, the level/phase ratio. Further, FIG. 75B shows the variation of the level/phase ratio with regard to detection signals from five reception conductors 14, that is, from reception conductors $X_m$, $X_{m+2}$, $X_{m+4}$, $X_{m+6}$ and $X_{m+8}$.

Assume a spread code or supplying signal is supplied from a one-end side of the transmission conductor $Y_k$, in the example of FIG. 75A, from the right-hand side of the transmission conductor 12. As the distance from the supplying side of the spread code increases toward the reception conductor $X_m$ remote from the reception conductor $X_{m+8}$, which is positioned adjacent to the supplying side of the spread code, the level of the detection signal from the reception conductor 14 drops due to an influence of the floating capacitance in the transmission line carrying the supplying signal. Also, the phase delay of the detection signal increases as the distance from the supplying side of the spread code increases. As a result, the level/phase ratio between the level and the phase delay of the detection signal linearly decreases from the reception conductor $X_{m+8}$ toward the reception conductor $X_m$, as seen in FIG. 75B. The level difference and the phase difference of a detection signal, which appear between the reception conductor $X_{m+8}$ positioned adjacent to the supplying side of the spread code and the reception conductor $X_m$ positioned remotely from the supplying side of the spread code, may cause coordinate displacement during position detection. Particularly where the sensor section is formed with ITO films as the transmission conductors 12 and the reception conductors 14, the resistance value of the conductors is high and the influence of the transmission line upon the spread code becomes great.

Modification 28 provides a configuration which eliminates a problem described above. FIGS. 76A and 76B illustrate a supplying form of spread codes and a variation characteristic of the ratio between the level and the phase delay (the level/phase ratio) of detection signals in the present example.

In the present example, spread codes of the same phase difference $Ph_k$ are supplied at the same time from the opposite ends of a transmission conductor 12. In order to implement this supplying form, for example, in the configurations of the first to third embodiments, the output terminals of two spread code supplying circuits should be connected to the opposite ends of the corresponding transmission conductors 12. Further, in the fourth embodiment, the output terminals of two transmission conductor selection circuits should be connected to the opposite ends of the corresponding transmission conductors 12. Alternatively, one spread code supplying circuit or one transmission conductor selection circuit may be provided, and its output may be split into two to be respectively supplied to the opposite ends of the transmission conductors 12.

In this instance, the ratio between the level and the phase delay of the detection signal, that is, the level/phase ratio, is lowest, for example, at the reception conductor $X_{m+4}$, which is positioned farthest from the supplying sides of the spread code, that is, from the opposite ends of the transmission conductors 12, as see in FIG. 76B. However, the distance to the reception conductor $X_{m+4}$ positioned farthest from either of the supplying sides of the spread code is one half that in the case of the one-side supplying scheme described above with reference to FIGS. 75A and 75B. Therefore, the decreasing ratio between the level and the phase delay of the detection signal, that is, of the level/phase ratio, is moderated.

In the present example, since a spread code is supplied at the same time from the opposite ends of a transmission medium 12, the level drop and the phase delay of the detection signal can be moderated in comparison with those in a conventional one-side supplying system. In the present example, the level difference and the phase difference between the reception conductors 14 decrease significantly, and a drop of detection sensitivity can be suppressed.

In the present example, spread codes are supplied at the same time from the opposite ends of a single transmission conductor 12 ($Y_k$). However, the present modification can also be applied to supply spread codes of the same phase to a plurality of transmission conductors, as described above in connection with modifications 14 to 26.

[Modification 29]

In the pointer detection apparatus 100 of the first embodiment, it is possible to refer to the level of an output signal or correlation value of the correlation value calculation circuit 33 in order to determine a reception gain value, and to feed back the reception gain value to the signal detection circuit 31 to set another reception gain value. However, in this technique of setting the reception gain value, if noise or the like is superposed on a signal received by the signal detection circuit 31, the level of the detection signal may possibly exceed a preset reception gain value. In this instance, it is possible that the detection signal may be saturated in the signal detection circuit 31 and, as a result, the level of the signal component to be detected may drop.

Modification 29 provides a configuration which eliminates the problem described above and controls the reception gain value favorably. While the configuration of the present example is applied to the pointer detection apparatus 100 of the first embodiment, the configuration of the present invention can be applied also to the pointer detection apparatus of the second to fourth embodiments and similar effects can be achieved.

Figure 77:
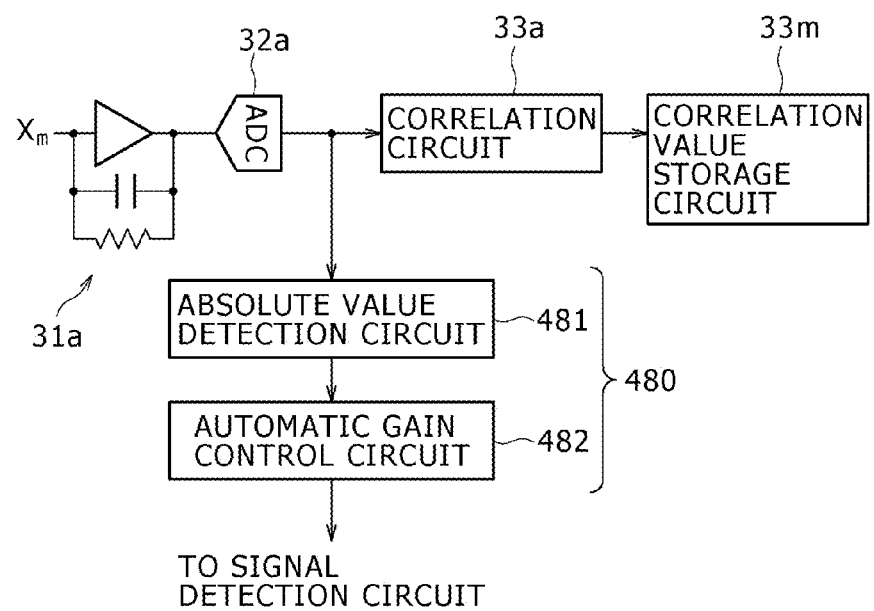
FIG. 77 is a block diagram showing a configuration of a reception gain value setting circuit of a pointer detection apparatus according to modification 29.

FIG. 77 shows a block configuration of the reception gain value setting circuit of the present example and associated circuits. Referring to FIG. 77, the reception gain value setting circuit 480 of the present example includes an absolute value detection circuit 481 and an automatic gain control circuit 482 disposed on the output side of the absolute value detection circuit 481. The reception gain value setting circuit 480 is connected to the output terminal of an A/D converter 32a and controls the reception gain of a reception conductor 14 selected, for example, by the reception conductor selection circuit 471 described above with reference to FIG. 74. The absolute value detection circuit 481 in the reception gain value setting circuit 480 is connected at an input terminal thereof to the output terminal of the A/D converter 32a and at an output terminal thereof to the signal detection circuit 31, so that the gain of an amplifier of an I/V conversion circuit 31a provided in the signal detection circuit 31 is controlled.

The absolute value detection circuit 481 detects the signal intensity of an energy component of a signal output from the A/D converter 32a. A signal output from the A/D converter 32a includes not only a signal component or spread code component to be detected but also an unnecessary component such as noise, so that the absolute value detection circuit 481 detects the signal intensity of an energy component of the entire detection signal including the unnecessary signal component such as noise.

Figure 78:
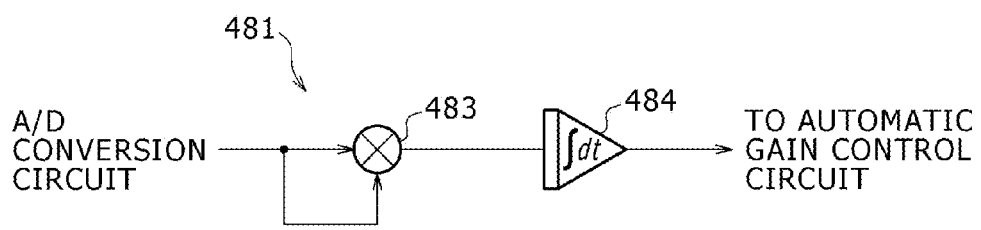
FIG. 78 is a circuit diagram showing a general configuration of an absolute value detection circuit in the reception gain value setting circuit of FIG. 77.

FIG. 78 shows an internal configuration of the absolute value detection circuit 481. Referring to FIG. 78, the absolute value detection circuit 481 includes an integrator 483 and another integrator 484 connected to an output terminal of the integrator 483.

The integrator 483 carries out squaring arithmetic operation of an output signal of the A/D converter 32a and outputs a resulting signal to the integrator 484. The output signal of the A/D converter 32a is input, after it is branched, to two input terminals of the integrator 483, and the input signals are multiplied by the integrator 483. The integrator 484 temporally integrates an output signal of the integrator 483 and outputs the integration signal to the automatic gain control circuit 482, which uses the integration signal for gain control.

The automatic gain control circuit 482 refers to the signal intensity of the energy component output from the absolute value detection circuit 481 to set a reception gain value. Thereupon, since the signal intensity of the energy component of the absolute value detection circuit 481 includes not only the signal component or spread code component to be detected but also noise and so forth, the automatic gain control circuit 482 sets the reception gain value based on the signal intensity of the energy component of the entire signal detected by the signal detection circuit 31. Then, the automatic gain control circuit 482 outputs the set reception gain value to the signal detection circuit 31.

According to the reception gain value setting technique of the present example, the signal intensity of the energy component of a signal which includes not only a signal component or spread code component to be detected but also noise and so forth is detected, and the reception gain value is set based on the signal intensity. In this instance, even if noise is superposed in the signal received by the signal detection circuit 31, the reception gain value can be set appropriately.

Any suitable technique for absolute value detection can be used as long as it can detect the level of a signal including a signal component to be detected as well as noise. For example, in addition to the technique described above, a technique of integrating the absolute value of the level of the output signal or a like method can be used. Further, as the absolute value detection process, either a digital signal process or an analog signal process may be used.

[Modification 30]

Modification 30 provides a technique suitable for detecting pressing force (hereinafter referred to as "pointing pressure") when a pointer touches the detection surface of the sensor section in the pointer detection apparatus of the present invention.

In a conventional technique, the pointing pressure is calculated based on the touched area of a pointer on the detection surface of the sensor section. However, this technique has a problem. Specifically, when a user has a thin finger, even when he touches strongly on the detection surface of the sensor section, the touching is identified as a light touch because the touched area is small.

In order to eliminate this problem, the pointing pressure may be detected using a spatial distribution or mapping data of the level of the detection signal or correlation value at cross points obtained upon position detection of a pointer. The technique is described particularly with reference to FIGS. 79 and 80. The detection of the pointing pressure is carried out by the position detection circuit of the reception section.

Figure 79:
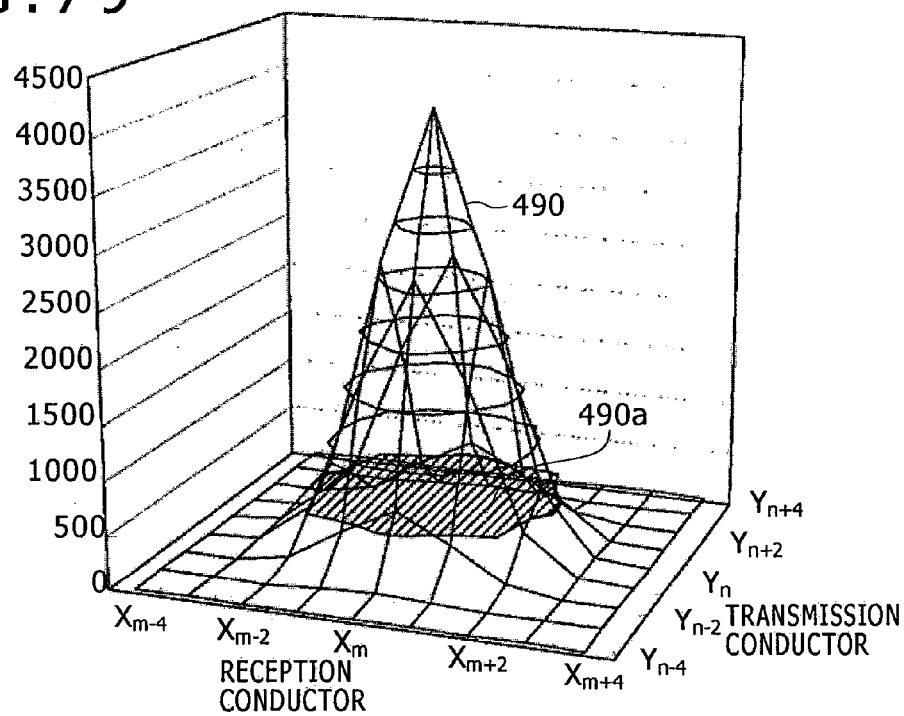
FIGS. 79, 80 and 81 are diagrammatic views illustrating a principle of determining a pointing pressure of a pointer according to modification 30.

FIG. 79 schematically illustrates a spatial distribution of the level of signals or correlation values produced by the correlation value storage circuit when a pointer touches the detection surface of the sensor section. In FIG. 79, the axis of abscissa indicates the position of the reception conductors 14, and an axis extending from the abscissa side toward the rear side of the figure indicates the position of the transmission conductors 12, while the axis of ordinate indicates the level of the detection signals or correlation values. The level along the axis of ordinate indicates a normalized value. Further, the example illustrated in FIG. 79 represents a spatial distribution of the level of detection signals when a pointer touches a cross point between the transmission conductor $Y_n$ and the reception conductor $X_m$. Furthermore, FIG. 79 illustrates a spatial distribution of the level only in a region defined by the transmission conductors $Y_{n-4}$ to $Y_{n+4}$ and the reception conductors $X_{m-4}$ to $X_{m+4}$ in order to simplify illustration and description.

The position detection circuit first reads out mapping data of the detection signal stored in the correlation value storage circuit and carries out an interpolation process or the like, based on the signal levels of the detection signal at cross points, to interpolate the signal levels between the cross points, so as to calculate a level curved surface 490 of a mountain shape which has an apex or summit at the cross point $[X_m, Y_n]$ at which the pointer touches. The position detection circuit calculates and obtains the level curved surface 490 by analyzing the detection signal.

In FIG. 79, the level curved surface 490 is produced by an interpolation process carried out for the correlation values at the cross points. However, the level curved surface 490 can also be produced by retaining the correlation value determined for each cross point as mapping data and carrying out an interpolation process for such mapping data. It is also possible to carry out an interpolation process for a correlation value determined for each cross point to produce and store mapping data and produce the level curved surface 490 from the mapping data obtained by the interpolation process.

Then, a signal processing is carried out to cut out the level curved surface 490 with (or at) a predetermined level plane 490a, which is indicated by slanting lines in FIG. 79. Further, another signal processing is carried out to determine the volume of a region defined by the level plane 490a and the level curved surface 490. It is to be noted that the area of the predetermined level plane 490a corresponds to a contact area (touched area) of the pointer.

Figure 80:
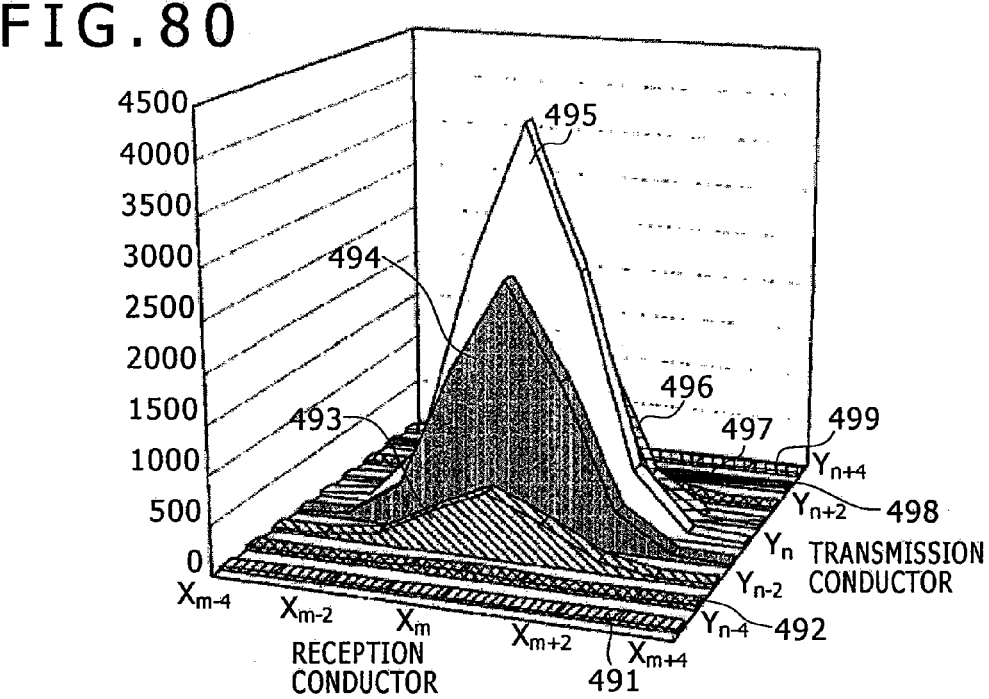

A technique of determining the volume of the region defined by the level plane 490*a* and the level curved surface 490 is described with reference to FIG. 80. First, the level curved surface 490 is divided into planes lying in the extending direction of the transmission conductors 12, as seen in FIG. 80. Consequently, divided planes 491 to 499 are produced, which extend along the extending direction of the transmission conductors $Y_{n-4}$ to $Y_{n+4}$, as seen in FIG. 80.

Then, the areas $Sa_1$ to $Sa_9$ of the divided planes 491 to 499 are determined, respectively. As the areas $Sa_1$ to $Sa_9$ of the divided planes 491 to 499, preferably the area of a region higher than a predetermined level value, that is, higher than the value of the level plane 490*a*, is used. Then, the calculated areas $Sa_1$ to $Sa_9$ are added, and a resulting sum value is determined as an approximate value of the volume in the region defined by the level plane 490*a* and the level curved surface 490. The volume of the region defined by the level plane 490*a* and the level curved surface 490 is a value corresponding to the pointing pressure, and as the pointing pressure increases, the volume also increases. Therefore, the pointing pressure can be determined based on the volume in the region defined by the level plane 490*a* and the level curved surface 490. In the present example, the signal processing described above is carried out to determine the pointing pressure of the pointer.

The volume of the region defined by the level plane 490*a* and the level curved surface 490 determined as described above may further be divided by the contact area (i.e., the touched area by the pointer). In this instance, a value corresponding to the pointing pressure per unit area of the contact region can be determined.

In this manner, in the present example, when a pointer touches the detection surface of the sensor section, a three-dimensional level curved surface of the detection signal or correlation values is calculated by the position detection circuit, and the volume of the region defined by the level curved surface is calculated to specify the pointing pressure. Therefore, the problem arising from the conventional pointing pressure detection technique described above can be eliminated, and a pointing pressure that is reflective of the actual touch by a user can be detected.

According to the pointing pressure detection technique described above, the level curved surface 490 is divided into a plurality of planes and the sum value of the areas of the divided planes, that is, the integration value of the areas, is determined as the volume of the level curved surface 490. In order to calculate the volume of the level curved surface 490 with a higher degree of accuracy, the areas of the divided planes may be weight-added in a numerical analysis fashion. Further, the calculation method of the volume is not limited to the summing the area values of the divided planes. The volume may be calculated, for example, by applying multi-dimensional curved surface approximation, such as trapezoidal shape approximation and square approximation.

Figure 81:
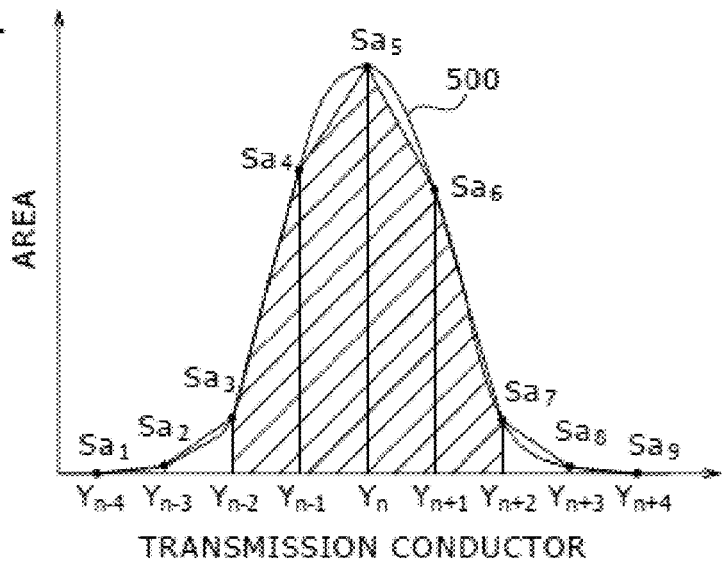

The following describes, with reference to FIG. 81, a procedure of determining a volume of a region defined by the level curved surface 490 (and the level plane 490*a*) using trapezoidal shape approximation, wherein the areas of divided planes are weight-added and summed.

FIG. 81 illustrates a relationship between the positions of the transmission conductors 12 and the areas $Sa_1$ to $Sa_9$ of the divided planes 491 to 499 determined by the technique described above with reference to FIG. 80. In FIG. 81, the axis of abscissa indicates the position of the transmission conductors 12 and the axis of ordinate indicates the area of the divided planes. A curve 500 in FIG. 81 is obtained by interconnecting data points of the areas $Sa_1$ to $Sa_9$.

The volume of the region defined by the level curved surface 490 corresponds to the area of a portion defined by the axis of abscissa and the curve 500 in FIG. 81. If the data points of the areas $Sa_1$ to $Sa_9$ are interconnected by linear line segments, four trapezoidal regions are formed between adjacent ones of the transmission conductors $Y_{n-2}$ and $Y_{n+2}$. In the trapezoidal shape approximation method, the area of the portion defined by the axis of abscissa in FIG. 81 and the curve 500 is approximated as the sum value of the areas of the four trapezoidal regions produced between the transmission conductors $Y_{n-2}$ and $Y_{n+2}$ in FIG. 81, that is, as the area of the portion indicated by slanting lines in FIG. 81. The volume is determined as follows.

First, a weight value is applied to each of the data points $Sa_3$ to $Sa_7$, which form the region indicated by slanting lines in FIG. 81, in accordance with trapezoidal approximation. For example, the weight 1 is applied to the data point $S_{a3}$, weight 2 to the data point $S_{a4}$, weight 2 to the data point $S_{a5}$, weight 2 to the data point $S_{a6}$ and weight 1 to the data point $S_{a7}$. The volume $V_1$ of the level curved surface 490 is determined by dividing the "sum value of the weighted areas of the divided planes" by an "average value of the weight values." The volume $V_1$ of the level curved surface 490 is given by:

$$\text{Volume } V_1 = (1 \times S_{a3} + 2 \times S_{a4} + 2 \times S_{a5} + 2 \times S_{a6} + 1 \times S_{a7})/2$$

Here, the "average value of the weight values," which is the value of the denominator in the equation above, is determined by dividing the "sum total of the weight values for the data points" by the "number of the trapezoids." In the example above, $(1+2+2+2+1)/4=2$.

When the technique of trapezoidal approximation described above is used, the error between the hypotenuses of the four trapezoids and the curve 500 in FIG. 81 is small. Thus, the error between a calculation result obtained using the trapezoidal approximation, that is, the area of the portion indicated by slanting lines, and the actual volume of the level curved surface 490, becomes small. Therefore, where the present technique is used, the volume of the level curved surface 490 can be determined with relative accuracy. Further, where such approximation calculation is used to determine the volume of the level curved surface 490, the computational load on the position calculation circuit can be reduced.

In the technique described above wherein the areas of divided planes are weight-added and summed, the square approximation may be used in place of the trapezoidal approximation. When square approximation is used, a weighted value in accordance with the square approximation is applied to each of the data points $Sa_3$ to $Sa_7$, which form the region indicated by slanting lines in FIG. 81. For example, weight 1 is applied to the data point $S_{a3}$, weight 4 to the data point $S_{a4}$, weight 2 to the data point $S_{a5}$, weight 4 to the data point $S_{a6}$ and weight 1 to the data point $S_{a7}$. In this instance, the volume $V_2$ of the level curved surface 490 is given by $$\text{Volume } V_2 = (1 \times S_{a3} + 4 \times S_{a4} + 2 \times S_{a5} + 4 \times S_{a6} + 1 \times S_{a7})/3$$

Here, the "average value of the weight values," which is the value of the denominator in the equation above, is determined by dividing the "sum total of the weight values for the data points" by the "number of the trapezoids." In the example above, $(1+4+2+4+1)/4=3$.

[Modification 31]

In the first embodiment described above, when a palm of a hand or the like touches a reception conductor 14 therealong as described above with reference to FIGS. 16 and 17, the reference level of a correlation characteristic calculated by the reception section sometimes fluctuates, resulting in a reduced accuracy in detecting the touched position. The "reference level" of a correlation characteristic means a level during the time region other than time 0 to 3τ in FIG. 17, and indicates a level obtained in a state where no interaction occurs between the pointer 19 and the sensor section 10. Fluctuation of the reference level results in difficulty to accurately detect the touched position.

Modification 31 provides an example of a configuration that would solve the above problem. Although the configuration of the present example is applied to the pointer detection apparatus of the first embodiment, this configuration can be applied also to the pointer detection apparatus of the second to fourth embodiments and similar effects can be achieved.

In the first embodiment described above, a plurality of spread codes produced by the spread code supplying circuit 21 and having phase differences from each other are individually supplied to corresponding ones of the transmission conductors 12. However, in the present example, a predetermined one of a plurality of spread codes is supplied directly to the reception section without the intervention of a transmission conductor 12, and the spread code is used as a calibration signal or a reference signal for a reference level of a correlation characteristic in the reception section.

Figure 82:
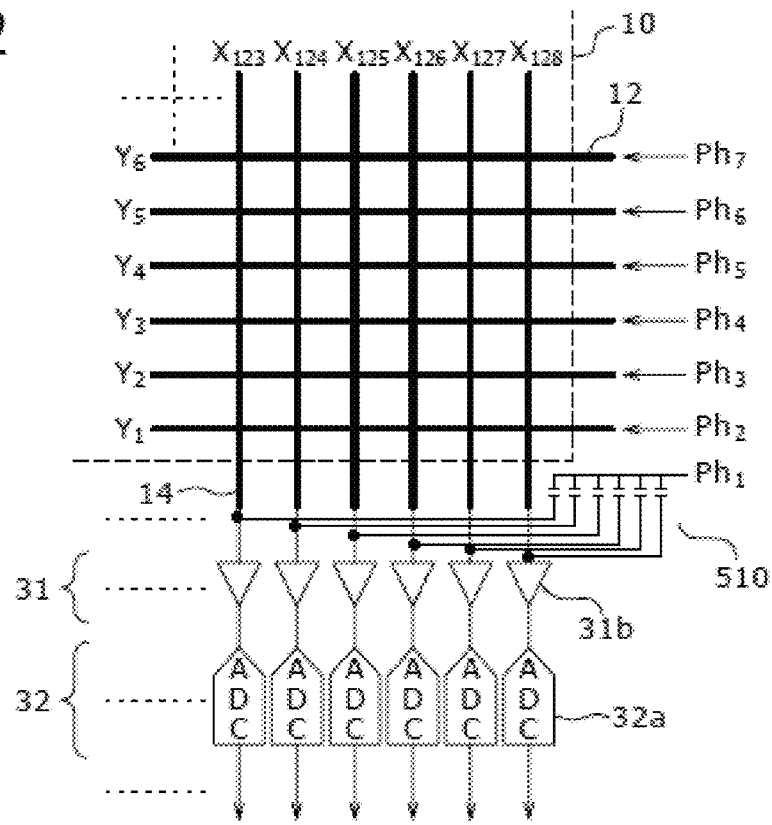
FIG. 82 is a schematic view showing a general configuration of a pointer detection apparatus according to modification 31.

FIG. 82 illustrates a relationship between a supplying form of spread codes and a detection form in the reception section in the pointer detection apparatus of the present example. In FIG. 82, elements like those in the pointer detection apparatus of the first embodiment described above with reference to FIGS. 1 to 8 are denoted by like reference characters. Characteristic portions of the configuration example of modification 31 in FIG. 82 are described in detail, while circuit components similar to those described above are briefly described. In particular, a region on the sensor section 10, where transmission conductors $Y_1$ to $Y_6$ and reception conductors $X_{123}$ to $X_{128}$ cross each other, is described. Further, FIG. 82 illustrates only an amplifier 31b as an internal component of the signal detection circuit 31 for simplified description of a common circuit configuration described above.

In the example shown in FIG. 82, an output terminal of the spread code supplying circuit for a spread code having the phase difference $Ph_1$ is connected to a plurality of output terminals of the signal detection circuit 31, through a capacitor 510, without being connected to a transmission conductor 12. In other words, in the example shown in FIG. 82, the spread code of the phase difference $Ph_1$ is used as a calibration signal for a reference level for a correlation characteristic. In place of the capacitor 510, a resistor may be connected between the output terminal of the spread code supplying circuit for the spread code of the phase difference $Ph_1$ and the output terminals of the signal detection circuit 31.

In the configuration of the present example, since current corresponding to a combined signal of the spread codes of the phase differences $Ph_2$ to $Ph_7$ is output from each of the reception conductors 14 as in the first embodiment, a position detection of a pointer can be carried out as in the first embodiment.

Further, in the example shown in FIG. 82, the spread code of the phase difference $Ph_1$, that is, a current signal corresponding to the spread code of the phase difference $Ph_1$, is input to the reception section without the intervention of any of the transmission conductors 12 and the reception conductors 14. Therefore, a signal component of the spread code of the phase difference $Ph_1$ is independent of the influence of the pointer 19 or the influence of noise to the transmission conductors 12 and the reception conductors 14 which form the sensor section 10. Thus, a stable correlation characteristic is obtained with regard to the spread code of the phase difference $Ph_1$. In other words, the reference level for the correlation characteristic with regard to the spread code of the phase difference $Ph_1$ exhibits a stable value without fluctuation. In the example of FIG. 82, since the spread code of the phase difference $Ph_1$ has the same phase as or the closest phase to that of the original spread code, the reference level of the correlation characteristic, detected immediately after the position detection is started, is used as the reference level of the correlation characteristic of the spread code of the phase difference $Ph_1$.

In the example shown in FIG. 82, the reference level is detected immediately after the position detection process is started. Then, the reference level is used as a reference to correct a later reference level of the correlation characteristic. By setting and correcting the reference level of the correlation characteristic in this manner, fluctuation of the reference level of the correlation characteristic can be suppressed. Since the pointer detection apparatus includes a signal path along which a spread code is supplied, not to the transmission conductor 12, but directly to the signal detection circuit 31 to be subjected to a correlation process and used as a reference, even when a palm of a hand or the like is touching along the same reception conductor 14, the influence of any fluctuation associated with the reception conductor 14 upon the correlation characteristic is suppressed. Consequently, the touched position on the sensor section 10 can be detected accurately.

When the sensor is not touched by a pointer, the correlation characteristic has a predetermined value in principle. For example, the correction characteristic should have a zero value when a compensation signal is used and added. The level of the correlation characteristic is fluctuated by, for example, noise received by the sensor section 10. However, since the present example uses the spread code of the phase difference $Ph_1$ as a calibration signal, which is not influenced by the sensor section 10, when the sensor section 10 is not touched by a pointer, the correlation characteristic can be adjusted to a fixed characteristic, for example, to zero (NULL adjustment) based on the reference level.

Therefore, in the present configuration, when the sensor section is not touched by a pointer, because the spread code of the phase difference $Ph_1$ is used to carry out NULL adjustment in advance, a position detection and setting of a reference level of the correlation characteristic can be carried out in a corrected state without being influenced by the noise from the sensor section 10. In this instance, even when a palm of a hand or the like touches along the same reception conductor 14, the touched position can be detected with a higher degree of accuracy.

In the example described above with reference to FIG. 82, a spread code of the phase difference $Ph_1$, that is, a current signal corresponding to the spread code of the phase difference $Ph_1$, is input to the output terminals of the signal detection circuit 31 through the capacitor 510 or the like. However, the spread code of the phase difference $Ph_1$ may be combined with an output signal of the A/D converters 32a in the A/D conversion circuit through the capacitor 510 or the like. An example of this configuration is shown in FIG. 83.

Figure 83:
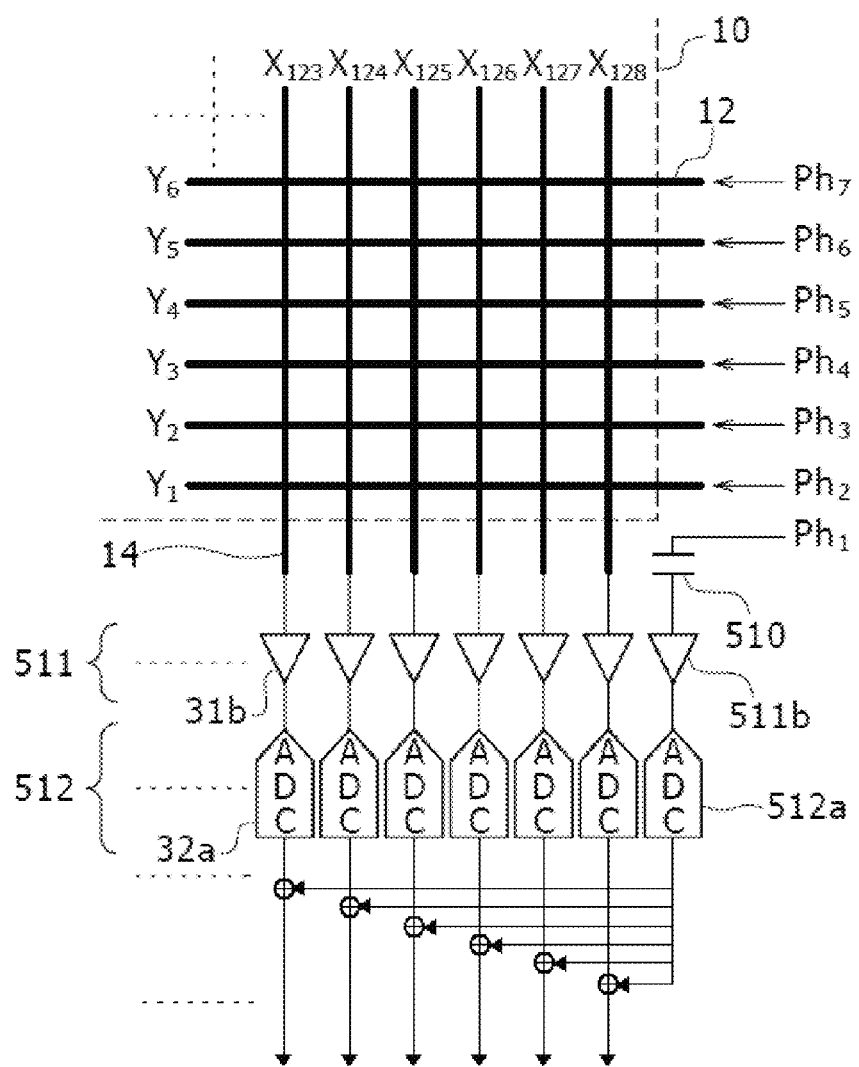
FIG. 83 is a schematic view showing a general configuration of another pointer detection apparatus according to modification 31.
Figure 84A:
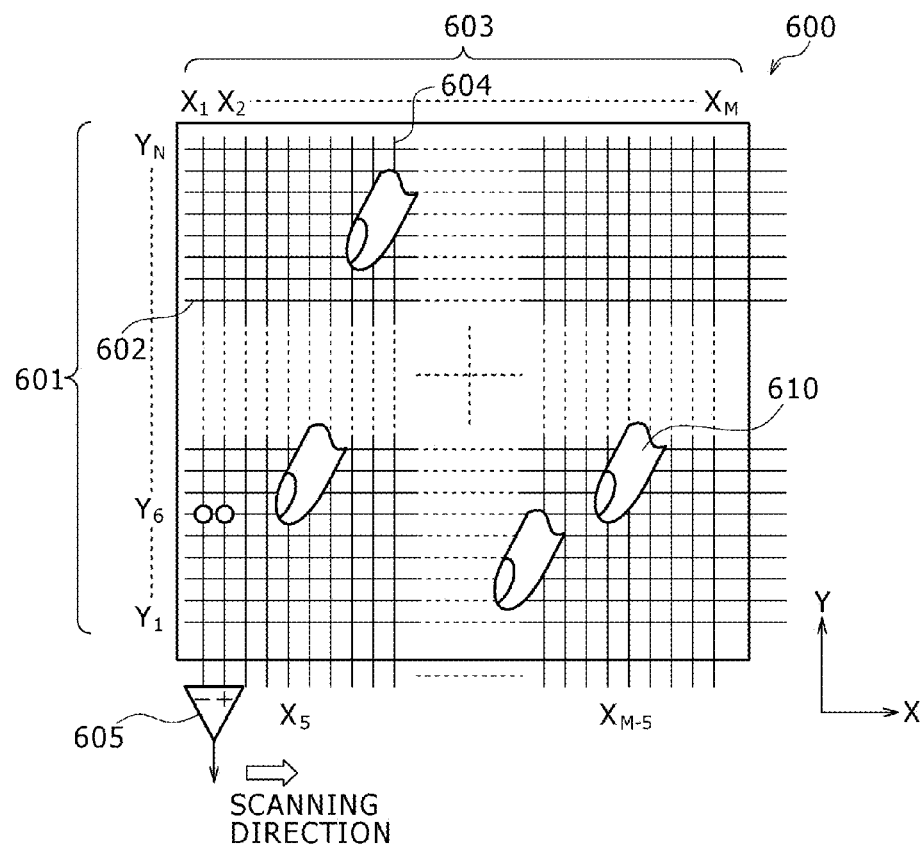
FIG. 84A is a schematic view showing a general configuration of a conventional pointer detection apparatus of the cross point type electrostatic coupling type.
Figure 84B:
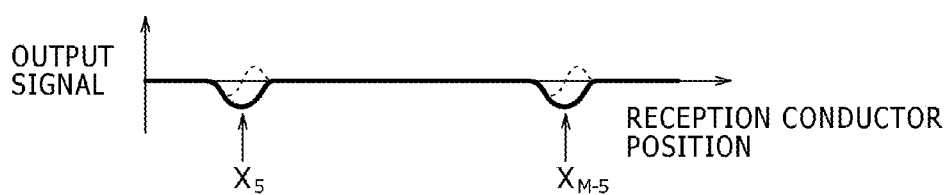
FIG. 84B is a waveform diagram illustrating a waveform of an output signal of the pointer detection apparatus of FIG. 84A.

The example shown in FIG. 83 is different than the configuration shown in FIG. 82 wherein correction of a reference level of the correlation characteristic was carried out in the form of an analog signal. In the present example, on the other hand, correction of the reference level of the correlation characteristic is carried out after an analog signal is converted into a digital signal. Referring to FIG. 83, an I/V conversion circuit for amplifying a current signal corresponding to the spread code of the phase difference $Ph_1$ and converting the current signal into a voltage signal is provided in a signal detection circuit 511 (the signal detection circuit is described already and, in FIG. 83, only amplifiers 511*b* which are components of the signal detection circuit are shown). Further, A/D converters 512*a* configured to carry out analog to digital conversion of the spread code of the phase difference $Ph_1$ supplied thereto without the intervention of the transmission conductors 12, which form the sensor section 10, is provided in an A/D conversion circuit 512. Thus, a digital arithmetic operation process is carried out for correcting the reference level between a signal output from the A/D converter 512*a* and signals output from the other A/D converters 512*a*, which form the A/D converters 32*a*, configured to carry out analog to digital conversion of reception signals from the reception conductors 14. The signals from the reception conductors for which the digital arithmetic operation process for correction of the reference level has been carried out are supplied to the correlation value calculation circuit, which carries out a calculation of a correlation value.

The configuration example shown in FIG. 83 can carry out position detection, NULL adjustment, and reference level adjustment of the correlation characteristic in a manner similar to the example shown in FIG. 82.

In the example described above, one spread code is used as a calibration signal for reference level adjustment of the correlation characteristic. However, a plurality of spread codes produced by the spread code supplying circuit may be used as calibration signals.

[Modification 32]

While in the first to fourth embodiments and modifications 1 to 31 described above, one type of spread code having orthogonality is supplied to one transmission conductor 12, the present invention is not limited to this implementation. Plural types of spread codes having different orthogonalities may be combined and supplied to one transmission conductor 12. Such codes are hereinafter referred to as "multiple orthogonality codes." A configuration of this example is described as modification 32 below without referring to the drawings.

The transmission section of the position detector includes an orthogonal code production circuit for producing plural types of different orthogonal codes, i.e., multiple orthogonality codes. Also, signals to be supplied to the transmission conductors 12 may be stored in advance in a storage circuit such that the transmission section carries out readout control of the storage circuit. It is also possible to adopt a different configuration in which plural types of different orthogonal codes (multiple orthogonality codes) to be supplied to the transmission conductors 12 are stored in the storage circuit in advance, and readout control is carried out to supply the multiple orthogonality codes to the transmission conductors 12.

Further, though not shown, the reception section of the position detector of the present example is configured such that a plurality of correlation circuits respectively corresponding to the multiple orthogonality codes are provided, and a correlation characteristic is calculated separately for each of the multiple orthogonality code. The reception section of the present example may include a circuit, which selectively uses one of the multiple orthogonality codes whose detected correlation characteristic exhibits a lesser amount of noise.

In the above configuration, if a particular one of the multiple orthogonality codes suffers from high noise, it is possible to select another one of the multiple orthogonality codes and use the correlation characteristic of the selected orthogonality code to carry out a position detection. Thus, position detection of a pointer can be carried out favorably with the influence of noise minimized.

[Modification 33]

In the first to fourth embodiments and modifications 1 to 31 described above, a spread code is used as an orthogonal code. However, any code can be used if it allows phase multiplexing similar to the spread code. For example, a code called complementary code, the Hadamard code, and so forth, can be used.

While modifications 1 to 33 are applied separately to some of the first to fourth embodiments, modifications 1 to 33 may also be applied in a suitable combination to some of the first to fourth embodiments.

While preferred embodiments of the present invention have been described using specific terms, such description is for illustrative purpose only, and it is to be understood that changes and variations may be made without departing from the spirit and scope of the following claims.

What is claimed is:

1. A pointer position detection apparatus, comprising:
   (a) a conductor pattern including a plurality of first conductors disposed in a first direction and a plurality of second conductors disposed in a second direction which crosses the first direction;
   (b) a code string signal production circuit configured to produce a plurality of orthogonal code signals, each having a predetermined time difference from each other, based on a code string having an orthogonal characteristic, and to supply the produced plurality of orthogonal code signals to the plurality of first conductors;
   (c) a signal detection circuit configured to be connected to the plurality of second conductors to receive signals from the plurality of second conductors generated in response to the plurality of orthogonal code signals supplied to the plurality of first conductors, and to detect and output a signal corresponding to a variation of capacitance caused between the conductor pattern and a pointer;
   (d) an analog to digital conversion circuit configured to convert the signal output from the signal detection circuit into a digital signal comprising a word string formed of a plurality of bits;
   (e) a correlation detection circuit configured to determine correlation values between code strings provided for correlation and the word string output from the analog to digital conversion circuit;
   (f) a memory circuit configured to store the correlation values, each having a plurality of bits output from the correlation detection circuit; and
   (g) a position calculation circuit configured to calculate a position on the conductor pattern pointed to by the pointer based on the correlation values;
   wherein a number of the plurality of orthogonal code signals to be produced by the code string signal production circuit is 4N−1 each having the same chip length, N being an integer equal to or greater than 2, and the code string signal production circuit is further configured to produce a determined number of compensation signal(s), the number of the compensation signal(s) being less than 4N−1 and set such that the sum of 4N−1 and the number of the compensation signal(s) is an even number and a sum total of signal values output from the plurality of second conductors becomes zero in case the pointer is not present on the conductor pattern.

2. The pointer detection apparatus according to claim 1, wherein the code string signal production circuit includes a shift register formed from a plurality of registers configured to successively shift a phase of an input signal thereto in response to a clock signal and to output a resulting signal, wherein the shift register holds the plurality of orthogonal code signals.

3. The pointer detection apparatus according to claim 1, wherein the code string signal production circuit includes a code string storage circuit configured to store the plurality of orthogonal code signals, wherein the plurality of orthogonal code signals are read out from the code string storage circuit in accordance with a determined sequence.

4. The pointer detection apparatus according to claim 1, wherein the code string signal production circuit includes a signal modulation circuit configured to carry out determined modulation of the plurality of orthogonal code signals, and
wherein the signal detection circuit includes a signal demodulation circuit configured to carry out signal demodulation, corresponding to the determined modulation carried out by the signal modulation circuit, of signals output from the plurality of second conductors.

5. The pointer detection apparatus according to claim 1, wherein the code string signal production circuit is further configured to carry out determined modulation of the plurality of orthogonal code signals, and
wherein the signal detection circuit is further configured to carry out signal demodulation, corresponding to the determined modulation, of signals output from the plurality of second conductors.

6. The pointer detection apparatus according to claim 1, wherein the code string signal production circuit includes a signal storage circuit configured to store a plurality of modulated orthogonal code signals obtained by modulating the plurality of orthogonal code signals, wherein the plurality of modulated orthogonal code signals are read out from the signal storage circuit in accordance with a determined sequence and supplied to the plurality of first conductors, and
wherein the signal detection circuit includes a signal demodulation circuit configured to carry out signal demodulation, corresponding to the determined modulation, of signals output from the plurality of second conductors.

7. The pointer detection apparatus according to claim 1, wherein the code string signal production circuit is configured to produce the plurality of orthogonal code signals having a code string length of $4N-1$, N being an integer equal to or greater than 2, wherein a number of the first conductors disposed in the first direction is at least $2\times(4N-1)$, and
wherein the produced plurality of orthogonal code signals are supplied to a first group of first conductors that are positioned adjacent to each other, and successively supplied to a second group of first conductors that are positioned adjacent to each other, wherein at least one of the first group of first conductors overlaps with at least one of the second group of first conductors.

8. The pointer detection apparatus according to claim 1, wherein the compensation signal produced by the code string signal production circuit is supplied to a conductor, which is disposed adjacent to one side of the plurality of first conductors to which the produced $4N-1$ orthogonal code signals are supplied.

9. The pointer detection apparatus according to claim 1, wherein the compensation signal is supplied directly to the signal detection circuit, without being supplied to the plurality of first conductors.

10. The pointer detection apparatus according to claim 1, wherein a number of the plurality of first conductors disposed in the first direction is at least $2\times(4N-1)$ and each of the $4N-1$ orthogonal code signals is supplied to a pair of the first conductors that are positioned adjacent to each other.

11. The pointer detection apparatus according to claim 1, wherein, when it is recognized, based on an output signal from the correlation detection circuit, that the conductor pattern is not pointed to by the pointer, the plurality of second conductors are selectively skipped and are connected to the signal detection circuit.

12. The pointer detection apparatus according to claim 1, wherein the plurality of orthogonal code signals produced by the code string signal production circuit are divided into first orthogonal code signals to be supplied to the plurality of first conductors and second orthogonal code signal(s) to be supplied as a reference signal for use in the correlation detection circuit without being supplied to the plurality of first conductors.

13. The pointer detection apparatus according to claim 12, wherein the reference signal is supplied to an input of the signal detection circuit to provide a correlation reference level in an analog domain.

14. The pointer detection apparatus according to claim 12, wherein the reference signal is supplied to an output of the analog to digital conversion circuit to provide a correlation reference level in a digital domain.

15. The pointer detection apparatus according to claim 1, wherein the code string signal production circuit is further configured to produce a second plurality of orthogonal code signals based on a second code string having an orthogonal characteristic, and to supply a combination of the second plurality of orthogonal code signals produced based on the second code string and the plurality of orthogonal code signals produced based on the original code string to the plurality of first conductors.

16. The pointer detection apparatus according to claim 1, wherein the plurality of first conductors disposed in the first direction are divided into a plurality of groups, and the plurality of orthogonal code signals are supplied to corresponding ones of the plurality of groups, respectively.

17. The pointer detection apparatus according to claim 1, wherein the conductor pattern is disposed on one surface of a substrate,
wherein the plurality of first conductors and the plurality of second conductors are electrically isolated from each other by an insulating member disposed in a region in which the plurality of first conductors and the plurality of second conductors cross each other; and
wherein each of the plurality of second conductors is formed in a pattern of a line shape and each of the plurality of first conductors is formed in a pattern of a plurality of land shapes electrically connected to each other and a signal from the code string signal production circuit is supplied to the pattern of a plurality of land shapes.

18. The pointer detection apparatus according to claim 1, wherein the plurality of first conductors disposed in the first direction are disposed on one surface of a substrate and the plurality of second conductors disposed in the second direction which crosses the first direction are disposed on the other surface of the substrate.

19. The pointer detection apparatus according to claim 1, wherein the plurality of orthogonal code signals produced by the code string signal production circuit are supplied from opposite ends of the first conductors.

20. The pointer detection apparatus according to claim 1, wherein a number of the first conductors to which the plurality of orthogonal code signals produced by the code string signal production circuit are supplied and a number of the second conductors from which signals are to be received for obtaining one correlation value are set according to a level of the signals received from the plurality of second conductors.

21. The pointer detection apparatus according to claim 1, wherein a number of the plurality of first conductors which are disposed in the first direction is at least 2×(4N−1), N being an integer equal to or greater than 2, and the 4N−1 orthogonal code signals produced by the code string signal production circuit are supplied to 4N−1 ones of the first conductors while signals output from a waveform inversion circuit, which inverts the phase of said 4N−1 orthogonal code signals, are supplied to the remaining 4N−1 ones of the first conductors.

22. The pointer detection apparatus according to claim 1, wherein the signal detection circuit includes a differential amplification circuit to which second conductors that are disposed adjacent to each other are to be selectively connected.

23. The pointer detection apparatus according to claim 1, wherein a pointing pressure exerted by the pointer on the conductor pattern is determined based on a three-dimensional spatial distribution of the correlation values.

24. The pointer detection apparatus according to claim 23, wherein the pointing pressure exerted by the pointer on the conductor pattern is further determined based on the touched area of the pointer on the conductor pattern.

25. The pointer detection apparatus according to claim 1, further comprising a conductor film, which is made of the same material used to form the first and second conductors and is applied in a region of the conductor pattern other than the region of the conductor pattern in which the first conductors and the second conductors are disposed.

26. The pointer detection apparatus according to claim 1, wherein a state in which the pointer is hovering above the conductor pattern is identified based on both a maximum value and a shape characteristic of the signals detected by the signal detection circuit.

27. The pointer detection apparatus according to claim 1, wherein the position calculation circuit is further configured to calculate a plurality of positions on the conductor pattern pointed to by a plurality of pointers, respectively, based on the correlation values.

28. A method for detecting a pointer position by a pointer detection apparatus having a conductor pattern that includes a plurality of first conductors disposed in a first direction and a plurality of second conductors disposed in a second direction which crosses the first direction, the method comprising:
   supplying a plurality of orthogonal code signals, which have a predetermined time difference from each other and which are produced based on a code string having an orthogonal characteristic, to the plurality of first conductors of the conductor pattern;
   detecting a signal corresponding to a variation of electrostatic capacitance caused between the conductor pattern and a pointer;
   converting the detected signal into a digital signal comprising a word formed of a plurality of bits;
   determining correlation values between code strings provided for correlation and the digital signal obtained by the conversion;
   storing the correlation values; and
   detecting the pointer position based on the correlation values,
   wherein a number of the plurality of orthogonal code signals produced by the code string signal production circuit is 4N−1 each having the same chip length, N being an integer equal to or greater than 2, and the method further comprises producing a determined number of compensation signal(s), the number of the compensation signal(s) being less that 4N−1 set such that the sum of 4N−1 and the number of the compensation signal(s) is an even number and a sum total of signal values output from the plurality of second conductors becomes zero in case the pointer is not present on the conductor pattern.

29. The method according to claim 28, wherein a position on the conductor pattern pointed to by the pointer is calculated based on the stored correlation values.

* * * * *